(12) United States Patent
Kim et al.

(10) Patent No.: US 11,788,851 B2
(45) Date of Patent: Oct. 17, 2023

(54) USER INTERFACES FOR CUSTOMIZED NAVIGATION ROUTES

(71) Applicant: Apple Inc., Cupertino, CA (US)

(72) Inventors: Yun Jae Kim, San Francisco, CA (US); Brian J. Andrich, San Francisco, CA (US); Ting-Yuan Wu, Campbell, CA (US); Christopher Y. Tremblay, San Jose, CA (US); Sean M. Meiners, San Jose, CA (US); Brandon J. Van Ryswyk, Los Altos, CA (US); Song Yang, Beijing (CN); Jin'ao Zhong, Beijing (CN); Kun Chen, Beijing (CN); Amanda Y. Miyahira, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/028,675

(22) Filed: Sep. 22, 2020

(65) Prior Publication Data

US 2021/0389143 A1 Dec. 16, 2021

Related U.S. Application Data

(60) Provisional application No. 63/041,985, filed on Jun. 21, 2020, provisional application No. 63/038,080, filed on Jun. 11, 2020.

(51) Int. Cl.
*G01C 21/34* (2006.01)
*G01C 21/36* (2006.01)
(Continued)

(52) U.S. Cl.
CPC ..... *G01C 21/3461* (2013.01); *G01C 21/3423* (2013.01); *G01C 21/3469* (2013.01);
(Continued)

(58) Field of Classification Search
CPC ............ G01C 21/3461; G01C 21/3423; G01C 21/3469; G01C 21/362; G01C 21/3664;
(Continued)

(56) References Cited

U.S. PATENT DOCUMENTS 5,311,434 A 5/1994 Tamai
5,790,976 A 8/1998 Boll et al.
(Continued)

FOREIGN PATENT DOCUMENTS

DE 102007050021 A1 4/2009
EP 1275936 A2 1/2003
(Continued)

OTHER PUBLICATIONS

Final Office Action received for U.S. Appl. No. 17/028,638, dated Mar. 22, 2021, 15 pages.
(Continued)

*Primary Examiner* — Faris S Almatrahi
*Assistant Examiner* — Abdalla A Khaled
(74) *Attorney, Agent, or Firm* — Kubota & Basol LLP

(57) ABSTRACT

In some embodiments, an electronic device displays suggested routes based on the characteristics of respective vehicles. In some embodiments, an electronic device receives data for respective vehicles from a source external to the electronic device. In some embodiments, an electronic device anonymizes a vehicle identifier and determines customized suggested routes using the anonymized vehicle identifier.

18 Claims, 56 Drawing Sheets

(51) Int. Cl.
  *G01C 21/00* (2006.01)
  *G06F 16/29* (2019.01)
  *G06F 21/62* (2013.01)
(52) U.S. Cl.
  CPC ....... *G01C 21/362* (2013.01); *G01C 21/3664* (2013.01); *G01C 21/3682* (2013.01); *G01C 21/3691* (2013.01); *G01C 21/3697* (2013.01); *G01C 21/3833* (2020.08); *G01C 21/3896* (2020.08); *G06F 16/29* (2019.01); *G06F 21/6254* (2013.01)
(58) Field of Classification Search
  CPC ............ G01C 21/3682; G01C 21/3691; G01C 21/3697; G01C 21/3833; G01C 21/3896; G06F 16/29; G06F 21/6254
  See application file for complete search history.

(56) References Cited

U.S. PATENT DOCUMENTS

| | | |
|---|---|---|
| 5,857,066 A | 1/1999 | Wyche et al. |
| 5,948,040 A | 9/1999 | Delorme et al. |
| 6,181,991 B1 | 1/2001 | Kondo et al. |
| 6,188,957 B1 | 2/2001 | Bechtolsheim et al. |
| 6,323,846 B1 | 11/2001 | Westerman et al. |
| 6,340,936 B1 | 1/2002 | Mcgaffey et al. |
| 6,570,557 B1 | 5/2003 | Westerman et al. |
| 6,677,932 B1 | 1/2004 | Westerman |
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,212,924 B1 | 12/2015 | Salowitz |
| 9,348,458 B2 | 5/2016 | Hotelling et al. |
| 9,417,933 B2 | 8/2016 | Narayanan et al. |
| 9,933,937 B2 | 4/2018 | Lemay et al. |
| 10,169,794 B2* | 1/2019 | Aziz .................. G06Q 30/0281 |
| 10,184,800 B2 | 1/2019 | Fowe et al. |
| 10,360,518 B2 | 7/2019 | Hirose et al. |
| 10,371,536 B2 | 8/2019 | König et al. |
| 10,424,195 B2 | 9/2019 | Kim et al. |
| 10,488,215 B1 | 11/2019 | Yu |
| 10,699,347 B1 | 6/2020 | Slusar et al. |
| 11,015,952 B1 | 5/2021 | Lyle et al. |
| 11,092,459 B2 | 8/2021 | Hoffman et al. |
| 11,196,665 B1 | 12/2021 | Pereira et al. |
| 11,391,597 B2 | 7/2022 | Teske |
| 2002/0015024 A1 | 2/2002 | Westerman et al. |
| 2002/0082773 A1 | 6/2002 | Ikeuchi et al. |
| 2003/0178482 A1 | 9/2003 | Kisliakov |
| 2005/0190059 A1 | 9/2005 | Wehrenberg |
| 2005/0193117 A1 | 9/2005 | Morris |
| 2005/0222766 A1 | 10/2005 | Burch et al. |
| 2006/0017692 A1 | 1/2006 | Wehrenberg et al. |
| 2006/0033724 A1 | 2/2006 | Chaudhri et al. |
| 2006/0190167 A1 | 8/2006 | Inukai |
| 2006/0197753 A1 | 9/2006 | Hotelling |
| 2007/0088500 A1 | 4/2007 | Spinelli |
| 2008/0120171 A1 | 5/2008 | Ikeuchi et al. |
| 2008/0136612 A1 | 6/2008 | Machii et al. |
| 2008/0195314 A1 | 8/2008 | Green |
| 2008/0262714 A1 | 10/2008 | Abramovich |
| 2009/0027399 A1 | 1/2009 | Sato et al. |
| 2009/0112462 A1 | 4/2009 | Lo |
| 2009/0271109 A1 | 10/2009 | Lee et al. |
| 2010/0036599 A1 | 2/2010 | Froeberg et al. |
| 2010/0131190 A1 | 5/2010 | Terauchi et al. |
| 2010/0321406 A1 | 12/2010 | Iwase et al. |
| 2011/0074350 A1 | 3/2011 | Kocher |
| 2011/0112710 A1 | 5/2011 | Meyer-Ebeling et al. |
| 2011/0172909 A1 | 7/2011 | Kahn et al. |
| 2011/0177845 A1 | 7/2011 | Fasold |
| 2011/0178698 A1 | 7/2011 | Aben et al. |
| 2011/0224852 A1 | 9/2011 | Profitt-Brown et al. |
| 2011/0238457 A1 | 9/2011 | Mason et al. |
| 2011/0246055 A1 | 10/2011 | Huck et al. |
| 2012/0004841 A1 | 1/2012 | Schunder |
| 2012/0066035 A1 | 3/2012 | Stanger et al. |
| 2012/0136567 A1 | 5/2012 | Wang et al. |
| 2012/0179521 A1 | 7/2012 | Nelson |
| 2012/0253596 A1 | 10/2012 | Ibrahim et al. |
| 2012/0259541 A1 | 10/2012 | Downey et al. |
| 2012/0271547 A1 | 10/2012 | Mori |
| 2012/0324228 A1* | 12/2012 | Padhye .................. H04L 9/321 |
| | | 713/176 |
| 2013/0024112 A1 | 1/2013 | Tate, Jr. |
| 2013/0060462 A1 | 3/2013 | Hansen |
| 2013/0116919 A1 | 5/2013 | Furuhata et al. |
| 2013/0124006 A1 | 5/2013 | Anantha et al. |
| 2013/0132019 A1 | 5/2013 | Suzuno |
| 2013/0179057 A1 | 7/2013 | Fisher et al. |
| 2013/0226443 A1 | 8/2013 | Scofield et al. |
| 2013/0297201 A1 | 11/2013 | Van Hende |
| 2013/0304377 A1 | 11/2013 | Van Hende |
| 2013/0328861 A1 | 12/2013 | Arikan et al. |
| 2013/0332070 A1 | 12/2013 | Fleizach et al. |
| 2013/0345959 A1 | 12/2013 | Van Os et al. |
| 2013/0345975 A1 | 12/2013 | Vulcano et al. |
| 2014/0107919 A1 | 4/2014 | Venkatraman et al. |
| 2014/0180582 A1 | 6/2014 | Pontarelli et al. |
| 2014/0197924 A1 | 7/2014 | Wegelin et al. |
| 2014/0214261 A1 | 7/2014 | Ramamoorthy et al. |
| 2014/0244110 A1 | 8/2014 | Tharaldson et al. |
| 2014/0365120 A1 | 12/2014 | Vulcano et al. |
| 2014/0365122 A1 | 12/2014 | Mcgavran et al. |
| 2015/0015513 A1 | 1/2015 | Kwak et al. |
| 2015/0032366 A1 | 1/2015 | Man et al. |
| 2015/0051829 A1 | 2/2015 | Gearhart et al. |
| 2015/0081210 A1 | 3/2015 | Yeh et al. |
| 2015/0125042 A1* | 5/2015 | Haden .................... G06V 20/52 |
| | | 382/105 |
| 2015/0192426 A1 | 7/2015 | Foster et al. |
| 2015/0285652 A1 | 10/2015 | Peri et al. |
| 2015/0300823 A1 | 10/2015 | Kahn et al. |
| 2015/0338223 A1 | 11/2015 | Letz |
| 2015/0345958 A1 | 12/2015 | Graham |
| 2016/0047666 A1 | 2/2016 | Fuchs |
| 2016/0078037 A1 | 3/2016 | Ziezold et al. |
| 2016/0102992 A1 | 4/2016 | Otero Diaz et al. |
| 2016/0124707 A1 | 5/2016 | Ermilov et al. |
| 2016/0138927 A1 | 5/2016 | Ettinger et al. |
| 2016/0187152 A1 | 6/2016 | Tanizaki et al. |
| 2016/0210834 A1 | 7/2016 | Dayal |
| 2016/0252363 A1 | 9/2016 | Tertoolen et al. |
| 2016/0313138 A1 | 10/2016 | Chupakhin |
| 2016/0356613 A1 | 12/2016 | Hajj et al. |
| 2016/0375306 A1 | 12/2016 | Gu et al. |
| 2017/0001649 A1 | 1/2017 | Dickow |
| 2017/0023373 A1 | 1/2017 | Buchholz et al. |
| 2017/0061708 A1 | 3/2017 | Sol |
| 2017/0074669 A1 | 3/2017 | Newlin et al. |
| 2017/0176195 A1 | 6/2017 | Rajagopalan et al. |
| 2017/0276502 A1 | 9/2017 | Fischer et al. |
| 2017/0328734 A1 | 11/2017 | Devkar et al. |
| 2018/0058868 A1 | 3/2018 | Kang et al. |
| 2018/0080788 A1 | 3/2018 | Belvadi Shankaraiah et al. |
| 2018/0088966 A1 | 3/2018 | Chourasiya |
| 2018/0100742 A1 | 4/2018 | Greenwood et al. |
| 2018/0113606 A1 | 4/2018 | Crawford et al. |
| 2018/0129276 A1 | 5/2018 | Nguyen et al. |
| 2018/0143029 A1 | 5/2018 | Nikulin et al. |
| 2018/0253617 A1* | 9/2018 | Tsai ..................... G08G 1/0175 |
| 2018/0266842 A1 | 9/2018 | Di Censo et al. |
| 2019/0003849 A1 | 1/2019 | Pahwa et al. |
| 2019/0178660 A1* | 6/2019 | Greenberg ......... G01C 21/3469 |

(56) References Cited

U.S. PATENT DOCUMENTS

| | | | |
|---|---|---|---|
| 2019/0178672 A1 | 6/2019 | Woolley | |
| 2019/0219410 A1 | 7/2019 | Burgess et al. | |
| 2019/0219411 A1 | 7/2019 | Christen et al. | |
| 2019/0266890 A1 | 8/2019 | Lei et al. | |
| 2019/0293447 A1 | 9/2019 | O'beimne et al. | |
| 2019/0303088 A1 | 10/2019 | Yuan | |
| 2019/0383637 A1 | 12/2019 | Teske | |
| 2020/0012391 A1 | 1/2020 | Fleizach et al. | |
| 2020/0026946 A1* | 1/2020 | Hu | G08G 1/017 |
| 2020/0096358 A1 | 3/2020 | Dal Bo et al. | |
| 2020/0200551 A1 | 6/2020 | Fischer et al. | |
| 2020/0273333 A1 | 8/2020 | Elshenawy | |
| 2021/0004627 A1* | 1/2021 | Chen | G06K 9/6212 |
| 2021/0213959 A1 | 7/2021 | Shahriari et al. | |
| 2021/0233393 A1 | 7/2021 | Sievers et al. | |
| 2021/0255828 A1* | 8/2021 | Krishnan | G06F 3/0481 |
| 2021/0302175 A1 | 9/2021 | Pishdadian et al. | |
| 2021/0356281 A1 | 11/2021 | Hajj | |
| 2021/0356287 A1 | 11/2021 | Hajj et al. | |
| 2021/0356288 A1 | 11/2021 | Hajj et al. | |
| 2021/0374285 A1 | 12/2021 | D'Agostino | |
| 2021/0389142 A1 | 12/2021 | Kim et al. | |
| 2021/0389144 A1 | 12/2021 | Kim et al. | |
| 2022/0221292 A1 | 7/2022 | Putnam et al. | |
| 2022/0390248 A1 | 12/2022 | Apuy et al. | |
| 2022/0391074 A1 | 12/2022 | Apuy et al. | |

FOREIGN PATENT DOCUMENTS

| | | |
|---|---|---|
| EP | 2378249 A1 | 10/2011 |
| EP | 2721844 A2 | 4/2014 |
| EP | 2825902 A1 | 1/2015 |
| EP | 3104122 A1 | 12/2016 |
| EP | 3343472 A1 | 7/2018 |
| EP | 3534119 A1 | 9/2019 |
| KR | 10-2013-0033948 A | 4/2013 |
| WO | 2012/141827 A2 | 10/2012 |
| WO | 2013/138183 A1 | 9/2013 |
| WO | 2013/169849 A2 | 11/2013 |
| WO | 2014/105276 A1 | 7/2014 |
| WO | 2016/090282 A1 | 6/2016 |

OTHER PUBLICATIONS

Non-Final Office Action received for U.S. Appl. No. 17/028,638, dated Nov. 16, 2020, 16 pages.

Non-Final Office Action received for U.S. Appl. No. 17/028,638, dated Jun. 7, 2022, 20 Pages.

Final Office Action received for U.S. Appl. No. 16/460,507, dated Aug. 11, 2020, 37 pages.

Final Office Action received for U.S. Appl. No. 16/460,507, dated Aug. 18, 2021, 40 pages.

International Search Report received for PCT Patent Application No. PCT/US2021/032640, dated Oct. 13, 2021, 7 pages.

International Search Report received for PCT Patent Application No. PCT/US2021/037124, dated Jan. 21, 2022, 9 pages.

Non Final Office Action received for U.S. Appl. No. 17/030,131, dated Apr. 4, 2022, 51 pages.

Non-Final Office Action received for U.S. Appl. No. 16/460,507, dated Apr. 6, 2020, 37 pages.

Non-Final Office Action received for U.S. Appl. No. 16/460,507, dated Feb. 22, 2022, 50 pages.

Non-Final Office Action received for U.S. Appl. No. 16/460,507, dated Feb. 25, 2021, 37 pages.

Non-Final Office Action received for U.S. Appl. No. 17/028,638, dated Nov. 2, 2021, 17 pages.

Non-Final Office Action received for U.S. Appl. No. 17/030,091, dated Feb. 4, 2022, 21 pages.

Non-Final Office Action received for U.S. Appl. No. 17/030,165, dated Feb. 1, 2022, 30 pages.

Non-Final Office Action received for U.S. Appl. No. 17/485,344, dated Dec. 7, 2021, 40 pages.

Google, "Biking Directions on Google Maps", Available online at: <https://www.youtube.com/watch?v=JN5_NBSu7LW>, [Retrieved Mar. 7, 2022], Mar. 10, 2010, 1 page.

Notice of Allowance received for U.S. Appl. No. 17/485,344, dated Apr. 19, 2022, 9 Pages.

Restriction Requirement received for U.S. Appl. No. 17/028,322, dated Apr. 13, 2022, 6 Pages.

ABRP 3.7 Release Notes, Apple Store Release Notes, Available online at: <https://web.archive.org/web/20191225192637/https://apps.apple.com/us/app/a-better-routeplanner-abrp/id1490860521 >, [Retrieved Jul. 19, 2022], Apr. 26, 2019, pp. 1-16.

Corrected Notice of Allowance received for U.S. Appl. No. 17/485,344, dated Oct. 3, 2022, 3 pages.

Final Office Action received for U.S. Appl. No. 17/030,091, dated Aug. 17, 2022, 26 pages.

International Search Report received for PCT Patent Application No. PCT/US2022/072600, dated Sep. 2, 2022, 5 pages.

Non-Final Office Action received for U.S. Appl. No. 17/028,322, dated Jul. 28, 2022, 22 Pages.

Notice of Allowance received for U.S. Appl. No. 16/460,507, dated Sep. 15, 2022, 35 Pages.

Notice of Allowance received for U.S. Appl. No. 17/485,344, dated Sep. 9, 2022, 9 pages.

Waze Suggestion Box, Available online at: <https://waze.uservoice.com/forums/59223-waze-suggestion-box/suggestions/803059-add-pause-option-for-stops?page=3&per_page=20>, [Retrieved Jul. 21, 2022], 2010, pp. 1-7.

What are the Best EV Route Planners?, enrg.io, Available online at: <https://enrg.io/what-are-the-best-ev-route-planners/>, [Retrieved Jul. 19, 2022], 2019, pp. 1-10.

Baum et al., "Shortest Feasible Paths with Charging Stops for Battery Electric Vehicles", ARXIV.org, Cornell University Library, Available online at: <https://doi.org/10.48550/arXiv.1910.09812>, [Retrieved Sep. 8, 2022], Oct. 22, 2019, pp. 1-43.

Fingas, Jon, "Tesla's in-Car Trip Planning Tool is Available on the Web", Engadget, Available online at: <https://www.engadget.com/2018-01-04-tesla-trip-planner-available-on-web.html#:-:text=There's%20now%20a%20better%20way,particular%20Tesla%20you're%20driving>, [Retrieved Jul. 19, 2022], Jan. 4, 2018, pp. 1-5.

Lambert, Fred, "Tesla Launches a New Web-Based Trip Planning Tool Using the Supercharger Network", Electrek, Available online at: <https://electrek.co/2018/01/04/ tesla-launches-new-web-based-trip-planning-tool-supercharger-network/>, [Retrieved Jul. 19, 2022], Jan. 4, 2018, pp. 1-6.

Zündorf, Tobias, "Electric Vehicle Routing with Realistic Recharging Models", Available online at: <https://i11www.iti.kit.edu/_media/teaching/theses/ma-zuendorf-14.pdf>, [Retrieved Aug. 22, 2022], Nov. 1, 2014, 94 pages.

Final Office Action received for U.S. Appl. No. 17/028,322, dated Jan. 3, 2023, 22 pages.

Final Office Action received for U.S. Appl. No. 17/028,638, dated Dec. 7, 2022, 24 pages.

Final Office Action received for U.S. Patent Application No. 17/030,165, dated Nov. 15, 2022, 50 pages.

Notice of Allowance received for U.S. Appl. No. 17/028,638, dated Apr. 4, 2023, 26 pages.

Notice of Allowance received for U.S. Appl. No. 17/030,091, dated Feb. 3, 2023, 9 pages.

Notice of Allowance received for U.S. Patent Application No. 17/030, 131, dated Dec. 7, 2022, 11 pages.

Welcome to EV Trip Planner Version 2.8, VTripPlanner, Available Online at: <https://web.archive.org/web/20180807120132/https://www.evtripplanner.com/planner/2-8/>, 2018, 3 pages.

\* cited by examiner

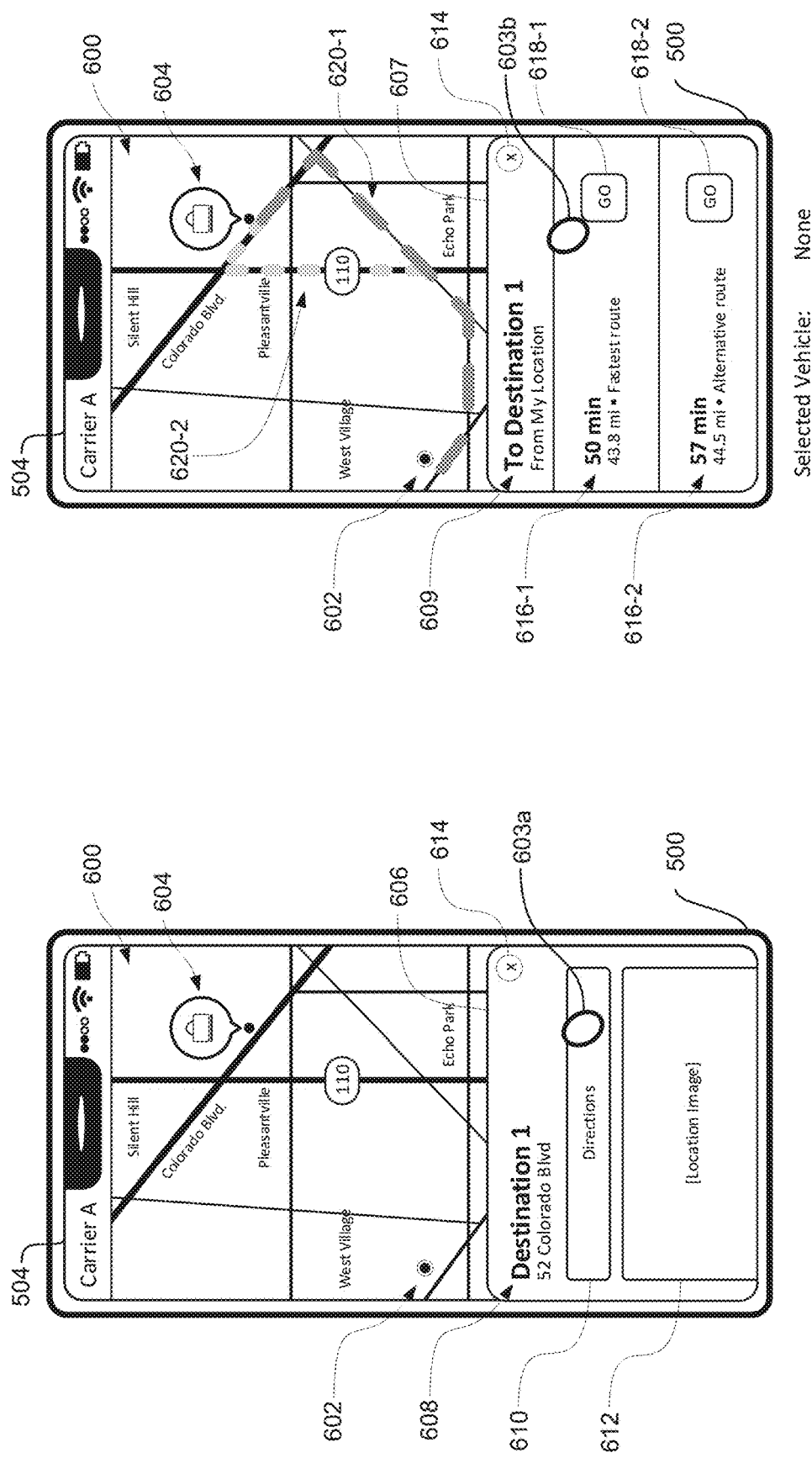

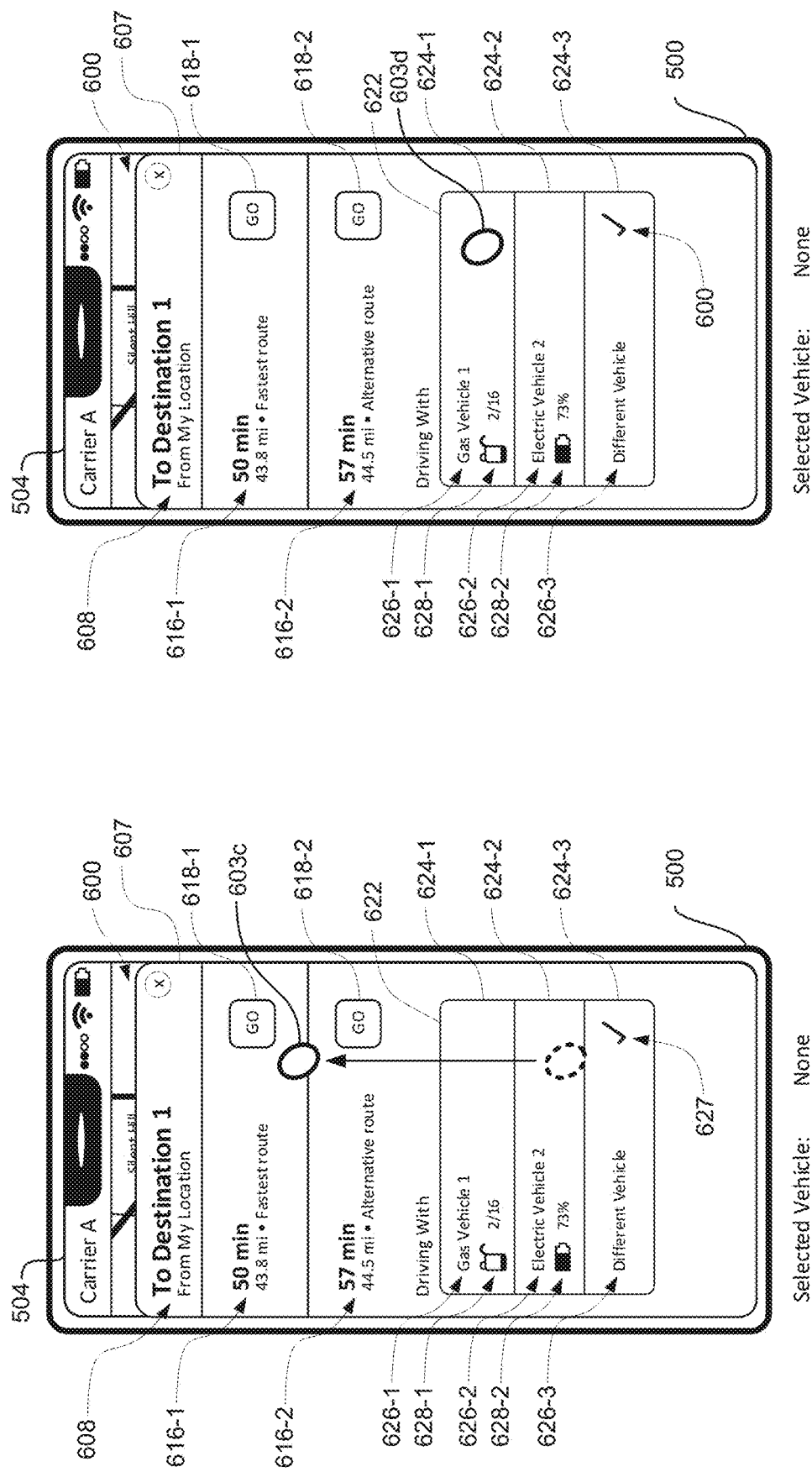

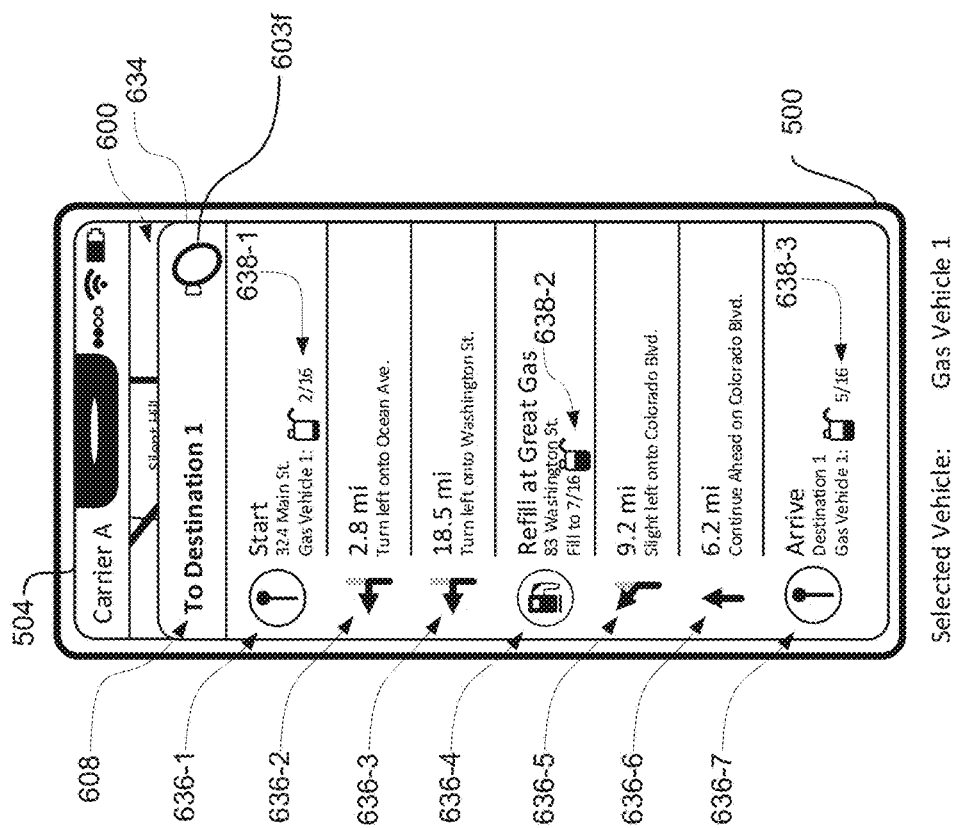
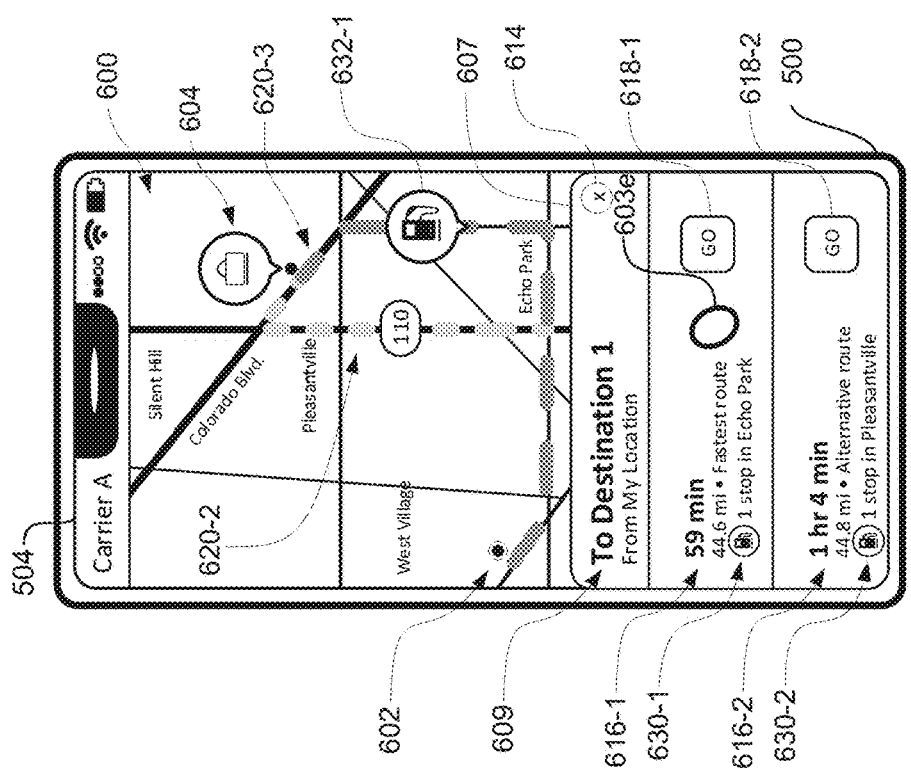
FIG. 6F
FIG. 6E

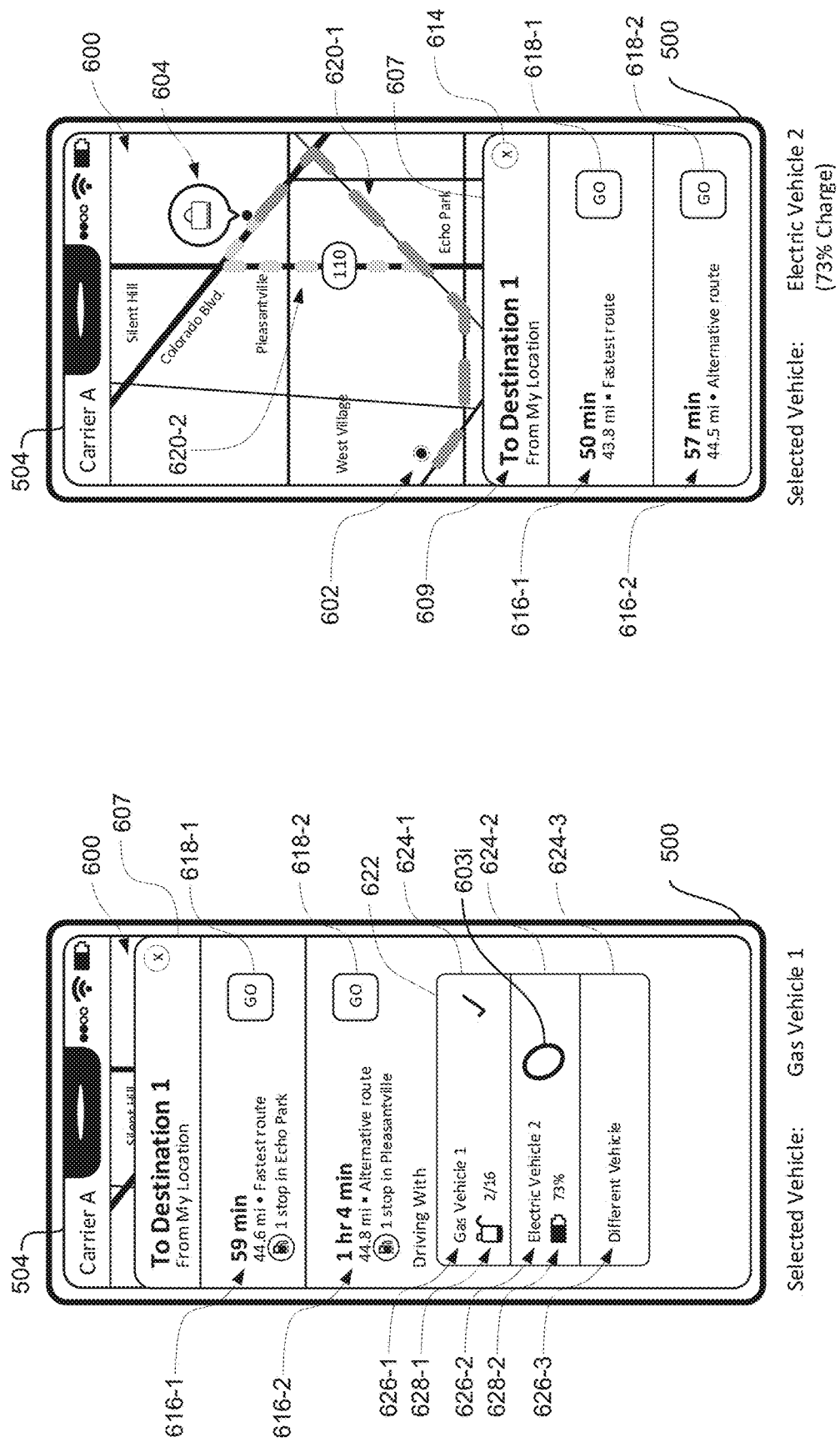

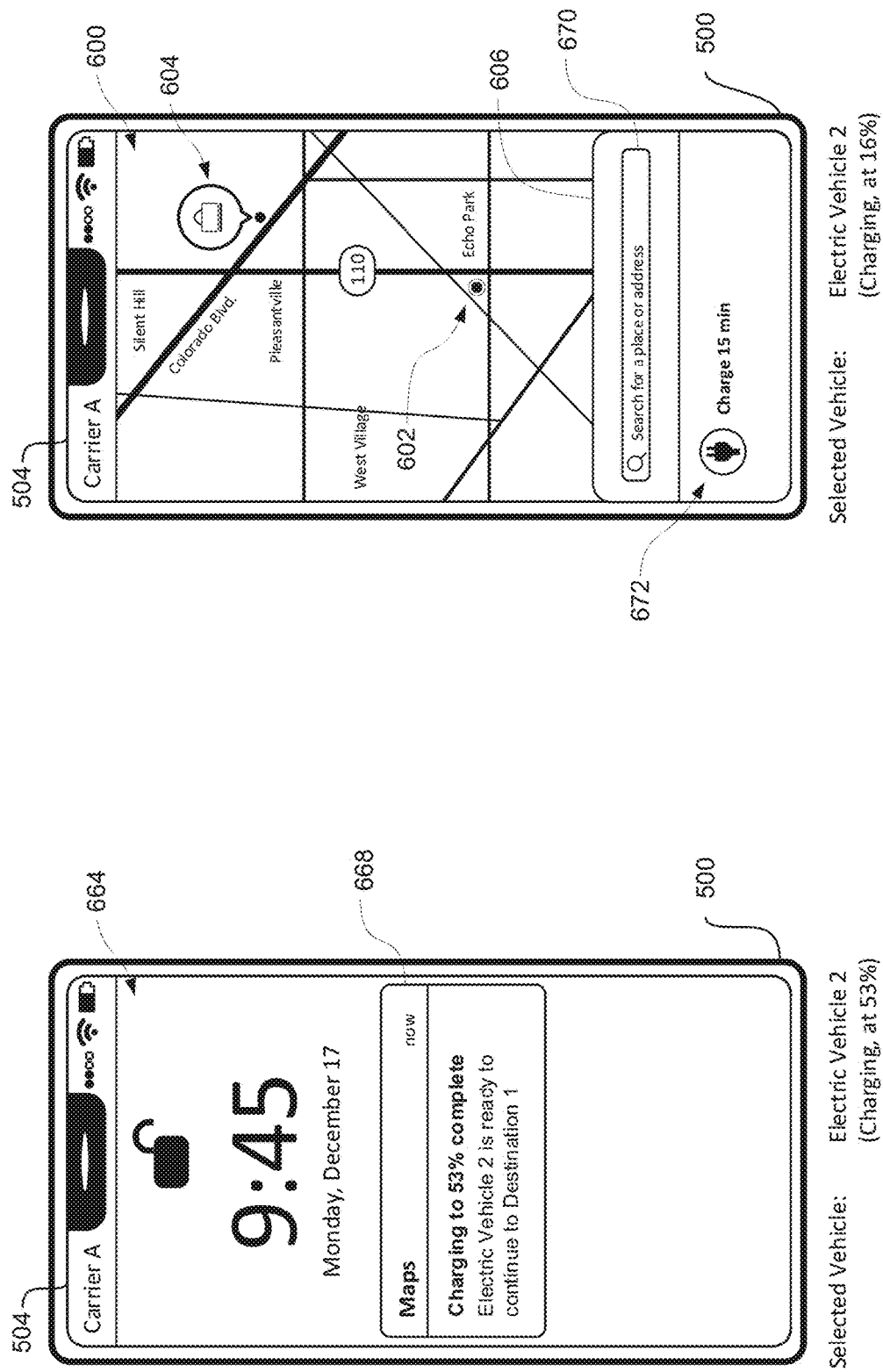

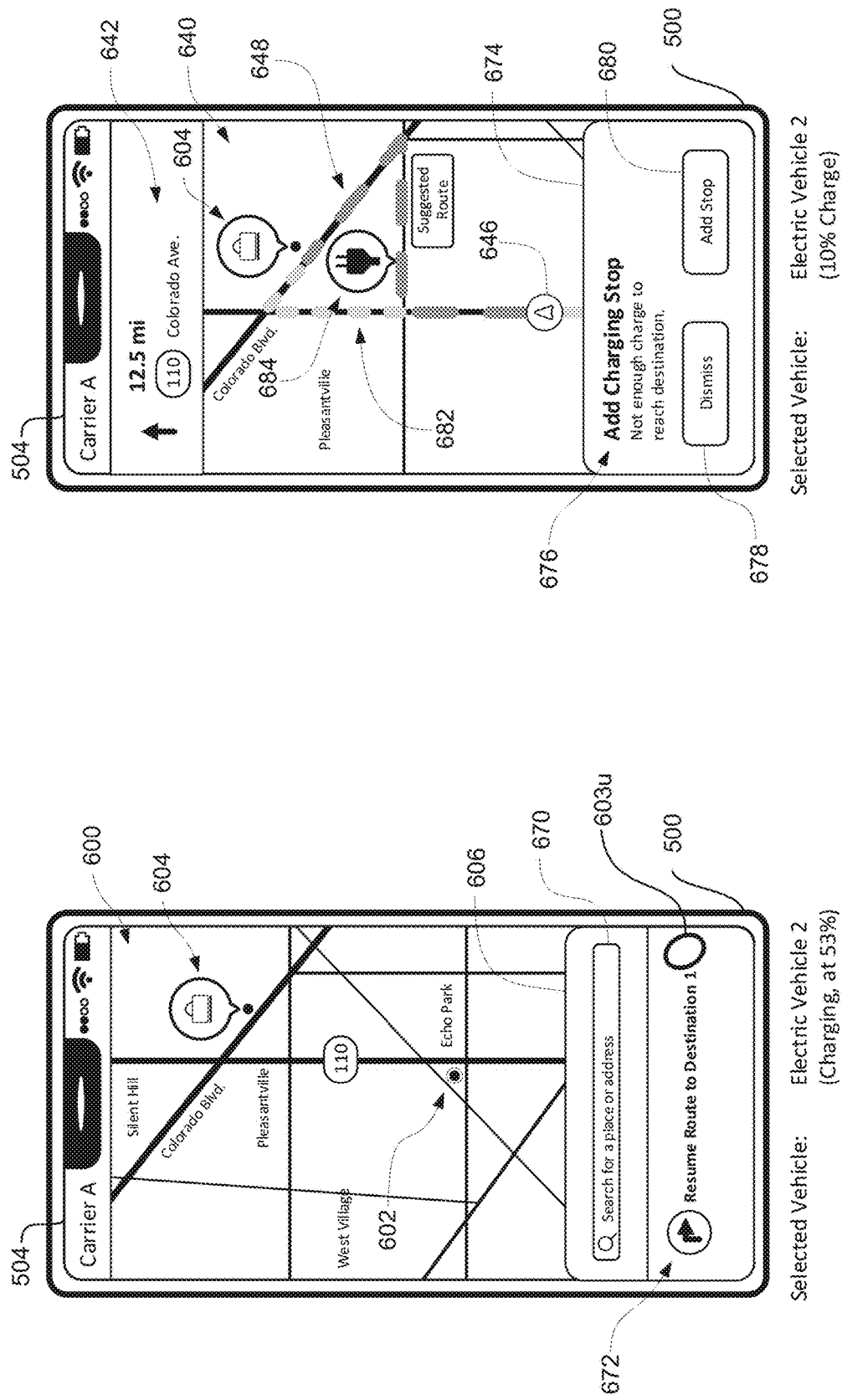

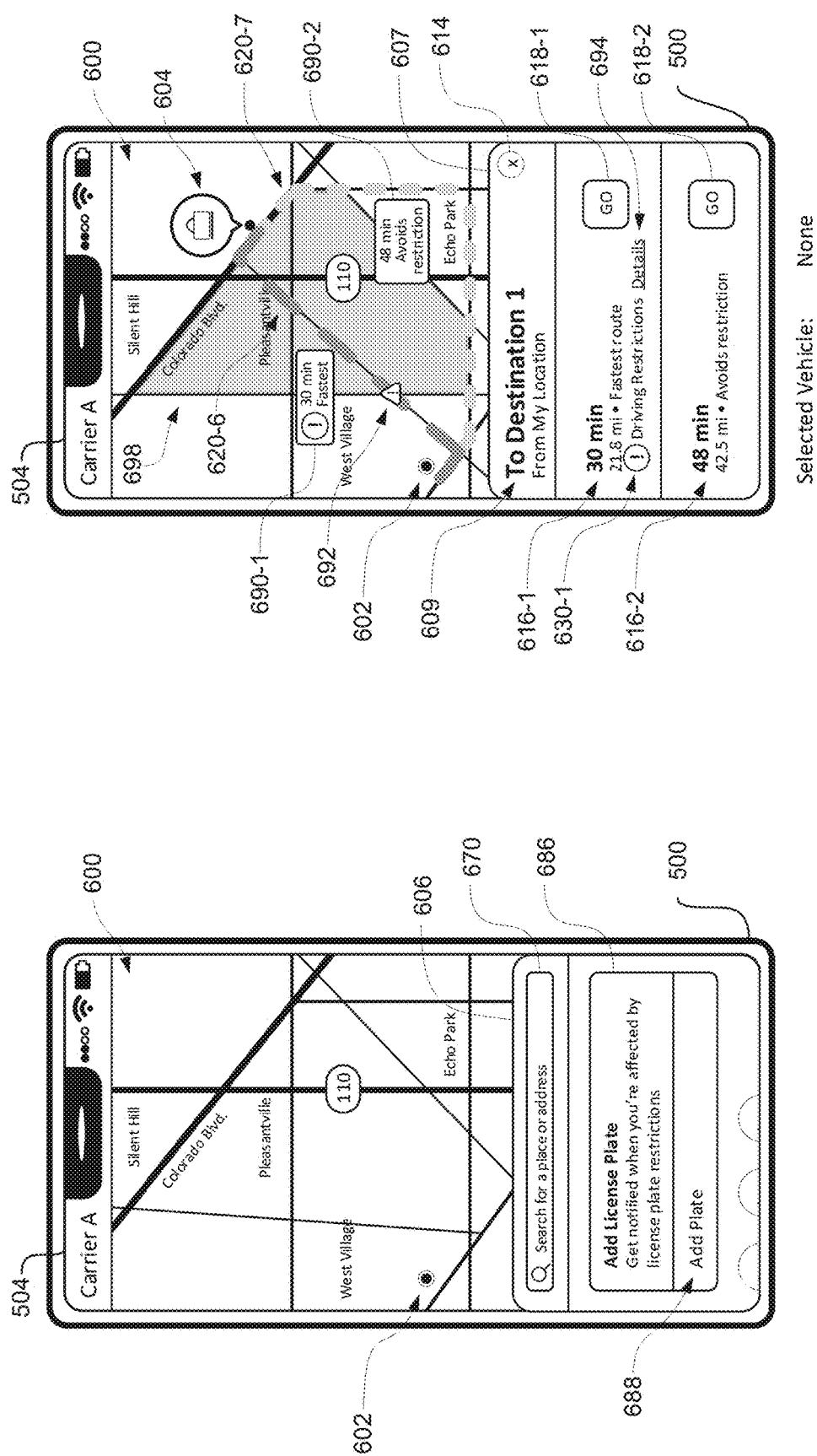

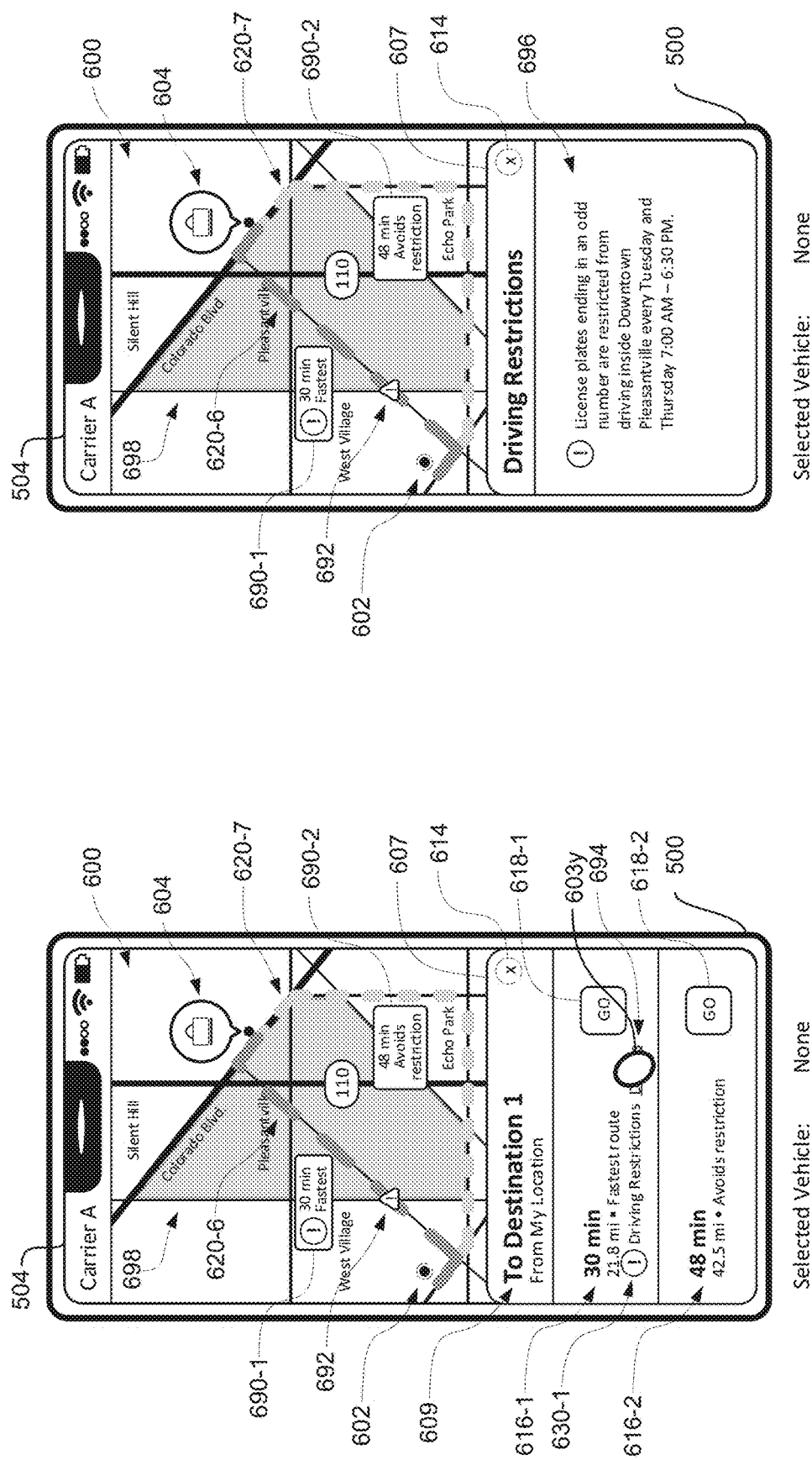

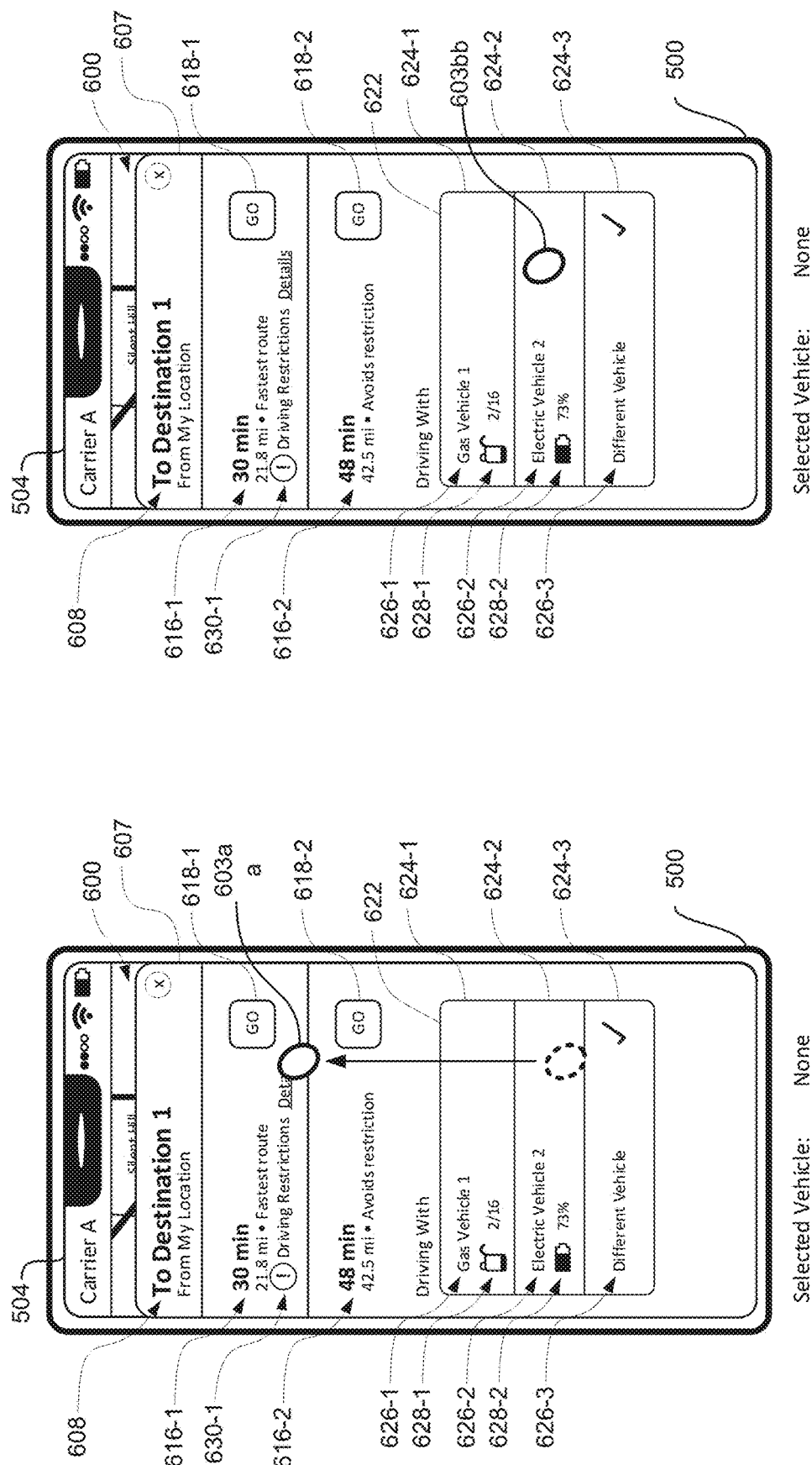

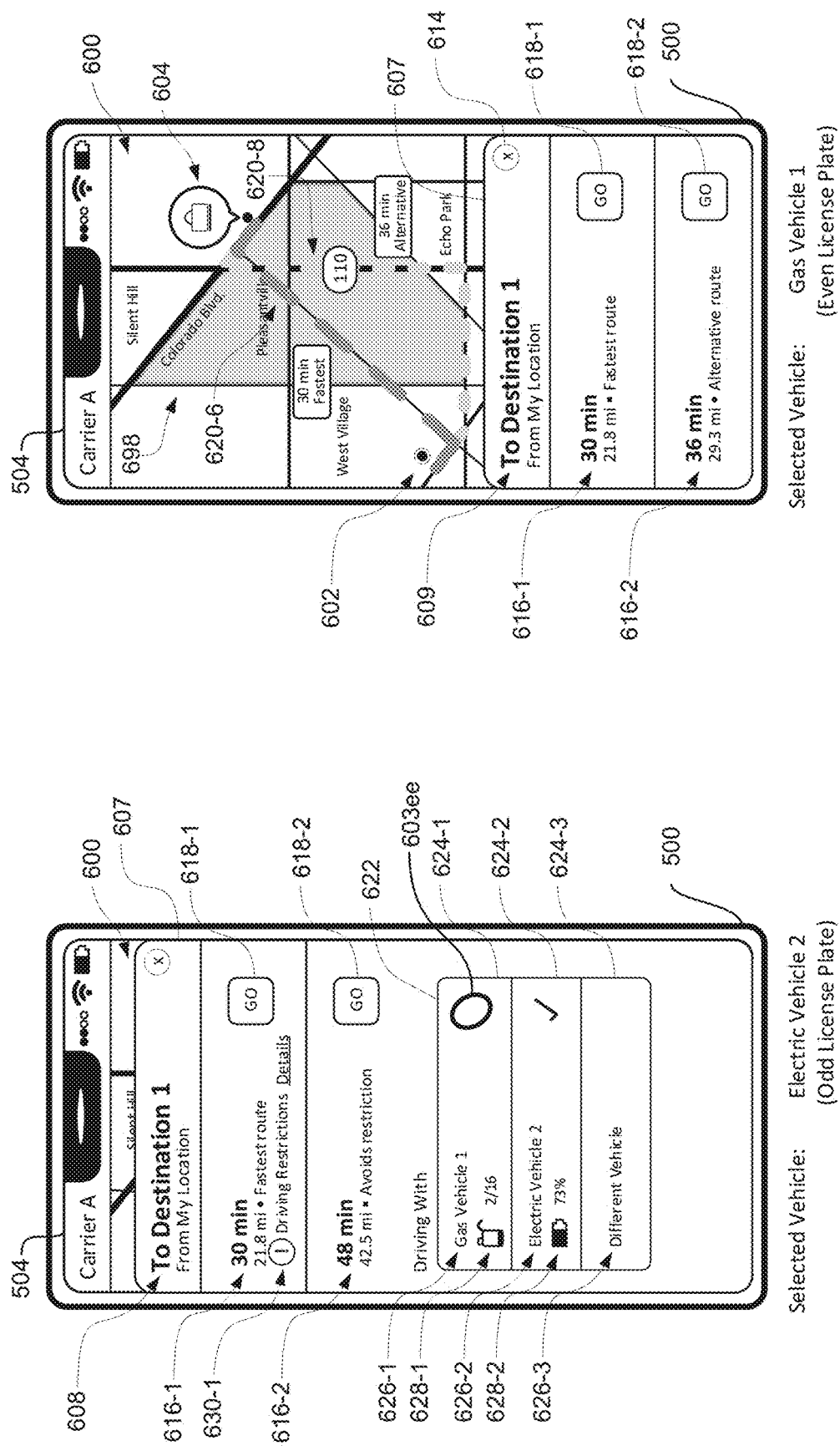

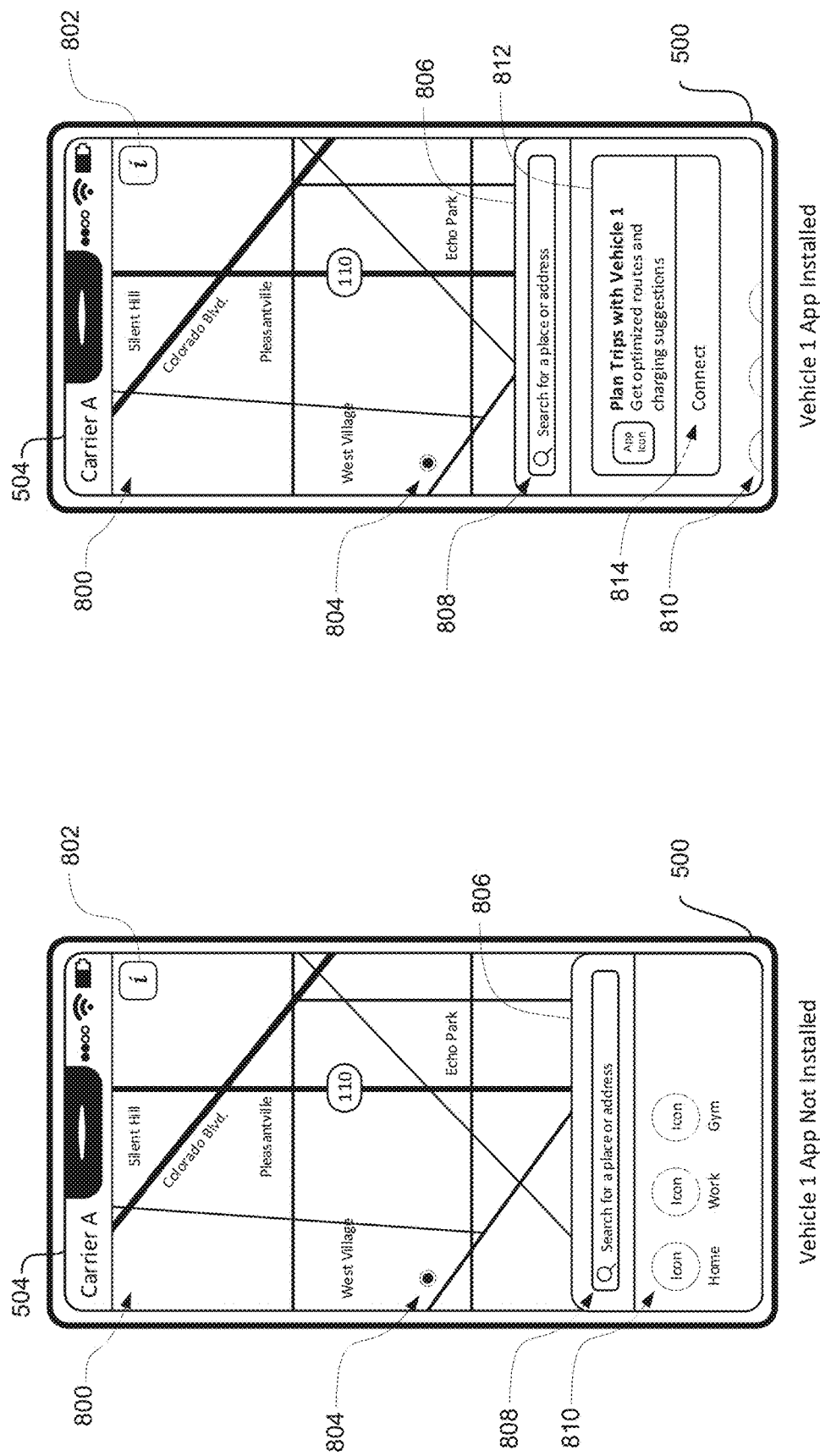

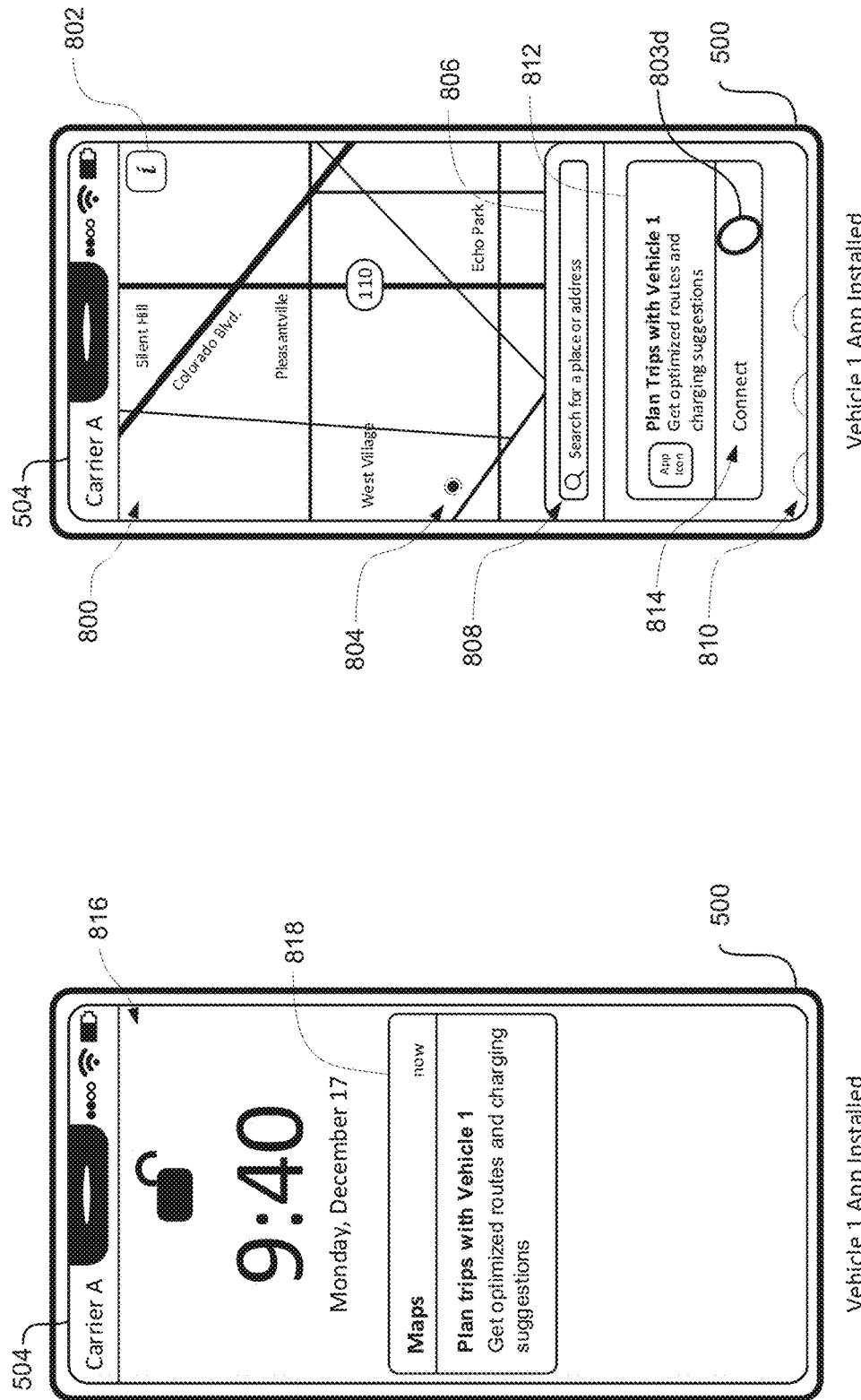

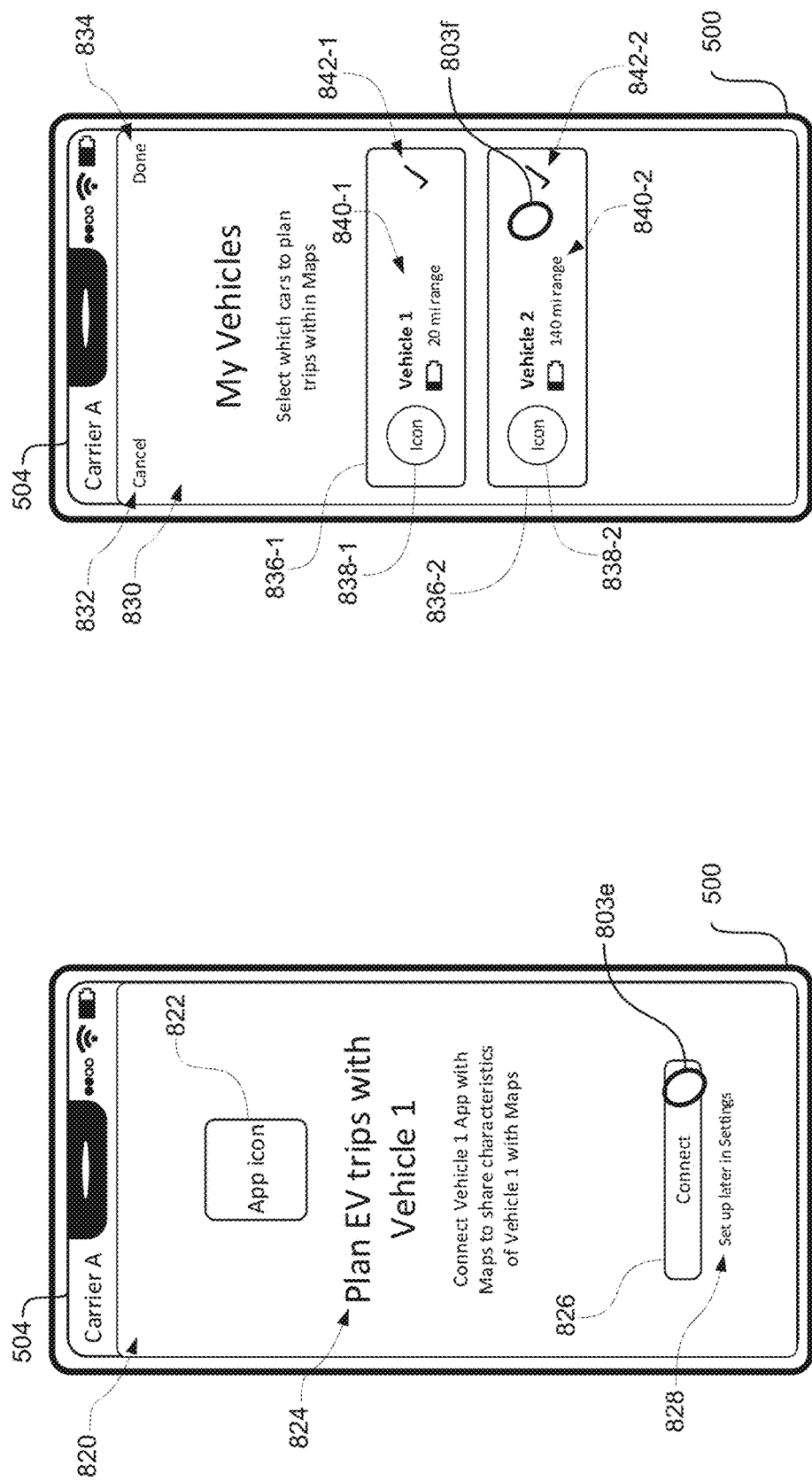

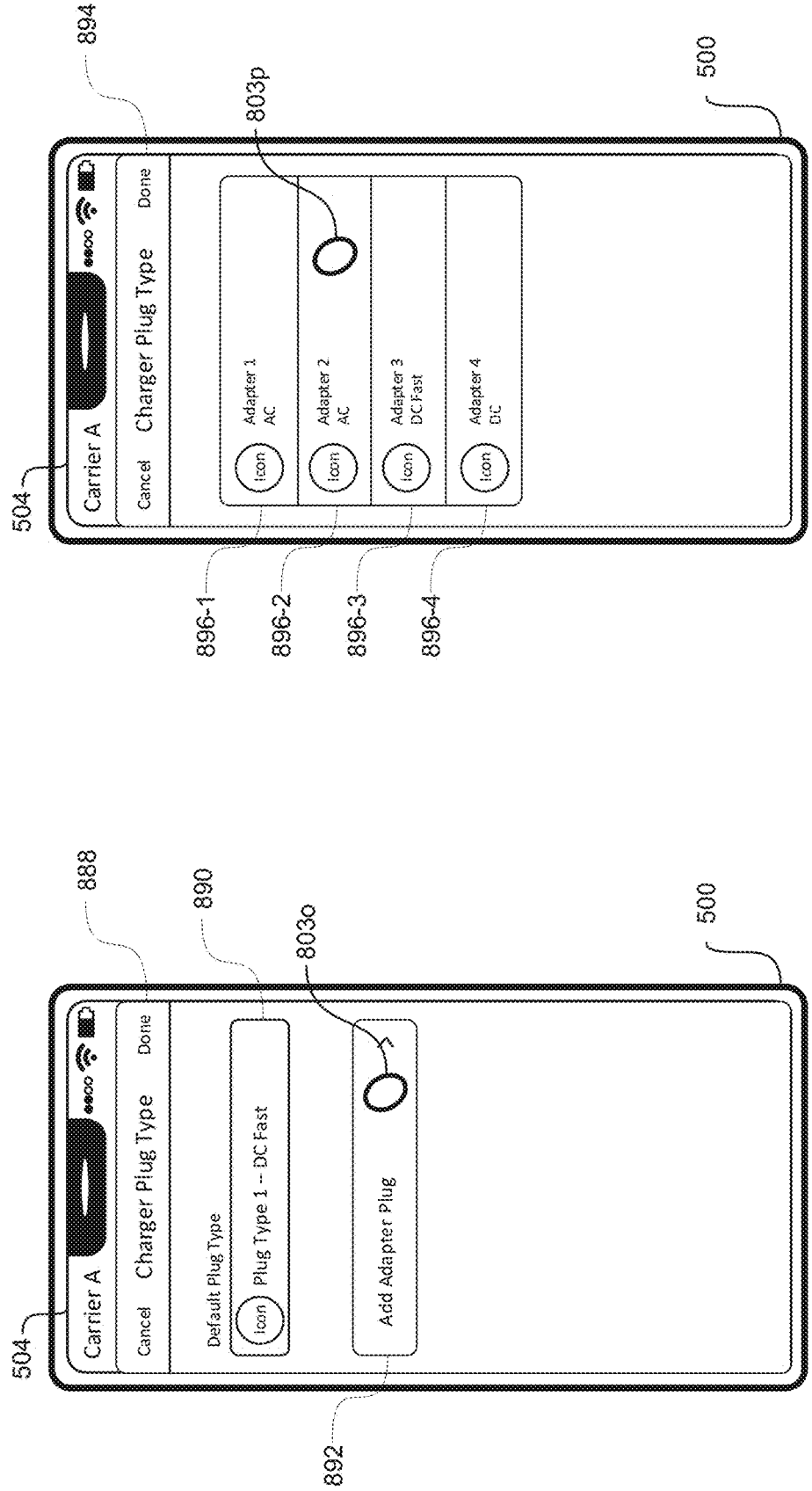

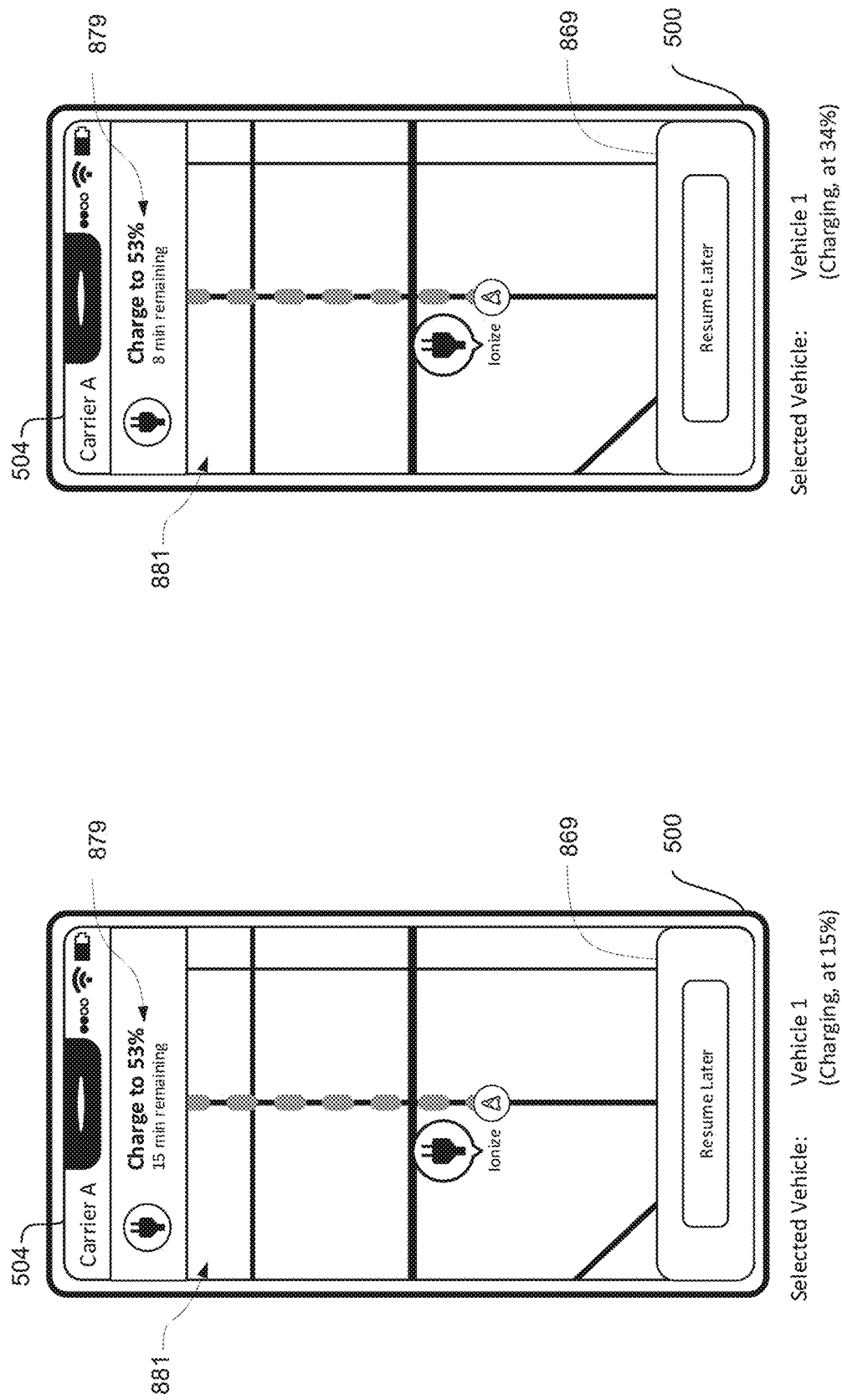

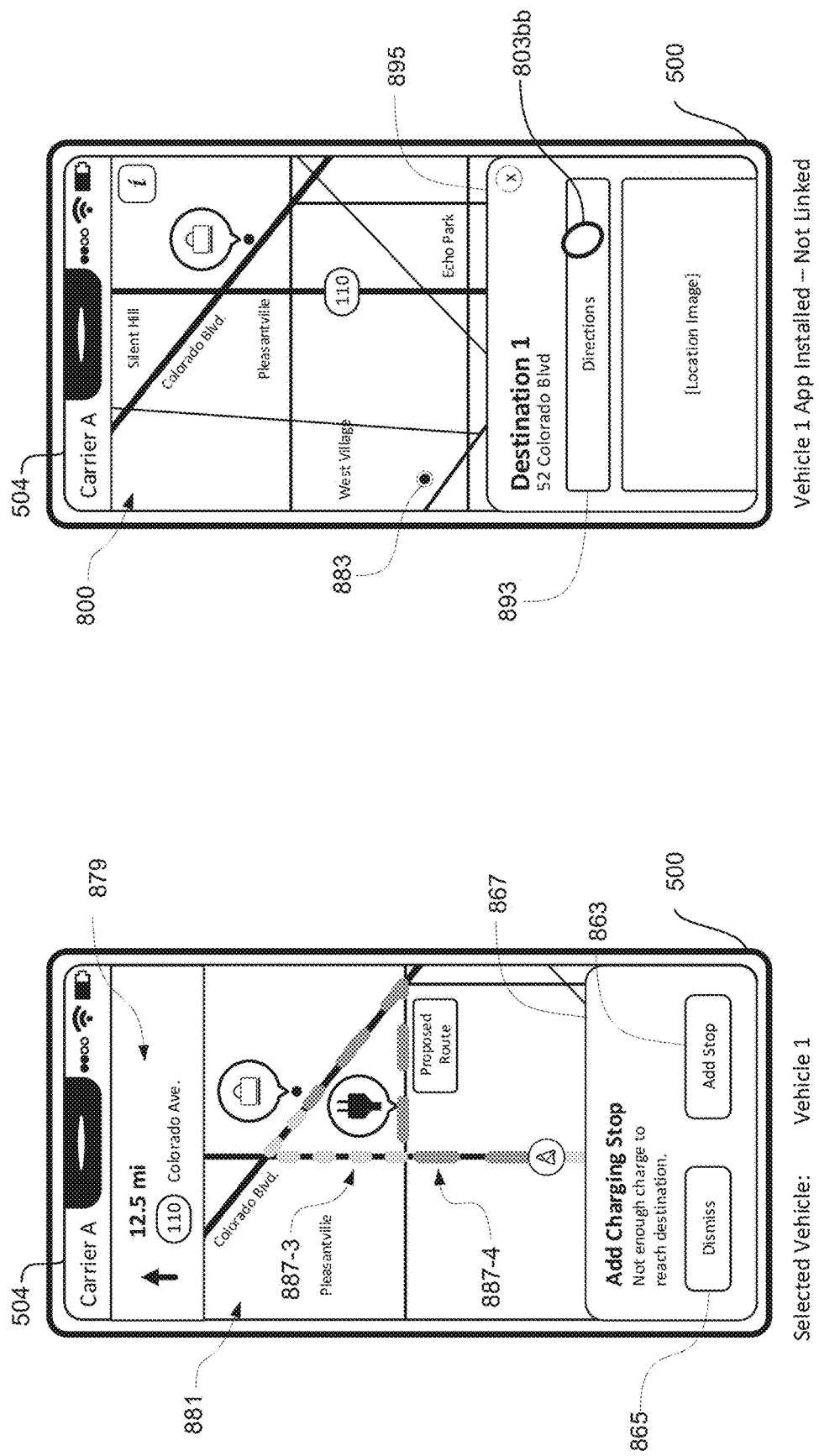

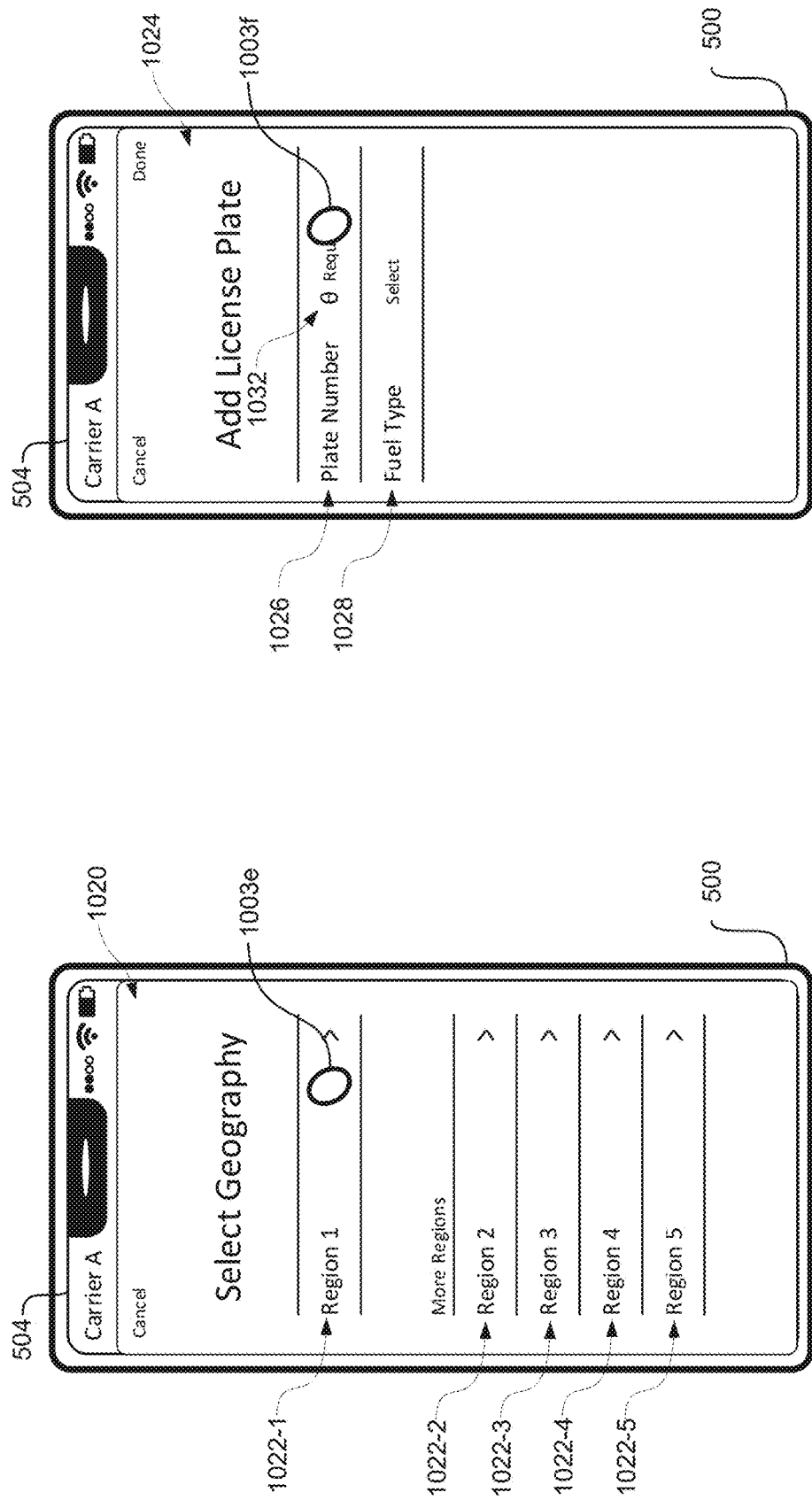

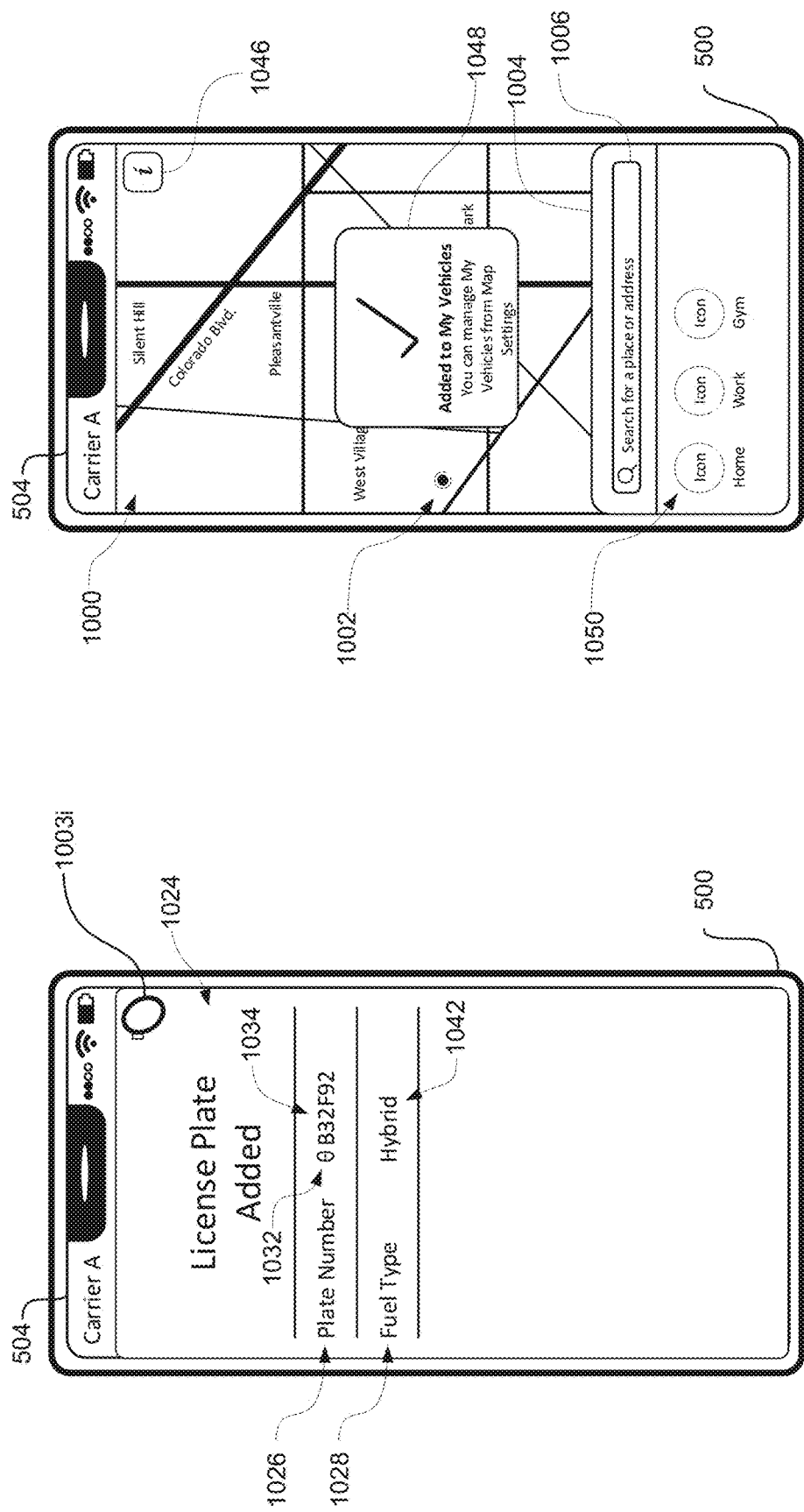

USER INTERFACES FOR CUSTOMIZED NAVIGATION ROUTES

CROSS REFERENCE TO RELATED APPLICATIONS

This application claims the benefit of U.S. Provisional Patent Application No. 63/038,080, filed Jun. 11, 2020, and U.S. Provisional Patent Application No. 63/041,985, filed Jun. 21, 2020, the contents of which are hereby incorporated by reference in their entireties for all purposes.

FIELD OF THE DISCLOSURE

This disclosure relates generally to user interfaces that enable a user to view navigation routes that are customized for a respective vehicle.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, an electronic device displays map user interfaces. In some circumstances, map user interfaces display suggested directions and routes.

SUMMARY OF THE DISCLOSURE

Some embodiments described in this disclosure are directed to displaying suggested routes based on the characteristics of respective vehicles. Some embodiments described in this disclosure are directed to receiving data for respective vehicles from external sources. Some embodiments described in this disclosure are directed to anonymizing a vehicle identifier.

The embodiments described in this disclosure provide the user with the ability to view and select navigation routes that are customized for the user's vehicles. This customization improves the user's overall experience and interactions with the device. By customizing views and routes based on a user's vehicle, embodiments also decrease user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
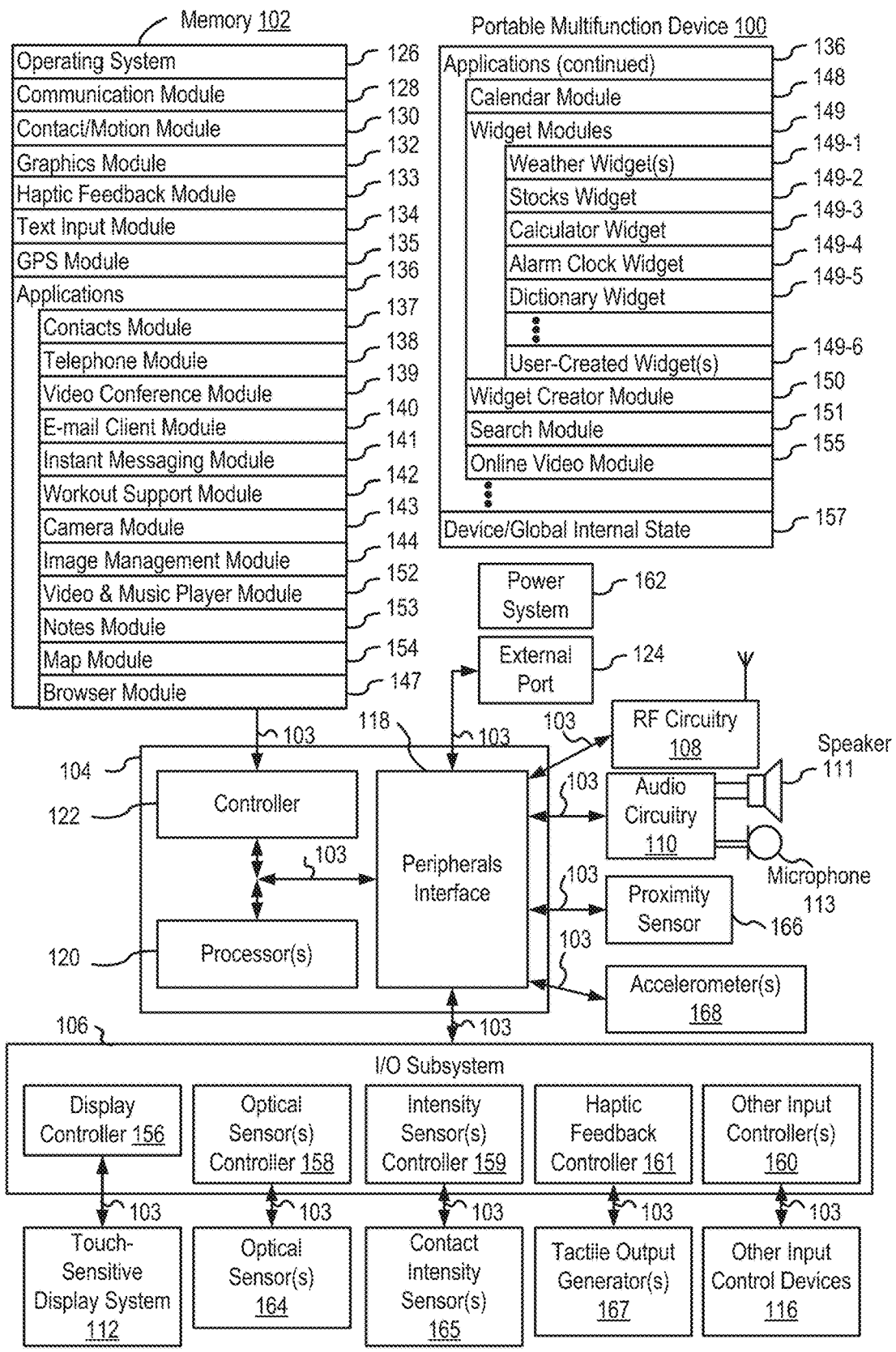
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient user interfaces and mechanisms for user interaction for viewing customized navigation routes. In some implementations, an electronic device displays customized navigation routes for a respective vehicle based on characteristics of the respective vehicle. In some implementations, an electronic device receives the information on the characteristics of the respective vehicle from an external source (e.g., an application associated with the respective vehicle, a server, a website, etc.). In some implementations, an electronic device anonymizes a user's license plate (e.g., to be used in requesting customized routes from a navigation server).

Such techniques can reduce the cognitive burden on a user who uses such devices and/or protect the privacy and/or security of sensitive incidents while providing navigation routes customized for the user's vehicles. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In some embodiments, device 100 is a portable computing system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., an integrated display, touch screen 112, etc.). In some embodiments, the display generation component is separate from the computer system (e.g., an external monitor, a projection system, etc.). As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
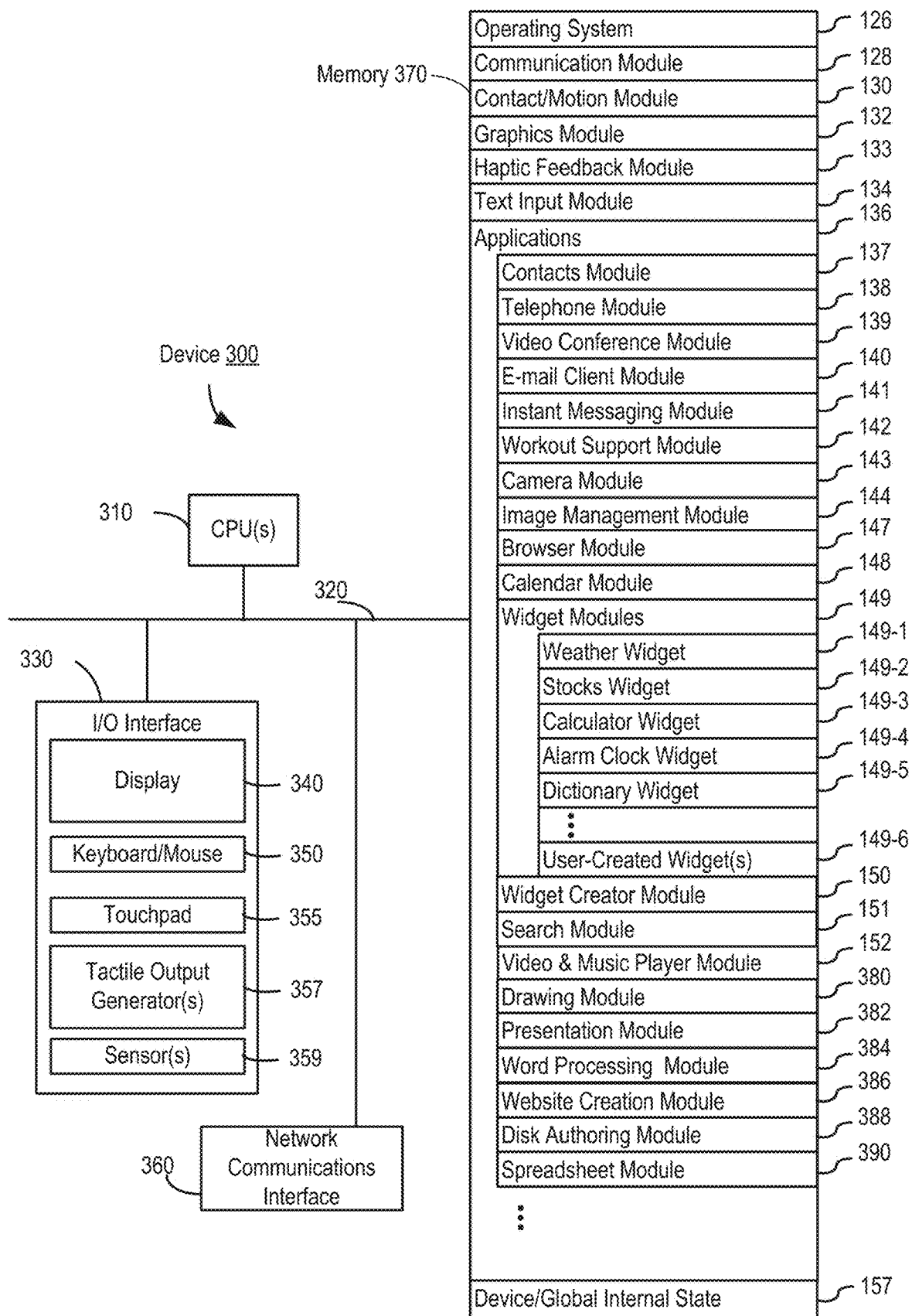
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;

Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo!Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
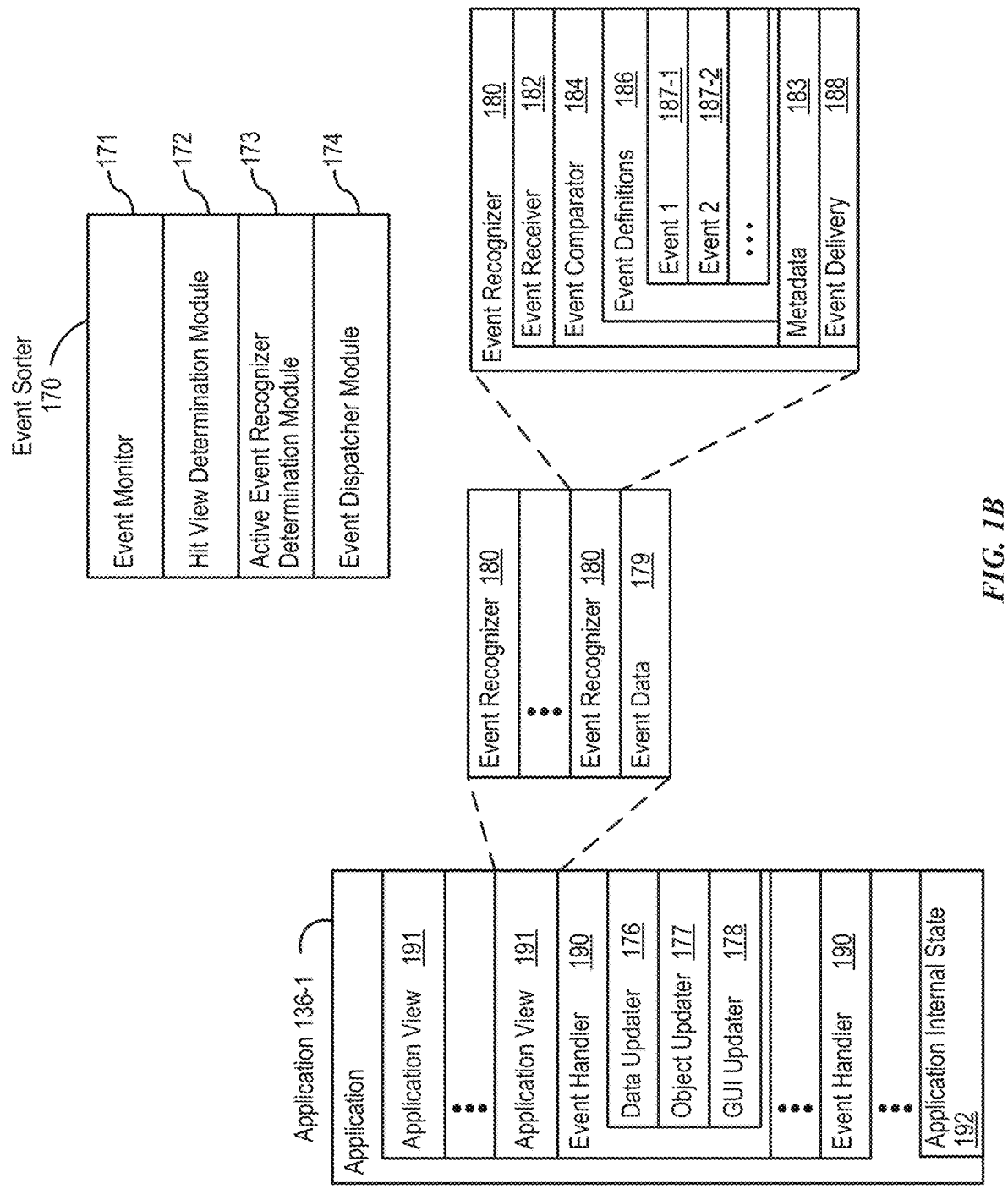
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
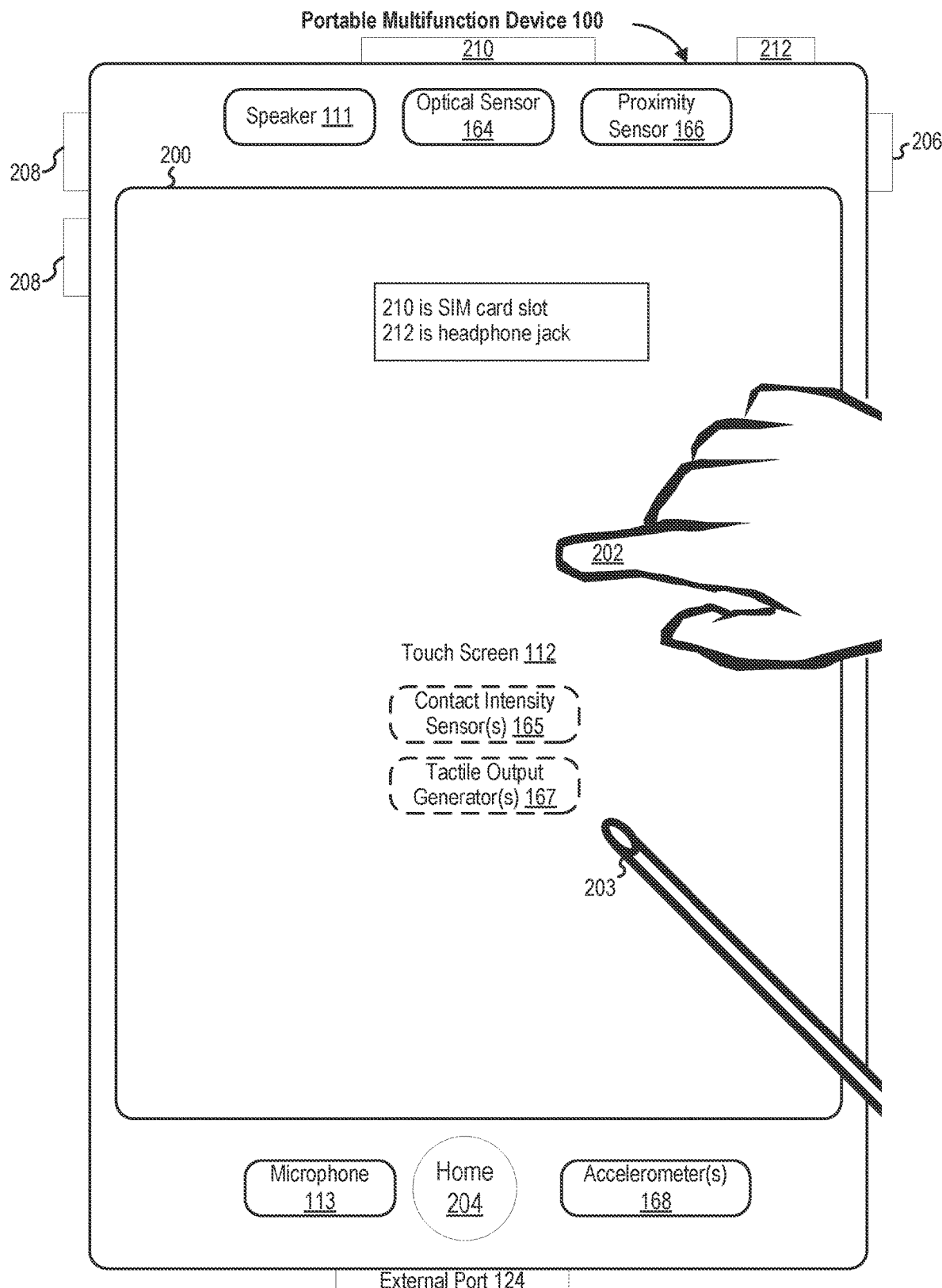
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
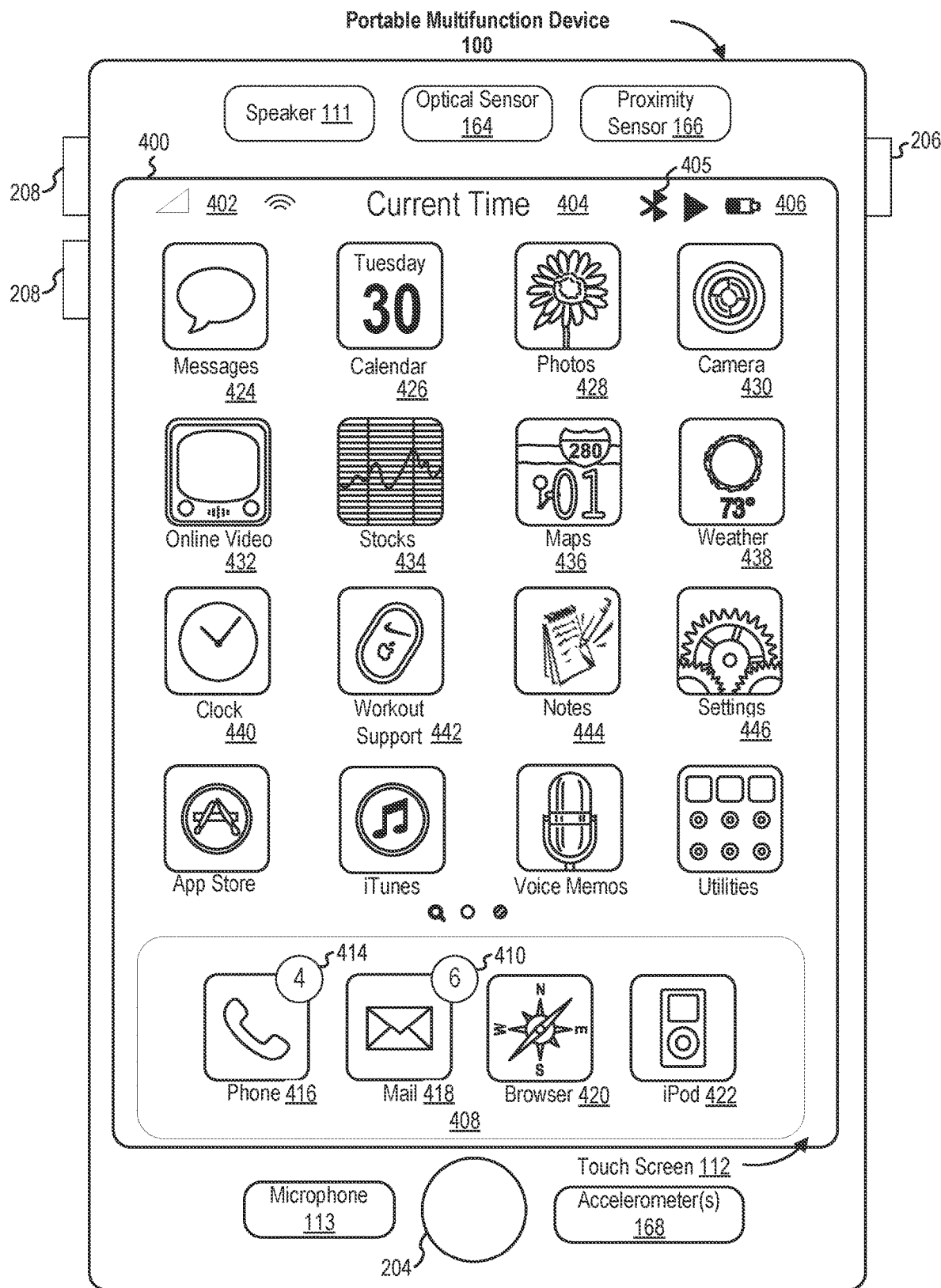
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
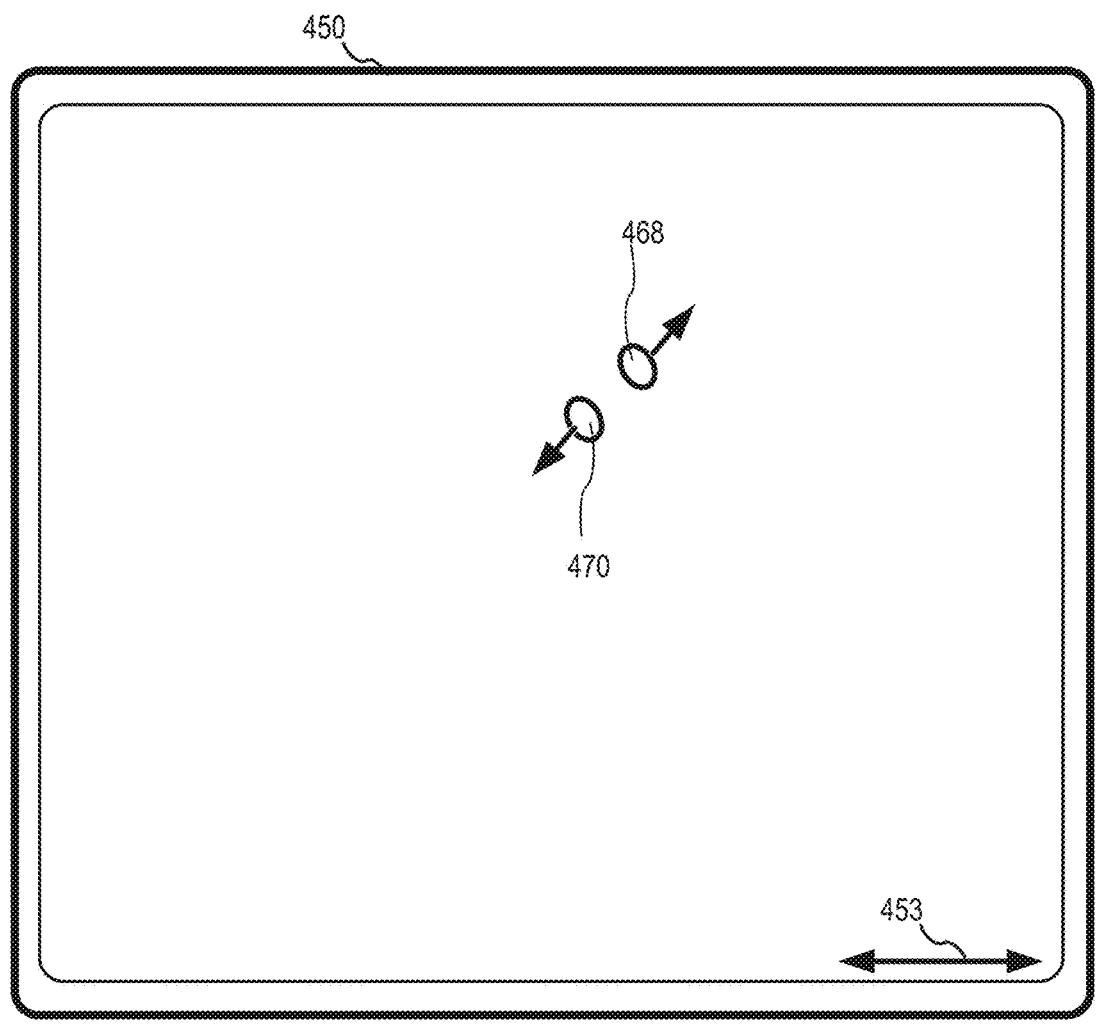
FIG. 4B illustrates an exemplary user interface for a multifunction device with a touch-sensitive surface that is separate from the display in accordance with some embodiments.
Figure 4B:
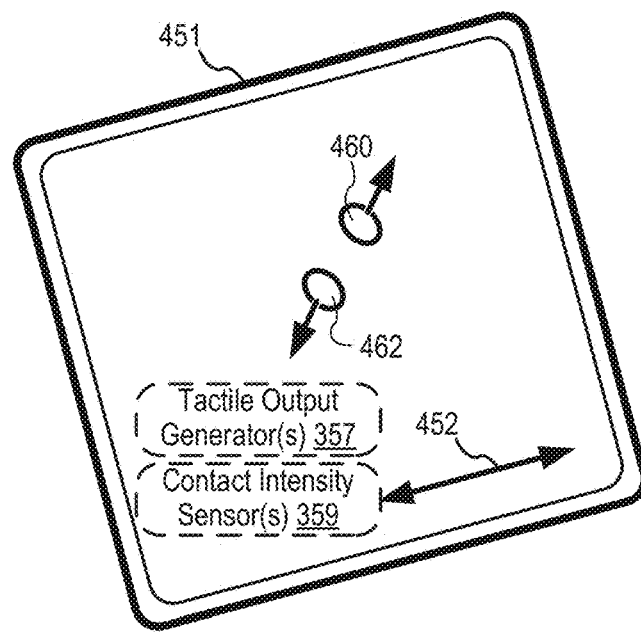

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
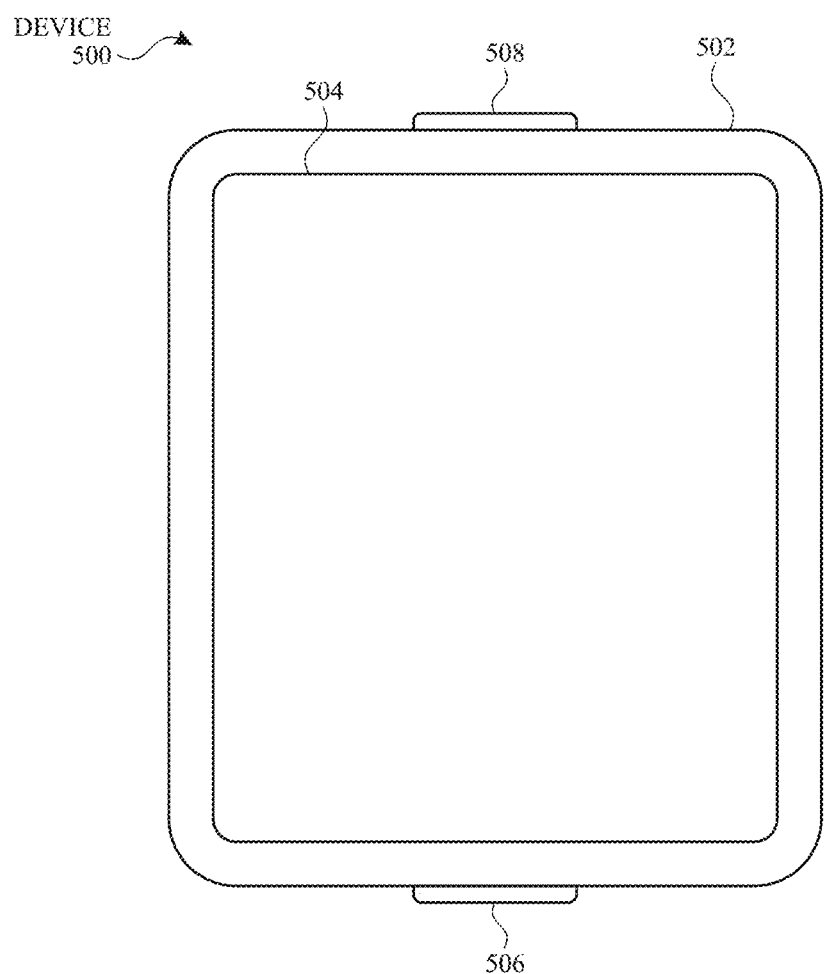
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
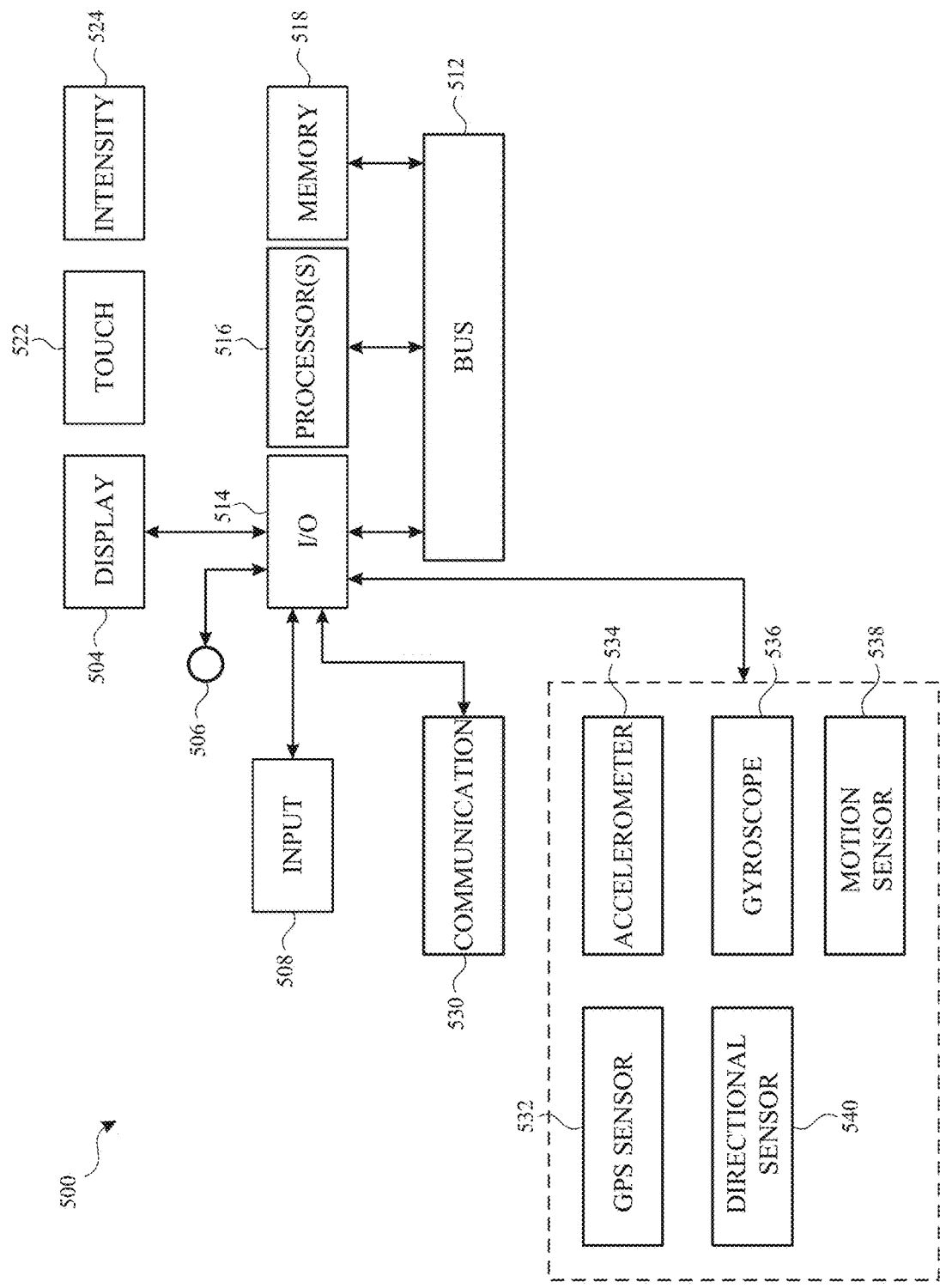
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Figure 7:
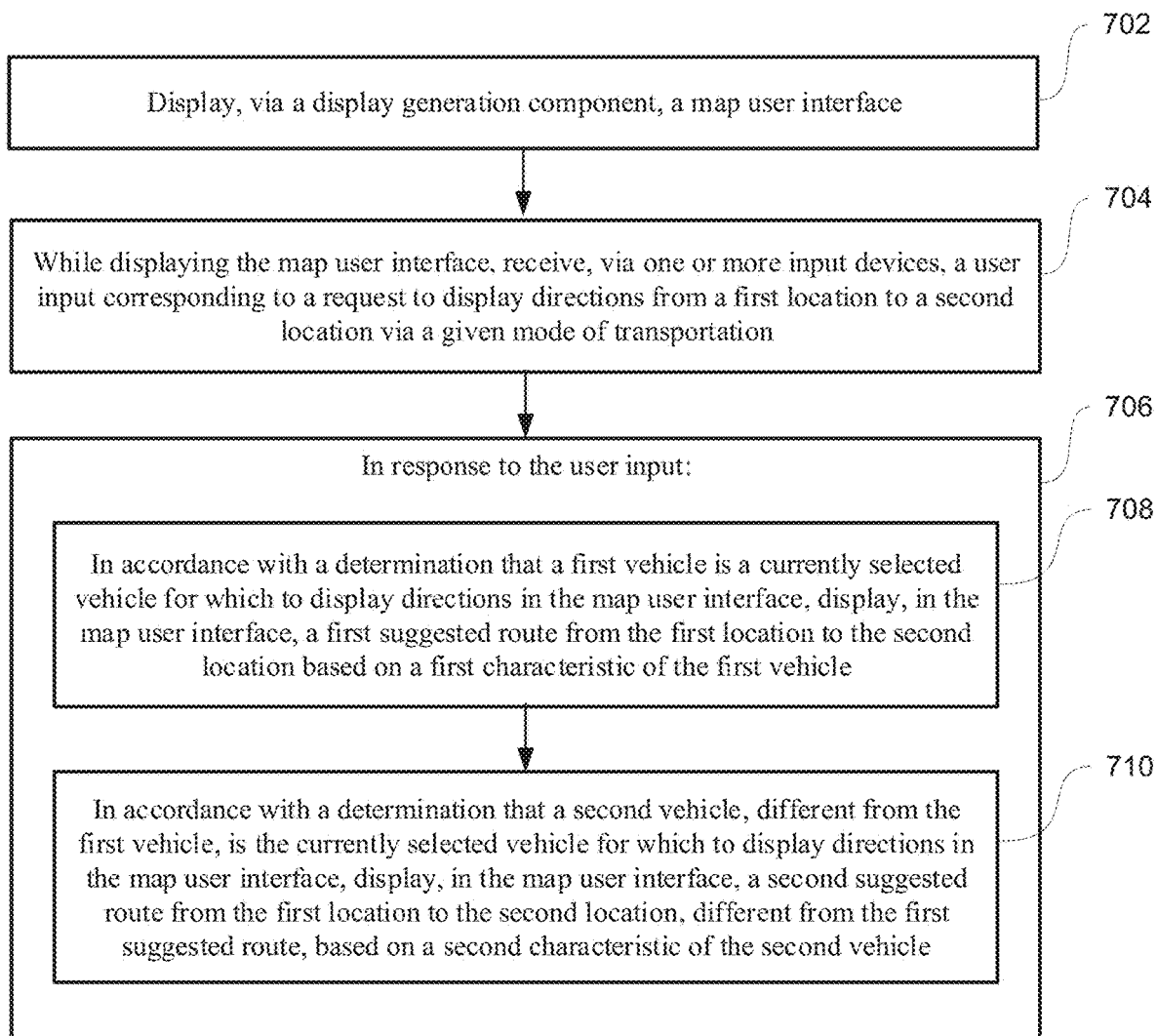
FIG. 7 is a flow diagram illustrating a method of displaying customized navigation routes in accordance with some embodiments of the disclosure.
Figure 9:
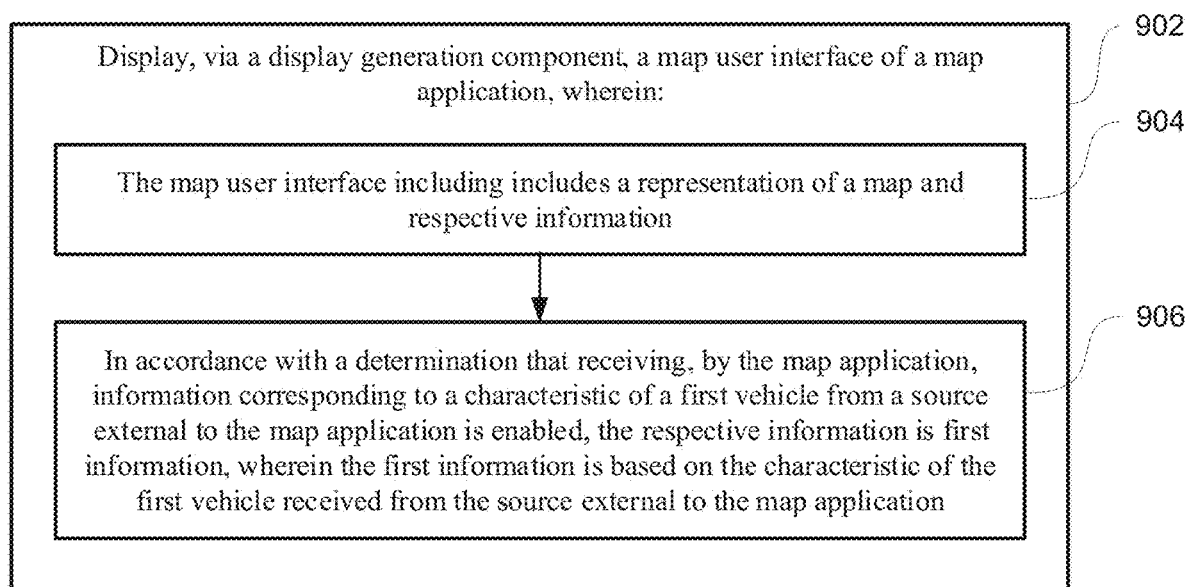
FIG. 9 is a flow diagram illustrating a method of receiving information about characteristics of respective vehicles in accordance with some embodiments of the disclosure.
Figure 11:
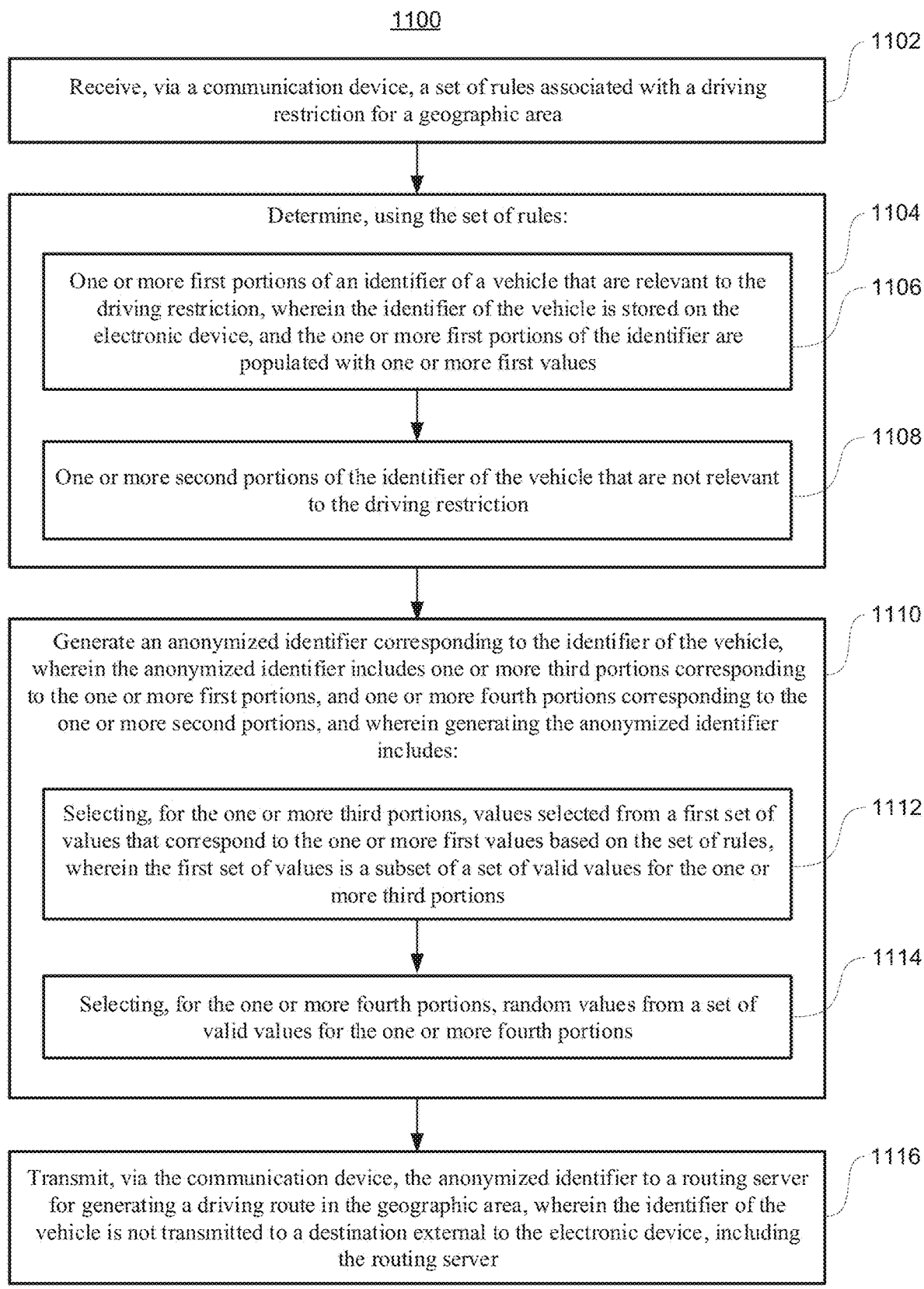
FIG. 11 is a flow diagram illustrating a method of anonymizing a vehicle identifier in accordance with some embodiments of the disclosure.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700, 900, and 1100 (FIGS. 7, 9, and 11). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
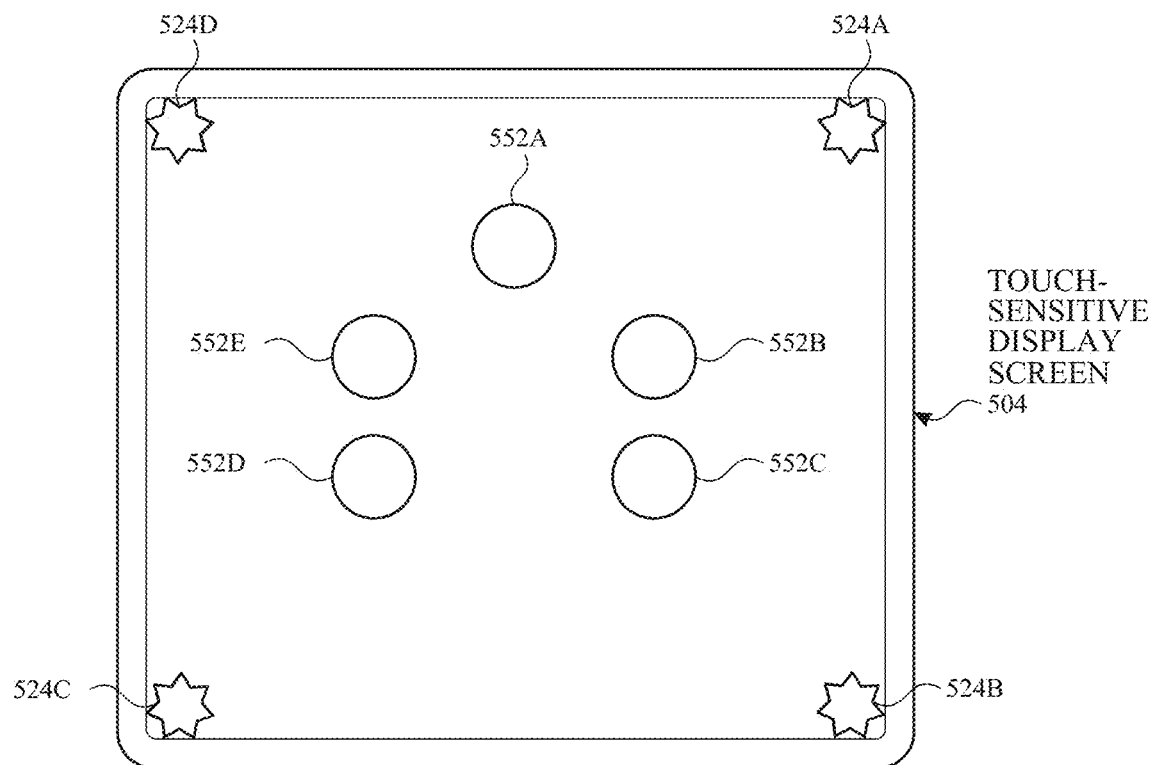
FIGS. 5C-5D illustrate exemplary components of a personal electronic device having a touch-sensitive display and intensity sensors in accordance with some embodiments.
Figure 5C:
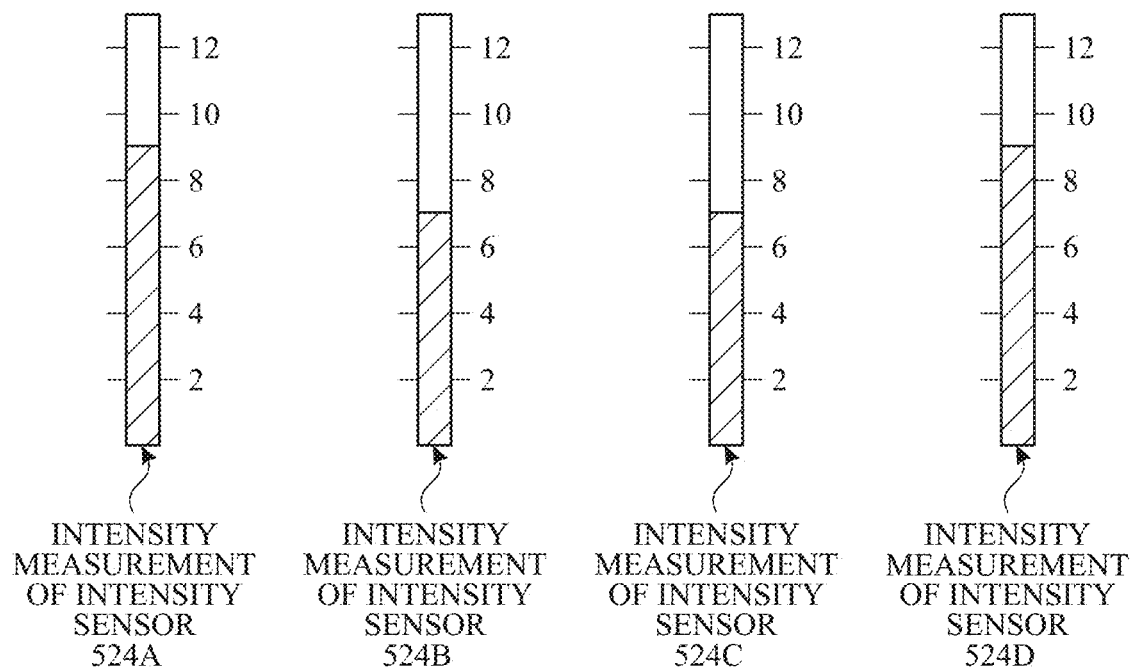
Figure 5D:
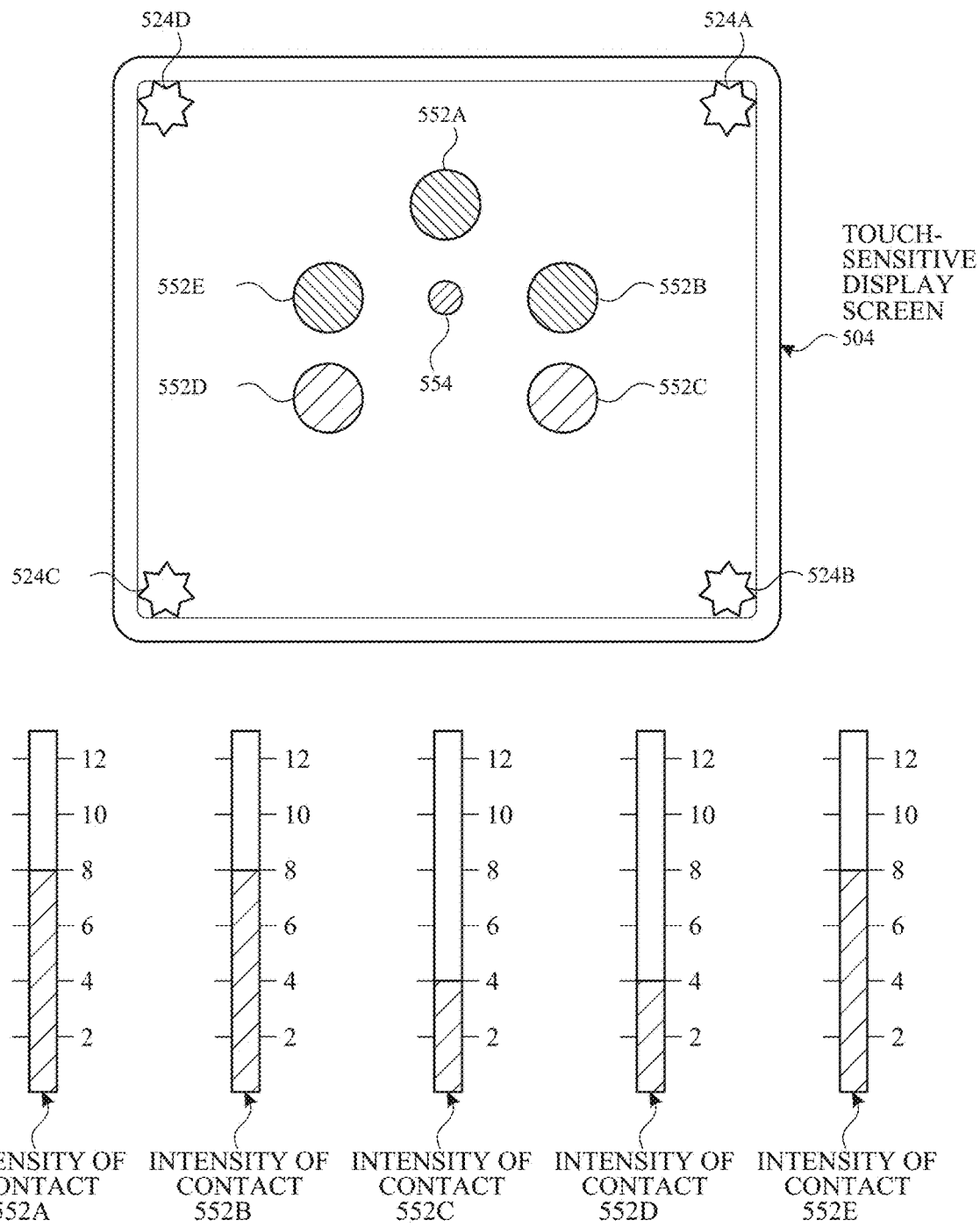

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity $I_j$ that is a portion of the aggregate intensity, A, in accordance with a predefined mathematical function, $I_j = A \cdot (D_j/$ ΣDi), where Dj is the distance of the respective contact j to the center of force, and ΣDi is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
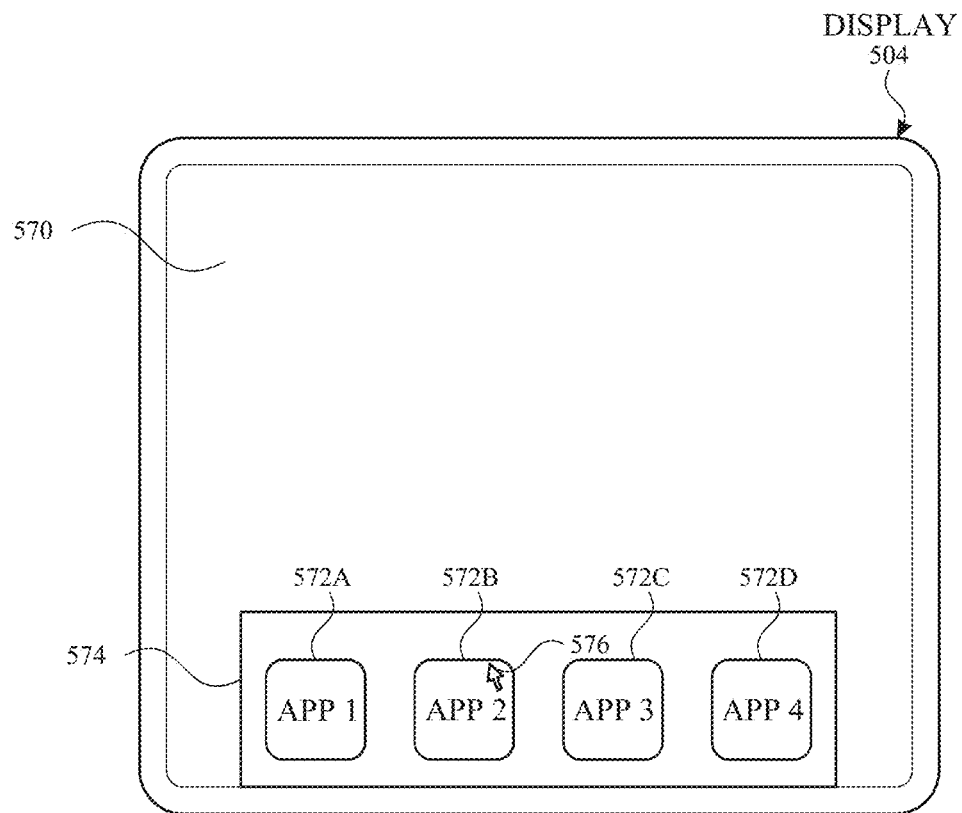
FIGS. 5E-5H illustrate exemplary components and user interfaces of a personal electronic device in accordance with some embodiments.
Figure 5E:
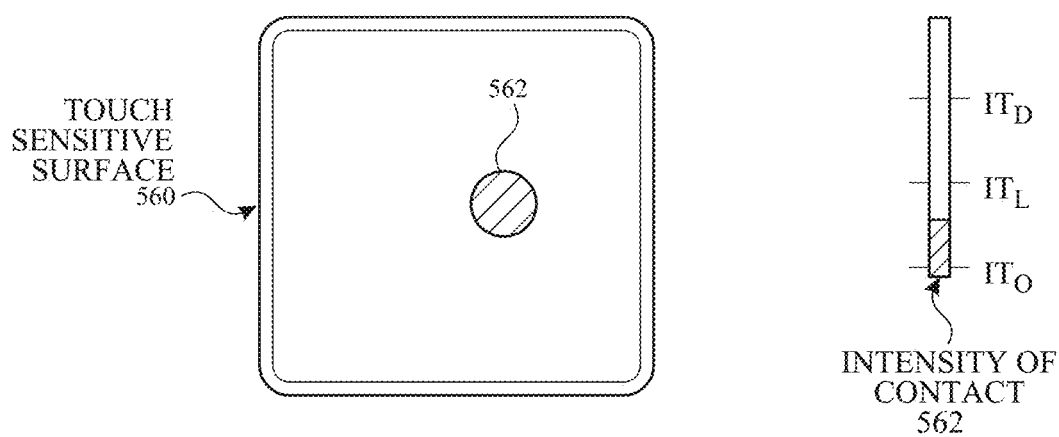
Figure 5F:
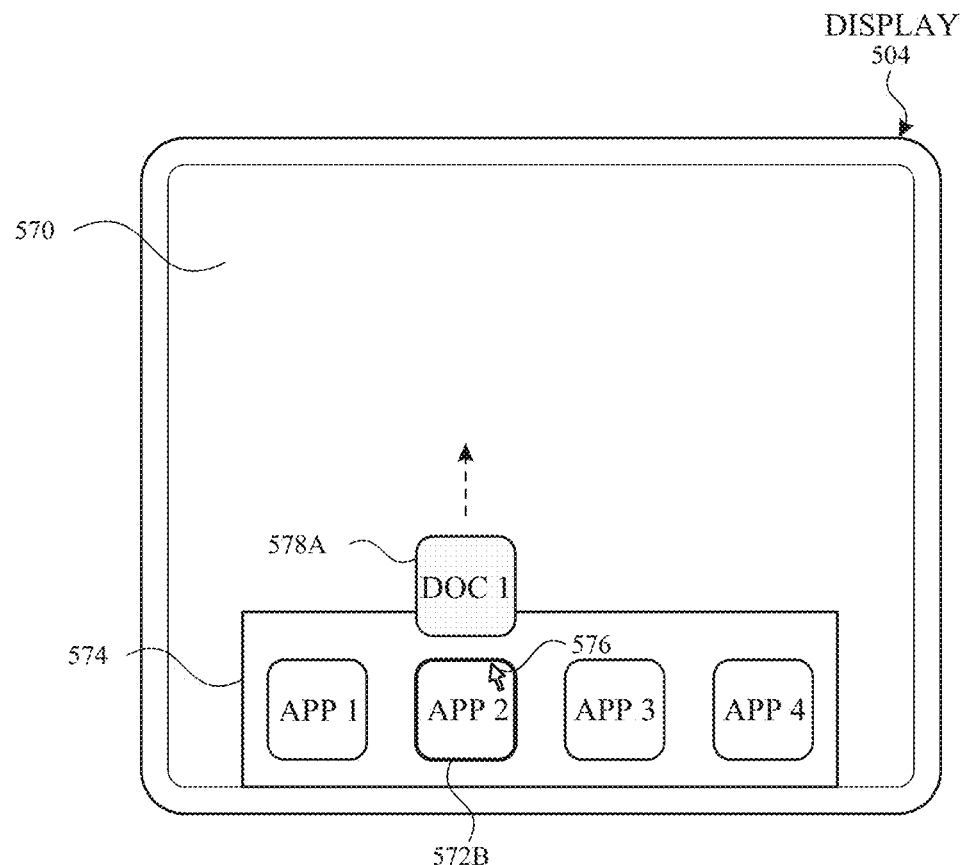
Figure 5F:
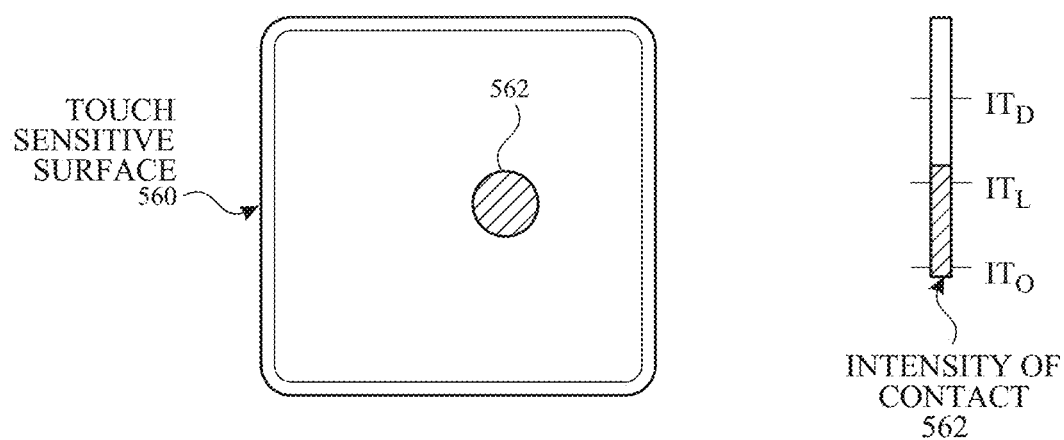
Figure 5G:
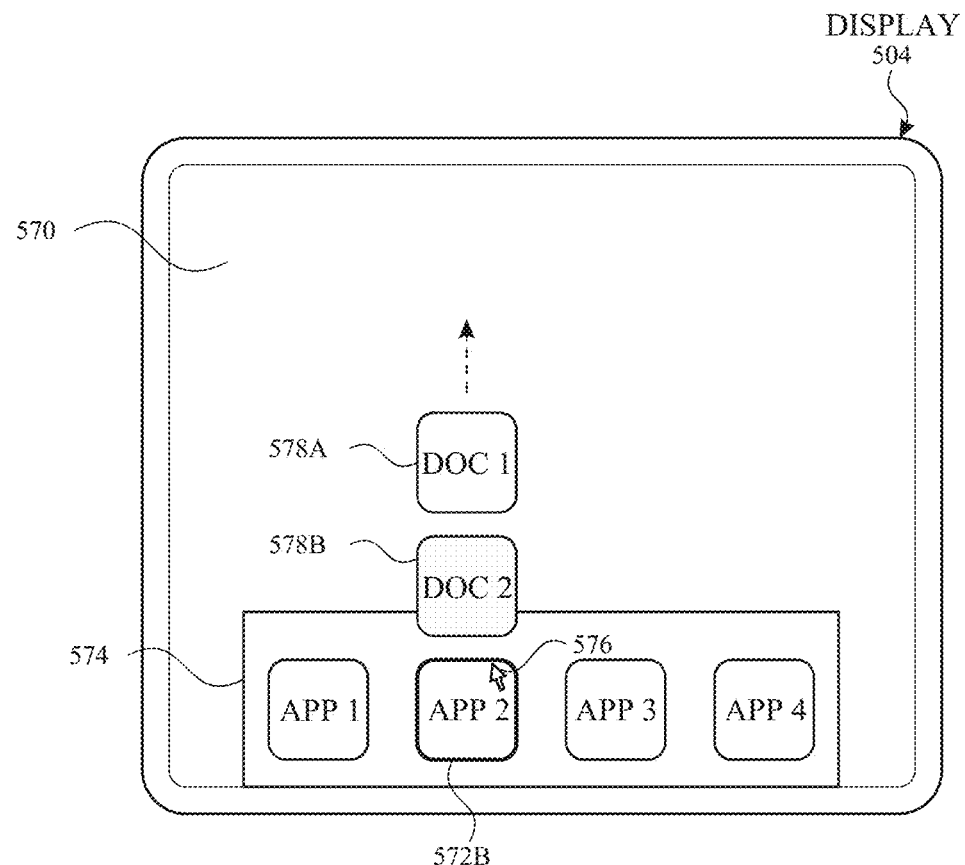
Figure 5G:
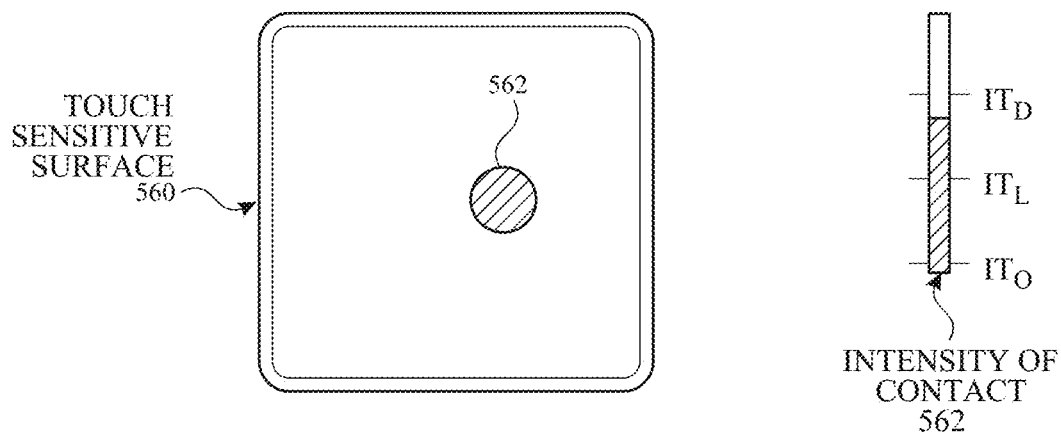
Figure 5H:
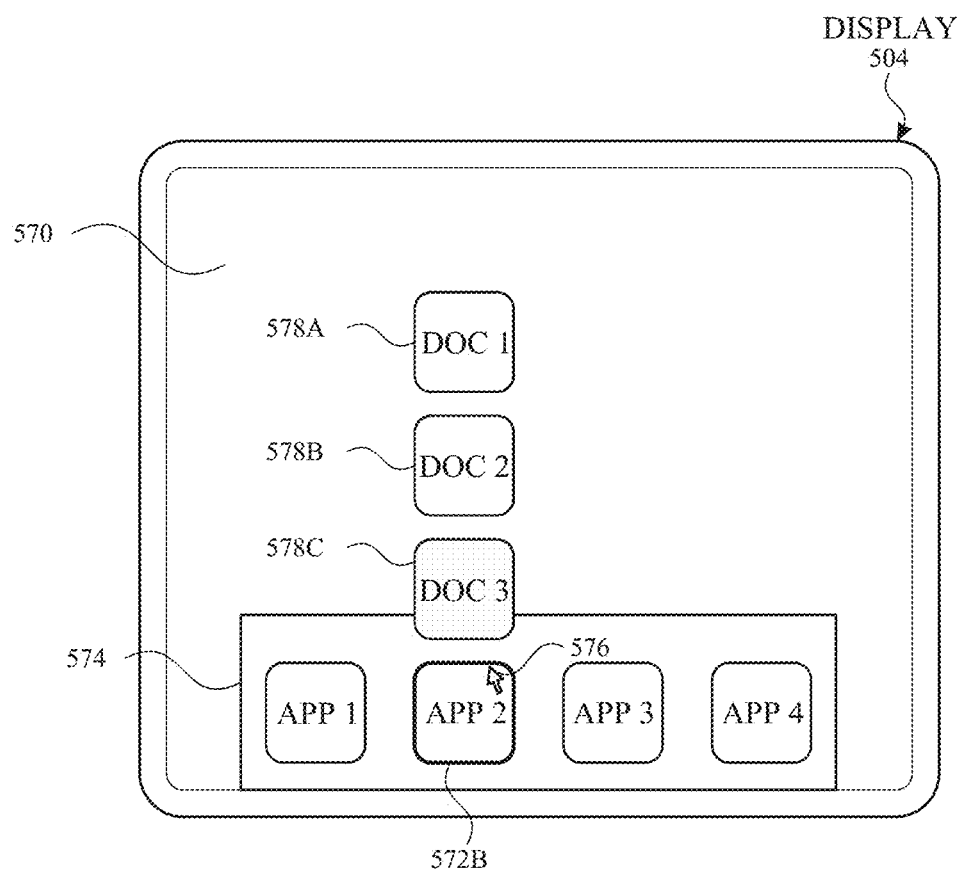
Figure 5H:
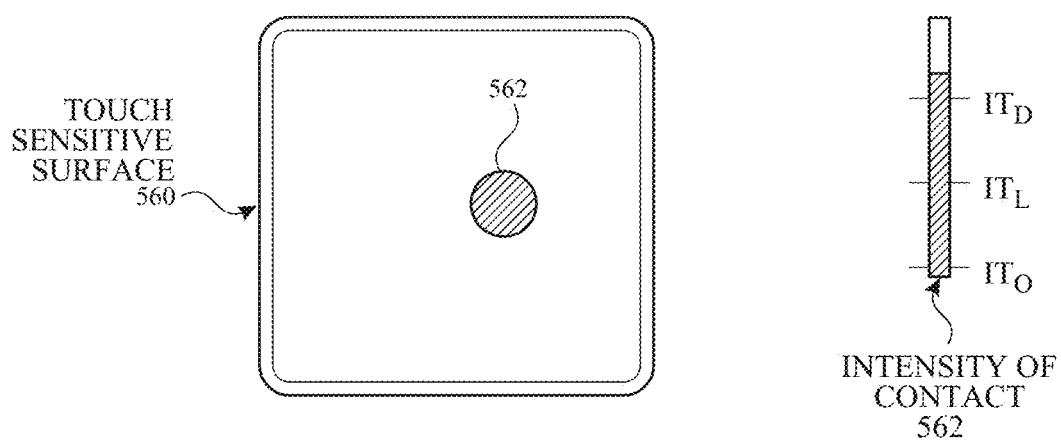

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
    an active application, which is currently displayed on a
        display screen of the device that the application is being
        used on;
    a background application (or background processes),
        which is not currently displayed, but one or more
        processes for the application are being processed by
        one or more processors; and
    a suspended or hibernated application, which is not running, but has state information that is stored in memory
        (volatile and non-volatile, respectively) and that can be
        used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as device 100, device 300, or device 500.

User Interfaces and Associated Processes

Customized Navigation Routes

Users interact with electronic devices in many different manners, including using electronic devices to view and find geographic locations on a map. In some embodiments, a user can request directions from one geographic location to another geographic location. The embodiments described below provide ways for displaying customized, suggested routes between locations. These routes can be customized based on the characteristics of a user's vehicle. This customization enhances the user's interactions with the electronic device and reduces the amount of time the user needs to perform operations. Reducing operational time decreases the power usage of the device and increases battery life for battery-powered devices.

FIGS. 6A-6FF illustrate exemplary ways in which an electronic device displays customized navigation routes in accordance with some embodiments of the disclosure. The embodiments in these figures are used to illustrate the processes described below, including the processes described with reference to FIG. 7. Although FIGS. 6A-6FF illustrate various examples of ways an electronic device is able to perform the processes described below with respect to FIG. 7, it should be understood that these examples are not meant to be limiting, and the electronic device is able to perform one or more processes described below with reference to FIG. 7 in ways not expressly described with reference to FIGS. 6A-6FF.

FIG. 6A illustrates electronic device 500 displaying user interface 600 (e.g., via a display device, via a display generation component, etc.). In some embodiments, user interface 600 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 600 is a user interface of a map application (e.g., an application in which a user is able to view geographic locations, search for locations, and/or request directions from one location to another). In some embodiments, the map application is an application installed on device 500.

In some embodiments, the map application can present maps, routes, location metadata, and/or imagery (e.g., captured photos) associated with various geographical locations, points of interest, etc. The map application can obtain map data that includes data defining maps, map objects, routes, points of interest, imagery, etc., from a navigation server. For example, the map data can be received as map tiles that include map data for geographical areas corresponding to the respective map tiles. The map data can include, among other things, data defining roads and/or road segments, metadata for points of interest and other locations, three-dimensional models of the buildings, infrastructure, and other objects found at the various locations, and/or images captured at the various locations. The map application can request from a navigation server through a network (e.g., local area network, cellular data network, wireless network, the Internet, wide area network, etc.) map data (e.g., map tiles) associated with locations that device 500 frequently visits. The map application can store the map data in a map database. The map application can use the map data stored in the map database and/or other map data received from device 500 to provide the map application features described herein (e.g., display of customized navigation routes).

In some embodiments, the navigation server can be a software server configured to obtain, generate, and/or store map data. For example, the navigation server can obtain a lidar generated point cloud (e.g., points that define locations of surfaces of objects in the vicinity of an image capture location) for various locations included in the map data. The navigation server can generate a three-dimensional model (e.g., three-dimensional mesh) for each of the various locations using the respective point clouds for the locations. The navigation server can obtain images captured at the various locations (e.g., capture locations) and use the images to add texture to the three-dimensional model thereby generating a photorealistic three-dimensional image representing the corresponding location. For example, the captured images (e.g., photographs, panorama photographs, etc.) can be stretched over the surfaces of the three-dimensional model for a particular location to generate a photorealistic three-dimensional view of the particular location. The three-dimensional models and textures (e.g., captured images, stretched images, images applied to the three-dimensional model, etc.) can be stored in a map database on the navigation server and served to user devices (e.g., device 500) to provide the various features and functions described herein. The navigation server can be configured to obtain, generate, and/or store other map data in the map database.

It is understood that although the description of the figures below describe embodiments in which device 500 determines one or more suggested routes and/or determines one or more suggested stops, this determination can be performed by the navigation server or by a combination of device 500 and the navigation server, the results of which are provided to device 500 for display in a user interface via a display generation component of device 500.

In FIG. 6A, user interface 600 includes a representation of a map. For example, in FIG. 6A, user interface 600 includes representations (e.g., textual and/or graphical presentations) associated with particular geographic location, including representations of roads, landmarks, businesses, and/or buildings, etc. In some embodiments, a user is able to search for a respective place or address. For example, in FIG. 6A, a user has performed a search for Destination 1. In some embodiments, in response to the search for Destination 1, user interface 600 includes representation 604 at the location on the map corresponding to the location of Destination 1, as shown in FIG. 6A.

In some embodiments, the map application searches through a map database for locations (e.g., places) that match the search criteria (e.g., for Destination 1). The map application can send a request to a navigation server to cause the navigation server to search for locations that match the search criteria. After obtaining map data corresponding to the search criteria, the map application can present a list of places that match the search criteria and/or the user may select one of the places to cause the place (e.g., address, point of interest, landmark, etc.) to be presented on user interface 600.

In FIG. 6A, device 500 displays user interface 606 corresponding to Destination 1. In some embodiments, user interface 606 is displayed overlaid over user interface 600. In some embodiments, user interface 606 includes information associated with Destination 1. In FIG. 6A, user interface 606 includes textual indication 608, button 610, and graphic 612. In some embodiments, textual indication 608 includes the name of Destination 1 and/or the address of Destination 1. In some embodiments, button 610 is selectable to request and/or display navigation directions to Destination 1 (e.g., from the current location of the electronic device or from a respective location provided by a user). In some embodiments, graphic 612 includes an image associated with Destination 1 (e.g., an image of the location, an image of the view of Destination 1 from the street level, etc.). In some embodiments, user interface 606 includes button 614 that is selectable to dismiss user interface 606 (e.g., and optionally cease display of the search results).

In FIG. 6A, a user input 603a is received selecting button 610. In some embodiments, in response to the user input, device 500 displays one or more suggested routes to travel from the current location of device 500 (e.g., represented by location indicator 602) to Destination 1, as shown in FIG. 6B. In FIG. 6B, device 500 displays suggested route 620-1 and suggested route 620-2. In some embodiments, suggested route 620-1 is the fastest route to Destination 1. In some embodiments, suggested route 620-2 is an alternative route to suggested route 620-1. In some embodiments, suggested route 620-1 and/or suggested route 620-2 are selected based on different criteria such as shortest route, fastest route, avoiding tolls, avoiding highways. In some embodiments, the suggested routes are selected while taking into consideration the current traffic conditions. In FIG. 6B, because no vehicles are currently selected in the map application, the suggested routes are selected without consideration of the characteristics of respective vehicles (e.g., the driving range of a particular vehicle). Display of suggested routes with respect to particular selected vehicles in the map application will be described in further detail below.

In some embodiments, in response to the user input, device 500 displays user interface 607, as shown in FIG. 6B.

In some embodiments, user interface 607 includes information for navigating to Destination 1. In FIG. 6B, user interface 607 includes textual indication 609, listing 616-1, and listing 616-2. In some embodiments, textual indication 609 includes an indication that the suggested routes are for travel to Destination 1 and an indication that the suggested routes are for travel from "My Location" to Destination 1. In some embodiments, listing 616-1 corresponds to suggested route 620-1 and includes a description that suggested route 620-1 is estimated to take 50 minutes to travel, that suggested route 620-1 is 43.8 miles in length, and that suggested route 620-1 is the fastest route (e.g., by time, optionally including current traffic conditions). In some embodiments, listing 616-2 corresponds to suggested route 620-1 and includes a description that suggested route 620-2 is estimated to take 57 minutes to travel, that suggested route 620-2 is 44.5 miles in length, and that suggested route 620-2 is an alternative route (e.g., alternative to suggested route 620-1). In some embodiments, listing 616-1 and listing 616-2 include button 618-1 and button 618-2, respectively, that are selectable to begin navigation along the respective suggested route. In some embodiments, listing 616-1 and listing 616-2 are selectable to display more information about the respective route, as will be described in more detail below.

It is understood that although FIG. 6B illustrates two suggested routes being displayed, device 500 may display only one suggested route or may display more than two suggested routes.

Figure 6H:
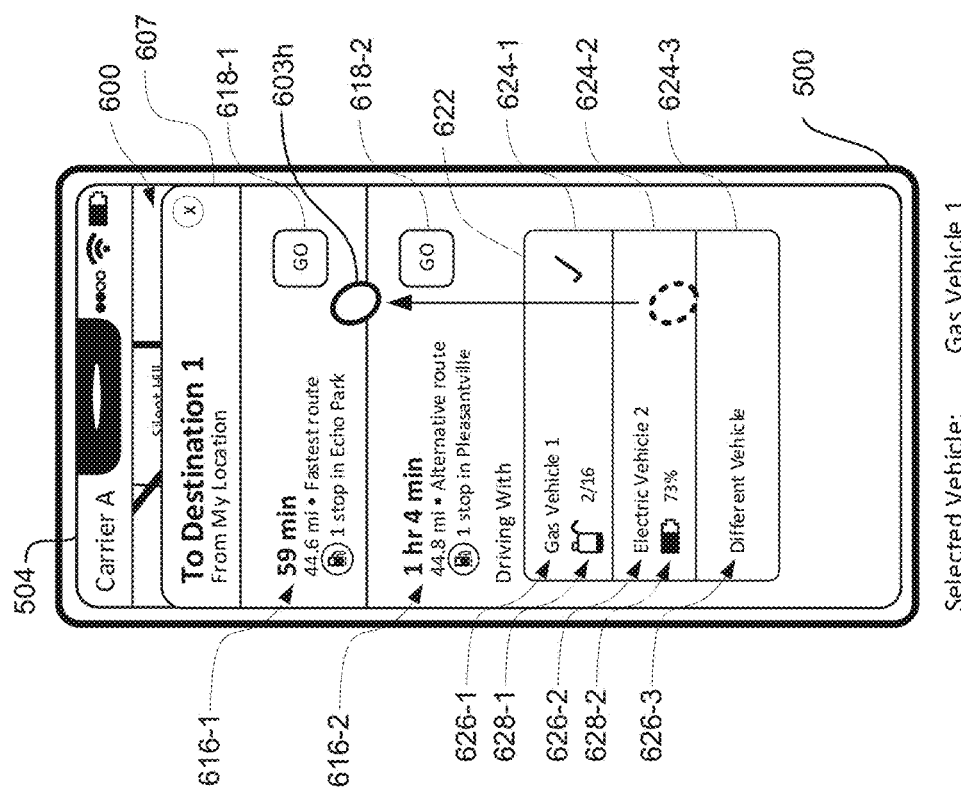
FIGS. 6A-6FF illustrate exemplary ways in which an electronic device displays customized navigation routes in accordance with some embodiments of the disclosure.
Figure 6G:
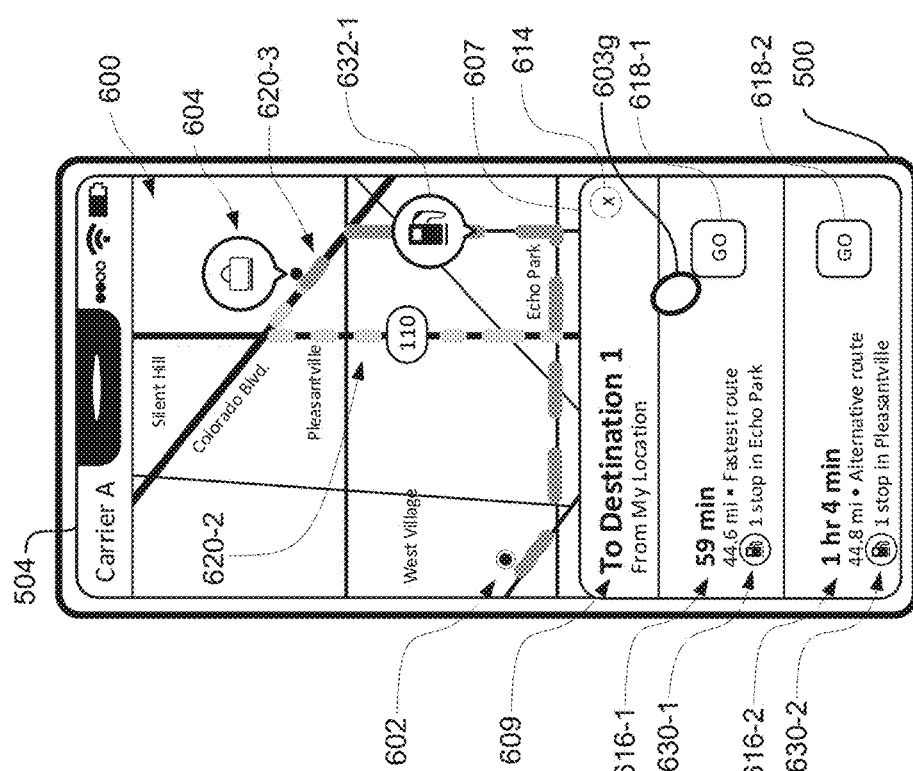
Figure 6L:
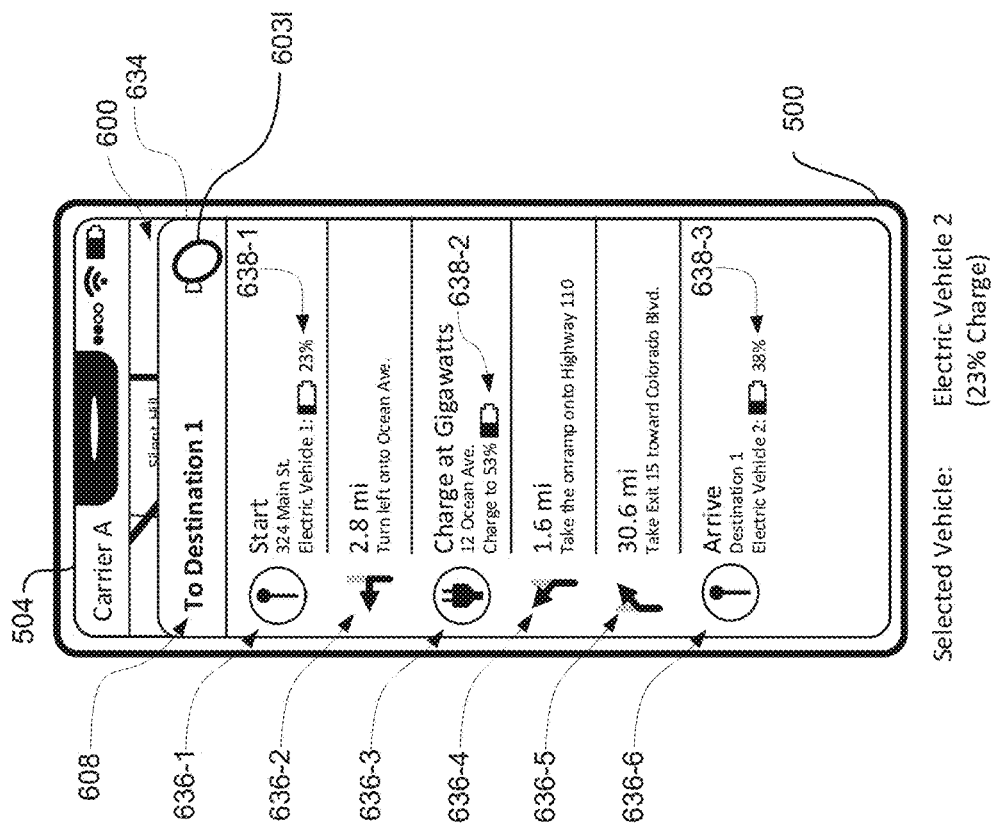
Figure 6K:
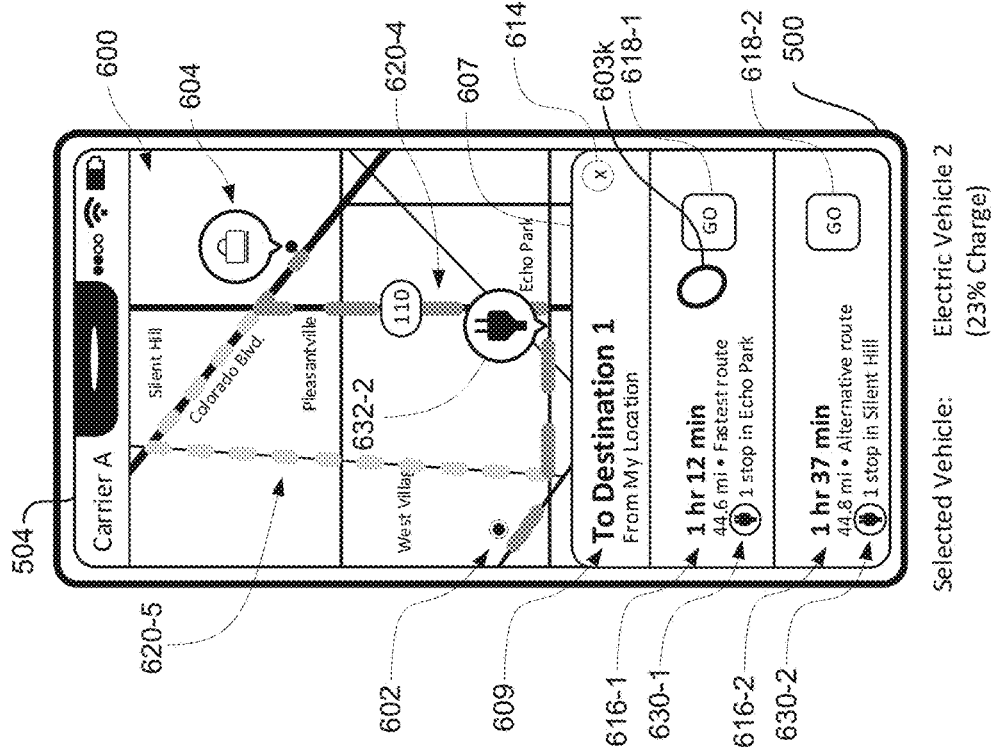
Figure 6N:
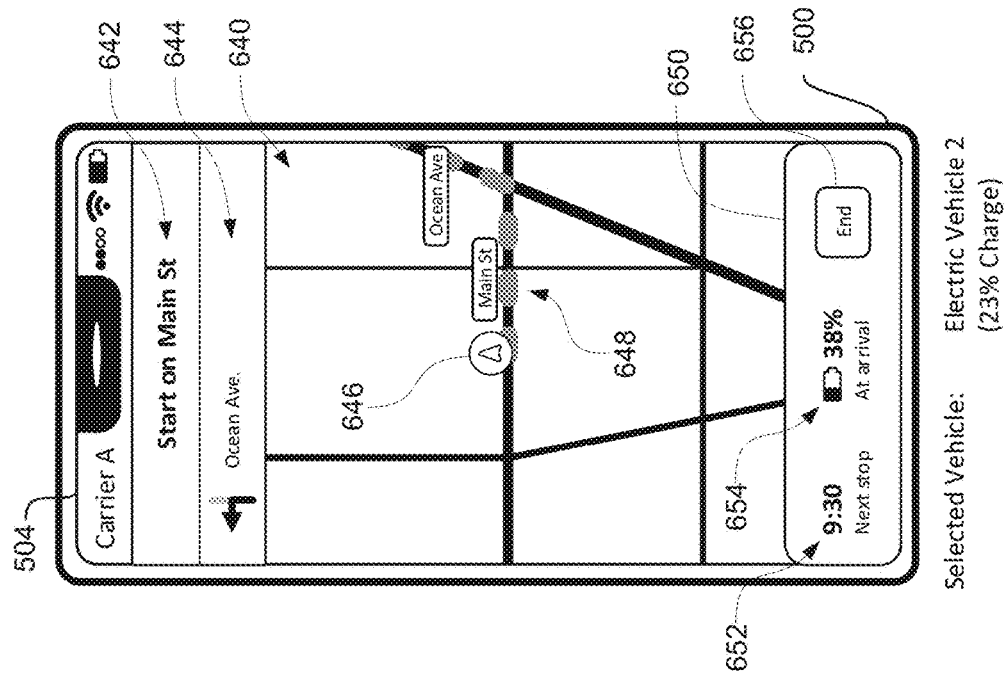
Figure 6M:
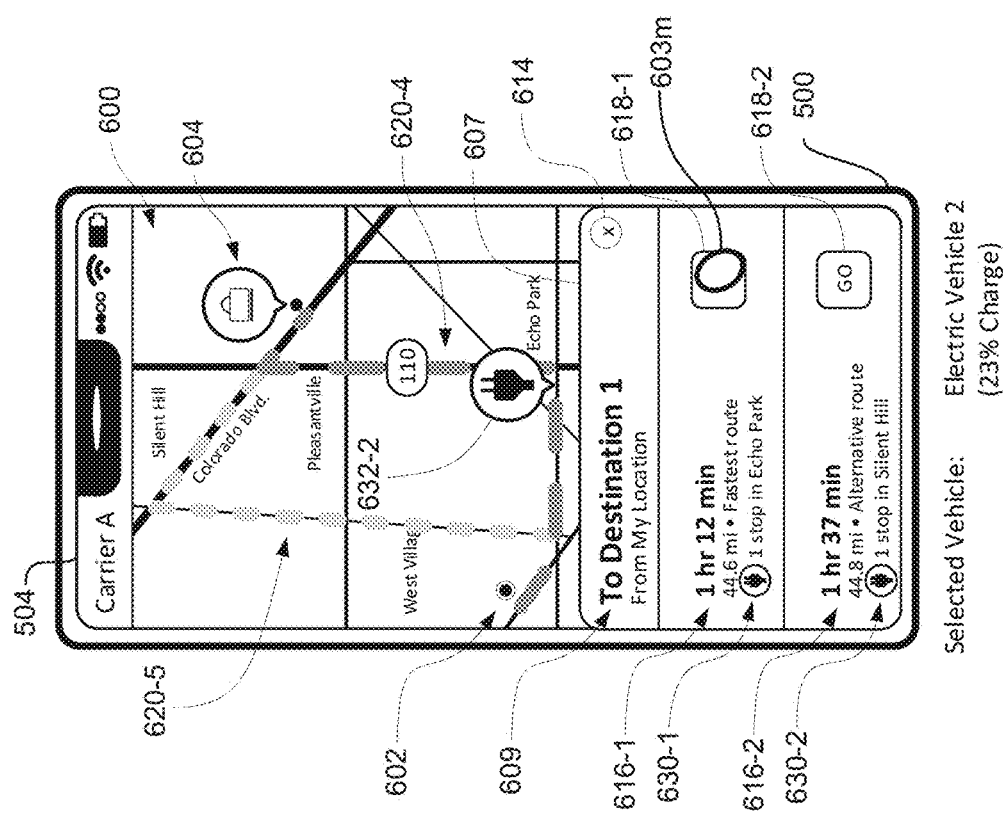
Figure 6P:
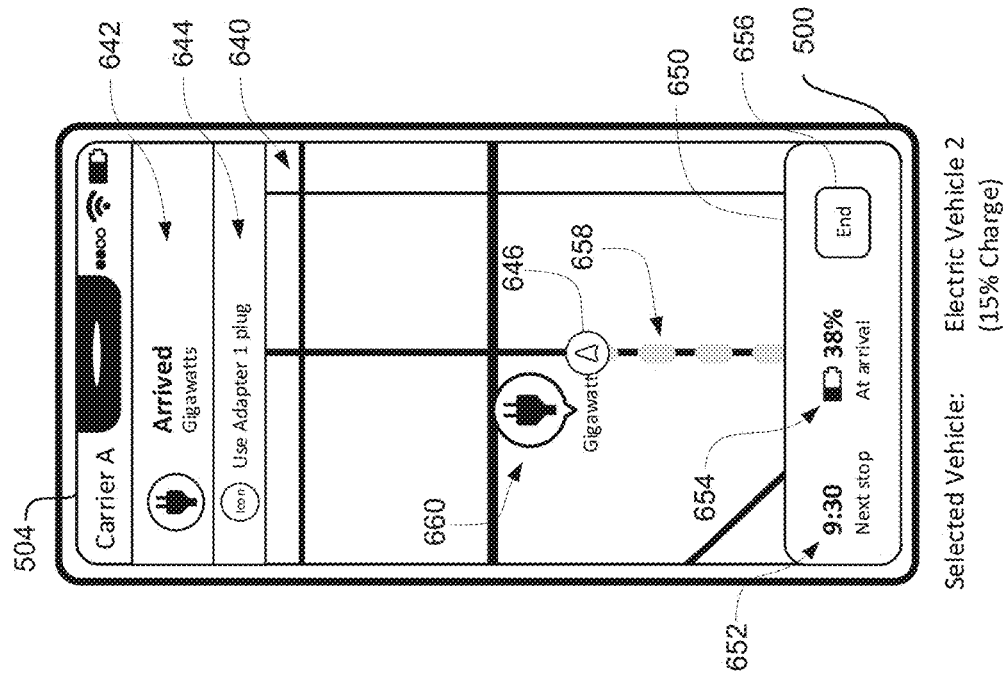
Figure 6O:
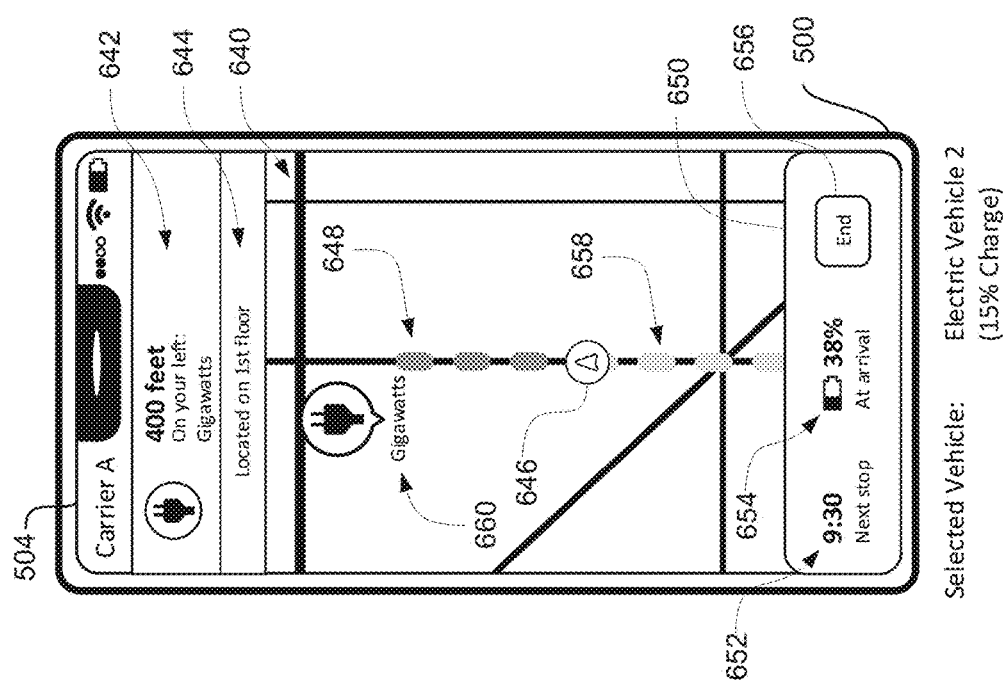
Figure 6R:
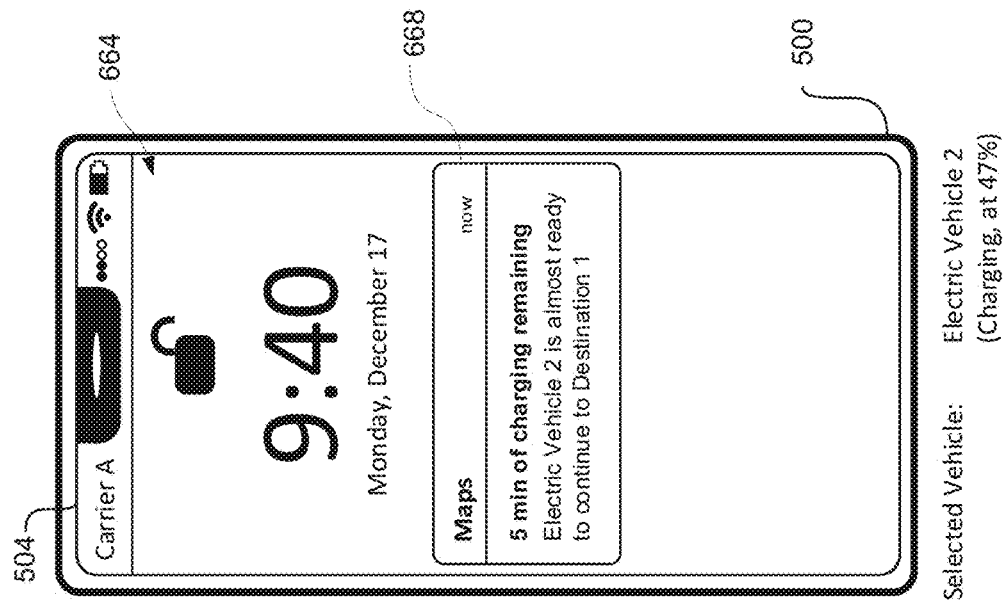
Figure 6Q:
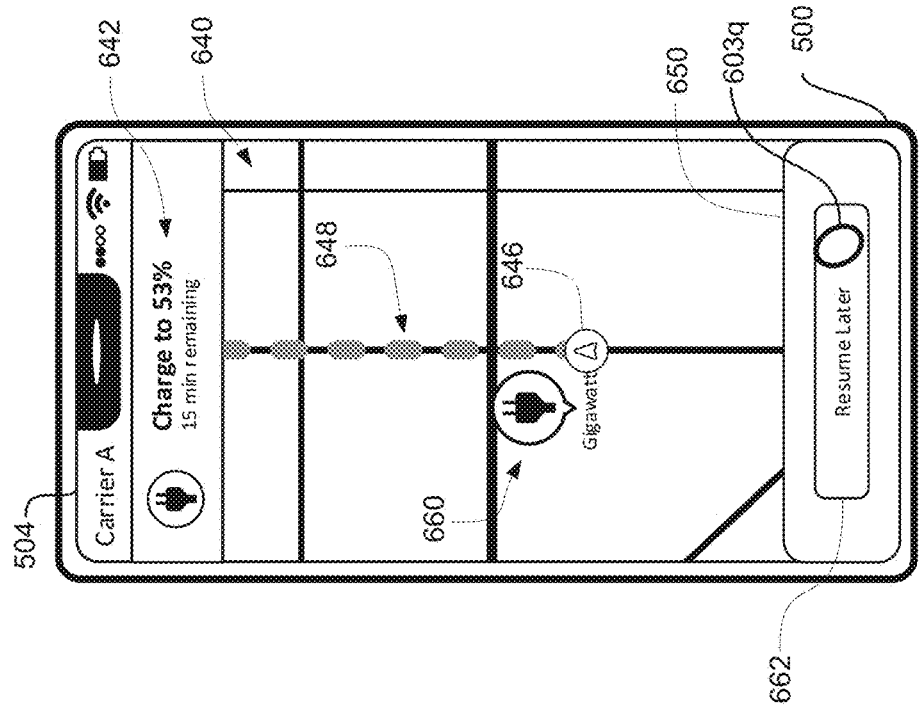

In FIG. 6B, a contact 603*b* is received on user interface 607. In FIG. 6C, an upward swipe 603*c* of contact 603*b* on user interface 607 is detected (e.g., an upward swipe from contact 603*b* in FIG. 6B). In some embodiments, in response to upward swipe 603*c*, user interface 607 is expanded upwards in accordance with the upward swipe gesture, as shown in FIG. 6C. In some embodiments, expanded user interface 607 includes options for selecting one or more vehicles for which to provide customized suggested routes. For example, in FIG. 6C, expanded user interface 607 includes vehicle list 622. In some embodiments, vehicle list 622 includes vehicle option 624-1, vehicle option 624-2, and no vehicle option 624-3. In some embodiments, vehicle option 624-1 corresponds to a first vehicle that has been registered with (e.g., added to) the map application and vehicle option 624-2 corresponds to a second vehicle that has been registered with the map application. As shown in FIG. 6C, vehicle 1 is a gas vehicle and vehicle 2 is an electric vehicle. In some embodiments, the no vehicle option 624-3 corresponds to no specific vehicle and selection of vehicle option 624-3 causes the map application to suggest routes that are selected without consideration of the characteristics of a specific vehicle (e.g., such as a type of fuel for a particular vehicle or the fuel and/or charge level of a particular vehicle), such as described above with respect to FIG. 6B.

In some embodiments, vehicle option 624-1 includes a textual description 626-1 of Gas Vehicle 1 (e.g., the name of the vehicle, the make, the model, etc.). In some embodiments, vehicle option 624-1 includes indication 628-1 of how much fuel (e.g., for a gasoline vehicle) and/or charge (e.g., for an electric vehicle) the vehicle current has. In some embodiments, the map application receives the current fuel and/or charge information from another application or a server, as will be described in further detail below with respect to method 900. In some embodiments, vehicle option 624-2 includes a textual description 626-2 of Electric Vehicle 2 (e.g., the name of the vehicle, the make, the model, etc.). In some embodiments, vehicle option 624-2 includes indication 628-2 of how much fuel (e.g., for a gasoline vehicle) and/or charge (e.g., for an electric vehicle) the vehicle current has. It is understood that if more or fewer vehicles are registered with the map application, vehicle list 622 will include more or fewer vehicles, respectively.

As shown in FIG. 6C, icon 627 (e.g., a check mark) indicates that the currently selected option in vehicle list 622 is the no vehicle option 624-3, and thus no vehicle is currently selected.

It is understood that although FIG. 6C illustrates two vehicles (Vehicle 1 as a gasoline vehicle, and Vehicle 2 as an electric vehicle) being registered with the map application, more or fewer vehicles can be registered with the map application. For example, before the user has added any vehicles to the map application (e.g., either manually added or by linking with a vehicle application, such as described below with respect to method 900), vehicle list 622 includes no vehicles and only includes the no vehicle option 626-3 (or optionally vehicle list 622 is not included on user interface 607). In response to adding vehicles, vehicle listing 622 can have one or more vehicles corresponding to the vehicles that have been added. For example, after adding one vehicle, vehicle listing 622 can have one vehicle listing and the no vehicle listing 626-3. In some embodiments, any of the vehicles in vehicle listing 622 can be a vehicle of any fuel type (e.g., gasoline vehicle, hybrid vehicle, plug-in hybrid vehicle, hydrogen vehicle, fuel cell vehicle, electric vehicle, solar vehicle, etc.). It is also understood that although Vehicle 1 is illustrated as a gasoline vehicle and Vehicle 2 is illustrated as an electric vehicle, this is merely exemplary, and Vehicle 1 and Vehicle 2 can be a vehicle of any fuel type.

Figure 6D:
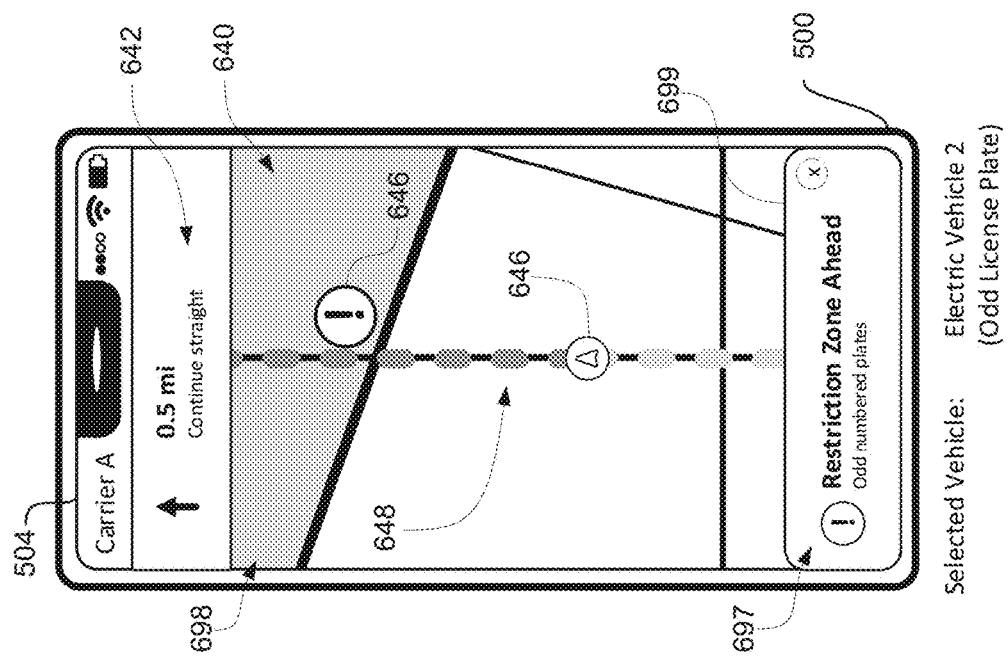
Figure 6C:
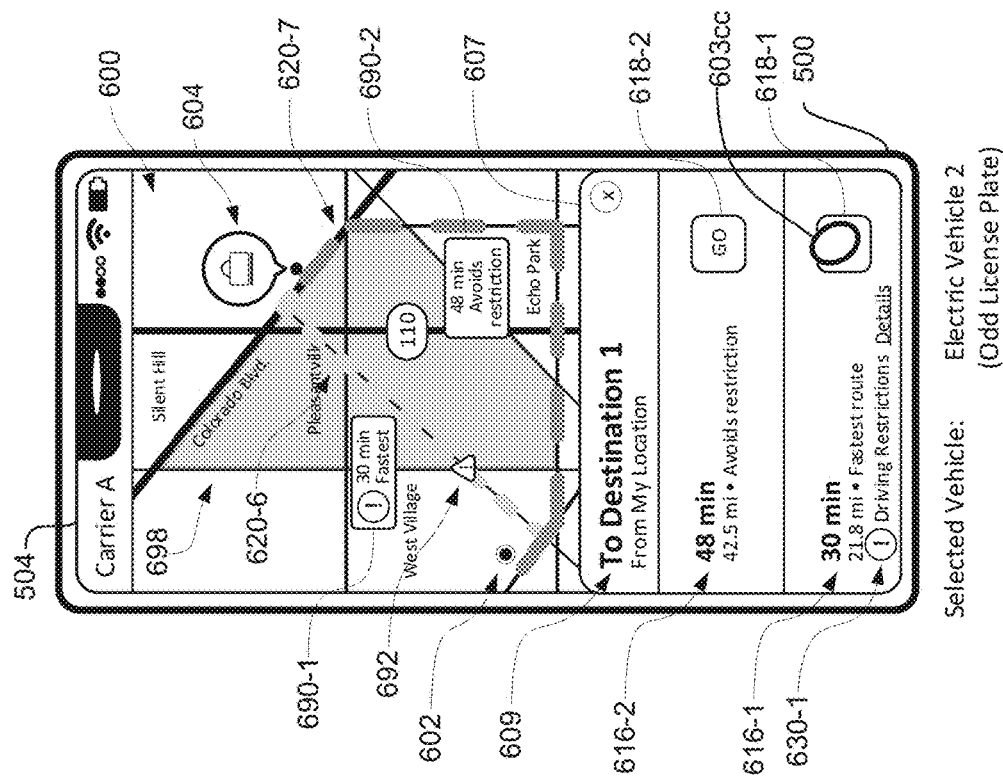

FIGS. 6D-6V illustrate embodiments in which suggested routes are displayed based on characteristics of a selected vehicle. For example, the map application (or optionally the navigation server described above with which the map application is in communication) is able to determine whether a selected vehicle requires a stop to recharge or refuel in order to reach a destination. It is understood that the features described below for Gasoline Vehicle 1 and Electric Vehicle 2 are not limited to only the type of vehicle for which the features were described (e.g., the features described for Gasoline Vehicle 1 are not limited only to gasoline vehicles, and the features described for Electric Vehicle 2 are not limited to only electric vehicles), and any or all of the features described for Gasoline Vehicle 1 can be applied to Electric Vehicle 2 and vice versa. Additionally, the features described for either Gasoline Vehicle 1 and Electric Vehicle 2 can be applied to any type of vehicle with any fuel type (e.g., unleaded gasoline vehicle, diesel gasoline vehicle, hybrid vehicle, plug-in hybrid vehicle, electric vehicle, fuel cell vehicle, hydrogen vehicle, etc.).

In FIG. 6D, a user input 603*d* is received selecting vehicle option 624-1 corresponding to Gas Vehicle 1. In some embodiments, in response to user input 603*d*, Gas Vehicle 1 becomes the selected vehicle, as shown in FIG. 6E. In FIG. 6E, because suggested routes were provided by the map application when the user selected Gas Vehicle 1, the suggested routes are updated to be customized for Gas Vehicle 1 (optionally if suggested routes were not provided by the map application when the user selected Gas Vehicle 1, then no suggested routes are updated). In some embodiments, a customized route for a vehicle is selected based on at least some of the characteristics of the selected vehicle (e.g., one characteristic, two characteristics, etc.). Thus, in FIG. 6E, suggested route 620-2 and suggested route 620-3 are selected based on a characteristic of Gas Vehicle 1. In some embodiments, the suggested routes are selected based on the current gas level of Gas Vehicle 1. In some embodiments, the suggested routes are selected based on the estimated driving range of Gas Vehicle 1 (e.g., the distance that Gas Vehicle 1 can travel with the current amount of fuel without refueling).

As shown in FIG. 6E, suggested route 620-3 is the primary recommended route (e.g., the first listed route and displayed with a prioritized visual characterization) and includes suggested stop 632-1. In some embodiments, suggested stop 632-1 is an icon that represents a gasoline station and indicates that a stop to refuel Gas Vehicle 1 is recommended and/or required to reach the destination. In some embodiments, suggested stop 632-1 is placed at a location on suggested route 620-3 corresponding to the location of the respective gasoline station. In some embodiments, a determination that a refueling stop should be suggested is based on the estimated driving range of Gas Vehicle 1. In some embodiments, if the estimated driving range of Gas Vehicle 1 is not enough to reach the destination, then a suggested stop is recommended. In some embodiments, if Gas Vehicle 1 will reach the destination with less than a threshold amount of fuel (e.g., less than 5%, 10%, 15%, 20%, etc. of fuel) or with less than a threshold number of estimated driving range remaining (e.g., less than 5 miles, 10 miles, 20 miles, 30 miles, 50 miles, etc.), then a suggested stop is recommended. As will be described below, suggested stop 632-1 is a gasoline station based on the fact that Gas Vehicle 1 requires gasoline for travel, but the suggested stop can be any type of refilling or recharging station based on the type of vehicle for which suggested stops are suggested (e.g., electric vehicle, hydrogen vehicle, E85 vehicle, diesel vehicle, etc.).

In some embodiments, listing 616-1 corresponding to suggested route 620-3 includes indication 630-1 that indicates that suggested route 620-3 includes one stop in Echo Park (e.g., the name of the region at which the gas station is located). In some embodiments, listing 616-2 corresponding to suggested route 620-2 includes indication 630-2 that indicates that suggested route 620-2 includes one stop in Pleasantville. In some embodiments, listing 616-1 and listing 616-2 includes an indication of the estimated amount of time to travel along the respective suggested route. In some embodiments, the estimated amount of time includes the estimated amount of time to refuel the vehicle to the suggested level. In some embodiments, suggested route 620-2 does not include a representation or icon of a suggested stop even though suggested route 620-2 does include a suggested stop. In some embodiments, only the first listed (e.g., most recommended, or the route that is currently selected or highlighted) suggested stop includes icons of suggested stops and other suggested routes do not include an icon of suggested stops even if the suggested route includes suggested stops (e.g., any or all of the other suggested stops). In some embodiments, all displayed suggested routes include an icon or indication of suggested stops (e.g., and not just the first suggested route). As shown in FIG. 6E, in some embodiments, one or more of the customized suggested routes is the same as the non-customized suggested routes. For example, suggested route 620-2 in FIG. 6E is the same as suggested route 620-3 in FIG. 6B (e.g., optionally except that suggested route 620-2 in FIG. 6E includes a suggested stop). In some embodiments, suggested route 620-3 is a route that would not otherwise be suggested when no vehicle is selected (e.g., as in FIG. 6B).

In FIG. 6E, user input 603e is received selecting listing 616-1 corresponding to suggested route 620-3. In some embodiments, in response to user input 603e, device 500 displays user interface 634, as shown in FIG. 6F. In some embodiments, user interface 634 includes one or more step-by-step directions for travelling from the current location of device 500 to Destination 1 via suggested route 620-3. In FIG. 6F, user interface 634 includes step 636-1 to step 636-7 for travelling from the starting location to the destination location.

In some embodiments, one or more of the steps includes an indication of an amount of fuel and/or charge that the vehicle will or should have when the vehicle reaches or is following the respective step. For example, step 636-1 corresponding to the starting location (e.g., the starting step) includes indication 638-1 of the estimated amount of gas that Gas Vehicle 1 will have at the starting location. In some embodiments, indication 638-1 includes an indication of the current amount of gas (e.g., because step 636-1 is the first step). In some embodiments, step 636-4 corresponding to the suggested stop (e.g., suggested stop 632-1 in Echo Park at a gas station to refuel) includes an indication 638-2 of the recommended amount of fuel to fill Gas Vehicle 1 up to in order to reach the destination (optionally to reach the destination with the threshold amount of fuel or remaining driving range). In some embodiments, step 636-7 corresponding to the arrival step at the destination includes indication 638-3 that indicates the estimated amount of fuel that Gas Vehicle 1 will have upon arriving at the destination (e.g., $5/16$ of a tank). It is understood that more or fewer steps can include indications of an estimated amount of fuel (e.g., zero, one, or more steps include indications of an estimated amount of fuel optionally while zero, one or more other steps do not include indications of an estimated amount of fuel) and any of steps 636-1 to 636-7 can include an indication of an estimated amount of fuel when arriving at or following the respective step.

In FIG. 6F, user input 603f is received selecting the "Done" button. In some embodiments, in response to user input 603f, user interface 634 is dismissed (e.g., ceased to be displayed), as shown in FIG. 6G.

In FIG. 6G, a contact 603g is received on user interface 607. In FIG. 6H, an upward swipe 603h of contact 603g on user interface 607 is detected (e.g., an upward swipe from contact 603g in FIG. 6G) causing display of expanded user interface 607. In FIG. 6I, while displaying expanded user interface 607, a user input 603i is received selecting listing 626-2 corresponding to Electric Vehicle 2. In some embodiments, in response to user input 603i, Electric Vehicle 2 becomes the selected vehicle, as shown in FIG. 6J. In some embodiments, because suggested routes were displayed by the map application when user input 603i was received in FIG. 6I, the suggested routes are updated to be customized for Electric Vehicle 2. For example, in FIG. 6J, user interface 600 includes suggested route 620-1 and suggested route 620-2. As shown, suggested route 620-1 and suggested route 620-2 are the same routes suggested in FIG. 6B because Electric Vehicle 2 has enough charge to reach the destination (e.g., 73% charge). Thus, even though device 500 takes into account the charge status of Electric Vehicle 2, the suggested routes can optionally be the same suggested routes as when device 500 does not take into account charge status (e.g., when device 500 suggests routes when no vehicle is selected).

FIG. 6K illustrates an embodiment in which Electric Vehicle 2 does not have enough charge to reach the destination (e.g., 23% charge). In such embodiments, user interface 600 includes suggested route 620-4 and suggested route 620-5. In some embodiments, suggested route 620-4 includes suggested stop 632-2 corresponding to a recommended stop to recharge Electric Vehicle 2 at an electric vehicle charging station. In some embodiments, suggested stop 632-2 is recommended because Electric Vehicle 2 does not have enough charge to reach the destination (or optionally will not have enough charge to reach the destination with a threshold amount of remaining charge or remaining driving range). In some embodiments, as will be described in more detail below with respect to method 900, suggested stop 632-2 is selected based on the charging station network that is compatible with Electric Vehicle 2. In some embodiments, suggested stop 632-2 in FIG. 6K is an electric vehicle charging station based on the fact that Electric Vehicle 2 requires electric charge for travel, but the suggested stop can be any type of refilling or recharging station based on the type of vehicle for which suggested stops are suggested (e.g., gasoline vehicle, hydrogen vehicle, E85 vehicle, diesel vehicle, etc.).

As shown in FIG. 6K, suggested route 620-4 is a different route than suggested route 620-1 and suggested route 620-2 because device 500 has determined that a recharging stop is required. Thus, suggested route 620-4 navigates the user to a suggested recharging stop before navigating the user to the destination. In some embodiments, suggested route 620-4 is different than suggested route 620-3 because Electric Vehicle 2 requires an electric vehicle recharging stop rather than a gasoline station stop. Thus, device 500 is able to take into account the charge status of Electric Vehicle 2 as well as the type of stop required based on the fuel type of Electric Vehicle 2 (e.g., electricity rather than gasoline). Similarly, suggested route 620-5 is different from suggested route 620-1, suggested route 620-2 and suggested route 620-3 because it is an alternative route that also includes a stop at an electric vehicle charging station. In some embodiments, any of the suggested routes for Electric Vehicle 2 can have a similar route as any of the suggested routes discussed above for Gas Vehicle 1 or when no vehicle is selected, but optionally include a stop at an electric vehicle charging station, for example, if a compatible electric vehicle charging station happens to be along one of the routes that otherwise would have been suggested to the user for Electric Vehicle 2.

In some embodiments, listing 616-1 corresponding to suggested route 620-4 includes indication 630-1 that indicates that suggested route 620-3 includes one stop in Echo Park (e.g., the name of the region at which the charging station is located). In some embodiments, listing 616-2 corresponding to suggested route 620-5 includes indication 630-2 that indicates that suggested route 620-5 includes one stop in Silent Hill. In some embodiments, suggested route 620-5 does not include a representation or icon of a suggested stop even though suggested route 620-5 does include a suggested stop. In some embodiments, only the first listed (e.g., most recommended route or the route that is currently selected or highlighted) suggested stop includes icons of suggested stops and other suggested routes do not include an icon of suggested stops even if the suggested route includes suggested stops (e.g., any or all of the other suggested stops). In some embodiments, all displayed suggested routes include an icon or indication of suggested stops (e.g., and not just the first suggested route). As shown in FIG. 6K, the indication (e.g., icon) of the suggested stop 632-2 is a representation of an electric vehicle charging station and is a different icon than suggested stop 632-1 shown in FIG. 6G that is a representation of a gas station. In some embodiments, the icon representing a suggested stop along a route is the same regardless of whether the suggested stop is an electric vehicle charging station or a gasoline station.

In FIG. 6K, user input 603k is an input that selects listing 616-1 corresponding to suggested route 620-4. In some embodiments, in response to user input 603k, device 500 displays user interface 634, as shown in FIG. 6L. In some embodiments, user interface 634 includes one or more step-by-step directions for travelling from the current location or a selected starting location of device 500 to Destination 1 via suggested route 620-4. In FIG. 6L, user interface 634 includes step 636-1 to step 636-6 for travelling from the starting location to the destination location.

In some embodiments, as illustrated in FIG. 6L, one or more of the steps 636-1 to 636-6 include an indication of an amount of charge that Electric Vehicle 2 will or should have when the vehicle reaches the location of the respective step (e.g., if the vehicle is following the route as planned). For example, step 636-1 corresponding to the starting location (e.g., the starting step) includes indication 638-1 of the estimated amount of charge that Electric Vehicle 2 will have at the starting location. In some embodiments, indication 638-1 includes an indication of the current amount of charge (e.g., because step 636-1 is the first step). In some embodiments, step 636-4 corresponding to the suggested stop of FIG. 6K (e.g., suggested stop 632-2 in Echo Park at an electric vehicle charging station to recharge) includes an indication 638-2 of the recommended amount of charge to recharge Electric Vehicle 2 up to in order to reach the destination (optionally to reach the destination with the threshold amount of charge or remaining driving range). In some embodiments, step 636-6 corresponding to the arrival step at the destination includes indication 638-3 that indicates the estimated amount of charge that Electric Vehicle 2 will have upon arriving at the destination (e.g., 38% battery remaining). It is understood that more or fewer steps can include indications of an estimated amount of charge and any of steps 636-1 to 636-6 can include an indication of an estimated amount of charge when arriving at or following the respective step.

In FIG. 6L, user input 603l is received selecting the "Done" button. In some embodiments, in response to user input 603l, user interface 634 is dismissed (e.g., ceased to be displayed), as shown in FIG. 6M. In FIG. 6M, a user input 603m is received selecting button 618-1 for beginning navigation using suggested route 620-4. In some embodiments, in response to user input 603m, device 500 begins navigation mode and displays user interface 640, as shown in FIG. 6N.

In some embodiments, navigation mode includes displaying step-by-step and/or turn-by-turn directions to travel along a respective route. In some embodiments, the step-by-step and/or turn-by-turn directions are provided based on the location of the device to provide the user with live directions to reach the destination. In FIG. 6N, user interface 640 includes instructions 642 and instructions 644. In some embodiments, instructions 642 includes textual instructions corresponding to the currently displayed step. For example, in FIG. 6N, instructions 642 instruct the user to begin driving on Main St. In some embodiments, instructions 644 provide additional instructions associated with the displayed step or provides a preview of the next step. For example, in FIG. 6N, instructions 644 indicates that the next step is to turn left on Ocean Ave. As shown in FIG. 6N, any of instructions 642 and/or 644 can include an icon representative of the step (e.g., a turn icon, a start icon, etc.). In some embodiments, instructions 644 is not displayed for certain steps or for all steps (e.g., if additional information is not necessary).

In some embodiments, user interface 640 includes a representation of the map that includes the current position of device 500, illustrated by location indicator 646. As shown in FIG. 6N, location indicator 646 indicates the current position of device 500 (e.g., is located on the representation of the map corresponding to the current location of device 500) and/or the orientation of device 500 (e.g., the arrow in location indicator 646 is facing in the direction of the orientation of device 500). In some embodiments, user interface 640 includes route 648 corresponding to suggested route 620-4. In some embodiments, the representation of the map is oriented such that the map is facing the direction that device 500 is facing. For example, in FIG. 6N, if device 500 is facing south, then the representation of the map is oriented such that south is upwards.

In some embodiments, user interface 640 includes user interface 650 that is displayed overlaid over user interface 640. In some embodiments, user interface 650 provides general information of suggested route 620-4. For example, in FIG. 6N, user interface 650 includes indication 652, indication 654, and button 656. In some embodiments, indication 652 displays the estimated time of arrival at the next stop (e.g., the suggested stop, the destination, or a user-selected stop along the suggested route). In some embodiments, indication 654 displays the estimated amount of charge that Electric Vehicle 2 will have upon arrival at the next stop. In some embodiments, button 656 is selectable to end navigation mode (e.g., to stop providing step-by-step or turn-by-turn instructions to reach the destination).

FIG. 6O illustrates an embodiment in which the user has traveled along suggested route 620-4 and is approaching the suggested charging stop along suggested route 620-4. In some embodiments, device 500 determines that the user has traveled along suggested route 620-4 and is approaching the suggested charging stop (e.g., suggested stop 632-2 from FIG. 6K, represented by representation 660) using one or more device location mechanisms or processes (e.g., using a GPS locator on device 500, etc.). In FIG. 6O, instructions 642 is updated to indicate that the suggested charging stop is 400 feet ahead and on the left side of the road. In some embodiments, instructions 644 is updated to provide additional information about the suggested charging stop (e.g., that the charging station is located on the first floor). In some embodiments, if the suggested stop is to refuel at a gasoline station (e.g., for a gasoline vehicle), instructions 644 can be updated to provide additional information about the gasoline station (e.g., which pump to use, which grade of gas to use, where the pumps are located, etc.).

In some embodiments, user interface 640 includes route 648 corresponding to the upcoming route. In some embodiments, user interface 640 includes route 658 corresponding to the route that was traversed. Between route 648 and route 658, there may be a representation (e.g., indicator 646) of the current location of the user's vehicle. In some embodiments, user interface 640 includes representation 660 corresponding to the suggested stop (e.g., suggested stop 632-2 from FIG. 6K). In some embodiments, representation 660 is displayed at a location on the representation of the map corresponding to the location of the suggested stop. As shown in FIG. 6O, representation 660 is an icon of an electric vehicle charging station. In some embodiments, representation 660 includes a textual description of the suggested stop (e.g., the name of the suggested stop, the name of the charging station, the charging network associated with the charging station, etc.).

FIG. 6P illustrates an embodiment in which the user has arrived at the suggested charging stop (or optionally within a threshold distance from the suggested charging stop, such as 50 feet, 100 feet, 300 feet, 500 feet, 1500 feet, etc.). In some embodiments, instructions 642 is updated to indicate that the user has arrived at the suggested stop. In some embodiments, instructions 644 is updated to suggest that the user use Adapter 1 to convert the plug used by Electric Vehicle 2 to a plug type that is compatible with the charging station. In some embodiments, determination that Adapter 1 is required to convert the plug type installed on Electric Vehicle 2 to a plug type that is compatible with the charging station is based on information received about Electric Vehicle 2 as described below with respect to method 900 (e.g., information about the compatible plug types, information about available adapters, etc.). It is understood that providing information regarding required adapters can be applied to vehicles of other fuel types (e.g., gasoline vehicles, electric vehicles, hybrid vehicles, plug-in hybrid vehicles, etc.).

FIG. 6Q illustrates an embodiment in which device 500 has determined that Electric Vehicle 2 is being charged. In some embodiments, device 500 receives information about the charging status from a source external to the map application (e.g., an application other than the map application, or a server external to device 500) as described below with respect to method 900. In some embodiments, instructions 642 is updated to instruct the user to charge Electric Vehicle 2 to at least 53% and that the charging is estimated to take 15 minutes. In some embodiments, the estimated remaining charge time is determined based on information received from the source external to the map application.

In some embodiments, in response to determining that Electric Vehicle 2 is being charged, user interface 640 is updated to display route 648 corresponding to the forward route to reach the destination. In FIG. 6Q, user interface 650 is updated to include button 662. In some embodiments, button 662 is selectable to pause navigation mode (e.g., while the vehicle is charging). In some embodiments, pausing navigation mode returns the map application to a browsing mode in which a user is able to interact with the representation of the map and search for locations (and optionally provides for easy resumption of navigation mode, as described below), such as shown in FIG. 6A. In FIG. 6Q, a user input 603q is received selecting button 662. In some embodiments, in response to user input 603q, device 500 pauses (e.g., ceases, ends, or stops) navigation mode (and optionally displays user interface 600, such as in FIG. 6A).

FIG. 6R illustrates an exemplary lock or wake screen user interface 664 while Electric Vehicle 2 is being charged (e.g., optionally after the user has paused navigation mode via selection of button 662, after the user has locked device 500 or placed device 500 in a low power mode, or after navigating away from a user interface of the map application, such as user interface 600). A lock or wake screen user interface (e.g., such as user interface 664) is a user interface that is initially displayed upon waking device 500 after waking device 500 from a low power mode. In some embodiments, while navigation is paused (e.g., previously ceased, ended, or stopped) and while Electric Vehicle 2 is being charged, device 500 displays notification 668 that includes the charging status of the vehicle and/or the remaining charging time. In FIG. 6R, notification 668 indicates that there is five minutes of estimated time remaining to reach the suggested charge level. In some embodiments, the suggested charge level is selected based on the remaining distance to the destination (e.g., the amount of charge required to reach the destination, the amount of charge required to reach the destination with a threshold amount of remaining charge and/or remaining driving range). In some embodiments, notification 668 is periodically updated (e.g., every 10 seconds, 30 seconds, 1 minute, 5 minutes, 10 minutes, etc.) to indicate the estimated remaining time to charge the vehicle to the suggested charge level. In some embodiments, notification 668 indicates the current charge level (or gasoline level for a gasoline vehicle, or any other relevant fuel amount for vehicles of other fuel types).

In some embodiments, notification 668 is displayed on any user interface and is not limited to only a lock or wake screen user interface. For example, notification 668 can be displayed while device 500 is displaying a system user interface (e.g., the home screen user interface, an application launching user interface, a settings user interface) or a user interface of an application. In some embodiments, notification 668 can be displayed on a notification user interface (e.g., a user interface that includes one or more active notifications). In some embodiments, notification 668 is persistent and remains displayed on the lock or wake screen user interface (optionally and on the notification user interface) while Electric Vehicle 2 is being charged. In some embodiments, notification 668 is automatically dismissed (e.g., removed from lock or wake screen user interface 664 and/or the notification user interface) in accordance with a determination that Electric Vehicle 2 has stopped charging. In some embodiments, notification 668 can be manually dismissed in response to a user input requesting dismissal of notification 668.

FIG. 6S illustrates notification 668 when device 500 determines that Electric Vehicle 2 has reached the suggested charge level. In some embodiments, notification 668 indicates that Electric Vehicle 2 is ready to continue travelling towards the destination. In some embodiments, notification 668 indicates that Electric Vehicle 2 has reached the suggested charge level. In some embodiments, notification 668 indicates the current charge level.

In some embodiments, selection of notification 668 (e.g., while Electric Vehicle 2 is charging or after Electric Vehicle 2 has completed charging) initiates a process to display the map application (e.g., user interface 600) and/or to resume navigation (e.g., optionally after device 500 has been unlocked). In some embodiments, if Electric Vehicle 2 has charged beyond the suggested level, then notification 668 can indicate that Electric Vehicle 2 has charged beyond the level required and that Electric Vehicle 2 is ready to continue along the suggested route.

FIG. 6T illustrates an exemplary user interface 600 of the map application while Electric Vehicle 2 is being charged, such as in response to a user selection of button 662. In some embodiments, user interface 606 includes an indication 672 to charge Electric Vehicle 2 for another 15 minutes. In some embodiments, indication 672 is periodically updated (e.g., every 10 seconds, 30 seconds, 1 minute, 5 minutes, 10 minutes, etc.) to indicate the estimated remaining time to charge the vehicle to the suggested charge level. In some embodiments, indication 672 indicates the current charge level. In some embodiments, for vehicles of other fuel types, indication 672 indicates the current fuel level (e.g., gasoline level for gasoline vehicles, etc.).

FIG. 6U illustrates indication 672 when device 500 determines that Electric Vehicle 2 has reached the suggested charge level. In some embodiments, indication 672 indicates that Electric Vehicle 2 is ready to continue travelling towards the destination. In some embodiments, indication 672 indicates that Electric Vehicle 2 has reached the suggested charge level. In some embodiments, indication 672 is selectable to resume navigation mode (e.g., and optionally display user interface 640).

In FIG. 6U, a user input 603*u* is received selecting indication 672. In some embodiments, in response to user input 603*u*, device 500 resumes navigation mode of suggested route 620-4 and displays user interface 640, as shown in FIG. 6V. Similarly, navigation mode of suggested route 620-4 is optionally resumed in response to selection of notification 668 shown in FIG. 6S. In some embodiments, selection of notification 668 or indication 672 before the vehicle has reached the suggested charge level does not cause resumption of navigation mode. In some embodiments, selection of notification 668 or indication 672 before the vehicle has reached the suggested charge level does cause resumption of navigation mode (but optionally could cause the addition of another suggested stop, such as described below with respect to FIG. 6V).

FIG. 6V illustrates an embodiment in which device 500 determines that a (or another) refueling and/or recharging stop is required to reach the destination while in navigation mode. In some embodiments, a refueling and/or recharging stop was not previously recommended but based on updated information, a refueling and/or recharging stop is now recommended. For example, based on updated information, device 500 determines that Electric Vehicle 2 will not reach the destination (or optionally will reach the destination with less than a threshold amount of charge or less than a threshold amount of driving range remaining). In some embodiments, the updated information is an updated estimated driving range of Electric Vehicle 2 and/or an updated charge level of Electric Vehicle 2, such as described below with respect to method 900. For example, in FIG. 6V, device 500 determines that Electric Vehicle 2 only has 10% charge remaining and may not reach the destination. In some embodiments, a suggested stop is required if the original estimated driving range was not accurate, because the driving economy of the vehicle changed (e.g., due to aggressive or spirited driving), because Electric Vehicle 2 did not follow the suggested route, or any other potential reason.

In some embodiments, in response to determining that a refueling and/or recharging stop is required, device 500 determines (or the above-described navigation server determines) the appropriate suggested stop and determines whether the route should be modified. For example, in FIG. 6V, user interface 640 is updated to display route 648 that includes a suggested stop 684. As shown in FIG. 6V, route 648 is a modified route to the same destination that includes the suggested stop. In some embodiments, an indication is displayed that route 648 is a suggested route. In some embodiments, route 682 is displayed corresponding to the original suggested route (e.g., without the suggested stop). In some embodiments, user interface 674 is displayed indicating that a suggested stop is recommended and requesting confirmation of whether to add the suggested stop to the navigation route. In some embodiments, user interface 674 includes textual indication 676 that indicates that a charging stop is required or suggested because there is not enough charge to reach the destination. In some embodiments, user interface 674 includes button 678 that is selectable to dismiss user interface 674, to decline adding the suggested stop, and to continue along the original route (e.g., along route 682). In some embodiments, user interface 674 includes button 680 that is selectable to confirm addition of the suggested stop and to navigate along route 648 (including stopping at the suggested stop). In some embodiments, for vehicles of other fuel types (e.g., gasoline, hydrogen, E85, etc.), device 500 can display suggested stops to recharge and/or refuel at a compatible station.

FIGS. 6W-6FF illustrate embodiments in which suggested routes are selected based on the characteristics of respective vehicles with respect to driving restrictions. In FIG. 6W, device 500 displays user interface 600 of the map application and user interface 606. In FIG. 6W, user interface 600 does not include any suggested routes or driving directions and is optionally a default user interface of the map application (e.g., in a browsing state) that includes location indicator 602. In some embodiments, user interface 606 includes search field 670. In some embodiments, user interface 606 includes indication 686. In some embodiments, indication 686 is displayed in accordance with a determination that the current location of device 500 is within or near a geographic region in which a driving restriction exists.

In the embodiments illustrated in FIGS. 6W-6FF, the respective driving restriction is based on the license plate of the vehicle, but it is understood that any driving restriction is possible. In some embodiments, a driving restriction corresponds to a restriction that defines that a certain set of vehicles may travel without restriction and a second set of vehicles are restricted from travel. In some embodiments, other restrictions are possible (e.g., a first set of vehicles must follow a certain set of rules or regulations while a second set follows a different set of rules or regulations, or all vehicles with a certain characteristic(s) are restricted from travel, etc.). For example, if a particular region or set of roads are controlled by a driving restriction, certain vehicles with certain characteristics defined by the restriction may be restricted from traveling within the region (or on the roads), while other vehicles without those certain characteristics may not be restricted from traveling within the region (or on the roads). For example, a restriction can exist in which odd numbered license plates (e.g., vehicles with license plates that end in an odd number) are prohibited from driving in a particular location during particular times and dates while even numbered license plates (e.g., vehicles with license plates that end in an even number) are not prohibited from driving at any time (or are prohibited from driving in the particular location during other times). Another example of a driving restriction can be that vehicles over a particular gross weight are prohibited from driving on a particular highway during business hours, while vehicles under the gross weight threshold are not prohibited from driving on the highway.

In some embodiments, indication 686 includes affordance 688 that is selectable to provide one or more vehicle license plates to the map application. In some embodiments, indication 686 is displayed only if no license plates have yet been provided to the map application. Thus, in some embodiments, indication 686 is not displayed after the user adds a first license plate to the map application (optionally even if the current location of device 500 is within or near a geographic region in which a driving restriction exists). In some embodiments, indication 686 can be displayed even if the user has added a license plate to the map application if the current location of device 500 is within or near a geographic region in which a driving restriction that is not based on a vehicle's license plate exists and suggest to the user to provide other characteristic information for their vehicle (e.g., based on height, width, number of axles, weight, or any other suitable characteristic of the vehicle, etc.). In some embodiments, the process for adding a vehicle, registering a vehicle, and/or providing license plate information is similar to the process described below with respect to FIGS. 8D-8H.

FIG. 6X illustrates an embodiment in which suggested routes are provided to the user with respect to a driving restriction. In some embodiments, if the user requests directions to a destination and one or more routes require the user to travel through a region that is subject to a driving restriction, user interface 600 includes an indication 698 of the region that is subject to the driving restriction. In some embodiments, indication 698 is a visual element that visually differentiates the geographic region that is subject to the driving restriction from the areas that are not subject to a driving restriction (e.g., with a grey color, with a fill pattern, etc.).

In some embodiments, as shown in FIG. 6X, user interface 600 includes suggested route 620-6 and suggested route 620-7. In some embodiments, suggested route 620-6 travels through the geographic region that is subject to the driving restriction. In some embodiments, suggested route 620-6 includes indicator 692 on the border of the geographic region that is subject to the driving restriction to indicate that the user may become subject to the driving restriction at the location indicated by indicator 692. In some embodiments, label 690-1 corresponding to suggested route 620-6 indicates that suggested route 620-6 is the fastest route (and is estimated to take 30 minutes) and includes an icon that indicates that a driving restriction may apply to the user's vehicle.

In some embodiments, suggested route 620-7 travels around the geographic region that is subject to the driving restriction and does not include an indicator that indicates that the user may become subject to the driving restriction. In some embodiments, label 690-2 corresponding to suggested route 620-7 indicates that suggested route 620-7 avoids the driving restriction. As shown in FIG. 6X, no vehicle is currently selected, so device 500 does not have license plate information for the vehicle that the user intends to use to travel along the suggested routes. Thus, in some embodiments, device 500 provides at least one route that is selected without regard to the driving restriction (e.g., the fastest route, such as suggested route 620-6) and at least one route that is selected to avoid the driving restriction (e.g., the fastest route that avoids the driving restriction, such as suggested route 620-7). In some embodiments, only one suggested route is displays (e.g., only the fastest route without regard to the restriction or only the fastest route that avoids the restriction).

In some embodiments, user interface 606 includes listing 616-1 corresponding to suggested route 620-6 and listing 616-2 corresponding to suggested route 620-7. In some embodiments, listing 616-1 includes indication 630-1 that indicates that suggested route 620-6 is subject to driving restrictions. In some embodiments, indication 630-1 includes link 694 that is selectable to display details about the respective driving restriction that applies in the respective geographic region. In some embodiments, listing 616-2 does not include an indication that suggested route 620-7 is subject to driving restrictions, but includes an indication that suggested route 620-7 avoids the driving restriction to which suggested route 620-6 is subject.

In some embodiments, if suggested route does not pass through or pass near a restricted region, then map user interface 600 does not include indication 698 of the region that is subject to the driving restriction. For example, in the embodiment illustrated in FIG. 6B, no driving restrictions apply in the region displayed by the representation of the map, and thus device 500 does not display an indication of a driving restriction (e.g., does not include indication 698, indication 630-1 and/or link 694).

In FIG. 6Y, user input 603*y* is received selecting link 694 corresponding to a request to display more information about the driving restriction. In some embodiments, in response to user input 603*y*, device 500 updates user interface 607 to display information about the driving restriction, as shown in FIG. 6Z. In some embodiments, updated user interface 607 includes description 696 that describes the driving restriction that applies, optionally including description of what the restriction is and which vehicles are subject to the restrictions. For example, in FIG. 6Z, description 696 indicates that vehicles with license plate numbers that end in an odd number are prohibited from driving inside the restricted region (e.g., Downtown Pleasanton) on Tuesdays and Thursdays between 7:00 AM and 6:30 PM. In some embodiments, as will be described in further detail below, device 500 is able to determine whether a particular car is subject to the restriction and the times at which the car is subject to the restriction, and select suggested routes based on the determination.

In FIG. 6AA, an upward swipe 603*aa* of a contact on user interface 607 is detected (e.g., an upward swipe from a contact on user interface 607 illustrated in FIG. 6Y), causing expansion of user interface 607 (e.g., similar to FIG. 6C). Similar to described above with respect to FIG. 6C, expanded user interface 607 includes vehicle list 622. In some embodiments, vehicle list 622 includes vehicle option 624-1, vehicle option 624-2, and no vehicle option 624-3. In some embodiments, vehicle option 624-1 corresponds to a first vehicle that has been registered with (e.g., added to) the map application (e.g., the user has provided license plate information for the first vehicle to the map application) and vehicle option 624-2 corresponds to a second vehicle that has been registered with the map application (e.g., the user has provided license plate information for the second vehicle to the map application). As shown in FIG. 6AA, vehicle 1 is a gas vehicle and vehicle 2 is an electric vehicle. In some embodiments, no vehicle option 624-3 corresponds to no specific vehicle and selection of vehicle option 624-3 causes the map application to suggest routes that are selected without consideration of the characteristics of a specific vehicle (e.g., without respect to whether a particular car is subject to a restriction), such as described above with respect to FIG. 6Y.

In FIG. 6BB, a user input 603*bb* is received selecting vehicle option 624-2 corresponding to Electric Vehicle 2. In some embodiments, in response to user input 603*bb*, Electric Vehicle 2 becomes the selected vehicle, as shown in FIG. 6CC. In FIG. 6CC, because suggested routes were displayed when the user selected Electric Vehicle 2, the suggested routes are updated to be customized for Electric Vehicle 2. In some embodiments, a customized route for a vehicle is selected based on the license plate information of Electric Vehicle 2 (e.g., additionally or alternatively to vehicle characteristics described with reference to FIGS. 6A-6V). For example, device 500 is able to determine, based on the provided license plate information of Electric Vehicle 2, whether Electric Vehicle 2 is permitted to drive in the restricted region or prohibited from driving in the restricted region (e.g., based on the driving restriction rules, optionally at the current time or optionally at a future time selected by the user). In FIG. 6CC, Electric Vehicle 2 has an odd license plate number (e.g., the last number of the license plate is an odd number), and thus would be prohibited from driving inside Downtown Pleasanton on Tuesdays and Thursdays between 7:00 AM and 6:30 PM. Thus, in some embodiments, if the current time and day is Tuesday or Thursday between 7:00 AM and 6:30 PM, then the suggested routes are selected to avoid the restriction region (e.g., at least one suggested route avoids the restriction). For example, suggested route 620-7 is now the first suggested route (e.g., displayed first in user interface 607 and displayed on the map user interface with a prioritized visual characteristic). In some embodiments, one or more of the suggested routes travel through the restricted region even though Electric Vehicle 2 is prohibited from driving in the restricted region. For example, suggested route 620-6 is the fastest route, but because suggested route 620-6 travels through the restricted region, suggested route 620-6 is not displayed first and is displayed in the map user interface with a de-prioritized visual characteristic.

In some embodiments, a user input 603*cc* is received selecting button 618-1 corresponding to a request to begin navigation mode using suggested route 620-6, as shown in FIG. 6CC. Thus, in some embodiments, even though the selected vehicle (e.g., Electric Vehicle 2) is prohibited from driving inside the restricted region, a user is able to begin navigation along a route that takes the user into the restricted region. In some embodiments, in response to user input 603*cc*, device 500 begins navigation mode and displays user interface 640, as shown in FIG. 6DD.

FIG. 6DD illustrates an embodiment in which the user has traveled along suggested route 620-6 and is approaching the boundary of the restricted region (e.g., within 50 feet, 100 feet, 300 feet, 500 feet, 1000 feet, 3000 feet, etc.). In some embodiments, device 500 determines that the user has traveled along suggested route 620-6 and is approaching the boundary of the restricted region using one or more device location mechanisms or processes (e.g., using a GPS locator on device 500, etc.). In FIG. 6DD, the restricted region is visually differentiated from the non-restricted region (e.g., similar to indication 698 in FIG. 6X). In some embodiments, indication 646 is displayed at or near the boundary of the restricted region indicating the point at which the restricted region begins. In some embodiments, device 500 displays user interface 699 in response to the device 500 coming within a threshold distance (e.g., 100 feet, 300 feet, 500 feet, 1000 feet, 3000 feet, etc.) of the location of the restriction boundary, and user interface 699 optionally includes description 697 that provides a warning that the restricted region is ahead. In some embodiments, description 697 includes a brief description of the restriction (e.g., that odd numbered plates are affected).

As shown above, in some embodiments, although device 500 provides indications and/or warnings that the user is about to enter a restricted region, device 500 does not prevent the user from entering the restricted region or limit the navigational or mapping functionalities of the device as the user enters the restricted region or while the user is in the restricted region. Thus, in some embodiments, the device provides the user with information regarding the restricted region, but allows the user to make the decision of whether to enter the restricted region.

FIGS. 6EE-6FF illustrate an embodiment in which suggested routes are selected for a vehicle that that is not prohibited from driving within a restricted region. In FIG. 6EE, a user input 603*ee* is received selecting listing 624-1 from vehicle list 622 on expanded user interface 606. In some embodiments, in response to user input 603*ee*, Gas Vehicle 1 becomes the selected vehicle, as shown in FIG. 6FF. In FIG. 6FF, because suggested routes were displayed when the user selected Gas Vehicle 1, the suggested routes are updated to be customized for Gas Vehicle 1. In some embodiments, a customized route for a vehicle is selected based on the license plate information of Gas Vehicle 1. For example, device 500 is able to determine, based on the provided license plate information of Gas Vehicle 1, whether Gas Vehicle 1 is permitted to drive in the restricted region or prohibited from driving in the restricted region (e.g., based on the driving restriction rules, optionally at the current time or optionally at a future time selected by the user). In FIG. 6FF, Gas Vehicle 1 has an even license plate (e.g., the last number of the license plate is an even number) and thus is not prohibited from driving inside Downtown Pleasanton. Thus, in some embodiments, the suggested routes are selected without regard to the restriction of the restricted region. For example, suggested route 620-6 is the first suggested route (e.g., displayed first in user interface 606 and displayed on the map user interface with a prioritized visual characteristic), optionally because suggested route 620-6 is the fastest route. In some embodiments, suggested route 620-8 is an alternative route (e.g., alternative to suggested route 620-6). As shown in FIG. 6FF, both suggested route 620-6 and suggested route 620-8 travel into and/or through the restricted region. In some embodiments, user interface 600 does not display any indication that the suggested routes are subject to the restricted region. In some embodiments, user interface 600 still includes indicator 698 that indicates the area of the restricted region. In some embodiments, one or more of the suggested routes for Gas Vehicle 1 are the same routes as shown in FIG. 6X (e.g., suggested route 620-6 corresponding to the fastest route). In some embodiments, one or more routes of the suggested routes for Gas Vehicle 1 are different routes than those shown in FIG. 6X (e.g., suggested route 620-8 is different from suggested route 620-7 because suggested route 620-7 is optionally selected to avoid the restriction whereas suggested route 620-8 is not required to avoid the restriction due to the restriction not applying to Gas Vehicle 1). Although FIG. 6FF does not illustrate the inclusion of the indications that the suggested routes may be subject to driving restrictions (e.g., such as in FIG. 6 X and FIG. 6CC), in some embodiments, user interface 600 includes the indications on the suggested routes and on the listings, even though Gas Vehicle 1 is not itself prohibited from driving in the restricted region (e.g., in the case that Gas Vehicle 1 is selected by mistake, the user is able to see that a restriction exists).

It is understood that although the description of the figures above describe driving restrictions that are based on the license plate number of a respective vehicle, the disclosure herein is not so limited. For examples, the features described above can be applied to driving restrictions based on other characteristics of vehicles, such as a vehicle's VIN, a vehicle's height, width, length, weight, etc. For example, if a respective driving restriction prohibits vehicles with more than two axles from traveling within a certain region or along a certain road, then device 500 can provide a process for the user to provide information about the number of axles on the user's vehicles (e.g., in a process similar to the process to provide license plate information described above), and device 500 can use the provided information to suggest routes that that are customized for the user's vehicle (e.g., based on whether the user's vehicle is prohibited or not prohibited from driving along particular routes.

FIG. 7 is a flow diagram illustrating a method 700 of displaying customized navigation routes in accordance with some embodiments of the disclosure. The method 700 is optionally performed at an electronic device such as device 100, device 300, and device 500 as described above with reference to FIGS. 1A-1B, 2-3, 4A-4B and 5A-5H. Some operations in method 700 are, optionally combined and/or the order of some operations is, optionally, changed.

As described below, the method 700 displays customized navigation routes. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device 500 in communication with a display generation component and one or more input devices (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) displays (702), via the display generation component, a map user interface, such as user interface 600 in FIG. 6A (e.g., a user interface that displays a representation of a map of a given geographic location).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the user interface is a user interface of a map application. In some embodiments, the map user interface is interactable by the user to view different geographic locations or change the zoom level of the map.

In some embodiments, while displaying the map user interface, the electronic device receives (704), via the one or more input devices, a user input corresponding to a request to display directions from a first location to a second location via a given mode of transportation, such as user input 603*a* in FIG. 6A (e.g., a request to determine one or more routes and/or directions from a first geographic location to a second geographic location).

In some embodiments, a user selects the first and/or second geographic location. In some embodiments, the first or second geographic location is the determined current location of the electronic device. In some embodiments, the map user interface displays the one or more determined routes from the first geographic location to the second geographic location. In some embodiments, the one or more routes are displayed in the map user interface. In some embodiments, the user selects the mode of transportation for which to determine the route. For example, the electronic device is able to determine driving routes, public transportation routes, mass transit routes, walking routes, and/or bicycling routes, etc. In some embodiments, depending on the selected mode of transportation, the device uses different processes, algorithms, and/or restraints when determining potential routes.

In some embodiments, in response to the user input (706), in accordance with a determination that a first vehicle is a currently selected vehicle for which to display directions in the map user interface (e.g., a first vehicle is selected from one or more vehicles that are registered and/or added to the electronic device), the electronic device displays (708), in the map user interface, a first suggested route from the first location to the second location based on a first characteristic of the first vehicle, such as suggested route 620-2 and/or suggested route 620-3 based on the fuel level of Gas Vehicle 1 in FIG. 6E (e.g., displaying a first proposed or suggested route from the first location to the second location).

In some embodiments, the first vehicle travels using the selected mode of transportation (e.g., driving on roadways). In some embodiments, the first vehicle is a gas vehicle, a hybrid vehicle, an electric vehicle, or any car of any fuel type (e.g., unleaded fuel, diesel, hydrogen, ethanol, self-propelled, electricity, solar energy, bio energy, etc.).

In some embodiments, the first suggested route is determined based on the characteristics of the selected first vehicle. In some embodiments, the first characteristic is the type of fuel used by the vehicle (e.g., gasoline, diesel, electricity, etc.). In some embodiments, the first characteristic is the fuel economy of the vehicle (e.g., number of miles or kilometers a vehicle is able to travel per unit of fuel). In some embodiments, the first characteristic is the current effective range of the vehicle (e.g., number of miles or kilometers the vehicle is currently able to travel without refueling and/or recharging). In some embodiments, the first characteristic is the type of vehicle (e.g., passenger vehicle, commercial vehicle, truck, semi-trailer truck, etc.). In some embodiments, the first characteristic is the weight of the vehicle (e.g., vehicle with a certain current gross weight). In some embodiments, the first characteristic is the size of the vehicle (e.g., vehicle with a certain height clearance, vehicle with a certain width clearance, etc.). In some embodiments, the first characteristic is the power of the vehicle (e.g., horsepower, torque, etc.). In some embodiments, the first characteristic is an identifier of the vehicle (e.g., license plate number, vehicle identification number (VIN), serial number, etc.). In some embodiments, the first suggested route is determined based on the selected first vehicle's ability to traverse the potential routes from the first location to the second location (e.g., based on the value of the first characteristic). For example, if the first vehicle is an electric vehicle with a range of 100 miles and all routes from the first location to the second location are over 100 miles, then the first suggested route includes a stop to charge the batteries (e.g., at an EV charging station) to allow the first vehicle to reach the second location. In another example, if the first vehicle is an electric vehicle with a range of 100 miles and the fastest route from the first location to the second location is under 100 miles, then the first suggested route does not include the stop to charge the batteries. In another example, if the first vehicle is a gas vehicle with a range of 250 miles and all routes from the first location to the second location are over 250 miles, then the first suggested route includes a stop to purchase gas (e.g., at a gas station) to fill the gas tank. In another example, if the first vehicle is a semi-trailer truck with a gross weight over a threshold amount, then the first suggested route automatically excludes roads and streets whose maximum weight restrictions are below the gross weight of the vehicle. In some embodiments, if a first vehicle is not an off-road vehicle and/or is not able to traverse difficult terrain, then the first suggested route excludes routes that the vehicle would be unable to traverse. In some embodiments, if the first vehicle is a wide vehicle or tall vehicle, then the first suggested route excludes routes that require a narrow or low clearance. These and other characteristics that affect a vehicle's ability to travel from one location to another are contemplated. In some embodiments, information about the first characteristic of the first vehicle is received from a source external to the map application, as described below with respect to method 900.

In some embodiments, in accordance with a determination that a second vehicle, different from the first vehicle, is the currently selected vehicle for which to display directions in the map user interface (e.g., a different vehicle than the first vehicle that travels using the same mode of transportation (e.g., driving on roadways)), the electronic device displays (710), in the map user interface, a second suggested route from the first location to the second location, different from the first suggested route, based on a second characteristic of the second vehicle, such as suggested route 620-4 and suggested route 620-5 based on the current charge level of Electric Vehicle 2 in FIG. 6K (e.g., displaying a second proposed or suggested route from the first location to the second location for the same mode of transportation (e.g., driving on roadways) as would be used for the suggested route for the first vehicle).

In some embodiments, the second vehicle is a gas vehicle, a hybrid vehicle, an electric vehicle, or any car of any fuel type (e.g., unleaded fuel, diesel, hydrogen, ethanol, self-propelled, electricity, solar energy, bio energy, etc.). In some embodiments, the second suggested route is determined based on the characteristics of the selected second vehicle. In some embodiments, one or more characteristics of the second vehicle is different from one or more characteristics of the first vehicle, which results in the second suggested route being different from the first suggested route. In some embodiments, the second suggested route takes a different route than the first suggested route. In some embodiments, the second suggested route includes more or fewer stops than the first suggested route. In some embodiments, the second characteristic of the second vehicle is the same characteristic type as the first vehicle, but has a different value than the first vehicle. For example, the first and second vehicle are optionally both gas vehicles (e.g., same fuel type), but have different effective ranges (e.g., the first vehicle has enough gas to travel 100 miles while the second vehicle has enough gas to travel 50 miles). In such embodiments, the suggested route for the first vehicle is different from the suggested route for the second vehicle based on the distance between the first and second location and whether stops are required to purchase gas. In some embodiments, the second characteristic of the second vehicle is a different characteristic type than the first characteristic of the first vehicle. For example, the first vehicle is optionally a gas vehicle and the second vehicle is optionally an electric vehicle (e.g., different fuel types), and the first suggested route doesn't take into account the effective range of the first vehicle while the second suggested route does take into account the effective range of the second vehicle. In such embodiments, the suggested route for the second vehicle is optionally different from the suggested route for the first vehicle if a stop is required to charge the second vehicle in order to reach the destination. In some embodiments, certain license plate patterns are restricted in a certain geography and the device is able to suggest routes based on the applicable restrictions. For example, some geographies may restrict travel based on whether a vehicle's license plate is even or odd. In such examples, if the first vehicle has an odd numbered license plate number (e.g., ends in an odd number) and the second vehicle has an even numbered license plate number (e.g., ends in an even number), then the electronic device optionally suggests a first route for the first vehicle based on whether odd numbered license plates are currently restricted and optionally suggests a second, different, route for the second vehicle based on whether even numbered license plates are currently restricted. In some embodiments, information about the second characteristic of the second vehicle is received from a source external to the map application, as described below with respect to method 900.

The above-described manner of displaying different routes based on the characteristics of different vehicles for which directions are requested quickly and efficiently provides appropriate routes to travel from a first to a second location (e.g., by automatically taking into consideration the characteristic of the vehicle in suggesting routes), which simplifies the interaction between the user and the electronic device and enhances the operability of the electronic device and makes the user-device interface more efficient (e.g., without requiring the user to separately determine whether the user's vehicle is able to traverse the route unobstructed or without requiring the user to manually edit the route to account for the vehicle's particular characteristics), which additionally reduces power usage and improves battery life of the electronic device by enabling the user to use the electronic device more quickly and efficiency while reducing errors in the usage of the device.

In some embodiments, the first characteristic of the first vehicle includes a first current estimated driving range for the first vehicle, such as in FIG. 6E (e.g., the first characteristic is an estimate of the distance that the first vehicle is able to drive on the current fuel or charge level). In some embodiments, the estimate of the distance that the first vehicle is able to drive depends on the current fuel or electric charge level, the driving efficiency of the vehicle, the recent driving patterns of the first vehicle, and/or the habits of the driver, etc.

In some embodiments, the first suggested route is based on the first current estimated driving range, such as in FIG. 6E (e.g., the first suggested route is selected based on the estimate of the distance that the first vehicle is able to drive on the current fuel or charge level). In some embodiments, the first suggested route includes a suggested stop to refuel or recharge the vehicle (e.g., at a gas station or electric vehicle charging station) if the first current estimated driving range is not enough for the first vehicle to reach the second location from the first location. In some embodiments, the first suggested route includes a suggested stop to refuel or recharge the vehicle if the estimated fuel level or battery charge level when the vehicle reaches the destination is less than a threshold amount (e.g., such as less than 5%, 10%, 15%, 20%, etc. of fuel or charge remaining, or with less than 2 miles, 5 miles, 10 miles, 20 miles, 50 miles, etc. of driving range remaining). Thus, in some embodiments, even if the current estimated range of the first vehicle is enough to reach the second location from the first location, the device will include a suggested stop to refuel or recharge the first vehicle if the first vehicle would otherwise be left with less than a threshold amount of fuel or electric charge. In some embodiments, the first suggested route is selected to be less than the estimate of the distance that the first vehicle is able to drive (e.g., even if it is a slower route). In some embodiments, the first suggested route is selected to increase the driving economy of the first vehicle (e.g., selecting routes with more steady driving, etc.) if the estimated driving range is close to the distance from the first location to the second location, for example.

In some embodiments, the second characteristic of the second vehicle includes a second current estimated driving range for the second vehicle, different from the first current estimated driving range, such as in FIG. 6K (e.g., the current estimated driving range for the second vehicle is different from the current estimated driving range for the first vehicle). In some embodiments, the current estimate driving range for the second vehicle is different from the first vehicle because the vehicles have a different amount of fuel or charge and/or the vehicles have different driving efficiencies (e.g., fuel or charge efficiency).

In some embodiments, the second suggested route is based on the second current estimated driving range, such as in FIG. 6K (e.g., the second suggested route is selected based on the estimate of the distance that the second vehicle is able to drive on the current fuel or charge level). In some embodiments, the second suggested route includes a suggested stop to refuel or recharge the vehicle (e.g., at a gas station or electric vehicle charging station) if the second current estimated driving range is not enough for the second vehicle to reach the second location from the first location. In some embodiments, the second suggested route is the same route as the first suggested route (e.g., same route optionally with the same suggested stops). In some embodiments, the second suggested route is a different route than the first suggested route (e.g., different route optionally with different suggested stops or no suggested stops).

The above-described manner of displaying different routes based on the estimated driving range of different vehicles for which directions are requested quickly and efficiently provides appropriate routes to travel from a first to a second location (e.g., by automatically taking into consideration the driving range of the vehicle in suggesting routes), which simplifies the interaction between the user and the electronic device and enhances the operability of the electronic device and makes the user-device interface more efficient (e.g., without requiring the user to separately determine whether the user's vehicle is able to reach the destination without running out of fuel or charge), which additionally reduces power usage and improves battery life of the electronic device by enabling the user to use the electronic device more quickly and efficiency while reducing errors in the usage of the device.

In some embodiments, in accordance with a determination that the first current estimated driving range is less than a driving distance of the first suggested route from the first location to the second location (e.g., the first current estimated driving range for the first vehicle is less than the distance to drive from the first location to the second location (e.g., the distance of the fastest route, the distance of the shortest route, etc., optionally by a threshold amount such as 0 miles, 2 miles, 5 miles, 10 miles, 20 miles, 50 miles, or the equivalent of 5%, 10%, 15%, 20%, 25%, etc. of fuel or charge remaining)), the first suggested route includes a suggested stop for increasing a remaining driving range of the first vehicle, such as suggested stop 632-1 in FIG. 6E (e.g., the first suggested route is selected based on the estimate of the distance that the first vehicle is able to drive on the current fuel or charge level).

In some embodiments, the first suggested route includes a suggested stop to refuel or recharge the first vehicle (e.g., at a gas station or electric vehicle charging station). In some embodiments, the first suggested route includes a plurality of suggested stops to refuel or recharge the first vehicle if multiple stops to refuel or recharge are required to reach the second location from the first location. In some embodiments, if the second current estimated driving range for the second vehicle is less than the distance to drive from the first location to the second location, then the second suggested route includes a suggested stop to refuel or recharge the second vehicle. In some embodiments, the suggested stop for the second vehicle is different from the suggested stop for the first vehicle based on the difference in the characteristics of the two vehicles (e.g., different fuel types, different driving range, etc.). In some embodiments, the second suggested route for the second vehicle does not include a suggested stop.

The above-described manner of including a suggested stop in the suggested routes quickly and efficiently provides appropriate routes to travel from a first to a second location (e.g., by automatically taking into consideration whether the vehicle should be refueled or recharged along the way in order to reach the destination), which simplifies the interaction between the user and the electronic device and enhances the operability of the electronic device and makes the user-device interface more efficient (e.g., without requiring the user to separately determine whether the user's vehicle is able to reach the destination and then manually searching for and adding a refueling or recharging stop to the route), which additionally reduces power usage and improves battery life of the electronic device by enabling the user to use the electronic device more quickly and efficiency while reducing errors in the usage of the device.

In some embodiments, in accordance with a determination that the first vehicle is associated with a first charging network (e.g., the first vehicle (optionally the driver of the first vehicle) has a subscription, agreement, or relationship with a network of charging stations, charging station company, and/or gas station company, the driver of the first vehicle has a preferred network of charging stations, charging station company, and/or gas station company and/or the first vehicle is restricted to a particular network of charging stations (e.g., optionally due to limitations of the first vehicle, such as the compatible car types)), the suggested stop for increasing the remaining driving range of the first vehicle is a first stop associated with the first charging network, such as in FIG. 6L (e.g., the suggested stop is within the network of charging stations, is a charging station of the charging station company, or is a gas station of the gas station company that the user has a relationship with or prefers).

In some embodiments, the first vehicle's association with a particular charging network is set by a user or provided by a third-party application or server as described below with respect to method 900. Thus, in some embodiments, device 500 is able to determine the charging stations and/or gas stations within the user's network (e.g., network that the user or vehicle is associated with, a preferred network, or required network for the first network) and suggest those particular stations. In some embodiments, determining the charging station and/or gas station within the user's network includes receiving information for the charging network and/or gas station from a source external to the map application, as discussed below with respect to method 900. In some embodiments, in accordance with a determination that the first vehicle is associated with a second charging network, different from the first charging network, the suggested stop is a second stop, different from the first stop, associated with the second charging network.

The above-described manner of displaying suggested stops that are within a particular charging network quickly and efficiently provides appropriate recharging stops along the route from a first to a second location (e.g., by automatically taking into consideration the charging network that is preferred by the user or otherwise associated with the vehicle when determining the recharging stops to add to the suggested route), which simplifies the interaction between the user and the electronic device and enhances the operability of the electronic device and makes the user-device interface more efficient (e.g., without requiring the user to separately determine whether the suggested recharging stop is within the user's charging network), which additionally reduces power usage and improves battery life of the electronic device by enabling the user to use the electronic device more quickly and efficiency while reducing errors in the usage of the device.

In some embodiments, the first characteristic of the first vehicle includes a first current estimated driving range for the first vehicle, such as in FIG. 6E (e.g., the first characteristic is an estimate of the distance that the first vehicle is able to drive on the current fuel or charge level). In some embodiments, the estimate of the distance that the first vehicle is able to drive depends on the current fuel or electric charge level, the driving efficiency of the vehicle, the recent driving patterns of the first vehicle, and/or the habits of the driver, etc.

In some embodiments, the first suggested route is based on the first current estimated driving range, such as in FIG. 6E (e.g., the first suggested route is selected based on the estimate of the distance that the first vehicle is able to drive on the current fuel or charge level). In some embodiments, the first suggested route includes a suggested stop to refuel or recharge the vehicle (e.g., at a gas station or electric vehicle charging station) if the first current estimated driving range is not enough for the first vehicle to reach the second location from the first location.

In some embodiments, in response to the user input, in accordance with a determination that a third vehicle (e.g., a no vehicle option) is currently selected for which to display directions in the map user interface, the electronic device displays, in the map user interface, a third suggested route from the first location to the second location, that is not based on a current estimated driving range for a vehicle, such as suggested route 620-1 and suggested route 620-2 in FIG. 6B when no vehicle is selected (e.g., no vehicle has been selected for which to provide customized routes).

In some embodiments, the map application includes a list of vehicles that have been registered with the map application from which the user is able to select a car to determine directions from. In some embodiments, the list of vehicles includes an "other vehicle" option (or optionally an option to disable customized routes) that is not associated with a particular, the selection of which causes the device to provide generic routes (e.g., not customized to a particular vehicle, and without regard to the characteristics of a particular vehicle). In some embodiments, if the user selects the "other vehicle" option to disable customized routes that are based on the characteristics of a particular vehicle or if the user otherwise disabled customized routes (e.g., via a setting), then customized estimated driving ranges are not available. Thus, if no particular vehicle is selected or if customized routes are disabled, then current estimated driving range information is unavailable (e.g., because it is not associated with a specific vehicle), and the third suggested route is selected without regard to the driving range of a particular vehicle (e.g., without regard to the current estimated driving range of the first vehicle or the current estimated driving range of the second vehicle). In some embodiments, the third suggested route does not automatically include any refueling or recharging stops. In some embodiments, the third suggested route is the fastest route from the first location to the second location. In some embodiments, the third suggested route is the shortest route from the first location to the second location. In some embodiments, the third suggested route is the same as the first suggested route and/or the second suggested route (e.g., if the first current estimated driving range is more than enough to reach the second location from the first location). In some embodiments, the third suggested route is different than the first suggested route and/or the second suggested route (e.g., if the first current estimated driving range is not enough to reach the second location from the first location). In some embodiments, if current driving range information is not available for the second vehicle (e.g., because the map application is unable to communicate with the external source that is providing the information), then the second suggested route is selected without regard to the driving range for the second vehicle (e.g., similar to the third suggested route described herein for generic vehicles), optionally with an indication that the suggested route is not customized for the second vehicle.

The above-described manner of displaying a route based on the characteristics of a vehicle or a generic route if no vehicle is selected quickly and efficiently provides the option to choose between a customized route or a generic route (e.g., by providing a customized route if car information is available but otherwise providing a general route if car information is not available), which simplifies the interaction between the user and the electronic device and enhances the operability of the electronic device and makes the user-device interface more efficient (e.g., without requiring the user to always select a specific vehicle or requiring the user to add vehicles to the application before requesting directions), which additionally reduces power usage and improves battery life of the electronic device by enabling the user to use the electronic device more quickly and efficiency while reducing errors in the usage of the device.

In some embodiments, displaying the first suggested route from the first location to the second location includes displaying an estimated total travel time for the first suggested route, such as the indication of 59 minutes and 1 hour 4 minutes in FIG. 6E (e.g., the first suggested route is displayed with an indication of an estimated amount of time to travel along the first suggested route to reach the second location from the first location).

In some embodiments, in accordance with a determination that the first suggested route includes a suggested stop for increasing a remaining driving range of the first vehicle, the estimated total travel time includes an estimated time to increase the remaining driving range of the first vehicle at the suggested stop, such as in FIG. 6E (e.g., if the first suggested route includes a suggested stop to refuel or recharge the vehicle, then the displayed estimated amount of time to travel includes an estimated amount of time required to refuel or recharge the vehicle). For example, if the amount of time it takes to recharge the vehicle to a respective suggested amount is estimated to take 15 minutes, then the estimated total travel time includes the 15 minutes of charge time. In some embodiments, if the second suggested route (e.g., for the second vehicle) includes a suggested stop to refuel or recharge the second vehicle, then the estimated total travel time includes the estimated time for refueling or recharging.

The above-described manner of displaying estimated travel time that includes time to refuel and/or recharge provides a more accurate estimate of the amount of time required to reach the destination (e.g., by automatically taking into consideration the amount of time required to refuel or recharge the vehicle at a suggested refueling or recharging stop), which simplifies the interaction between the user and the electronic device and enhances the operability of the electronic device and makes the user-device interface more efficient (e.g., without requiring the user to separately determine how long the refueling or recharging will take and adding that to the estimated duration or estimated time of arrival), which additionally reduces power usage and improves battery life of the electronic device by enabling the user to use the electronic device more quickly and efficiency while reducing errors in the usage of the device.

In some embodiments, the electronic device displays, via the display generation component, one or more representations of one or more segments associated with the first suggested route, such as in FIG. 6F (e.g., while displaying the step-by-step directions of the first suggested route on a user interface (e.g., optionally in response to a user input selecting the first suggested route or a user input requesting display of the step-by-step directions of the first suggested route)), wherein a respective representation of a respective segment includes an indication of an estimated state of the first characteristic of the first vehicle during the respective segment, such as indication 638-1, indication 638-2, and indication 638-3 in FIG. 6F (e.g., some or all of the step-by-step directions of the first suggested route are displayed with an indication of the estimated amount of fuel or charge level of the respective vehicle when the respective vehicles reaches the respective step-by-step direction or while the vehicle is following the respective step-by-step direction).

In some embodiments, the estimated fuel or charge level are displayed for steps that the first vehicle has not already followed (e.g., for future steps). In some embodiments, estimated fuel or charge level are not displayed for steps that the first vehicle has already performed. In some embodiments, the actual fuel or charge level are displayed for steps that the first vehicle has already performed. For example, the "start" step (e.g., first step) and/or the "arrive" step (e.g., final step) include an indication of the estimated charge level for when the vehicle begins traveling along the suggested route and the estimated charge level for when the vehicle arrives at the destination, respectively. In some embodiments, if the first suggested route includes a suggested stop to recharge or refuel the vehicle, then the suggested stop includes an indication of the estimated fuel or charge level for when the vehicle arrives at the suggested stop. In some embodiments, the estimated fuel or charge level can be displayed for other steps. In some embodiments, the estimated fuel or charge level is the estimated fuel or charge level for when the user arrives at the beginning of the step, when the user completes the step, or any time while the first vehicle is following the step (e.g., along the route corresponding to the step). In some embodiments, the estimated charge or fuel level updates while the first vehicle is traveling along the suggested route based on new or updated information for the current charge or fuel levels of the first vehicle.

The above-described manner of displaying estimates of the fuel or charge level at respective steps of the suggested route provides the user with information about the fuel or charge level, which simplifies the interaction between the user and the electronic device and enhances the operability of the electronic device and makes the user-device interface more efficient (e.g., allowing a user to determine, using the provided estimates, whether to select the suggested route, select another route, or modify the suggested route), which additionally reduces power usage and improves battery life of the electronic device by enabling the user to use the electronic device more quickly and efficiency while reducing errors in the usage of the device.

In some embodiments, while the first vehicle is the currently selected vehicle and while displaying the first suggested route from the first location to the second location, the electronic device receives, via the one or more input devices, a user input corresponding to a request to select the second vehicle as the currently selected vehicle, such as in FIG. 6I (e.g., while displaying the suggested route(s) for the first vehicle, receive an input switching to the second vehicle).

In some embodiments, while displaying the first suggested route, other suggested routes are optionally also displayed. In some embodiments, the first suggested route is the recommended route and the other suggested routes are alternative routes and are optionally displayed de-emphasized as compared to the first suggested route (e.g., a dimmer color, a different color, with an indication that it is not the most recommended route, that it is an alternative route, etc.). In some embodiments, the second suggested route (e.g., that would be displayed for the second vehicle were it selected) is one of the other suggested routes that are displayed.

In some embodiments, in response to receiving the user input corresponding to the request to select the second vehicle as the currently selected vehicle, the electronic device displays, in the map user interface, the second suggested route, such as in FIG. 6J (e.g., switching from displaying the first suggested route to displaying the second suggested route).

In some embodiments, the second suggested route is displayed because the second suggested route is the recommended route for the second vehicle based on the characteristic of the second vehicle. In some embodiments, the first suggested route is ceased to be displayed. In some embodiments, the first suggested route remains displayed but is displayed with an indication that it is not the most recommended route (e.g., displayed with a text that indicates that the first suggested route is an alternative route, or displayed with a de-emphasized color as compared to the second suggested route and/or as compared to the color of the first suggested route before receiving the input, etc.). In some embodiments, when the input was received, the second suggested route was displayed concurrently with the first suggested route, but was displayed with an indication that it was not the most recommended route, and in response to the user input, the second suggested route is updated to indicate that the second suggested route is now the most recommended route (e.g., not displayed with a text that indicates that the second suggested route is an alternative route, not displayed with a de-emphasized color, displayed with a text that indicates that it is the fastest route, displayed with an emphasized color, etc.).

The above-described manner of switching from suggesting a first route to suggesting a second route when the user switches from selecting the first vehicle to selecting the second vehicle (e.g., by automatically taking into consideration the characteristics of the second vehicle and switching to suggesting routes based on the characteristics of the second vehicle rather than the routes based on the characteristics of the first vehicle), which simplifies the interaction between the user and the electronic device and enhances the operability of the electronic device and makes the user-device interface more efficient (e.g., without requiring the user to clear the search results and perform the query again in order to view routes that are customized for the second vehicle), which additionally reduces power usage and improves battery life of the electronic device by enabling the user to use the electronic device more quickly and efficiency while reducing errors in the usage of the device.

In some embodiments, while navigating along the first suggested route (e.g., while the device is in a navigation mode associated with the first suggested route in while turn-by-turn navigation instructions are provided to the user), the electronic device determines that the device has arrived at a suggested stop for increasing a remaining driving range of the first vehicle, such as in FIG. 6P (e.g., the device and/or the first vehicle has reached the location of the suggested stop and/or has reached within a threshold distance of the location of the suggested stop (e.g., within 30 feet, 50 feet, 200 feet, 500 feet, 2000 feet, etc.)). In some embodiments, the first vehicle is an electric vehicle and the suggested stop is a charging station for charging the electric vehicle.

In some embodiments, in response to determining that the device has arrived at the suggested stop for increasing the remaining driving range of the first vehicle, in accordance with a determination that an accessory of a first type is required to increase the remaining driving range of the first vehicle, the electronic device displays, via the display generation component, an indication of the accessory of the first type, such as instruction 644 in FIG. 6P (e.g., displaying an indication of the type of adapter required to charge the first vehicle at the charging station associated with the suggested stop).

For example, the charging station at the suggested stop is configured with one or more different outlet or plug types that are compatible with one or more charger plugs. In some embodiments, if an accessory of a second type (e.g., a second type of adapter) is required to use the charging station, then an indication of the accessory of the second type is displayed. In some embodiments, if the first vehicle is equipped with a compatible charger plug, then the first vehicle is able to use the charging station without using an adapter and thus an indication of an adapter is not displayed. In some embodiments, if the first vehicle is not equipped with a compatible charger plug, but an adapter is available to convert the incompatible charger plug to a compatible charger plug, then an indication of the adapter is displayed, thus indicating the adapter required to use the charging station. In some embodiments, the device provides only adapters that the user has previously indicated that the user is in possession of.

The above-described manner of displaying an accessory required to use the charging station quickly and efficiently provides the user with information of how to connect to the charging station (e.g., by automatically taking into consideration the requirements of the charging station, the type of plug installed on the vehicle, and the adapters that are available), which simplifies the interaction between the user and the electronic device and enhances the operability of the electronic device and makes the user-device interface more efficient (e.g., without requiring the user to separately determine whether an adapter is required or whether the user's vehicle is actually able to use the charging station), which additionally reduces power usage and improves battery life of the electronic device by enabling the user to use the electronic device more quickly and efficiency while reducing errors in the usage of the device.

In some embodiments, while navigating along the first suggested route, the electronic device determines that the device has arrived at a suggested stop for increasing a remaining driving range for the first vehicle, such as in FIG. 6P (e.g., the device and/or the first vehicle has reached the location of the suggested stop and/or has reached within a threshold distance of the location of the suggested stop (e.g., within 30 feet, 50 feet, 200 feet, 500 feet, 2000 feet, etc.)).

In some embodiments, in response to determining that the device has arrived at the suggested stop for increasing the effective range of the first vehicle, the electronic device displays, via the display generation component, a first affordance to pause the navigation along the first suggested route, such as button 662 in FIG. 6Q (e.g., displaying a button to pause navigation mode).

In some embodiments, while displaying the first affordance to pause the navigation, the electronic device receives, via the one or more input devices, a user input selecting the first affordance, such as in FIG. 6Q (e.g., a tap input on the button).

In some embodiments, in response to receiving the user input selecting the first affordance, the electronic device displays, via the display generation component, a second affordance to resume navigating along the first suggested route (e.g., displaying a button to resume navigation mode) and an indication of the first characteristic of the first vehicle while it is increasing, such as notification 668 in FIG. 6R or indication 672 in FIG. 6T (e.g., display the current charge level, the current estimated driving range, and/or the amount of time remaining to recharge the first vehicle in order to reach the suggested charge level).

In some embodiments, the button to resume navigation mode replaces the button to pause navigation mode. In some embodiments, the button to pause navigation mode becomes the button to resume navigation mode. In some embodiments, a selectable option is displayed on the map user interface for resuming navigating along the first suggested while not displaying any directions or routes. In some embodiments, the device displays a notification that is selectable to display the maps application and optionally resume navigating along the first suggested route.

In some embodiments, the indication dynamically updates as updated information about the first characteristic is received. In some embodiments, the maps application continuously (e.g., at a predetermined frequency, such as once every 0.25 seconds, 0.5 seconds, 1 second, 3 seconds, 5 seconds, etc.) polls a third party application or source (e.g., as described below with respect to method 900) to receive updated information for the first characteristic.

The above-described manner of monitoring the first characteristic as the first vehicle is refueling or recharging quickly and efficiently provides the user with updates on the status of the refueling or recharging (e.g., by automatically displaying updated fuel and charge information even if the user has paused active navigation), which simplifies the interaction between the user and the electronic device and enhances the operability of the electronic device and makes the user-device interface more efficient (e.g., without requiring the user to navigate to a separate user interface to determine to view the current status of the fuel or charge level), which additionally reduces power usage and improves battery life of the electronic device by enabling the user to use the electronic device more quickly and efficiency while reducing errors in the usage of the device.

In some embodiments, while navigating along the first suggested route, the electronic device determines that a current estimated driving range for the first vehicle is less than a remaining driving distance of the first suggested route from a current location to the second location, such as in FIG. 6V (e.g., while in navigation mode and traveling along the first suggested route, receiving updated information about the first vehicle and determining based on the updated information that the first vehicle will not reach the destination from the first vehicle's current location).

In some embodiments, the received updated information is an updated estimated driving range or an updated current charge or fuel level. For example, if the first vehicle did not charge or refuel to the suggested level at a previous suggested stop, or if the first vehicle took a different route than the suggested route, then the estimated driving range may not be enough for the first vehicle to reach the destination and the device will suggest a stop to refuel or recharge the first vehicle. In some embodiments, the updated information is received from a source external to the map application, such as described below with respect to method 900.

In some embodiments, in response to determining that the current estimated driving range for the first vehicle is less than the remaining driving distance of the first suggested route from the current location to the second location, the electronic device updates the first suggested route to include a suggested stop for increasing a remaining driving range of the first vehicle, such as in FIG. 6V (e.g., if the updated estimated driving range suggests that the first vehicle does not have enough fuel or electric charge to reach the destination (or will reach the destination with less than a threshold amount of fuel or charge, such as less than 5%, 10%, 15%, 20%, etc. of fuel or charge remaining, or with less than 2 miles, 5 miles, 10 miles, 20 miles, 50 miles, etc. of driving range remaining), then add a suggested stop to the route to refuel or recharge the first vehicle).

Thus, in some embodiments, the device is able to dynamically add suggested stops to refuel or recharge while in navigation mode or while the vehicle is traveling towards the destination, without requiring the user to perform another query to route from the vehicle's current position to the destination to determine where to refuel or recharge the vehicle.

The above-described manner of suggesting a stop to refuel or recharge the vehicle while navigating along a route quickly and efficiently provides the user with a suggested stop if a stop is now required to reach the destination (e.g., by automatically determining that the estimated driving range is such that the first vehicle will not be able to reach the destination and suggesting a stop to refuel or recharge), which simplifies the interaction between the user and the electronic device and enhances the operability of the electronic device and makes the user-device interface more efficient (e.g., without requiring the user to separately monitor the fuel or charge level and separately determine whether the vehicle will reach the destination and then manually add a refueling or recharging stop to the route), which additionally reduces power usage and improves battery life of the electronic device by enabling the user to use the electronic device more quickly and efficiency while reducing errors in the usage of the device.

In some embodiments, the first characteristic of the first vehicle is associated with a first driving restriction for the first vehicle, such as in FIG. 6CC (e.g., a geographic region (e.g., city, county, area, etc.) has implemented driving restrictions that apply certain sets of vehicles based on the characteristics of the respective vehicle). In some embodiments, driving restrictions may be implemented based on the license plate of the vehicles. For example, during certain periods of time, odd numbered vehicles (e.g., vehicles with license plates ending in an odd number) are not permitted to drive in the restricted region, but even numbered vehicles (e.g., vehicles with license plates ending in an even number) are permitted to drive in the restricted region. In some embodiments, restrictions based on other characters are possible, such as the type of vehicle (e.g., whether the vehicle is a passenger vehicle, commercial vehicle, truck, SUV, semi-tractor trailer truck, whether the vehicle is taller than a certain height, whether the vehicle is above a certain gross weight, etc.).

In some embodiments, the first suggested route is based on the first driving restriction, such as in FIG. 6CC (e.g., the route suggested is based on whether the first vehicle is subject to the driving restriction). For example, if the driving restriction is that even numbered cars are not permitted to drive in a restricted region and the normally suggested route (e.g., the fastest route) would route the vehicle through the restricted region, then instead of suggesting the normally suggested route, a route that avoids the restriction (e.g., routes around the restricted region) is suggested to the user. In some embodiments, the normally suggested route is also concurrently displayed to the user, but displayed with an indication that it is affected by the restriction. In some embodiments, if the restriction only applies during a particular time window, the suggested route is only affected during those time windows (e.g., if the current time is outside the time window in which the restriction applies, then the suggested route is selected without regard to the restriction.

In some embodiments, the second characteristic of the second vehicle is associated with a second driving restriction for the second vehicle, different from the first driving restriction, such as in FIG. 6FF (e.g., the second vehicle has a different characteristic from the first vehicle and thus is either also restricted from driving in the restricted region or is not restricted from driving in the restricted region).

In some embodiments, the second suggested route is based on the second driving restriction, such as in FIG. 6FF (the suggested route for the second vehicle is based on whether the second vehicle is affected by the driving restriction).

In some embodiments, the driving restriction that applies to the second vehicle is the same driving restriction than the one that applies to the first vehicle and the device is able to determine whether the first vehicle or the second vehicle is prohibited from traveling a particular route due to that driving restriction. In some embodiments, the driving restrictions that applies to the second vehicle is a different driving restriction than the one that applies to the first vehicle and the device is able to determine whether the second vehicle is able to travel a particular route based on the driving restriction that affects the second vehicle. In some embodiments, the suggested route for the second vehicle is the same as the suggested route for the first vehicle because the second vehicle and the first vehicle are similarly affected by the driving restriction (e.g., are both even numbered cars). In some embodiments, the suggested route for the second vehicle is different from the suggested route for the first vehicle because the vehicles are affected differently by the restriction. In some embodiments, if the second vehicle is not affected by the restriction (e.g., is permitted to travel in the restricted zone), then the suggested route is selected without regard to the restriction (e.g., is the fastest route, and/or shortest route, etc.). In some embodiments, the second vehicle is affected by the same restriction as the restriction that affects the first vehicle and also an additional restriction, different from the restriction that affects the first vehicle, and the suggested route is selected to avoid both restrictions. In some embodiments, whether a car is affected by a restriction is based on the characteristics of the vehicle, such as the license plate pattern or the vehicle type. In some embodiments, a different set of restrictions apply to different types of vehicles (e.g., a first set of restrictions apply to passenger vehicles and a second set of restrictions apply to commercial vehicles, etc.). In some embodiments, the maps application receives information about the characteristics of the vehicle from a source external to the map application, as described below with respect to method 900. In some embodiments, a user provides the map application with license plate information, similarly to the process to add a vehicle to the maps app as described below with respect to method 900.

The above-described manner of displaying different routes based on whether a respective vehicle is affected by a driving restriction quickly and efficiently provides appropriate routes to travel from a first to a second location (e.g., by automatically taking into consideration the restrictions that apply to the respective vehicle), which simplifies the interaction between the user and the electronic device and enhances the operability of the electronic device and makes the user-device interface more efficient (e.g., without requiring the user to separately determine whether the user's vehicle is prohibited to drive in a restricted region), which additionally reduces power usage and improves battery life of the electronic device by enabling the user to use the electronic device more quickly and efficiency while reducing errors in the usage of the device.

In some embodiments, the first driving restriction is determined using an anonymized characteristic corresponding to the first characteristic of the first vehicle (e.g., anonymize the characteristic of the vehicle when determining the suggested route for the vehicle).

In some embodiments, a third party server or third party service is used to gather travel information or road conditions. For example, a server hosted by a government agency provides current traffic information, current outages, viable routes, and/or restriction information. In some embodiments, a server maintains driving restriction information and is able to be queried to determine whether a particular vehicle is prohibited from driving in a restricted zone. In some embodiments, the server is queried by providing the vehicle's license plate information and the intended route and the server provides a determination on whether the vehicle is prohibited from driving along a part of or all of the intended route. In some embodiments, because the driving restriction is based on a pattern of the license plate (e.g., whether it ends in an even or odd number) rather than the full license plate number, the device is able to anonymize the license plate to preserve the privacy of the user and thus prevent information about the user's travel habits or history from being sent away from the device and/or to another entity. For example, the device provides, to the server, a randomly generated license plate number (that optionally follows the license plate pattern of the region), that ends with a randomly generated even or odd number (whichever is the case based on whether the first vehicle is an even or odd number) to simulate the license plate pattern of the first vehicle while not providing the actual license plate information of the first vehicle. Thus, in some embodiments, the device uses an anonymized characteristic that is the same type of characteristic as the first characteristic (e.g., optionally the characteristic that is relevant to the respective driving restriction.

The above-described manner of determining suggested routes using an anonymized characteristic of the vehicle quickly and efficiently determines the appropriate routes for the respective vehicle while maintaining the privacy of the user (e.g., by automatically removing identifying information when determining the routes to suggest), which simplifies the interaction between the user and the electronic device and enhances the operability of the electronic device and makes the user-device interface more efficient (e.g., by allowing the user to enter the vehicle's true details and without requiring the user to provide incorrect identifying information, which may result in incorrect determination of whether the user's vehicle is restricted, for example, if the restriction is changed), which additionally reduces power usage and improves battery life of the electronic device by enabling the user to use the electronic device more quickly and efficiency while reducing errors in the usage of the device.

In some embodiments, the first characteristic of the first vehicle is associated with a first driving restriction for the first vehicle, such as in FIG. 6CC (e.g., the first characteristic of the first vehicle is relevant to a driving restriction for a restricted region and the first vehicle is either prohibited or not prohibited from traveling in the restricted region). In some embodiments, the license plate pattern of the first vehicle matches the restriction pattern such that the first vehicle is restricted or not restricted.

In some embodiments, the first suggested route is based on the first driving restriction, such as in FIG. 6CC (e.g., the first suggested route provided to the user is selected for the first vehicle based on whether the first vehicle is prohibited or not prohibited from driving in the restricted region). In some embodiments, if the first vehicle is prohibited, the first suggested route is a route that avoids the restriction (e.g., goes around the restricted region). In some embodiments, if the first vehicle is not prohibited, the first suggested route is selected without regard to the restriction (e.g., is the fastest route or shortest route, etc.).

In some embodiments, in response to the user input, in accordance with a determination that no vehicle is currently selected for which to display directions in the map user interface, the electronic device displays, in the map user interface, a third suggested route from the first location to the second location, that is not based on a driving restriction, such as in FIG. 6X (e.g., no vehicle has been selected for which to provide customized routes).

In some embodiments, the map application includes a list of vehicles that have been registered with the map application from which the user is able to select a car to determine directions from. In some embodiments, the list of vehicles includes an "other vehicle" option (or optionally an option to disable customized routes) that is not associated with a particular, the selection of which causes the device to provide generic routes (e.g., not customized to a particular vehicle, and without regard to the characteristics of a particular vehicle). In some embodiments, if the user selects the "other vehicle" option to disable customized routes that are based on the characteristics of a particular vehicle or if the user otherwise disabled customized routes (e.g., via a setting), then customized estimated driving ranges are not available. Thus, if no particular vehicle is selected or if customized routes are disabled, then license plate information is unavailable (e.g., because it is not associated with a specific vehicle), and the third suggested route is selected without regard to the driving restrictions of a particular vehicle (e.g., without regard to the driving restrictions of the first vehicle or the driving restrictions of the second vehicle). In some embodiments, the third suggested route travels through the restricted region. In some embodiments, the third suggested route is the fastest route from the first location to the second location. In some embodiments, the third suggested route is the shortest route from the first location to the second location. In some embodiments, the third suggested route is the same as the first suggested route and/or the second suggested route (e.g., if the first vehicle is not prohibited from traveling in the restricted region). In some embodiments, the third suggested route is different than the first suggested route and/or the second suggested route (e.g., if the first vehicle and/or the second vehicle are prohibited from traveling in the restricted region). In some embodiments, if driving restriction information is not available for the second vehicle (e.g., because the map application is unable to communicate with the external source that is providing the information), then the second suggested route is selected without regard to the driving restrictions that may apply to the second vehicle (e.g., similar to the third suggested route described herein for generic vehicles, optionally with an indication that the suggested route is not customized for the second vehicle).

The above-described manner of displaying a route based on whether a particular vehicle is restricted or a generic route that is not based on whether a particular vehicle is restricted quickly and efficiently provides the option to choose between a customized route or a generic route (e.g., by providing a customized route if car information is available but otherwise providing a general route if car information is not available), which simplifies the interaction between the user and the electronic device and enhances the operability of the electronic device and makes the user-device interface more efficient (e.g., without requiring the user to always select a specific vehicle or requiring the user to add vehicles to the application before requesting directions), which additionally reduces power usage and improves battery life of the electronic device by enabling the user to use the electronic device more quickly and efficiency while reducing errors in the usage of the device.

In some embodiments, in accordance with a determination that the third suggested route passes through an area restricted by a respective driving restriction, the electronic device displays, via the display generation component, an indication that the third suggested route passes through the area restricted by a driving restriction, such as in FIG. 6X (e.g., if no vehicle is selected, then the suggested route that is displayed without regard to whether a specific vehicle is affected by a restricted region).

In some embodiments, if the third suggested route passes through a restricted region or would otherwise be affected by the restricted region, then display an indication that the suggested route is affected by the restricted region to notify the user that a restriction may apply to the user's vehicle. In some embodiments, the indication is a text indicator that a restriction applies. In some embodiments, the indication is an icon indicating that a restriction applies. In some embodiments, the icon is displayed at or near the position of the portion of the suggested route that enters into the restriction region. In some embodiments, the icon is displayed on a respective listing of a suggested route in the list of suggested routes (which are optionally displayed in response to a request for directions) to indicate that the suggested route is affected by a driving restriction. In some embodiments, the indication identifies the type of restriction and/or indicates how or why the indication applies to certain vehicles (e.g., the indication includes a textual description of the restriction and/or the icon represents the type of restriction).).

The above-described manner of displaying an indication if a route is affected by a driving restriction (e.g., when the route is a generic route that is not customized for a particular vehicle) quickly and efficiently provides the user with an indication that the user's vehicle may be subject to the driving restriction (e.g., by displaying the indication that a driving restriction applies when the user has not selected a specific vehicle to search routes for), which simplifies the interaction between the user and the electronic device and enhances the operability of the electronic device and makes the user-device interface more efficient (e.g., without requiring the user to always select a specific vehicle or requiring the user to add vehicles to the application before requesting directions to receive information about driving restrictions), which additionally reduces power usage and improves battery life of the electronic device by enabling the user to use the electronic device more quickly and efficiency while reducing errors in the usage of the device.

In some embodiments, in accordance with a determination that a given route from the first location to the second location is associated with a driving restriction (e.g., if a suggested route travels through a restricted region and is thus affected by a driving restriction), in accordance with a determination that one or more criteria are satisfied (e.g., no cars have yet been added to the map application), the electronic device displays, via the display generation component, an affordance for adding information about a respective vehicle to the map user interface, such as button 688 in FIG. 6W (e.g., display a notification, an element on the user interface, and/or a link or button that is selectable to initiate a process to add vehicle information to the map application).

In some embodiments, a notification is displayed on a lock screen, a wake screen, or on the notification user interface indicating that license plate information can be added to the map application. In some embodiments, a banner or other user interface element is displayed in the map application indicating that license plate information can be added to the map application. In some embodiments, if the one or more criteria are not satisfied, the affordance for adding information about the respective vehicle is not displayed.

In some embodiments, the electronic device receives, via the one or more input devices, a user input selecting the affordance (e.g., a tap input or any other selection input on the affordance). In some embodiments, in response to receiving the user input, the electronic device initiates a process to add the information about the respective vehicle to the map user interface (e.g., initiate a process for the user to add license plate information to the maps application (e.g., information associated with the driving restriction)).

In some embodiments, the process includes displaying a wizard or step-by-step instructions to guide the user through adding license plate information. In some embodiments, the maps application maintains a list of vehicles associated with the user, which optionally includes license plate information and/or other characteristics for the respective vehicles. In some embodiments, the characteristics of the vehicles are automatically populated with information received from an external source, as discussed below with respect to method 900.

The above-described manner of adding vehicle information (e.g., providing an affordance that is selectable to initiate a process to add vehicle information to the map application) quickly and efficiently provides the user with the ability to provide the map application with vehicle information that is relevant to a driving restriction, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency while reducing errors in the usage of the device.

In some embodiments, while navigating along the first suggested route, the electronic device determines that a current location of the device satisfies one or more criteria associated with a driving restriction of the first suggested route, such as in FIG. 6DD (e.g., while in navigation mode and traveling along the suggested route, determining that the user is about to enter into a restricted region (optionally only if the currently selected vehicle is prohibited from traveling in the restricted region or if no vehicle is currently selected)).

In some embodiments, the suggested route includes directions that guides the user into a restricted region. In some embodiments, the suggested route that the user is traveling along is provided because the user has not selected a particular car to provide routes for or because the user chose to navigate using a route that travels into the restricted region.

In some embodiments, in response to determining that the current direction satisfies the one or more criteria associated with the driving restriction, the electronic device displays, via the display generation component, an indication of the driving restriction, such as in FIG. 6DD (e.g., within a threshold distance of entering into the restricted region (e.g., 10 feet, 50 feet, 100 feet, 300 feet, 500 feet, 1000 feet, etc.), displaying an indication that the user is about to enter the restricted region).

In some embodiments, the indication is a textual indication that a restricted region is upcoming. In some embodiments, the indication is an icon in the user interface at or near the location corresponding to the restricted region. In some embodiments, the indication identifies the type of restriction and/or indicates how or why the indication applies to certain vehicles (e.g., the indication includes a textual description of the restriction and/or the icon represents the type of restriction).

The above-described manner of displaying an indication that a user is about to enter a restricted region quickly and efficiently provides the user with a visual indication that the user may be prohibited from traveling in the restricted region, which simplifies the interaction between the user and the electronic device and enhances the operability of the electronic device and makes the user-device interface more efficient (e.g., without requiring the user to separately determine where the boundaries of the restricted region are and whether a restriction applies to the user's current selected vehicle), which additionally reduces power usage and improves battery life of the electronic device by enabling the user to use the electronic device more quickly and efficiency while reducing errors in the usage of the device.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900 and 1100) are also applicable in an analogous manner to method 700 described above with respect to FIG. 7. For example, the operation of the electronic device of displaying customized navigation routes described above with reference to method 700 optionally has one or more of the characteristics of receiving information about characteristics of respective vehicles, anonymizing a vehicle identifier, etc., described herein with reference to other methods described herein (e.g., methods 900 and 1100). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIG. 7 are, optionally, implemented by components depicted in FIGS. 1A-1B. For example, displaying operations 702, 708, and 710 and receiving operation 704 are, optionally, implemented by event sorter 170, event recognizer 180, and event handler 190. Event monitor 171 in event sorter 170 detects a contact on touch-sensitive surface 504, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Receiving Information about Characteristics of Respective Vehicles

Users interact with electronic devices in many different manners, including using electronic devices to view and find geographic locations on a map. In some embodiments, a user can request directions from one geographic location to another geographic location. In some embodiments, suggested directions between locations provided to the user in response to the user's request can be customized based on the characteristics of a user's vehicle. The embodiments described below provide ways for receiving information about the characteristics of the user's vehicle and using the received information to provide customized routes. Receiving this information and customizing routes enhances the user's interactions with the electronic device and reduces the amount of time needed by a user to perform operations. Reducing operational time decreases the power usage of the device and increases battery life for battery-powered devices.

Figure 8H:
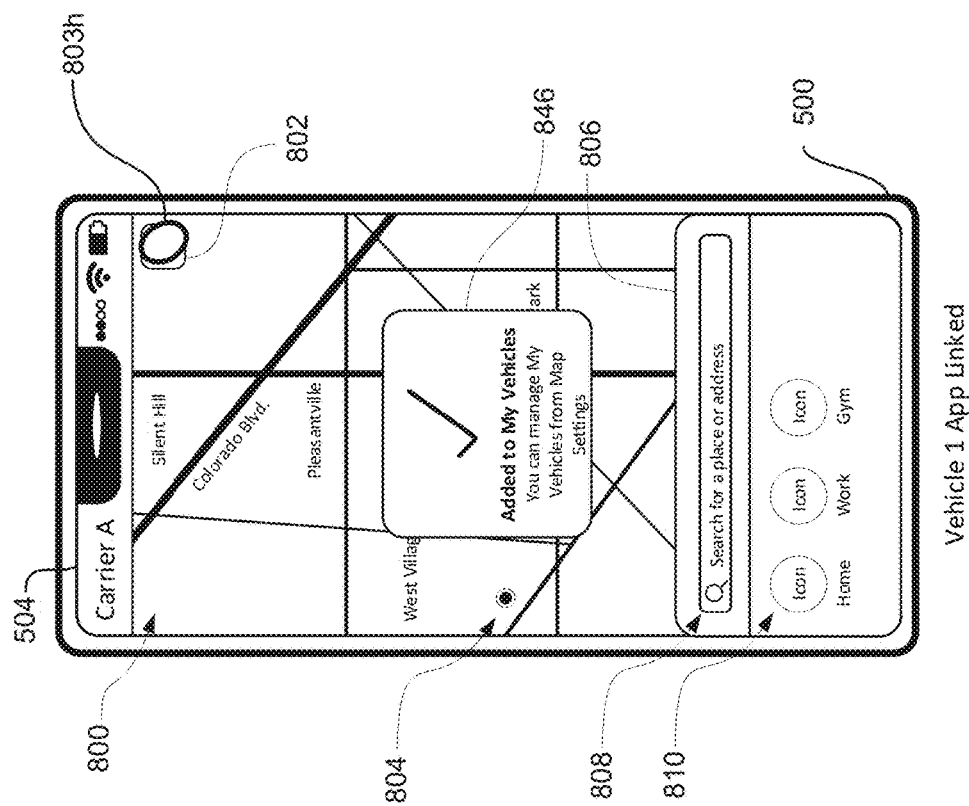
FIGS. 8A-8CC illustrate exemplary ways in which an electronic device receives information about characteristics of respective vehicles in accordance with some embodiments of the disclosure.
Figure 8G:
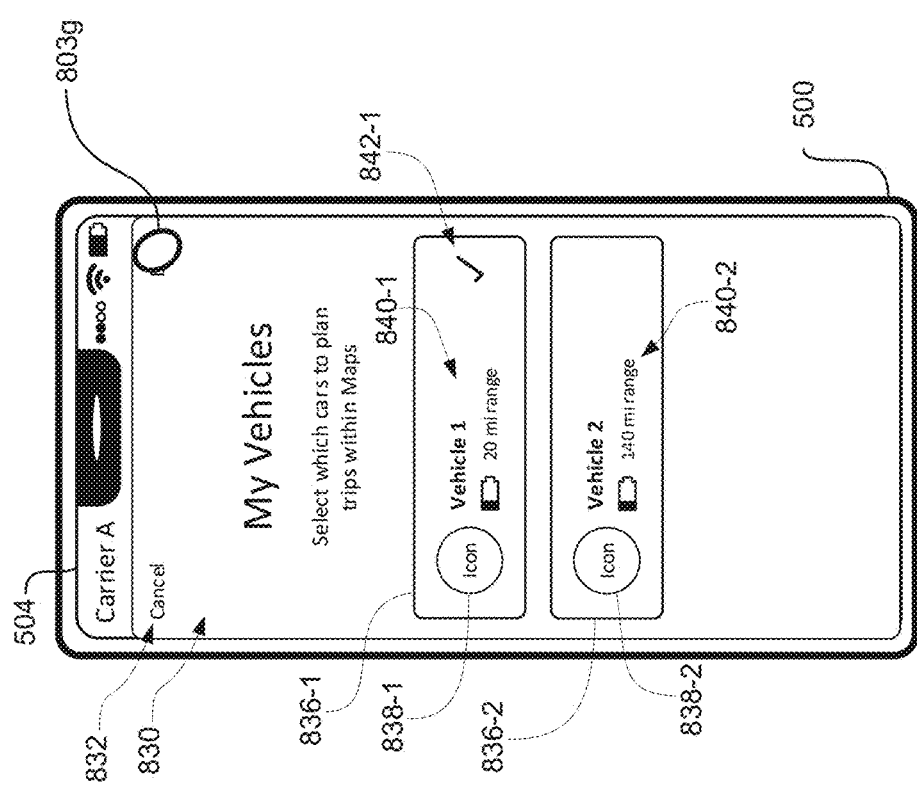
Figure 8J:
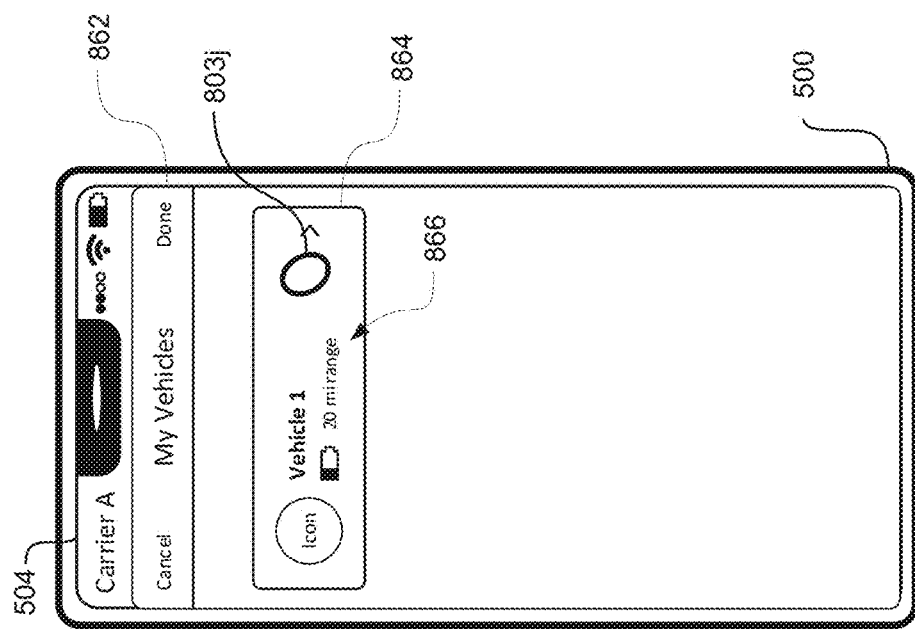
Figure 8I:
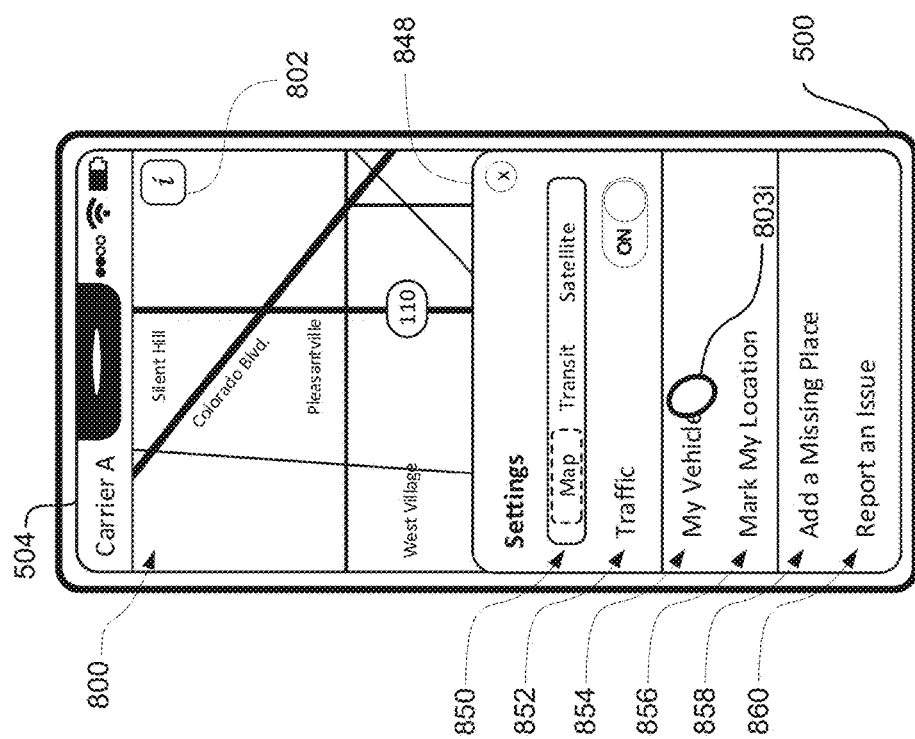
Figure 8L:
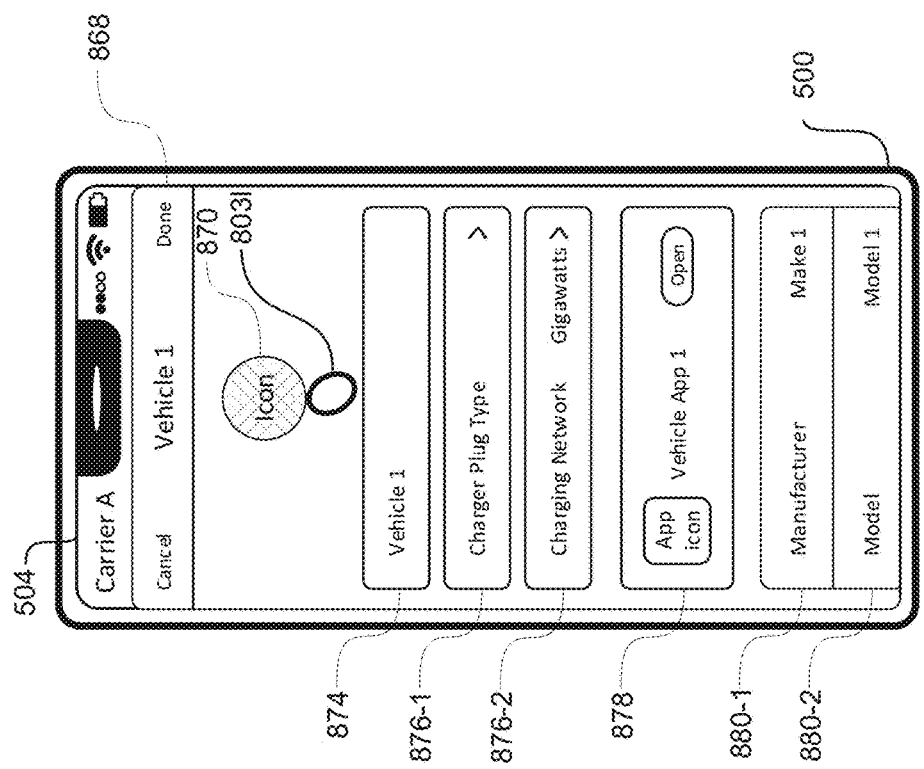
Figure 8K:
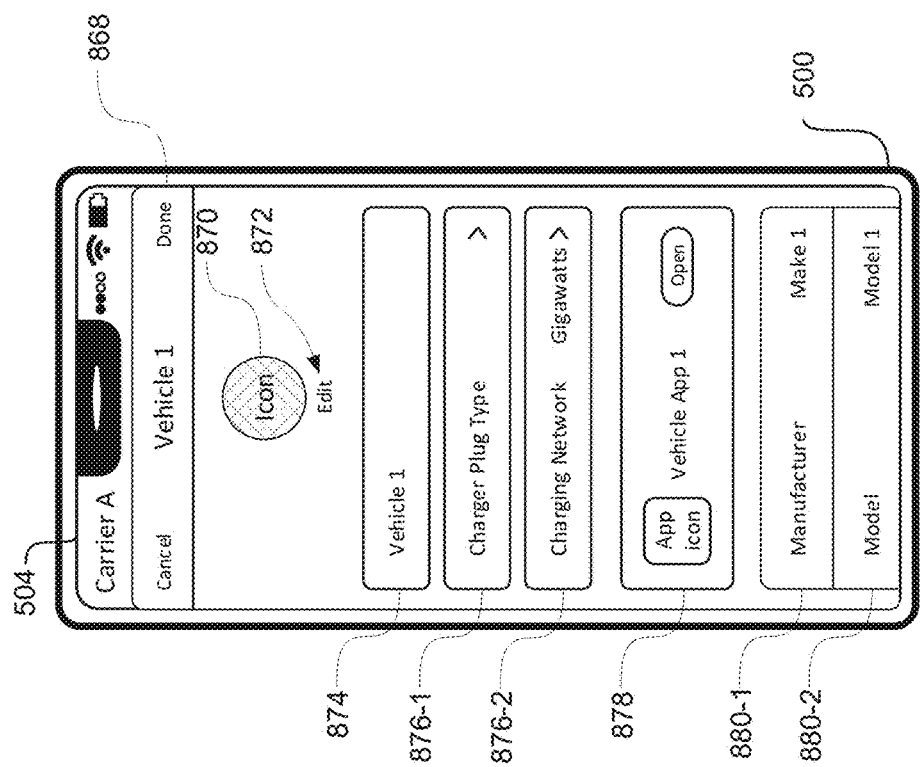
Figure 8N:
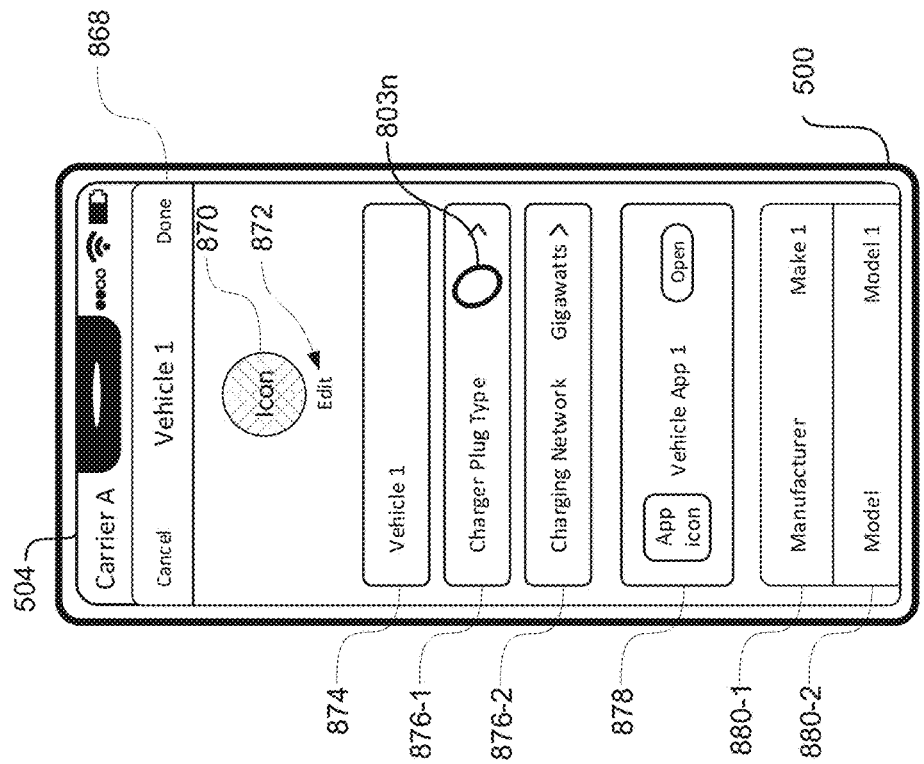
Figure 8M:
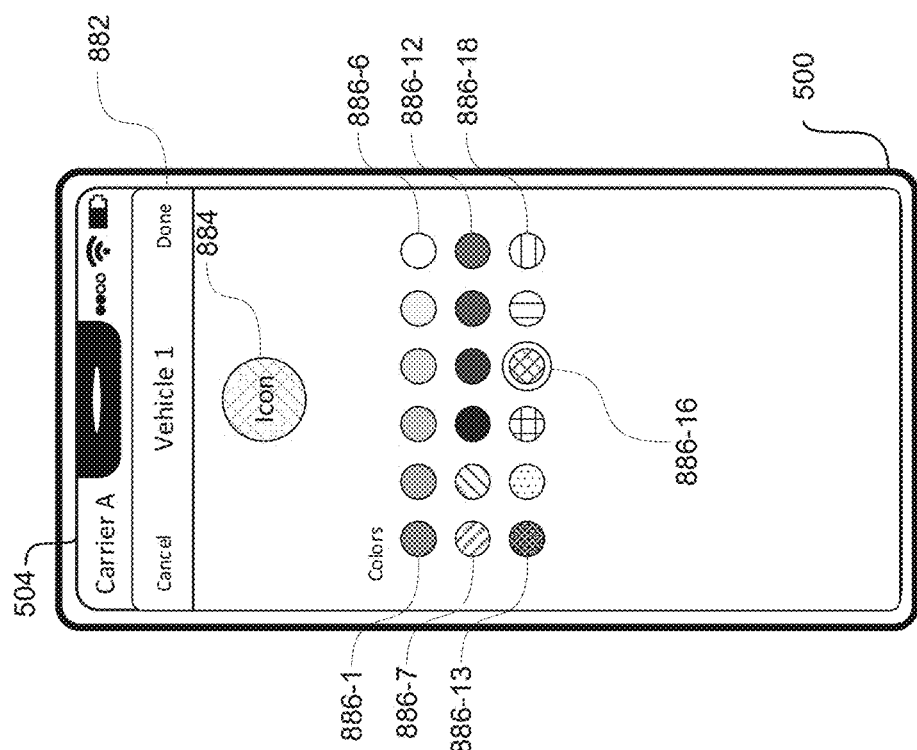
Figure 8R:
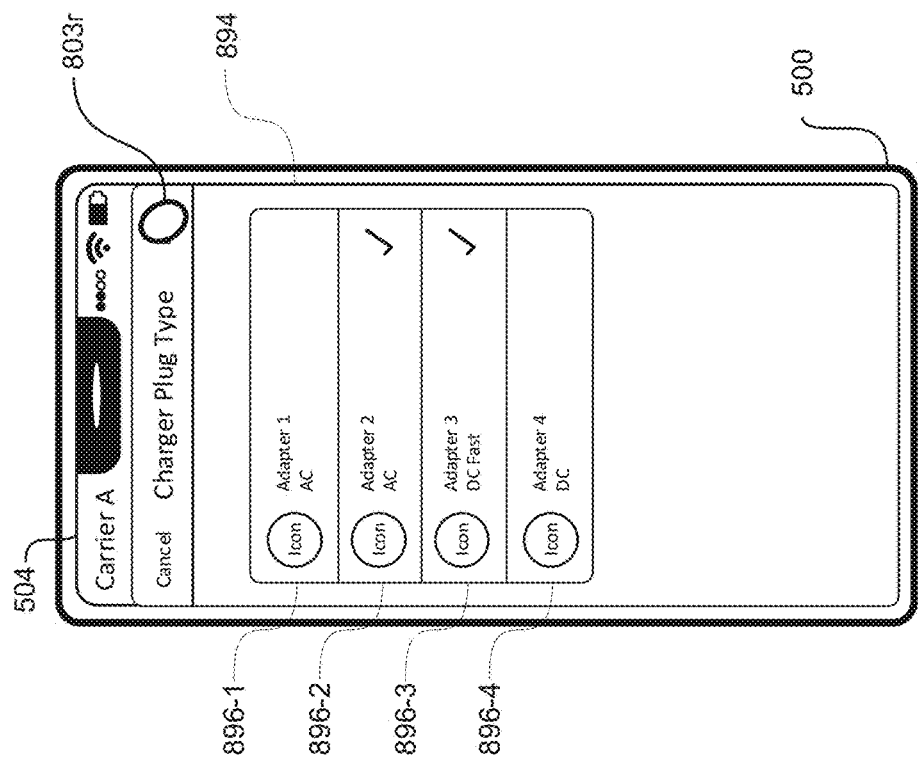
Figure 8Q:
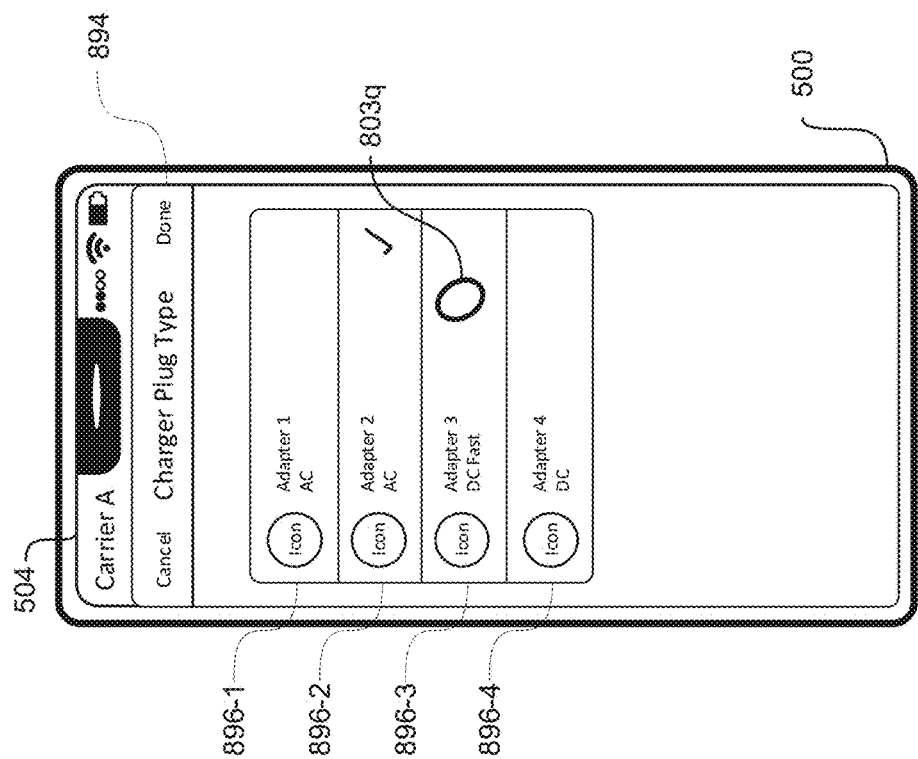
Figure 8T:
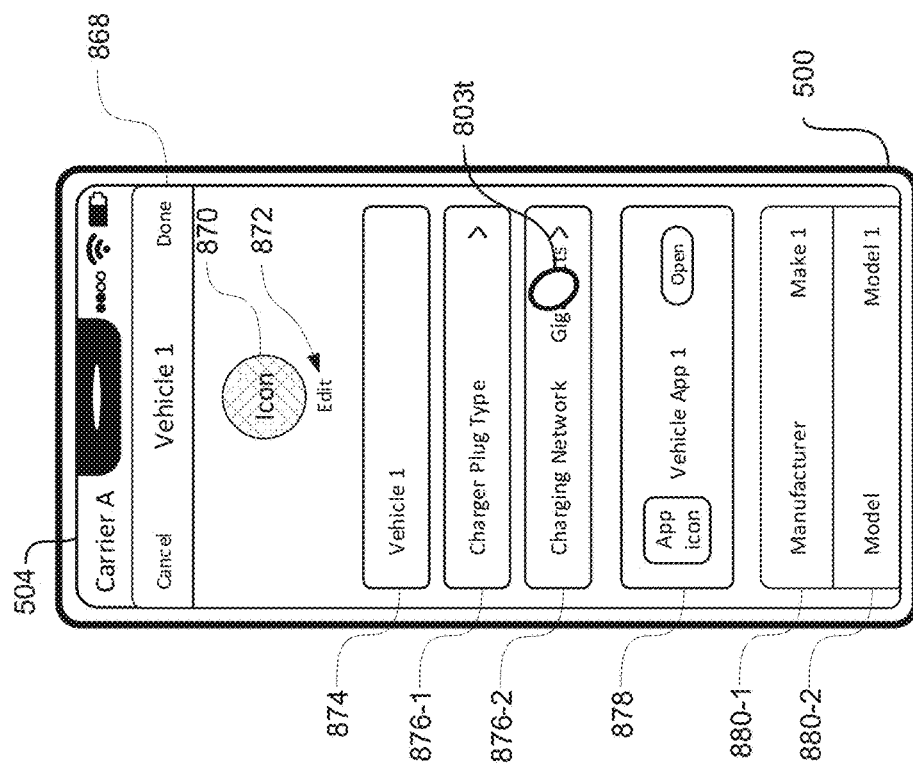
Figure 8S:
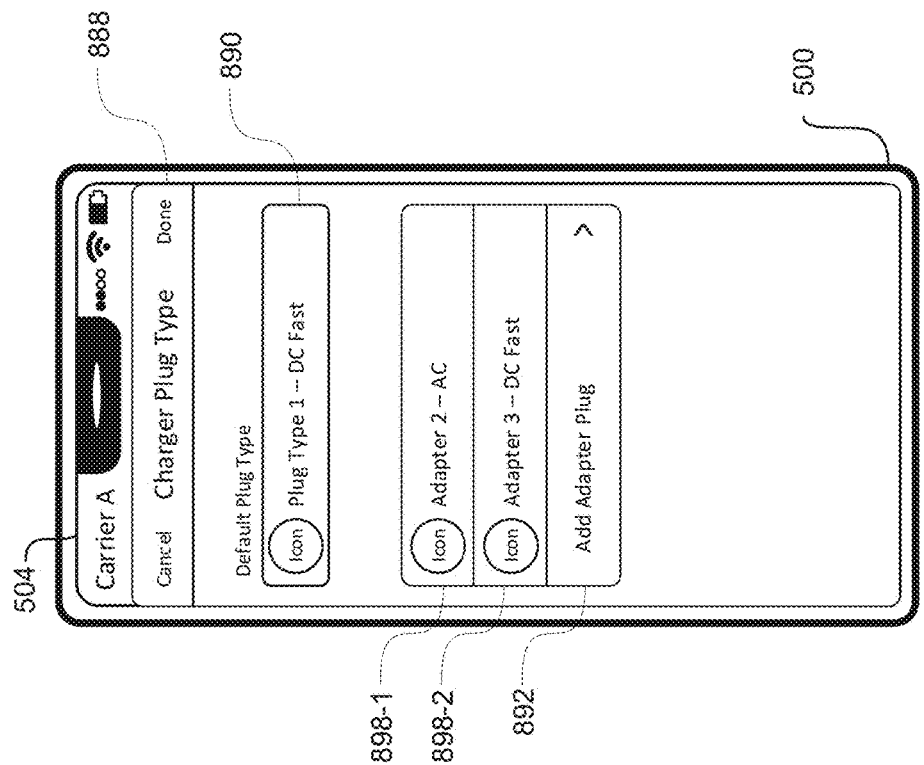
Figure 8V:
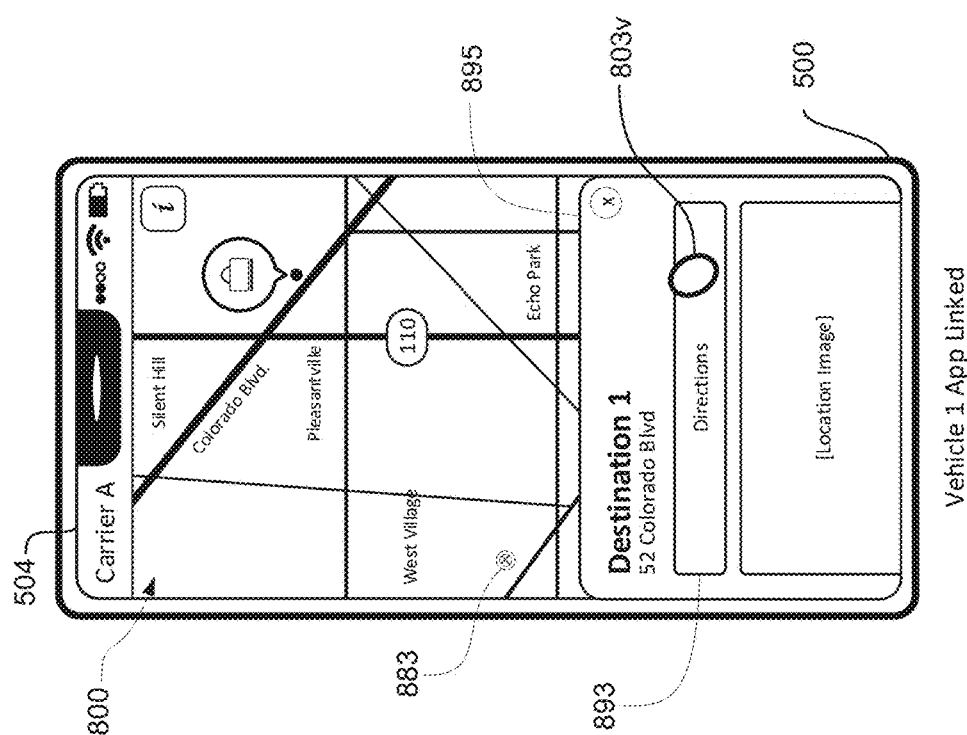
Figure 8U:
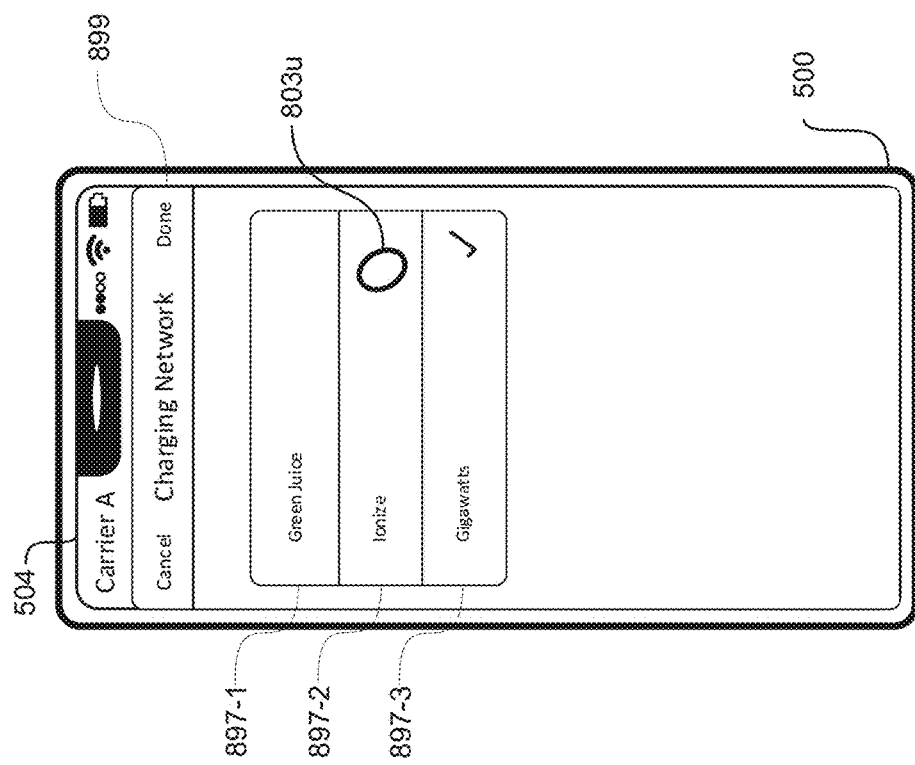
Figure 8X:
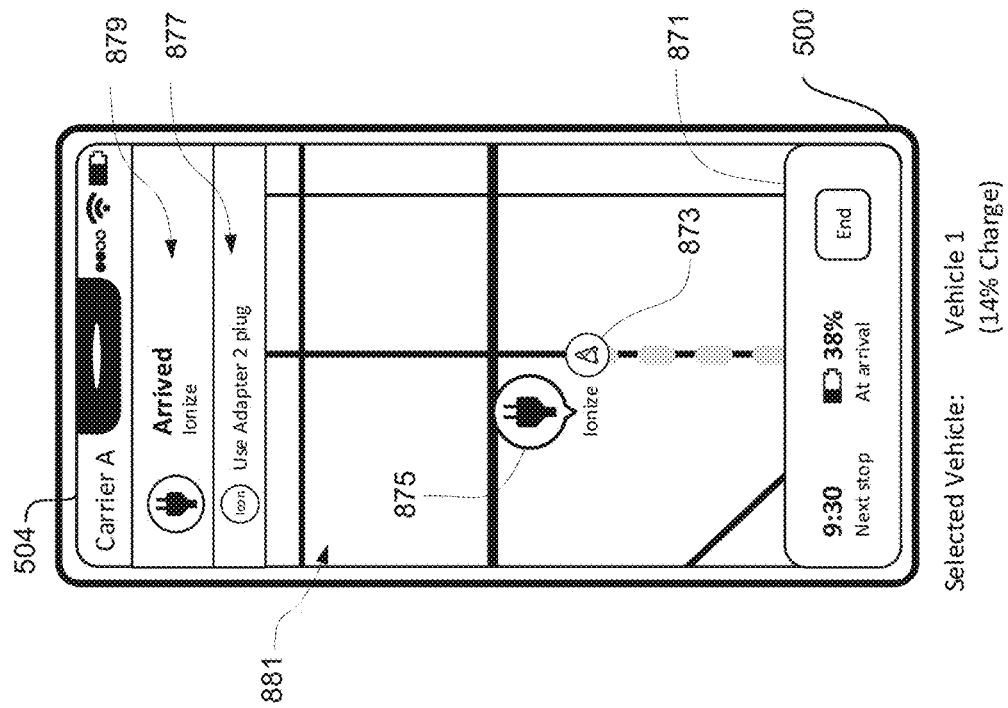
Figure 8W:
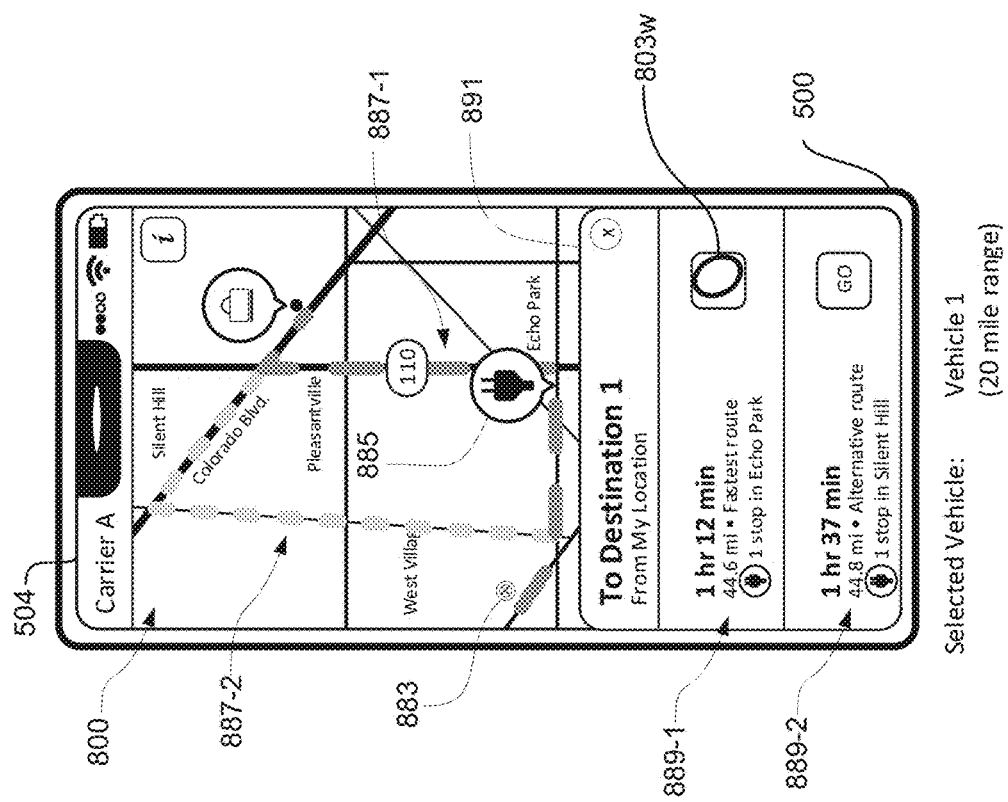
Figure 8C:
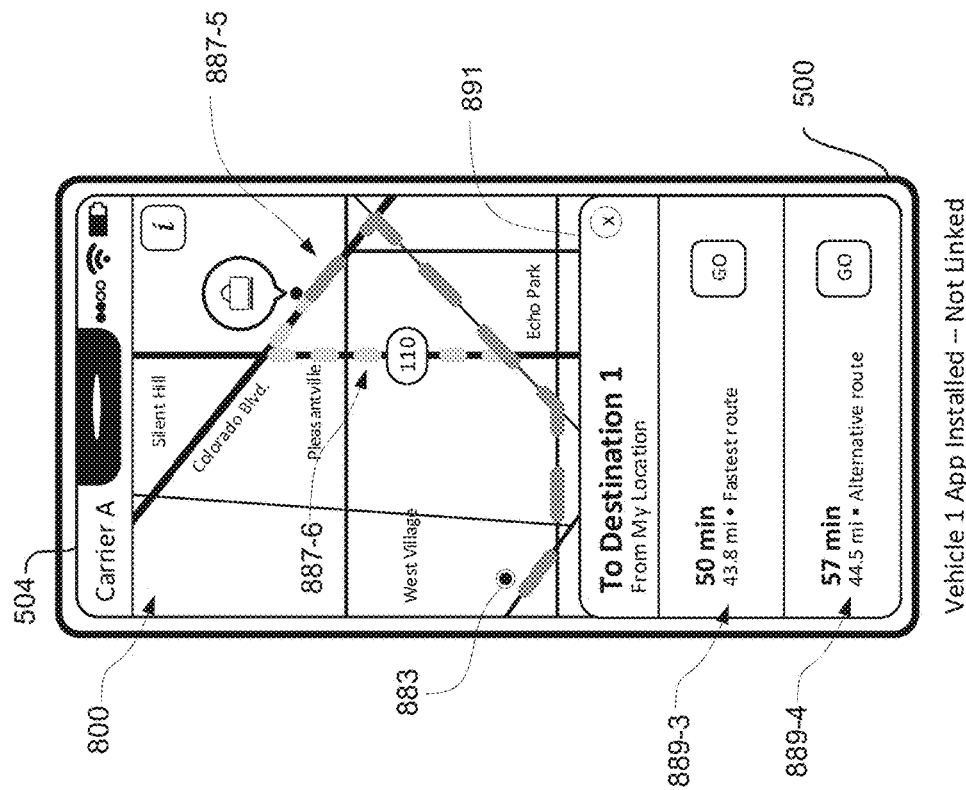

FIGS. 8A-8CC illustrate exemplary ways in which an electronic device receives information about characteristics of respective vehicles in accordance with some embodiments of the disclosure. The embodiments in these figures are used to illustrate the processes described below, including the processes described with reference to FIG. 9. Although FIGS. 8A-8CC illustrate various examples of ways an electronic device is able to perform the processes described below with respect to FIG. 9, it should be understood that these examples are not meant to be limiting, and the electronic device is able to perform one or more processes described below with reference to FIG. 9 in ways not expressly described with reference to FIGS. 8A-8CC.

FIG. 8A illustrates electronic device 500 displaying user interface 800 (e.g., via a display device, via a display generation component, etc.). In some embodiments, user interface 800 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 800 is a user interface of a map application (e.g., an application in which a user is able to view geographic locations, search for locations, and/or request directions from one location to another, similar to the map application described above with respect to FIG. 6A). In some embodiments, the map application is an application installed on device 500.

In some embodiments, user interface 800 includes a representation of a map including the current location of the electronic device. In FIG. 8A, user interface 800 does not include any suggested routes or driving directions and is optionally a default user interface of the map application (e.g., in a browsing state) that includes location indicator 804. In FIG. 8A, user interface 800 includes settings option 802 that is selectable to display a settings user interface. In some embodiments, user interface 800 includes location indicator 804 that represents the current location of device 500 on the representation on the map. In some embodiments, device 500 displays user interface 806. In some embodiments, user interface 806 includes search field 808 for performing a search for a location or business. In some embodiments, user interface 806 includes one or more shortcuts 810 that are selectable to search for and display the respective location associated with the respective shortcut. For example, the "Home" shortcut is selectable to display the location associated with "Home", the "Work" shortcut is selectable to display the location associated with "Work", and the "Gym" shortcut is selectable to display the location associated with "Gym".

In FIG. 8A, device 500 determines that an application associated with vehicle 1 (e.g., Vehicle 1 app) is not currently installed on the device. In some embodiments, an application associated with Vehicle 1 is an application external to the map application (e.g., a third-party application, an application provided by a manufacturer of Vehicle 1, etc.). In some embodiments, an application associated with Vehicle 1 is configured to receive and/or display information associated with Vehicle 1. For example, the application is able to receive information from a computer on Vehicle 1 or from a server (which in turns receive information from a computer on Vehicle 1) about one or more characteristics of Vehicle 1. For example, the application is able to receive the current fuel and/or charge level of the vehicle and/or is able to receive estimated driving range information (or determine the estimated driving range based on the current fuel and/or charge level) of the vehicle. In some embodiments, the application is able to receive and/or maintain information about other characteristics of the vehicle, such as the make a model, the color, the vehicle dimensions, the climate control status, the open or closed status of the doors, the current tire pressure, the airbag status, the emissions system status, etc. In some embodiments, the map application is able to receive information from the application associated with Vehicle 1. In some embodiments, the map application receives information about Vehicle 1 for use in providing customized routes when traveling using Vehicle 1, similar to described above with respect to method 700. In some implementations, the map application may receive information about Vehicle 1 from other sources. For example, a user can manually provide information to the map application (e.g., manual entry from a user), the information can be embedded in a QR code (e.g., information about the vehicle itself, or information for how to communicate with a server or system to receive information about the vehicle), an API call from the map application (e.g., by the map application, by device 500, etc.) to a computer system (e.g., a computer system associated with Vehicle 1), or other ways in which a user positively opts into sharing his or her vehicle information with the map application.

In FIG. 8A, because device 500 determines that no application associated with a particular vehicle is installed on the device, then user interface 800 does not include an indication and/or button to link an application associated with a vehicle with the map application. In some implementations, device 500 provides a way for the user to manually enter information to associate a vehicle with the map application. In some implementations, device 500 provides a way for the user to specify information about a vehicle, e.g., the vehicle manufacture, the vehicle VIN, or other identifying information, in order for the map application to communicate with a computer system (e.g., associated with the vehicle) in order to obtain vehicle data.

In FIG. 8B, the map application and/or device 500 has determined that Vehicle 1 App (e.g., an application associated with Vehicle 1) is installed on device 500. In some embodiments, in accordance with a determination that the Vehicle 1 app is installed on device 500, user interface 806 includes indication 812. In some embodiments, indication 812 includes a description to connect the Vehicle 1 app with the map application to get customized routes and/or charging suggestions. Additionally, or alternatively, user interface 806 includes an indication that a user can enter information about their specific vehicle in order to manually link the map application to the vehicle or to access a specific vehicle's computer system (e.g., through an API) to complete the linking process. In some embodiments, indication 812 includes button 814 that is selectable to initiate the process to link the map application with the Vehicle 1 app. In the embodiment illustrated in FIG. 8B, Vehicle 1 is an electric vehicle. In some embodiments, indication 812 is displayed only if the map application is not already linked with the Vehicle 1 app. In some embodiments, indication 812 is displayed only if the Vehicle 1 application is itself configured to provide information about Vehicle 1 (e.g., the Vehicle 1 app has been linked with Vehicle 1 and is able to receive and provide information about Vehicle 1). For example, if the Vehicle 1 app has been installed on device 500 but has not been initiated or otherwise linked to Vehicle 1 such that the Vehicle 1 app receives data about Vehicle 1, then indication 812 is optionally not displayed until such time that the Vehicle 1 app is initiated and/or linked to Vehicle 1. In some embodiments, indication 812 is displayed even if the user has manually added Vehicle 1 to the map application (optionally initiating a process to link the Vehicle 1 app with the map application will override or supplement the information manually provided to the map application by the user about Vehicle 1).

In some embodiments, indication 812 can be displayed in accordance with a determination that criteria other than that the Vehicle 1 app is installed are satisfied. For example, as described above, the map application is able to receive information for a vehicle from one or more external sources, such as an application that's installed on the same device as the map application, from an external server, from a computer system associated with a vehicle (e.g., a vehicle's on-board computer system, such as the vehicle's ECU), etc. Thus, in some embodiments, device 500 can display indication 812 if device 500 determines that any of these mechanisms for receiving information about the user's vehicle are available. For example, if device 500 determines that device 500 is in communication with or able to communicate with the on-board computer system of a user's vehicle, then device 500 can display indication 812 to link the user's vehicle with the map application. In such embodiments, in response to a user selection of indication 812, device 500 can initiate the process to add the user's vehicle to the map application (optionally to pair device 500 with the vehicle's on-board computer system), as will be described in more detail below. In some embodiments, device 500 can display indication 812 without requiring the satisfaction of the criteria described above. In such embodiments, in response to a user selection of indication 812, the user can be presented with one or more options to link Vehicle 1 with the map application (e.g., present the user with the option to provide communication details to connect with a server associated with the user's vehicle, present the user with the option to scan a QR code that provides communication details to connect with a server associated with the user's vehicle, etc.). In some embodiments, the map application can access the information about the user's vehicle via an API call to another application, to a server, to the vehicle's on-board computer system, etc.

FIG. 8C illustrates an exemplary lock or wake screen user interface 816 that includes notification 818. In some embodiments, notification 818 is displayed in accordance with a determination that the Vehicle 1 app is installed on device 500. In some embodiments, notification 818 includes a description to connect the Vehicle 1 app with the map application to get customized routes and/or charging suggestions. In some embodiments, selection of notification 818 initiates a process to link the map application with the Vehicle 1 app (e.g., causes the map application to be displayed, automatically navigated to a user interface for linking the Vehicle 1 app with the map application, such as the user interface shown in FIG. 8E). In some embodiments, notification 818 is displayed only if the map application is not already linked with the Vehicle 1 app.

In some embodiments, notification 818 is displayed on any user interface and is not limited to only a lock or wake screen user interface. For example, notification 818 can be displayed while device 500 is displaying a system user interface (e.g., the home screen user interface, an application launching user interface, a settings user interface) or a user interface of an application. In some embodiments, notification 818 can be displayed on a notification user interface (e.g., a user interface that includes one or more active notifications). In some embodiments, notification 818 is persistent and remains displayed on the lock or wake screen user interface (optionally and on the notification user interface) until a user manually dismisses notification 818, until the user selects notification 818 and/or until the user links the Vehicle 1 app with the map application.

In FIG. 8D, a user input 803d is received selecting button 814. In some embodiments, in response to user input 803d, device 500 initiates a process to link Vehicle 1, (e.g., through the Vehicle 1 app) with the map application, as shown in FIG. 8E. In FIG. 8E, device 500 displays user interface 820. In some embodiments, user interface 820 is a user interface for confirming linking of Vehicle 1 (e.g., through the Vehicle 1 App) with the map application. In some embodiments, user interface 820 includes an icon 822 that represents the Vehicle 1 app (e.g., the app icon). In some embodiments, user interface 820 includes description 824 that explains that connecting Vehicle 1 (e.g., through the Vehicle 1 App) with the map application allows the map application to receive characteristics of vehicle 1. In some embodiments, user interface 820 includes button 826 and button 828. In some embodiments, button 826 is selectable to connect (e.g., add, link, register, etc.) Vehicle 1 with the map application. In some embodiments, button 828 is selectable to terminate the process to link Vehicle 1 with the map application (e.g., cancel the linking).

In FIG. 8E, a user input 803e is received selecting button 826. In some embodiments, in response to receiving user input 803e, device 500 displays user interface 830. In some embodiments, user interface 830 includes the vehicles that are associated with the Vehicle 1 App (e.g., the application for which indication 812 was displayed). For example, a particular vehicle application can be associated with multiple vehicles and receive and provide information about multiple vehicles (e.g., if the vehicles are of the same make and model, if the vehicles are by the same manufacturer, if the application is compatible with multiple vehicles, if the application is compatible with vehicles of different makes and/or models, etc.). In FIG. 8F, user interface 830 includes listing 836-1 corresponding to Vehicle 1 and listing 836-2 corresponding to Vehicle 2. In such embodiments, the Vehicle 1 App is able to access and provide information about Vehicle 1 and Vehicle 2 (e.g., Vehicle 1 and Vehicle 2 are optionally the same make and/or model and/or both Vehicle 1 and Vehicle 2 are registered with the Vehicle 1 app). As shown in FIG. 8F, listing 836-1 includes icon 838-1 representing Vehicle 1 and description 840-1. In some embodiments, description 840-1 includes the name of the vehicle (or optionally the make and/or model of the vehicle) and the current charge status of Vehicle 1 (and optionally the current estimated driving range). Similarly, listing 836-2 includes icon 838-2 representing Vehicle 2 and description 840-2 that includes the name of Vehicle 2 and the current charge status of Vehicle 2 (and optionally the current estimated driving range). The names of the vehicles and the current charge statuses are optionally received from the Vehicle 1 app. In some embodiments, each listing includes an indication (e.g., indication 842-1 and indication 842-2) indicating that the respective vehicle will be added to the map application.

In FIG. 8F, user input 803f is received on listing 836-2, thus de-selecting Vehicle 2 from being added to the map application, as shown in FIG. 8G. Thus, only Vehicle 1 will be added to the map application (e.g., the map application will only receive information about Vehicle 1 and not Vehicle 2). In FIG. 8G, user input 803g is received selecting affordance 834 corresponding to a confirmation to add Vehicle 1. In some embodiments, in response to user input 803g, Vehicle 1 is added to the map application and the Vehicle 1 app is linked with the map application, as shown in FIG. 8H. In some embodiments, linking the Vehicle 1 app allows the map application to receive information about Vehicle 1 from a source external to the application. In some embodiments, the information is received from the Vehicle 1 app. In some embodiments, the information is received from a server external to device 500 (e.g., linking the Vehicle 1 app with the map application provided the map application with information and/or credentials to communicate with the external server).

It is understood that the above-described process of providing an indication and button to link the Vehicle 1 app with the map application can be repeated for multiple applications that are associated with other vehicles. For example, in the embodiments described above, the Vehicle 1 app is associated with Vehicle 1 and Vehicle 2. In addition to the Vehicle 1 app, device 500 can have a Vehicle 3 app installed that is associated with Vehicle 3. In such embodiments, an indication such as indication 812 can be displayed for linking the Vehicle 3 app with the map application (e.g., to add Vehicle 3 to the map application and enable the map application to receive information about Vehicle 3 from the Vehicle 3 app and/or an external source). In other embodiments, indication 812 is only displayed for one application associated with a vehicle (e.g., only displayed once) and after performing the above-described linking process, a user can manually initiate the process for other vehicle applications via a settings user interface of the map application (e.g., such as user interface 848 described below).

In FIG. 8H, user input 803h is received selecting settings button 802. In some embodiments, in response to user input 803h, device 500 displays user interface 848 as shown in FIG. 8I. As shown in FIG. 8I, user interface 848 is a settings user interface for changing and/or modifying one or more settings associated with the map application. For example, user interface 848 includes options 850, 852, 854, 856, 858, and 860 corresponding to different options and/or settings. In some embodiments, option 854 corresponds to the "My Vehicles" option and is selectable to display the vehicles that have been added to the map application. In FIG. 8I, user input 803i is received selecting option 854. In response to user input 803i, device 500 displays user interface 862, as shown in FIG. 8J. User interface 862 corresponds to the "my vehicles" user interface, in which the vehicles that have been registered with, added to, and/or linked to the map application are displayed. As shown in FIG. 8J, user interface 862 includes listing 864 corresponding to Vehicle 1 that was added according to the linking process described above. In some embodiments, user interface 862 includes listings of vehicles that were added to the map application via a process other than the process to link the map application with an application associated with a vehicle.

In some embodiments, listing 864 includes an icon representing the vehicle, the name of the vehicle (e.g., user selected name, make, and/or model), and indication 866 that indicates the current charge level and/or estimated driving range of the vehicle.

In FIG. 8J, user input 803j is received selecting listing 864. In some embodiments, in response to user input 803j, device 500 displays user interface 868. User interface 868 corresponds to a settings user interface for Vehicle 1. In FIG. 8K, user interface 868 includes icon 870 and edit link 872. In some embodiments, icon 870 is a representation of Vehicle 1 and optionally has a visual characteristic based on a visual characteristic of Vehicle 1. For example, if Vehicle 1 is red, then the maps application is able to receive information indicating that Vehicle 1 is red from the external source (e.g., from the Vehicle 1 app), and icon 870 includes a red car icon (e.g., without the user specifying the color of the icon). In some embodiments, edit link 872 is selectable to view and/or change the color and/or pattern of Vehicle 1 (e.g., away from the automatically populated color and/or pattern based on the information received about Vehicle 1), as will be described below.

In some embodiments, user interface 868 includes name field 874. In some embodiments, name field 874 is selectable to edit the name of Vehicle 1 (e.g., cause display of a soft keyboard with which the user is able to edit and/or provide a desired name). In some embodiments, name field 874 is pre-populated with a name provided by the Vehicle 1 app (e.g., the make and/or model of the car, a name selected by a user to the Vehicle 1 app, etc.). In some embodiments, user interface 868 includes charger option 876-1 and charger option 876-2. Charger option 876-1 corresponds to the charging plug type of Vehicle 1 and is selectable to view and/or edit the charger types and/or available adapters, as will be described in more detail below. In some embodiments, charger option 876-2 corresponds to the charging network preference and/or compatibility with Vehicle 1, and is selectable to view and/or edit the charging networks to charge Vehicle 1 with, as will be described in more detail below.

In some embodiments, user interface 868 includes app listing 878 corresponding to the application that is associated with Vehicle 1 (e.g., and linked with the map application). In some embodiments, selection of app listing 878 causes display of the application associated with Vehicle 1. In some embodiments, user interface 868 does not include app listing 878 if Vehicle 1 was added via a process other than the app linking process described above (e.g., such as via manually adding the vehicle).

In some embodiments, user interface 868 includes manufacturer information 880-1 and model information 880-2 that includes information about the make and model of Vehicle 1, respectively. In some embodiments, the make and/or model information of Vehicle 1 is received from the Vehicle 1 app and thus manufacturer information 880-1 and model information 880-2 is automatically populated upon linking the Vehicle 1 app with the map application.

In FIG. 8L, a user input 803*l* is received selecting edit link 872. In some embodiments, in response to user input 803*l*, device 500 displays user interface 882 for viewing and/or editing the visual characteristics of Vehicle 1. In FIG. 8M, user interface 882 includes a plurality of color options 886-1 to 886-18 that are selectable to set the color of Vehicle 1 (e.g., which is used as the color for icons that represent Vehicle 1, such as icon 884 and icon 870). In some embodiments, the color option that is selected in user interface 882 is initially automatically populated based on color information received from the Vehicle 1 app. For example, the Vehicle 1 app is able to provide the map application with information about the visual characteristics of Vehicle 1 and indicates to the map application that Vehicle 1 has a color associated with color option 886-16. Thus, color option 886-16 is automatically selected. In some embodiments, a user is able to select a different color option from the list of color options and override the color option that is provided by the Vehicle 1 application. In some embodiments, the color options that are displayed in user interface 882 are the only color options that are available for the specific make and model of the color (e.g., the map application receives all of the available color options from the Vehicle 1 app). In some embodiments, the color options that are displayed are generally available vehicle colors and are not selected for display based on the available colors for the specific vehicle.

In FIG. 8N, returning to user interface 868, a user input 803*n* is received selecting charger option 876-1. In some embodiments, in response to user input 803*n*, device 500 displays user interface 888, as shown in FIG. 8O. In some embodiments, user interface 888 includes listing 890 and adapter option 892. In some embodiments, listing 890 indicates the default plug type of Vehicle 1. In some embodiments, the default plug type is the type of plug that is currently installed on Vehicle 1. In some embodiments, the default plug type is automatically selected based on information received from the Vehicle 1 app. In some embodiments, listing 890 is selectable to change the installed plug type (e.g., if the user performed an after-market modification of the default plug type). In some embodiments, adapter option 892 is selectable to add one or more adapter plugs to the map application. An adapter plug is optionally a mechanism/apparatus that converts the default plug type to one or more other plug types. For example, Plug Type 1 may be only compatible with charging stations that accept Plug Type 1, but would not be compatible with charging stations that are only compatible with Plug Type 2. Thus, a plug adapter can be used to convert Plug Type 1 to be compatible with Plug Type 2 (e.g., by changing the physical characteristics of the plug, by changing the electrical characteristics of a particular charging station to something that is compatible with Vehicle 1, etc.).

In some embodiments, if the respective vehicle is not an electric vehicle, but rather, a vehicle of a different fuel type (e.g., gasoline vehicle, plug-in hybrid, E85 vehicle, etc.), then charger option 876-1 optionally is not displayed on user interface 868 or user interface 888 includes the default implement for use in refueling or recharging the vehicle, including an option for adding compatible adapters for the respective vehicle.

In FIG. 8O, user input 803*o* is received selecting adapter option 892. In some embodiments, in response to user input 803*o*, device 500 displays user interface 894, as shown in FIG. 8P. User interface 894 includes a list of adapters that are selectable to indicate to the map application the adapters that the user has possession of. In some embodiments, the list of adapters includes only adapters that are compatible with Vehicle 1 (e.g., only adapters that are compatible with the vehicle (optionally not adapters that are not compatible with the vehicle), only adapters that are compatible with the vehicle's plug type (optionally not adapters that are not compatible with the vehicle's plug type), etc.). In some embodiments, the list of adapters is received from the Vehicle 1 app. In some embodiments, the list of adapters includes all existing adapters for any plug type.

In FIG. 8P, a user input 803*p* is received selecting adapter option 896-2. In some embodiments, in response to user input 803*p*, adapter 2 is selected to be added as an available adapter for Vehicle 1, as shown in FIG. 8Q (e.g., represented by the check mark icon). In FIG. 8Q, a user input 803*q* is received selecting adapter 896-3 corresponding to adapter 3. In some embodiments, in response to user input 803*q*, adapter 3 is also selected to be added as an available adapter for Vehicle 1, as shown in FIG. 8R.

In FIG. 8R, a user input 803*r* is received selecting the "Done" option, thus completing the addition of Adapter 2 and Adapter 3, and dismissing user interface 894, as shown in FIG. 8S. In FIG. 8S, user interface 888 now includes adapter listing 898-1 and adapter listing 898-2 corresponding to adapter 2 and adapter 3, respectively, that was added. In some embodiments, based on the plug type and the list of available adapters, the map application is able to suggest charging stations that are compatible with Vehicle 1 (e.g., compatible with Plug Type 1 and/or can be made to be compatible with Plug Type 1 using Adapter 2 or Adapter 3). In some embodiments, device 500 can provide a list of different compatible adapters for vehicles other than electric vehicles. For example, a respective hydrogen vehicle may be compatible with certain fuel pump types and may require certain adapters to refuel at particular hydrogen fuel stations.

In FIG. 8T, user input 803*t* is received selecting charger option 876-2 corresponding to charging networks. In some embodiments, in response to user input 803*t*, device 500 displays user interface 899, as shown in FIG. 8U. In some embodiments, user interface 899 includes a list of one or more charging networks that are in operation in the user's geography (e.g., in the country, in the state, in the municipality, in the region, etc.). In FIG. 8U, user interface 899 includes charging network 897-1, charging network 897-2, and charging network 897-3. As shown in FIG. 8U, charging network 897-3 is automatically initially populated, optionally based on information received from the Vehicle 1 App. For example, Vehicle 1 may have a pre-existing relationship with charging network 897-3 or may be compatible with charging network 897-3 (e.g., optionally only compatible with charging network 897-3). In some embodiments, charging network 897-3 may be the charging network recommended by the manufacturer of Vehicle 1. As shown in FIG. 8U, a user is able to select any of the charging network listings to indicate to the map application the charging network that the user would like to use to charge Vehicle 1. In FIG. 8U, user input 803*u* is received selecting charging network 897-2. In response to selection of charging network 897-2, the map application will suggest only charging stops for Vehicle 1 that are within charging network 897-2 (e.g., selection of a charging network selects the respective charging network as the only compatible charging network). In some embodiments, in response to selection of charging network 897-2, the map application will suggest charging stops for Vehicle 1 that are within both charging network 897-2 and charging network 897-3 (e.g., selection of a charging network toggles the respective charging network as a compatible charging network).

In some embodiments, if the respective vehicle is not an electric vehicle, but rather, a vehicle of a different fuel type (e.g., gasoline vehicle, plug-in hybrid, E85 vehicle, etc.), then charger option 876-2 optionally is not displayed on user interface 868 or user interface 899 includes options for networks of stations compatible with the respective vehicle's fuel type (e.g., options corresponding to different gas station brands, etc.). For example, for a gas vehicle, user interface 899 can include options of different gas station brands that are selectable such that the map application will only suggest gas stations of the selected gas station brands.

FIGS. 8V-8CC illustrate embodiments in which the map application displays information or suggestions based on the information received from the Vehicle 1 app (and/or defined in the vehicle settings user interface, as previously described). It is understood that although the embodiments illustrated herein describe receive information from the Vehicle 1 app, the information can be received from any source external to the map application, such as a server external to device 500.

It is understood that although the description of the figures below describe embodiments in which device 500 determines one or more suggested routes and/or determines one or more suggested stops, this determination can be performed by the navigation server or by a combination of device 500 and the navigation server, the results of which are provided to device 500 for display in the user interface.

In FIG. 8V, device 500 displays user interface 800 while Vehicle 1 is selected. In FIG. 8V, user interface 800 is similar to user interface 600 described in FIG. 6A and includes location indicator 883. In some embodiments, location indicator 883 has a visual characteristic based on the visual characteristic of Vehicle 1. For example, in FIG. 8V, location indicator 883 has the same visual characteristic as the visual characteristic of icon 884 and color option 886-16 described above in FIG. 8M.

In FIG. 8V, a user input 803*v* is received requesting directions from the current location to Destination 1. As described above with respect to method 700, in response to user input 803*v*, device 500 displays one or more suggested routes. In some embodiments, suggested route 887-1 and/or suggested route 887-2 include one or more suggested stops to refuel and/or recharge Vehicle 1. As shown in FIG. 8W, the current charge level of Vehicle 1 is such that Vehicle 1 has a 20 mile range. In some embodiments, the map application receives the current driving range information from the Vehicle 1 app (e.g., 20 mile range) and/or receives the current charge information from the Vehicle 1 app (e.g., 5% charge). Based on the received information, device 500 determines that a charging stop is required and includes a charging stop on one or more of the suggested routes. In some embodiments, the charging stop that is selected is within the charging network that was selected above in FIG. 8U (e.g., that is optionally provided by the Vehicle 1 app) and that is compatible with the plug type of Vehicle 1 (optionally with or without using one of the available adapters). In some embodiments, the location and existence of charging stops is received from the Vehicle 1 app or from a database other than the Vehicle 1 app. In some embodiments, if the user had selected a different set of adapters and/or had selected a different charging network, then the suggested routes and/or suggested stops provided by device 500 can be different than those shown herein, based on whether particular charging stations are compatible with particular adapters and/or based on whether a particular charging station is within the selected charging network. For example, in FIGS. 6K-6L, the selected charging network is "Gigawatts" and thus the suggested stop is within the "Gigawatts" charging network, whereas the suggested stop of suggested route 887-1 is within the "Ionize" charging network (which is compatible with the adapters selected by the user in FIGS. 8P-8R).

Thus, as shown in FIG. 8W, the routes that are suggested to the user are based on characteristics of Vehicle 1 that are received from the source external to the map application (e.g., the Vehicle 1 app or an external server).

FIG. 8W illustrates an embodiment similar to FIG. 6M in which a user input 803*w* is received requesting navigation using suggested route 887-1. In some embodiments, in response to user input 803*w*, device 500 enters navigation mode and displays step-by-step and/or turn-by-turn directions to navigate along suggested route 887-1 to the destination. In some embodiments, while in navigation mode, device 500 displays a representation of the vehicle that is based on the characteristics received from the external source. For example, in FIG. 8X, icon 873 that represents the vehicle's current location can have the same color as location indicator 883 and icon 884, which is based on the color information received from the Vehicle 1 app. In some embodiments, icon 873 does not have a color based on the color of the vehicle.

FIG. 8X illustrates an embodiment, similar to FIG. 6P, in which the user has arrived at a suggested charging station. As shown in FIG. 8X, the suggested charging station is within the charging network selected above in FIG. 8U (e.g., the "Ionize" charging network). In FIG. 8X, instructions 877 indicate the adapter that is required to connect Vehicle 1 with the charging station (e.g., "Adapter 2"). As described above, in some embodiments, device 500 only suggests the use of an adapter that the user and/or Vehicle 1 app has indicated is available for Vehicle 1.

FIG. 8Y illustrates an embodiment, similar to FIG. 6Q, in which device 500 has determined that Vehicle 1 has begun charging. In some embodiments, device 500 receives information from Vehicle App 1 that Vehicle 1 has begun charging (e.g., receives charging and/or battery level information). In some embodiments, in accordance with a determination that Vehicle 1 has begun charging, device 500 updates instructions 879 to display the amount of time remaining to charge to the suggested level. In some embodiments, information 879 includes an indication of the current charge level.

FIG. 8Z illustrates an embodiment, similar to FIG. 6Q, in which Vehicle 1 has been charged to 34%. In some embodiments, instructions 879 is updated to reflect the updated charge status. For example, in FIG. 8Z, instructions 879 reads "8 minutes remaining", which is based on the estimated time remaining to charge to 53% that is based on the charging rate and/or based on the current charge level that is received from the Vehicle 1 app.

FIG. 8AA illustrates an embodiment, similar to FIG. 6V, in which device 500 is in navigation mode and device 500 determines, based on updated charge information, that a recharging stop is required to reach the destination. In some embodiments, the map application receives, from the Vehicle 1 app, updated charge information (e.g., 10% charge) and/or updated driving range information (e.g., 20 miles, 40 miles, etc.) and determines that a recharging stop is required. In accordance with a determination that a recharging stop is required, device 500 displays a proposed route that includes a suggested stop within the selected charging network (optionally that is compatible with the plug type of Vehicle 1).

It is understood that although the embodiments described above refer to an electric vehicle, this is merely exemplary and the above-described features are not limited to only electric vehicles. For example, the ability to link the map application to an application associated with a vehicle can be performed for a vehicle of any fuel type (e.g., gasoline vehicle, hybrid vehicle, plug-in hybrid, etc.), and the map application can receive information about characteristics of vehicles of any fuel type. Similarly, the map application can determine (optionally the navigation server can determine) suggested routes and/or suggested stops based on the type of fuel used by the selected vehicle (e.g., gas stations, electric vehicle charging stations, hydrogen refueling stations, E85 stations, diesel stations, etc.).

FIGS. 8BB-8CC illustrate an embodiment in which the Vehicle 1 app is installed on device 500 but is not yet linked with the map application. In FIG. 8BB, user input 803bb is received requesting directions from the current location to Destination 1 while the Vehicle 1 App is installed but not linked (e.g., Vehicle 1 is not selected and/or the map application does not have access to information about the characteristic of Vehicle 1), similar to the embodiments described in FIGS. 6A-6B. In some embodiments, in response to user input 803bb, device 500 displays suggested route 887-5 and suggested route 887-6. As shown in FIG. 8CC, suggested route 887-5 and suggested route 887-6 are selected and/or determined without regard to the characteristics of Vehicle 1. Thus, in FIG. 8CC, suggested route 887-5 is the fastest route from the device's current location to Destination 1, without including any suggested stops for recharging and/or refueling, and suggested route 887-6 is an alternative route to suggested route 887-5 that also does not include any suggested stops for recharging and/or refueling. Thus, as shown, even though Vehicle 1 app is installed, because Vehicle 1 app is not linked with the map application, the map application is not able to receive information about the current characteristics of the Vehicle 1 and does not provide suggested stops based on current characteristics of Vehicle 1 received from an external source. It is understood, however, that the map application is able to provide customized suggested stops based on other information that is not received from the Vehicle 1 app or an external source. For example, even if the Vehicle 1 app is not installed, a user is optionally able to manually add Vehicle 1 to the map application and provide license plate information and receive customized routes based on whether Vehicle 1 is or is not subject to driving restrictions, as described above with respect to FIGS. 6W-6FF. If, on the other hand, the Vehicle 1 app is linked to the map application, the map application can optionally receive license plate information from the Vehicle 1 app and provide customized routes for Vehicle 1 based on the received information.

FIG. 9 is a flow diagram illustrating a method 900 of receiving information about characteristics of respective vehicles in accordance with some embodiments of the disclosure. The method 900 is optionally performed at an electronic device such as device 100, device 300, and device 500 as described above with reference to FIGS. 1A-1B, 2-3, 4A-4B and 5A-5H. Some operations in method 900 are, optionally combined and/or the order of some operations is, optionally, changed.

As described below, the method 900 provides ways to receive information about characteristics of respective vehicles. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device 500 in communication with a display generation component (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) displays (902), via the display generation component, a map user interface of a map application, such as user interface 800 in FIG. 8A (e.g., a user interface that displays a representation of a map of a given geographic location.

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the user interface is a user interface of a map application. In some embodiments, the map user interface is interactable by the user to view different geographic locations or change the zoom level of the map.

In some embodiments, the map user interface includes a representation of a map (e.g., a representation of a geographic location) and respective information (904), such as suggested route 887-1 and suggested route 887-2 in FIG. 8W (e.g., an icon that represents the electronic device and optionally indicates the determined current location of the device). In some embodiments, the respective information includes one or more routes for travelling from one location to another location. In some embodiments, the respective information is based on characteristics of a vehicle (e.g., color, shape, size, model, mileage, fuel type, etc.). In some embodiments, the respective information is based on the selected mode of transportation.

In some embodiments, in accordance with a determination that receiving, by the map application, information corresponding to a characteristic of a first vehicle (e.g., a current and/or real-time state or characteristic of the first vehicle) from a source external to the map application is enabled (e.g., the map application has been configured to receive information from an external source that affects the display of the directions and/or routes from the first location to the second location), the respective information is first information, wherein the first information is based on the characteristic of the first vehicle received from the source external to the map application (906), such as current driving range of Vehicle 1 in FIG. 8W (e.g., the one or more proposed routes from the first location to the second location are based on the received information).

In some embodiments, the external source is an application associated with the first vehicle, separate from the map application, that is installed on the electronic device. In some embodiments, the external source is a server (e.g., external to the electronic device) associated with the first vehicle, that provides information to the map application. In some embodiments, the external source is another electronic device (e.g., external to the electronic device but in wired or wireless communication with the device). In some embodiments, the current characteristic of the first vehicle includes fuel information (e.g., amount of gas available, amount of charge available), estimated distance that can be traveled for the current fuel (or charge) level, the type of fuel the vehicle uses (or the type of charger required), and/or physical characteristics of the first vehicle such color, size, shape, etc.). In some embodiments, the information corresponding to the characteristic of the first vehicle is received from multiple sources that are external to the map application (e.g., multiple applications, multiple servers, etc.). In some embodiments, the information is information other than the current location of the vehicle and/or one or more geographic locations (e.g., landmarks, etc.). In some embodiments, the information includes the current location of the vehicle. In some embodiments, a particular source provides information of characteristics of multiple vehicles (e.g., an application is associated with and is able to provide information about one or more vehicles). In some embodiments, the map application is configured to receive information from multiple external sources. In some embodiments, each source is associated with a different vehicle (e.g., a first application associated with the first vehicle, a second application associated with a second vehicle, etc.).

In some embodiments, the proposed routes include a proposed stop to refuel and/or recharge. In some embodiments, the proposed routes include the proposed stop because the current fuel level (or charge level) received from the external source does not allow the vehicle to reach the destination without refueling (or recharging). In some embodiments, the proposed stop depends on the type of charging station or fuel station needed to provide the vehicle with the charge or fuel required (e.g., a specific type of charging station, a specific type of gas station that provides a specific type of fuel such as diesel or E85). In some embodiments, the first information is a representation of the first vehicle, such as an icon or model of the first vehicle that reflect the physical characteristics (e.g., has color(s) and/or a shape that is representative of the first vehicle). In some embodiments, the first information is information other than location information (e.g., current location of the vehicle, starting location for navigation directions, destination location for navigation directions, landmarks, favorite locations, etc. In some embodiments, for each external source for which the map application is receiving information from, the map application is able to display information based on the characteristic for the respective vehicle associated with the external source. For example, if the map application is configured to receive information from a first application associated with a first vehicle, a second application associated with a second vehicle, and a first server associated with a third vehicle, the map application is able to display first information based on characteristics of the first vehicle received from the first application, second information based on characteristics of the second vehicle received from the second application, and third information based on characteristics of the third vehicle received from the first server. In some embodiments, the first, second, and third information are displayed concurrently or are displayed individually when the respective vehicles are selected in the map application.). In some embodiments, the respective information includes an icon that represents the user's vehicle (e.g., at a location on the representation of the map corresponding to the device's determined current location). In some embodiments, the icon has one or more visual characteristics based on the visual characteristics of the user's vehicle. In some embodiments, the icon is a cartoon or caricature of the user's vehicle. For example, the icon is a car having the same or similar color as the first vehicle and/or the same or similar shape as the first vehicle.

The above-described manner of displaying information based on received information on the characteristics of a particular vehicle (e.g., if the map application is enabled to receive information from a source external to the map application) quickly and efficiently customizes information for a particular vehicle (e.g., by displaying information that is based on the received current characteristics of the vehicle), which simplifies the interaction between the user and the electronic device and enhances the operability of the electronic device and makes the user-device interface more efficient (e.g., without requiring the user to separately determine whether the resulting information is appropriate for the vehicle or perform additional inputs to manually edit proposed routes to include required stops to refuel or recharge), which additionally reduces power usage and improves battery life of the electronic device by enabling the user to use the electronic device more quickly and efficiency while reducing errors in the usage of the device.

In some embodiments, the respective information and the first information are of a respective type, such as the current driving range in FIG. 8W (e.g., the respective type of information includes navigation directions shown on the map, a representation of a vehicle on the map, etc.). In some embodiments, in accordance with a determination that receiving, by the map application, information corresponding to the characteristic of the first vehicle from the source external to the map application is not enabled, the respective information is second information of the respective type, wherein the second information is not based on the characteristic of the first vehicle, such as suggested route 887-5 and suggested route 887-6 not being based on the driving range of any vehicle in FIG. 8CC (e.g., if the map application is not configured to receive information from the external source, then display information that is not based on a characteristic of a particular vehicle. For example, the map application displays one or more generic proposed routes from the first location to the second location. In some embodiments, the generic proposed routes do not take into account fuel or charge levels of the first vehicle. In some embodiments, a generic icon or generic model of a vehicle is displayed (as opposed to an icon that has visual characteristics based on the visual characteristics of the first vehicle). In some embodiments, the information displayed when receiving information by the map application is not enabled is the same type of information displayed when receiving information by the map application is enabled (e.g., the information is a route, but different routes, the information is an icon of a vehicle, but different icons, etc.).

The above-described manner of displaying information that is not based on received information about a characteristic of a vehicle (e.g., if the map application is not enabled to receive information from a source external to the map application) quickly and efficiently provides either generic map information or customized map information, which simplifies the interaction between the user and the electronic device and enhances the operability of the electronic device and makes the user-device interface more efficient (e.g., by automatically providing customizing information if custom information is available, without requiring the user to perform additional inputs to enable or disable custom information), which additionally reduces power usage and improves battery life of the electronic device by enabling the user to use the electronic device more quickly and efficiency while reducing errors in the usage of the device.

In some embodiments, the respective information is displayed in response to a user input corresponding to a request to display directions from a first location to a second location, such as user input 803 in FIG. 8V (e.g., a request to display one or more routes and/or directions from a first geographic location to a second geographic location, and the respective information is one or more suggested routes for travelling from the first location to the second location).

For example, the user input requests driving directions from the first location to the second location. In some embodiments, a user selects the first and/or second geographic location. In some embodiments, the first or second geographic location is the determined current location of the electronic device. In some embodiments, the map user interface displays the one or more determined routes from the first geographic location to the second geographic location. In some embodiments, the one or more suggested routes are displayed overlaid on the representation of the map.

The above-described manner of displaying customized routes based on received information on the characteristics of a particular vehicle quickly and efficiently customizes information for a particular vehicle (e.g., by displaying suggested routes that are based on the characteristics of the vehicle), which simplifies the interaction between the user and the electronic device and enhances the operability of the electronic device and makes the user-device interface more efficient (e.g., by automatically using the information received from the external source, without requiring the user to separately determine whether the resulting information is appropriate for the vehicle or perform additional inputs to manually edit proposed routes to include required stops to refuel or recharge), which additionally reduces power usage and improves battery life of the electronic device by enabling the user to use the electronic device more quickly and efficiency while reducing errors in the usage of the device.

In some embodiments, the characteristic of the first vehicle includes a current estimated distance that the first vehicle is able to travel, such as the 20 mile range of Vehicle 1 in FIG. 8W (e.g., receiving, from the source external to the map application, the estimated driving range of the first vehicle). In some embodiments, the characteristic of the first vehicle includes the current charge level or the current fuel level of the first vehicle. In some embodiments, respective information is based on the estimated driving range of the first vehicle. For example, respective information includes one or more suggested routes and the one or more suggested routes optionally includes one or more suggested stops to refuel or recharge the vehicle (e.g., if the estimated driving range is less than the travel distance of the one or more suggested routes), as described above with respect to method 700.

The above-described manner of displaying information based on the estimated distance that the vehicle is able to travel quickly and efficiently displays customized travel information for a particular vehicle, which simplifies the interaction between the user and the electronic device and enhances the operability of the electronic device and makes the user-device interface more efficient (e.g., without requiring the user to separately determine whether the resulting information is appropriate for the vehicle), which additionally reduces power usage and improves battery life of the electronic device by enabling the user to use the electronic device more quickly and efficiency while reducing errors in the usage of the device.

In some embodiments, the characteristic of the first vehicle includes a type of charger compatible with the first vehicle, such as Adapter 2 in FIG. 8X (e.g., receiving, from the source external to the map application, the type of chargers that can be used to charge the first vehicle).

In some embodiments, different electric vehicle charging stations have different plugs and/or are compatible with different types of connectors. In some embodiments, different electric vehicles have different plugs and/or are compatible with different types of connectors. In some embodiments, adapters exist that allow electric vehicles to convert the plug installed on the electric vehicle to a plug type that is compatible with respective charging stations. In some embodiments, the source external to the map application provides the map application with information about what types of chargers are compatible with the first vehicle and optionally what adapters are compatible with the first vehicle (e.g., to connect to the different types of chargers). In some embodiments, based on the information about what types of chargers are compatible with the first vehicle, the map application is able to suggest charging stations that use the type of chargers that are compatible with the first vehicle (e.g., via using an adapter or without requiring an adapter). In some embodiments, the map application does not suggest charging stations that do not use the type of chargers (e.g., either with or without the use of an adapter) that are compatible with the first vehicle.

The above-described manner of displaying information based on the type of chargers that are compatible with a particular vehicle quickly and efficiently determines the charging stations that are compatible with the first vehicle (e.g., by automatically determining whether the charging stations uses charger types that are compatible with the vehicle), which simplifies the interaction between the user and the electronic device and enhances the operability of the electronic device and makes the user-device interface more efficient (e.g., without requiring the user to separately determine whether a suggested charging station is compatible with the user's vehicle), which additionally reduces power usage and improves battery life of the electronic device by enabling the user to use the electronic device more quickly and efficiency while reducing errors in the usage of the device.

In some embodiments, the characteristic of the first vehicle includes a vehicle type, such as the make and model of Vehicle 1 in FIG. 8N (e.g., the source external to the map application provides information about a make, model, and/or color of the first vehicle). In some embodiments, the map application displays a representation of the first vehicle that is based on the make, model, and/or color of the first vehicle. In some embodiments, the representation of the first vehicle is displayed on the representation of the map at the current determined location (e.g., via one or more location sensors such as GPS) of the electronic device (e.g., traveling on a road, parked on a road, parked at a building, etc.). In some embodiments, the representation of the first vehicle is displayed at the current determined location of the first vehicle (e.g., based on location information received from the source external to the map application). For example, an icon of the first vehicle is displayed in the map user interface that has a color similar to or the same as the color of the first vehicle. In some embodiments, the icon of the first vehicle has a shape that is based on the make and model of the first vehicle.

The above-described manner of receiving the type of vehicle for a particular vehicle quickly and efficiently customizes information for a particular vehicle (e.g., by displaying information that is based on the type of vehicle that is selected), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency while reducing errors in the usage of the device.

In some embodiments, the characteristic of the first vehicle includes a current charge level of the first vehicle, such as the 15% and 34% charge levels in FIGS. 8Y and 8Z (e.g., receiving, from the source external to the map application, the current charge level or the current fuel level of the first vehicle). In some embodiments, the respective information that is displayed includes the current charge level or current fuel level based on the information received from the source external to the map application. In some embodiments, the respective information that is displayed includes one or more suggested routes and the one or more suggested routes optionally includes one or more suggested stops to refuel or recharge the vehicle that are selected based on the current charge level or current fuel level of the first vehicle (e.g., if the current charge or fuel level will not allow the first vehicle to reach the destination without refueling or recharging), as described above with respect to method 700.

The above-described manner of displaying information based on the current charge level of a particular vehicle quickly and efficiently customizes information for a particular vehicle (e.g., by displaying customized routes based on whether the current charge level is enough to reach the destination), which simplifies the interaction between the user and the electronic device and enhances the operability of the electronic device and makes the user-device interface more efficient (e.g., without requiring the user to separately determine whether the vehicle is able to reach the destination using the suggested route), which additionally reduces power usage and improves battery life of the electronic device by enabling the user to use the electronic device more quickly and efficiency while reducing errors in the usage of the device.

In some embodiments, the first information includes one or more suggested routes to travel from the first location to the second location using the first vehicle, such as suggested route 887-1 and suggested route 887-2 in FIG. 8W (e.g., the respective information that is displayed includes one or more suggested routes from the first location to the second location). In some embodiments, the one or more suggested routes are selected and/or determined based on the received information for the characteristic of the first vehicle. For example, the map application receives, from the external source, the estimated driving range of the first vehicle and using the estimated driving range information, the map application may add one or more suggested stops to refuel or recharge the first vehicle. In some embodiments, the map application may suggest different routes based on the estimated driving range of the first vehicle, such as a shorter route or a route that is conducive to higher efficiency (e.g., to save fuel or charge). In some embodiments, the map application may suggest different routes based on other characteristics of the first vehicle, such as the ability to traverse certain roads (e.g., if the vehicle is too tall, too tall, or too heavy, or any other driving restriction, such as those described above with respect to method 700).

The above-described manner of displaying suggested routes based on received information for a particular vehicle quickly and efficiently customizes information for a particular vehicle (e.g., by receiving information about a current state of a vehicle and using the received information to select suggested routes for the vehicle), which simplifies the interaction between the user and the electronic device and enhances the operability of the electronic device and makes the user-device interface more efficient (e.g., without requiring the user to separately determine whether the vehicle is able to travel along the route without stopping to refuel or recharge and separately looking for appropriate refueling or recharging stations), which additionally reduces power usage and improves battery life of the electronic device by enabling the user to use the electronic device more quickly and efficiency while reducing errors in the usage of the device.

In some embodiments, the characteristic of the first vehicle includes a current estimated distance that the first vehicle is able to travel, and a first suggested route of the one or more suggested routes includes a suggested stop to charge a battery of the first vehicle, such as suggested stop 885 in FIG. 8W (e.g., based on the received information for the estimated driving distance for the first vehicle for the first vehicle's current fuel or charge level, a suggested route includes one or more suggested stops (e.g., such as at a gas station or a charging station) to refuel or recharge the first vehicle).

In some embodiments, as described above with respect to method 700, a stop to refuel or recharge the vehicle is suggested if the vehicle would not reach the destination, would run out of fuel or charge before reaching the destination, would reach the destination with less than a threshold amount of fuel or charge (e.g., less than 5%, 10%, 15%, 20%, 25%, 30%, etc. amount of fuel or charge), and/or with less than a threshold amount of estimated driving range remaining (e.g., 5 miles, 10 miles, 15 miles, 30 miles, 50 miles, etc. of remaining driving range).

The above-described manner of suggesting stops to recharge the vehicle based on received information of the current estimated distance that the vehicle is able to travel quickly and efficiently suggests required stops to recharge the vehicle (e.g., by automatically determining that a recharging stop is required, finding an appropriate recharging station, and adding the recharging stop to the suggested routes), which simplifies the interaction between the user and the electronic device and enhances the operability of the electronic device and makes the user-device interface more efficient (e.g., without requiring the user to separately determine whether the vehicle is able to travel along the route without stopping to refuel or recharge and separately looking for appropriate refueling or recharging stations), which additionally reduces power usage and improves battery life of the electronic device by enabling the user to use the electronic device more quickly and efficiency while reducing errors in the usage of the device.

In some embodiments, in accordance with a determination that an application associated with the first vehicle, different from the map application, is installed on the electronic device, the electronic device displays, in the map user interface, an affordance corresponding to the application associated with the first vehicle, such as button 814 in FIG. 8D (e.g., before the first vehicle has been added to the map application, determining that an application associated with the first vehicle is installed on the device).

In some embodiments, the application associated with the first vehicle is a third-party application (e.g., such as from the vehicle's manufacturer). In some embodiments, the application associated with the first vehicle is able to access and display information about the first vehicle. For example, the application associated with the first vehicle has access to the first vehicle's fuel or charge level, the first vehicle's mileage, the first vehicle's driving efficiency, the first vehicle's driving history, the first vehicle's tire pressure status, the first vehicle's estimated driving range, and/or any other vehicle status information. In some embodiments, if the first vehicle is not yet added to the map application (e.g., such as described above with respect to method 700) and/or if the application associated with the first vehicle is not yet linked with the map application, then the map user interface includes a selectable option to link the application associated with the first vehicle with the map application. In some embodiments, if an application associated with the first vehicle is not installed on the electronic device, then do not display an affordance to link the map application with the application associated with the first vehicle.

In some embodiments, the electronic device receives, via one or more input devices, a user input selecting the affordance, such as in FIG. 8D. In some embodiments, in response to receiving the user input selecting the affordance, the electronic device initiates a process to enable the map application to receive information corresponding to the characteristic of the first vehicle from the application associated with the first vehicle, such as in FIGS. 8E-8G (e.g., initiate a process to link the map application with the application associated with the first vehicle).

In some embodiments, linking the application associated with the first vehicle with the map application enables information that is accessible from the application associated with the first vehicle to be accessible by and/or from the map application. In some embodiments, the map application receives and/or accesses the information available to the application with the first vehicle to customize the information displayed in the map user interface based on the received information. In some embodiments, the information is received from the application associated with the first vehicle. In some embodiments, the information is received from a server external to the electronic device (e.g., using information received from the first application that enables the map application to communicate with the server).

The above-described manner of displaying an affordance to link the maps application with an application associated with a particular vehicle (e.g., if the application is determined to be installed on the electronic device) quickly and efficiently provides the user with a method for linking the map application with the application associated with the vehicle (e.g., by automatically determining that the application is installed and providing a selectable option to link the maps application with the application for the vehicle), which simplifies the interaction between the user and the electronic device and enhances the operability of the electronic device and makes the user-device interface more efficient (e.g., without requiring the user to determine whether information is accessible for the user's vehicle and then perform additional inputs to enable the maps application to receive information about the user's vehicle), which additionally reduces power usage and improves battery life of the electronic device by enabling the user to use the electronic device more quickly and efficiency while reducing errors in the usage of the device.

In some embodiments, while displaying the respective information, the electronic device receives, from the source external to the map application, updated information about the characteristic of the first vehicle, such as the updated charge information in FIG. 8AA (e.g., information about the characteristic of the first vehicle is continuously or periodically updated). In some embodiments, the map application periodically polls the source of the information for updated information. In some embodiments, the source pushes updates to the map application in response to determining that there is an update to the characteristic.

In some embodiments, in response to receiving the updated information about the characteristic of the first vehicle, the electronic device updates the respective information based on the updated information about the characteristic of the first vehicle, such as the new suggested route 887-4 with a suggested stop in FIG. 8AA (e.g., based on the received updated information, update the displayed information using the received updated information). For example, while displaying one or more suggested routes, if the map application receives updated information about the current driving range of the first vehicle, the map application changes the suggested routes to take into account any changes in the driving range (e.g., if the driving range decreases, a suggested stop may be added to the suggested routes). In some embodiments, if the updated information does not affect the displayed information (e.g., does not affect the suggested route, or is not relevant to the suggested route), then the device does not update the respective information based on the updated information.

The above-described manner of displaying updated information about a particular vehicle (e.g., while already displaying customized information for the vehicle) quickly and efficiently provides up-to-date information, which simplifies the interaction between the user and the electronic device and enhances the operability of the electronic device and makes the user-device interface more efficient (e.g., without requiring the user to perform additional inputs to refresh the information displayed to the user based on updated information), which additionally reduces power usage and improves battery life of the electronic device by enabling the user to use the electronic device more quickly and efficiency while reducing errors in the usage of the device.

In some embodiments, the updated information about the characteristic of the first vehicle includes a current charge level of the first vehicle and the updated information about the characteristic of the first vehicle is received while the first vehicle is being charged, such as the 15% and 34% charge level in FIGS. 8Y-8Z (e.g., the respective information is the current charge level or current fuel level of the first vehicle and while the first vehicle is being refueled or recharged, the map application is able to receive the updated fuel or charge levels and display the updated fuel or charge levels (and/or update estimated fuel or charge levels that are associated with certain steps of a route, and/or determine the estimated time for refueling or recharging the vehicle, and/or update the expected time of arrival at the destination based on the fueling or charging rate)).

The above-described manner of displaying updated charge information as the vehicle is charging quickly and efficiently provides up-to-date charging information, which simplifies the interaction between the user and the electronic device and enhances the operability of the electronic device and makes the user-device interface more efficient (e.g., without requiring the user to perform additional inputs to refresh the charge information), which additionally reduces power usage and improves battery life of the electronic device by enabling the user to use the electronic device more quickly and efficiency while reducing errors in the usage of the device.

In some embodiments, updating the respective information based on the updated information about the characteristic of the first vehicle is performed while providing navigation directions for the first vehicle, and includes updating the navigation directions based on the updated information about the characteristic of the first vehicle, such as the new proposed route with a new charging stop in FIG. 8AA. (e.g., while navigating along a suggested route such that step-by-step navigation directions are displayed, updating or modifying the navigation directions based on the updated information). For example, in accordance with a determination that the driving range of the first vehicle is no longer enough to reach the destination (e.g., based on updated driving range information received from the source), one or more stops may be added to the navigation directions for the vehicle to recharge or refuel.

The above-described manner of receiving updated information as the vehicle is navigating along a route quickly and efficiently monitors the state of the vehicle to determine whether the route should be updated (e.g., by automatically receiving updated information and modifying the navigation directions if the updated information suggests that the directions should be modified), which simplifies the interaction between the user and the electronic device and enhances the operability of the electronic device and makes the user-device interface more efficient (e.g., without requiring the user to separately determine whether the navigation directions provided to the user need to be modified and performing additional inputs to manually modify the route or trigger a refresh of the suggested directions), which additionally reduces power usage and improves battery life of the electronic device by enabling the user to use the electronic device more quickly and efficiency while reducing errors in the usage of the device.

In some embodiments, updating the navigation directions based on the updated information about the characteristic of the first vehicle includes adding a suggested stop to the navigation directions, such as in FIG. 8AA (e.g., adding one or more suggested stops at a gas station or charging station if, based on the updated information, the device determines that the first vehicle will not reach the destination without refueling or recharging (or optionally will reach the destination with less than a threshold amount of fuel or charge (e.g., 5%, 10%, 15%, 20%, 25%, 30%, etc. amount of fuel or charge) or less than a threshold amount of remaining driving range (e.g., 5 miles, 10 miles, 15 miles, 30 miles, 50 miles, etc. of remaining driving range)).

The above-described manner of adding a suggested top based on updated information for a particular vehicle (e.g., if the updated information suggests that a refueling or recharging stop is required to reach the desired destination) quickly and efficiently monitors whether the vehicle will reach the destination (e.g., automatically receiving updated information and determining whether the vehicle will still reach the destination or whether a stop is required), which simplifies the interaction between the user and the electronic device and enhances the operability of the electronic device and makes the user-device interface more efficient (e.g., without requiring the user to separately determine whether a stop is required and performing additional inputs to find a refueling or recharging station and adding the stop to the navigation directions), which additionally reduces power usage and improves battery life of the electronic device by enabling the user to use the electronic device more quickly and efficiency while reducing errors in the usage of the device.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 1100) are also applicable in an analogous manner to method 900 described above with respect to FIG. 9. For example, the operation of the electronic device of receiving information about characteristics of respective vehicles described above with reference to method 900 optionally has one or more of the characteristics of displaying customized navigation routes, anonymizing a vehicle identifier, etc., described herein with reference to other methods described herein (e.g., methods 700 and 1100). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIG. 9 are, optionally, implemented by components depicted in FIGS. 1A-1B. For example, displaying operation 902 is, optionally, implemented by event sorter 170, event recognizer 180, and event handler 190. Event monitor 171 in event sorter 170 detects a contact on touch-sensitive surface 504, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Anonymizing Vehicle Identifiers

Users interact with electronic devices in many different manners, including using electronic devices to view directions from one geographic location to another geographic location. In some embodiments, certain geographic locations implement driving restrictions in which certain cars may be prohibited from driving in a restricted region based on one or more characteristics of the user's vehicle. For example, a geographic location may implement a driving restriction based on the values of a vehicle's license plate. In some embodiments, the electronic device provides an anonymized version of the vehicle's license plate to a navigation server to receive navigation routes that are customized for the particular vehicle (e.g., that take into account the driving restriction). The embodiments described below provide ways for anonymizing the vehicle's license plate and transmitting the anonymized license plate to the navigation server to preserve the user's privacy. Anonymizing the user's license plates ensures that the user's personal information is protected, enhances the user's interactions with the electronic device, and reduces the amount of time needed by a user to perform operations. Reducing operational time decreases the power usage of the device and increases battery life for battery-powered devices.

Figures 10A, 10B:
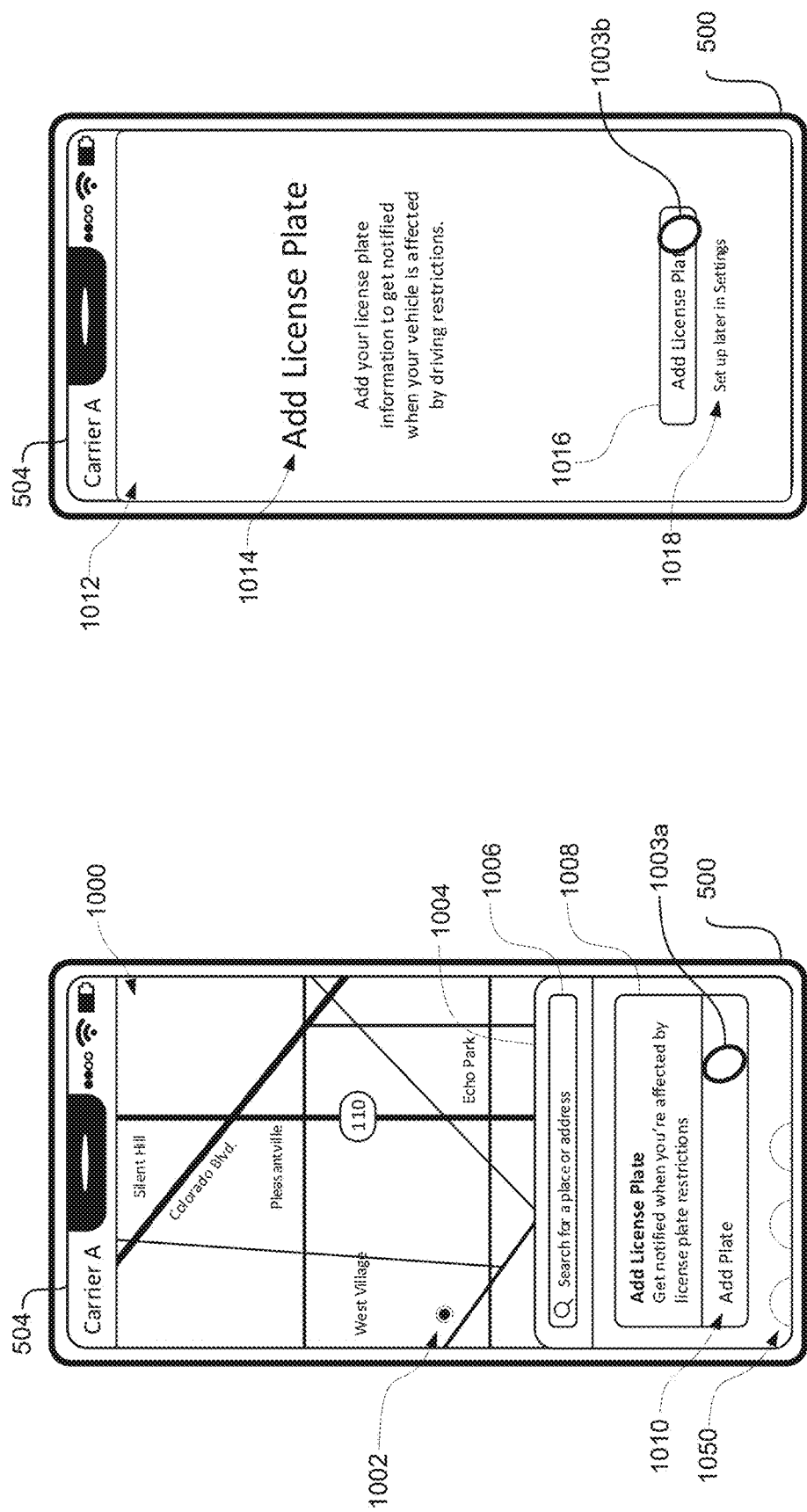
FIGS. 10A-10P illustrate exemplary ways in which a vehicle identifier is anonymized in accordance with some embodiments of the disclosure.
Figures 10C, 10D:
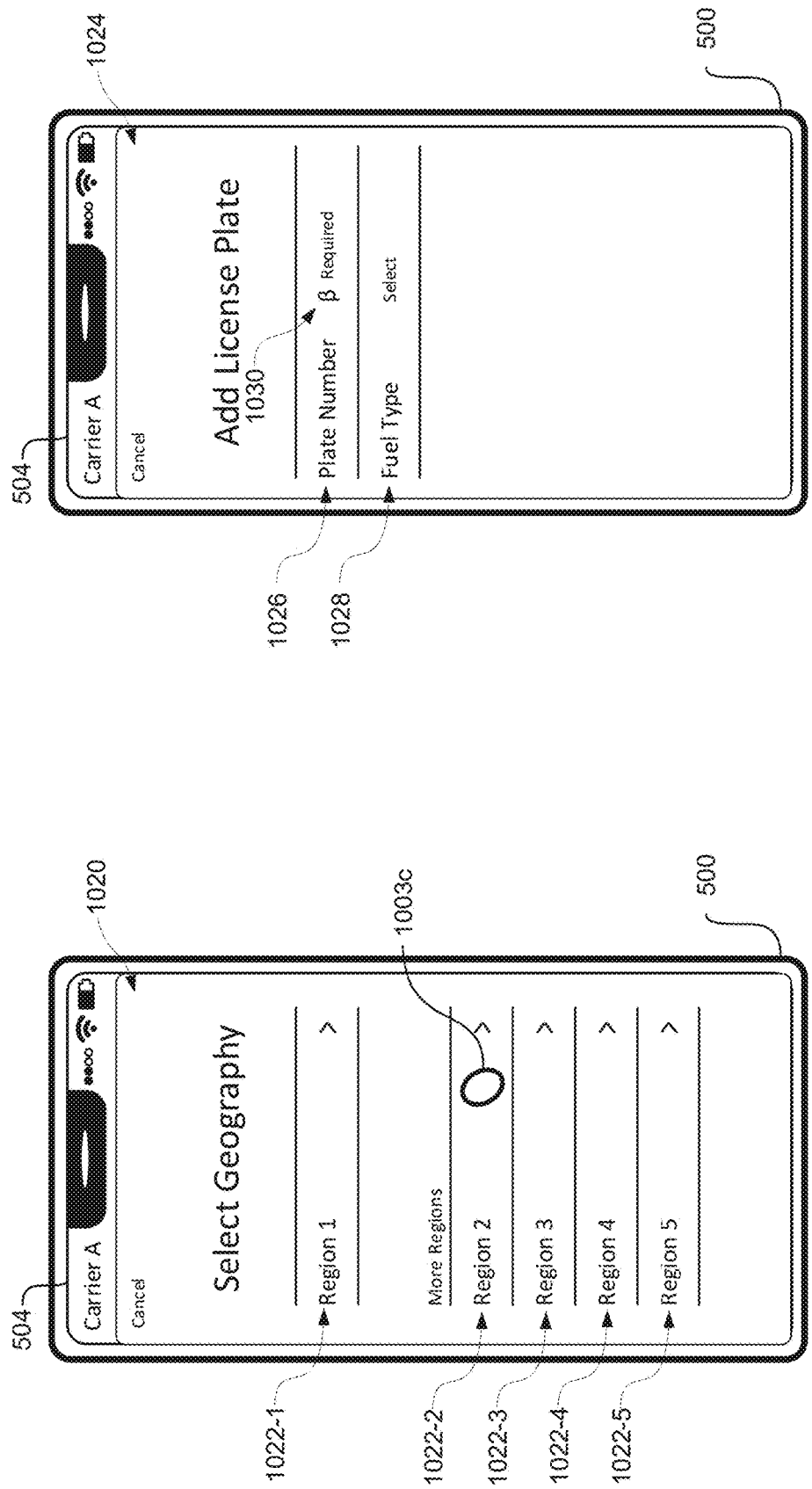
Figure 10H:
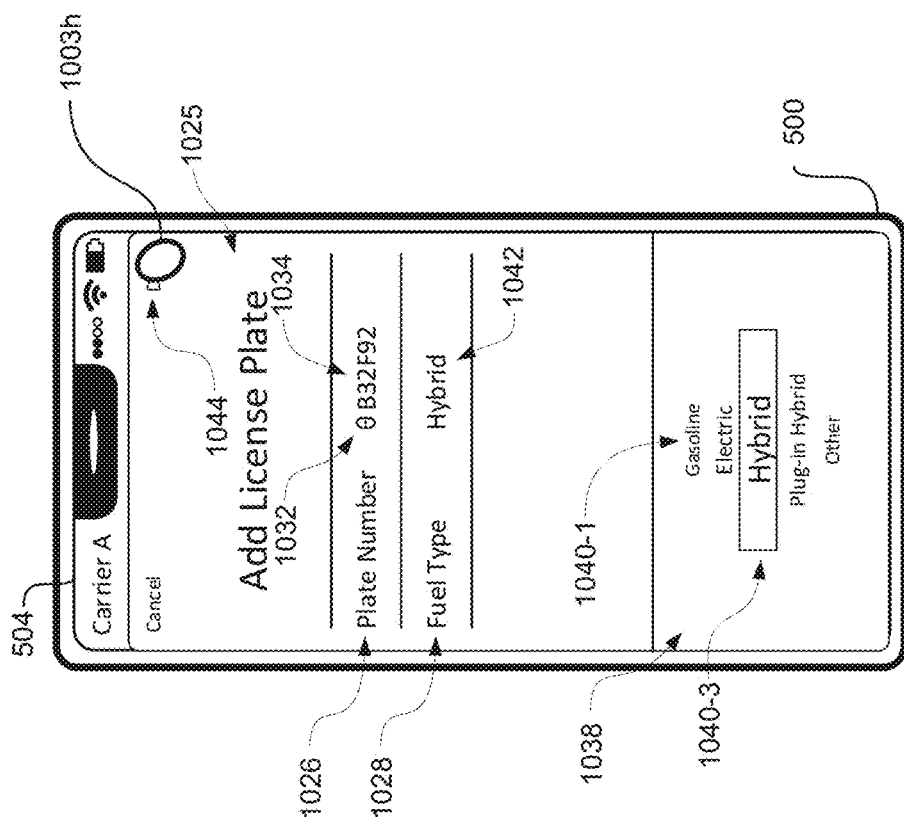
Figure 10G:
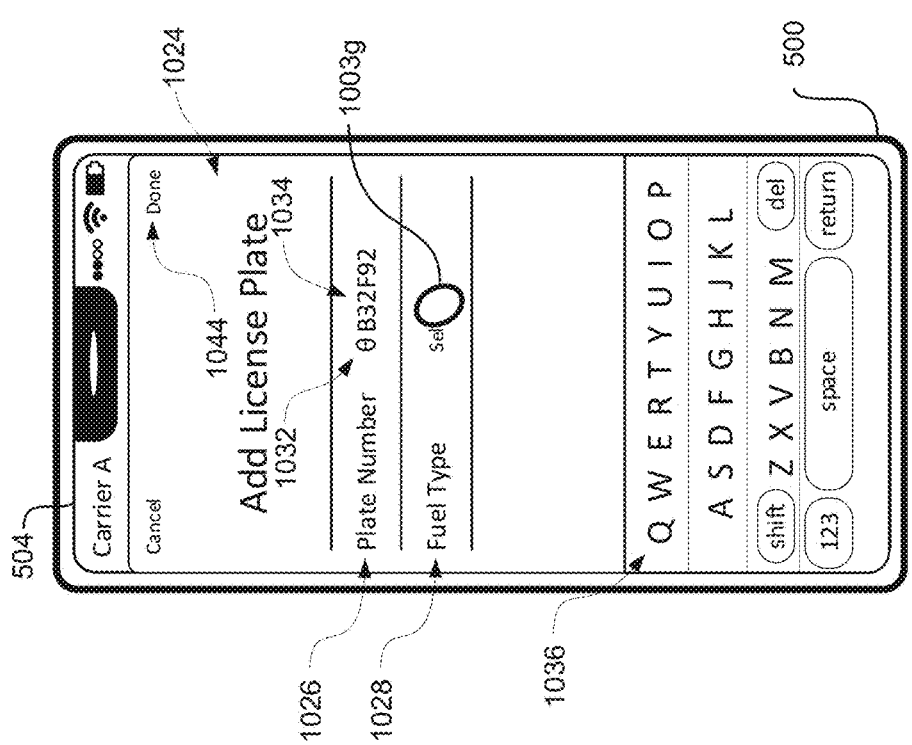
Figure 10L:
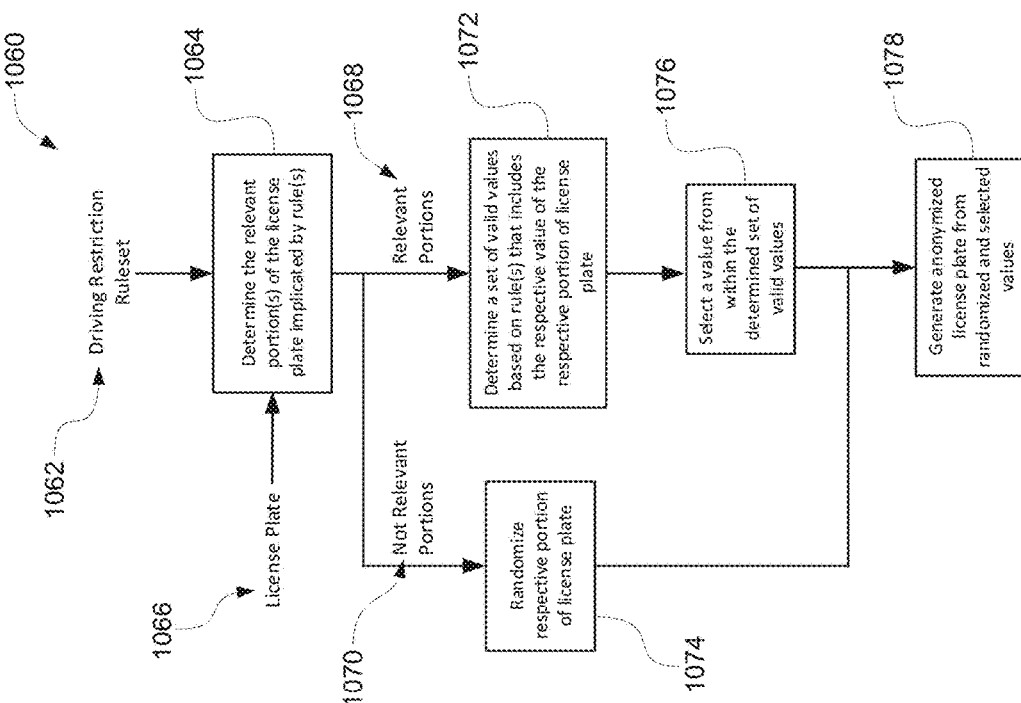
Figure 10K:
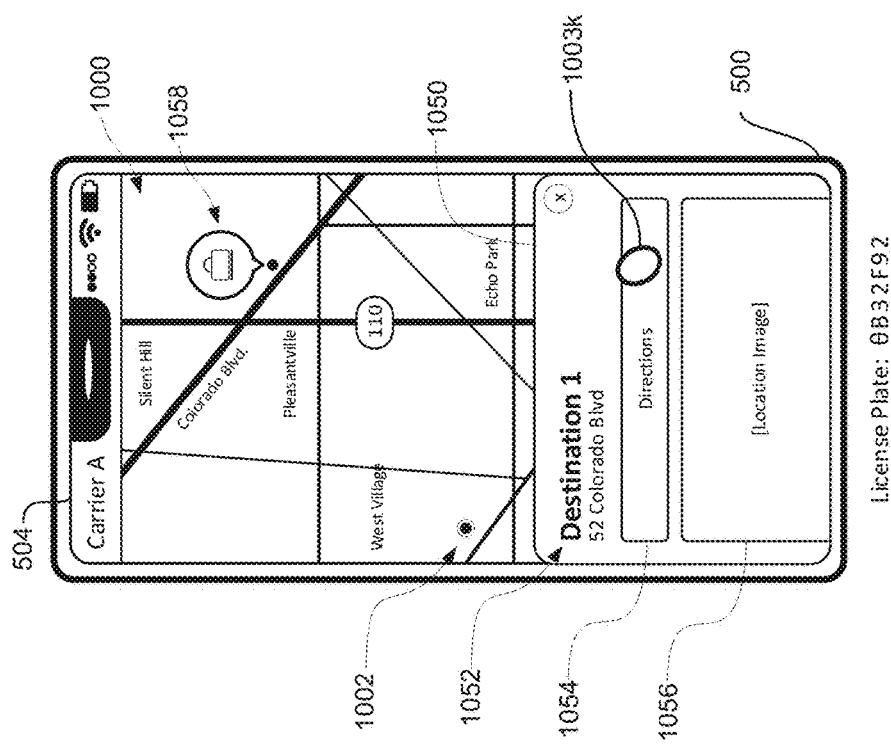
Figure 10N:
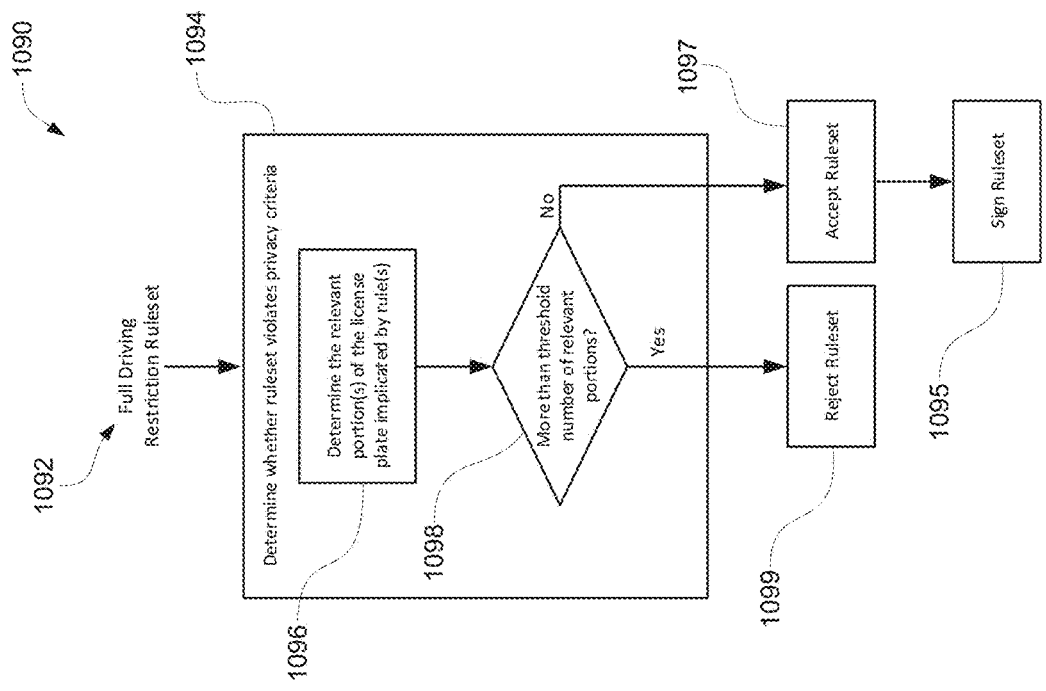
Figure 10M:
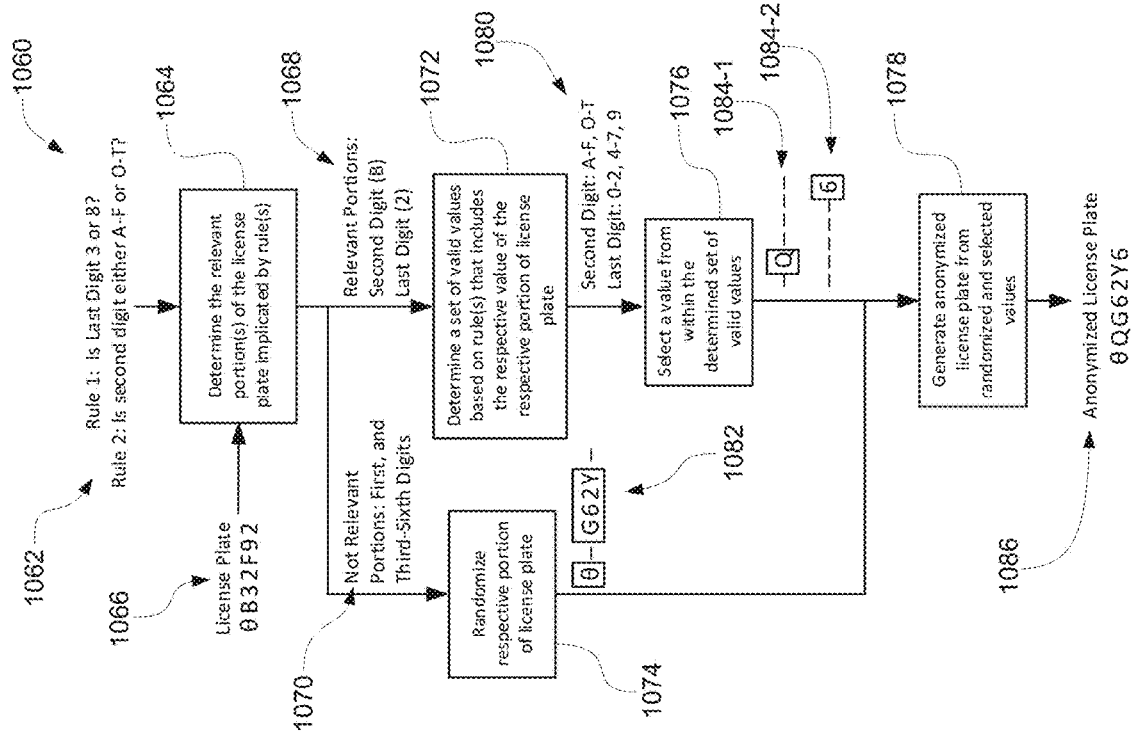
Figure 10P:
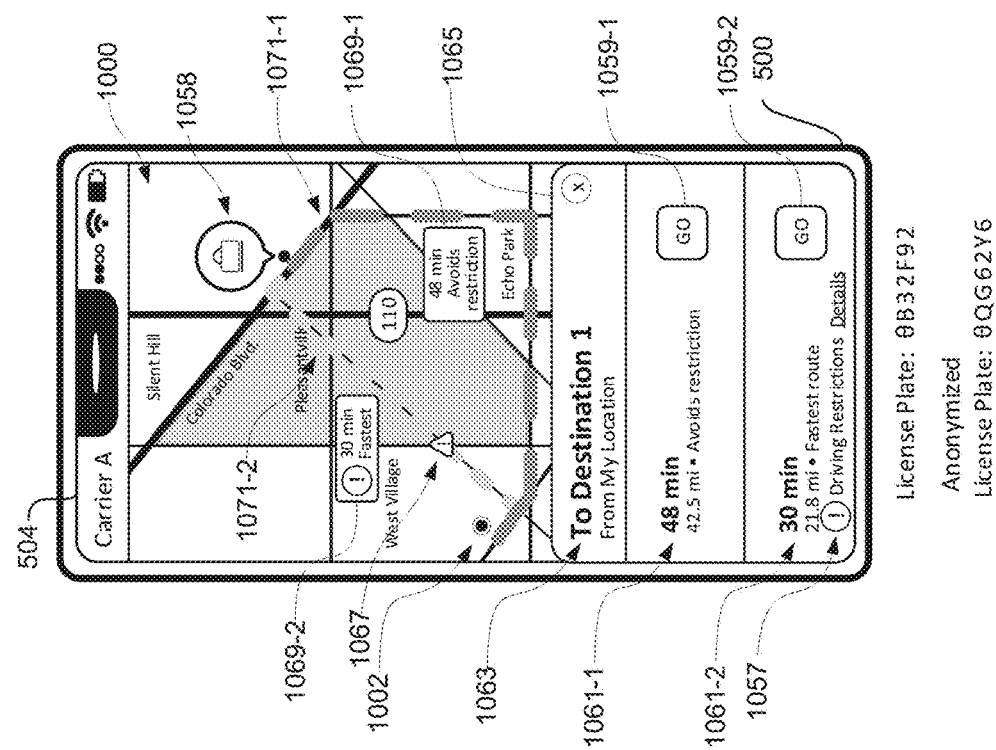

FIGS. 10A-10P illustrate exemplary ways in which a vehicle identifier is anonymized in accordance with some embodiments of the disclosure. The embodiments in these figures are used to illustrate the processes described below, including the processes described with reference to FIG. 11. Although FIGS. 10A-10P illustrate various examples of ways an electronic device is able to perform the processes described below with reference to FIG. 11, it should be understood that these examples are not meant to be limiting, and the electronic device is able to perform one or more processes described below with reference to FIG. 11 in ways not expressly described with reference to FIGS. 10A-10P.

FIG. 10A illustrates electronic device 500 displaying user interface 1000 (e.g., via a display device, via a display generation component, etc.). In some embodiments, user interface 1000 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

In some embodiments, user interface 1000 is a user interface of a map application (e.g., similar to user interface 800 described above with respect to FIG. 8A). In some embodiments, the map application is an application installed on device 500.

In some embodiments, user interface 1000 includes a representation of a map including the current location of the electronic device. In FIG. 10A, user interface 1000 does not include any suggested routes or driving directions and is optionally a default user interface of the map application (e.g., in a browsing state) that includes location indicator 1002 that represents the current location of device 500 on the representation on the map. In FIG. 10A, device 500 also displays user interface 1004. In some embodiments, user interface 1004 includes search field 1006 for performing a search for a location or business. In some embodiments, user interface 1004 includes one or more shortcuts 1050 that are selectable to search for and display the respective location associated with the respective shortcut. For example, the one or more shortcuts 1050 can include a "Home" shortcut that is optionally selectable to display the location associated with "Home", a "Work" shortcut that is optionally selectable to display the location associated with "Work", and a "Gym" shortcut that is optionally selectable to display the location associated with "Gym".

In some embodiments, a driving restriction corresponds to a restriction that defines that a certain set of vehicles may travel without restriction and a second set of vehicles are restricted from travel. In some embodiments, other restrictions are possible (e.g., a first set of vehicles must follow a certain set of rules or regulations while a second set follows a different set of rules or regulations, or all vehicles with a certain characteristic(s) are restricted from travel, etc.). For example, if a particular region or set of roads are controlled by a driving restriction, certain vehicles with certain characteristics defined by the restriction may be restricted from traveling within the region (or on the roads), while other vehicles without those certain characteristics may not be restricted from traveling within the region (or on the roads). For example, a restriction can exist in which odd numbered license plates (e.g., vehicles with license plates that end in an odd number) are prohibited from driving in a particular location during particular times and dates while even numbered license plates (e.g., vehicles with license plates that end in an even number) are not prohibited from driving at any time (or are prohibited from driving in the particular location during other times). In some embodiments, other vehicle identifiers are possible, such as the vehicle identification number (VIN). Another example of a driving restriction can be that vehicles over a particular gross weight are prohibited from driving on a particular highway during business hours, while vehicles under the gross weight threshold are not prohibited from driving on the highway.

As used herein, a restricted region is a geographic area in which a respective driving restriction applies. For example, if a driving restriction indicates that odd numbered license plates are prohibited from driving in a particular geographic area, but even numbered license plates are not prohibited from driving in the particular geographic area, then that entire geographic area in which the restriction applies is optionally referred to as a restricted region.

As shown in FIG. 10A, user interface 1004 includes indication 1008 (e.g., sharing similar features as indication 812 described above with respect to FIG. 8B). In some embodiments, indication 1008 includes a description to add license plate information to the map application. In some embodiments, indication 1008 includes button 1010 that is selectable to initiate the process to add license plate information to the map application.

In some embodiments, indication 1008 is displayed in accordance with a determination that device 500 is at or near a restricted region that prohibits vehicle based on the license plate numbers of the vehicles (e.g., in the restricted region or within 10 miles, 30 miles, 50 miles, 100 miles, etc. of a restricted region). In some embodiments, indication 1008 is displayed if the map application does not yet have any license plate information. For example, after the user completes the process to add a license plate to the map application (as will be described in more detail below), indication 1008 is no longer shown in user interface 1004. In some embodiments, indication 1008 is displayed even if the user has previously added license plate information to the map application.

In some embodiments, a user is able to add license plate information to the map application via a settings user interface for the map application (e.g., without requiring indication 1008 be displayed in user interface 1004). For example, a user is able to initiate the process to add a license plate by adding a vehicle to the map application via a user interface for managing vehicles that have been added to the map application, similar to the user interface 862 described above with respect to FIG. 8J. For example, user interface 862 can include one or more options for adding vehicles, editing vehicles, and/or deleting vehicles from the map application. In such embodiments, a user is able to initiate a process to add a vehicle to the map application and provide the license plate information for the added vehicle (e.g., similar to the process for adding a license plate to the map application in response to selection of button 1010, described below).

In some embodiments, providing the map application with license plate information allows the electronic device (e.g., device 500) to display one or more suggested routes based on whether the user's vehicle is prohibited or not prohibited from traveling in the restricted region, similar to the process described above with respect to method 700. In some embodiments, the suggested routes are determined by transmitting a request for navigation routes to a navigation server (e.g., routing server) and receiving, in return, one or more potential navigation routes. In some embodiments, the navigation server is able to receive anonymized license plate information (or other anonymized vehicle identifiers, such as an anonymized VIN number, an anonymized serial number, etc.) and provide navigation routes based on whether the provided anonymized vehicle identifier falls within the restriction (e.g., the vehicle is prohibited from driving in the restricted region) or outside of the restriction (e.g., the vehicle is not prohibited from driving in the restricted region).

As will be described in more detail below, device 500 is able to protect the user's privacy by modifying one or more values of the user's vehicle identifier (e.g., license plate, VIN number, etc.), thus anonymizing the vehicle identifier, before transmitting an anonymized vehicle identifier to the navigation server. In some embodiments, the vehicle identifier information provided by the user (e.g., the un-anonymized license plate, the actual license plate number, etc.) is stored on device 500 and is never transmitted away from device 500. In some embodiments, the vehicle identifier information provided by the user is deleted from device 500 after the anonymized vehicle identifier is generated (e.g., in response to generating the anonymized license plate or in response to transmitting the anonymized licensed plate to the navigation server.)

In FIG. 10A, user input 1003*a* is received selecting button 1010. In some embodiments, in response to user input 1003, device 500 initiates a process to add license plate information to the map application, as shown in FIG. 10B. In FIG. 10B, device 500 displays user interface 1012. User interface 1012 is optionally a splash page or introduction page for adding license plate information to the map application. For example, user interface 1012 can include introduction 1014 that describes the process of providing license plate information to the map application and/or the benefits of providing license plate information to the map application. In some embodiments, user interface 1012 includes button 1016 that is selectable to continue the process to add license plate information to the map application. In some embodiments, user interface 1012 includes button 1018 that is selectable to terminate the process to add license plate information to the map application. As described above, after terminating the process to add license plate information to the map application, a user is able to initiate the process via a settings user interface for the map application.

In FIG. 10B, user input 1003*b* is received by a user selecting button 1016. In some embodiments, in response to user input 1003*b*, device 500 continues the process to add license plate information to the map application and displays user interface 1020 as shown in FIG. 10C. In some embodiments, user interface 1020 includes one or more options for selecting the geographic region in which the vehicle is registered. For example, option 1022-1 corresponds to region 1, option 1022-2 corresponds to region 2, option 1022-3 corresponds to region 3, etc. In some embodiments, different geographic regions can have different license plate patterns or license plate values and providing the map application with the respective region in which the vehicle is registered allows the map application to verify that a license plate is valid (e.g., has the correct number of digits, has valid values for respective digits, etc.).

In some embodiments, device 500 prioritizes or otherwise visually emphasizes one or more regions based on the current location of device 500. For example, in FIG. 10C, device 500 determines, via one or more location determination processes (e.g., GPS data, cellular tower triangulation, etc.), that device 500 is located in region 1. Thus, in accordance with a determination that device 500 is located in region 1, user interface 1020 displays option 1022-1 corresponding to region 1 at a location on user interface 1020 separate from the options for other regions, as shown in FIG. 10C. Thus, device 500 is able to suggest a region to the user by displaying region 1 as the first option visually distinguished from the other regions, thereby increasing the efficiency of the device by emphasizing the more likely option to the user.

In FIG. 10C, a user input 1003*c* is received by selecting option 1022-2 corresponding to region 2. In some embodiments, in response to user input 1003*c*, device 500 displays user interface 1024. In some embodiments, user interface 1024 is a user interface for entering a license plate number. For example, in FIG. 10D, user interface 1024 includes entry 1026 for entering a license plate number and entry 1028 for selecting the vehicle's fuel type. In FIG. 10D, because the user selected region 2, device 500 is able to automatically determine that vehicles registered in region 2 have the same first character and thus device 500 automatically populates entry 1026 with the first character 1030 (e.g., a "beta" character). In some embodiments, device 500 can set the number of digits of a license plate or restrict the available values for respective digits based on the license plate pattern for the selected region.

It is understood that although FIG. 10D illustrates user interface 1024 including entry 1026 corresponding to the license plate number and entry 1028 corresponding to the fuel type, more or fewer entries are possible and both entries need not be displayed. For example, if a geographic region considers a vehicle's license plate number, but does not consider a vehicle's fuel type when making a driving restriction determination, then user interface 1024 can include only a single entry for entering a license plate number without including an entry for providing a fuel type. Similarly, if a geographic region considers a vehicle's fuel type but not the vehicle's license plate number, then user interface 1024 can include only a single entry for providing the fuel type without including an entry for providing a license plate number. Other embodiments for other characteristics of a vehicle and/or vehicle identifiers are possible. In some embodiments, any combination and any number of entries are possible.

FIG. 10E illustrates an alternative embodiment in which user input 1003e is received selecting option 1022-1 corresponding to region 1. In some embodiments, region 1 has a different license plate pattern than region 2. For example, in response to user input 1003e, device 500 displays user interface 1024 with entry 1026 automatically populated with first character 1032 (e.g., a "theta" character) that is different than first character 1030, as shown in FIG. 10F. Thus, in the embodiments shown in FIGS. 10C-10F, license plates in region 1 all have "theta" as the first character and license plates in region 2 all have "beta" as the first character. It is understood that device 500 is able to adapt to any license plate pattern for any geographic region and automatically populate one or more characters if respective digits of a license plate are fixed for a respective region.

In some embodiments, based on the determination that device 500 is located in region 1, device 500 automatically selects option 1022-1 corresponding to region 1 as the region of registration for the vehicle being added. In such embodiments, device 500 does not display user interface 1020 and, instead, proceeds to user interface 1024 as if option 1022-1 corresponding to region 1 were selected.

In FIG. 10F, a user input 1003f is received by a user selecting entry 1026. In some embodiments, in response to user input 1003f, device 500 displays virtual keyboard 1036 for entering characters into entry 1026, as shown in FIG. 10G. For example, in FIG. 10G, the user has provided characters 1034 (e.g., by selecting keys on virtual keyboard 1036) which, in combination with first character 1032, corresponds to the license plate for the user's vehicle that will be added to the maps application.

In FIG. 10G, a user input 1003g is received selecting entry 1028. In some embodiments, in response to user input 1003g, device 500 displays user interface 1038, as shown in FIG. 10H. As shown in FIG. 10H, user interface 1038 includes one or more options corresponding to different fuel types. For example, option 1040-1 corresponds to a gasoline fuel type and option 1040-3 corresponds to a hybrid fuel type. In some embodiments, the options are scrollable to change the option that is currently selected. Thus, a user is able to select the fuel type or power type for the user's vehicle. As will be discussed in more detail below, in some embodiments, a vehicle's fuel type can determine whether one or more sets of driving restriction rules apply to the vehicle. For example, a first set of rules may apply to cars with a gasoline fuel type while a different set of rules may apply to electric vehicles.

In FIG. 10H, after having selected option 1040-3 corresponding to a hybrid fuel type (e.g., and thus populating entry 1028 with hybrid option 1042), a user input 1003h is received by a user selecting option 1044 to complete the process for adding the license plate to the map application. In some embodiments in response to user input 1003h, device 500 displays user interface 1025, as shown in FIG. 10I. In some embodiments, user interface 1025 includes entry 1026 and entry 1028 populated with the user-provided values to confirm the license plate and fuel type details. In FIG. 10I, user input 1003i is received corresponding to a confirmation of the license plate and fuel type details. In some embodiments, in response to user input 1003i, device 500 adds the respective vehicle with the respective license plate and fuel type to the map application, and, optionally, provides a notification indication (e.g., pop-up 1048), such as shown in FIG. 10J. In some embodiments, device 500 displays user interface 1000 corresponding to the map application. In some embodiments, pop-up 1048 that indicates that the vehicle has been successfully added to the map application. As shown in FIG. 10J, indication 1008 is no longer shown in user interface 1000. In some embodiments, indication 1008 is only shown if the user has not previously added a license plate to the map application. Although indication 1008 is no longer shown in user interface 1000, a user is optionally able to initiate the process to add a license plate to the map application (e.g., add another license plate) via a settings user interface for the map application (e.g., similar to user interface 848 and/or 862 as described above with respect to FIGS. 8I-8J). Although the above disclosure describes a process for providing license plate information to the map application (e.g., adding a license plate to the map application), it is understood that the same or a similar process can be performed for adding other types of vehicle identifiers and/or vehicle characteristics to the map application.

In FIG. 10K, a user input 1003k is received requesting directions to Destination 1 (e.g., represented by icon 1058 in user interface 1000) while the currently active vehicle has a license plate of "θB32F92". As discussed above with respect to methods 700 and 900, a user is able to select the currently selected vehicle from a list of vehicles. In some embodiments, characteristics of the currently selected vehicle is used to determine one or more suggested navigation routes, as discussed above with respect to methods 700 and 900.

In some embodiments, in response to user input 1003k corresponding to a request for navigation routes (e.g., directions), device 500 determines one or more suggested routes for the selected vehicle. In some embodiments, determining one or more suggested routes for the selected vehicle includes transmitting a request for routes to a navigation server or routing server. In some embodiments, the request for routes can include starting location and destination location information. In some embodiments, the request for routes can include the license plate number of the vehicle for which routes are requested.

As discussed above, in some embodiments, certain geographic regions can have one or more driving restrictions. In some embodiments, the one or more driving restrictions are based on one or more characteristics of the vehicle seeking to travel within the restricted region. The examples described herein illustrate a driving restriction that uses the values of a vehicle's license plate to define whether a vehicle is prohibited or not prohibited from traveling within the restricted region during the restricted time period (although it is understood that other types of driving restrictions are possible). It is understood, however, that although the example illustrated herein is based on the vehicle's license plate, a restriction can be based on any characteristic or any identifier of a vehicle and device 500 can determine one or more routes and/or perform the below-described anonymization process.

It may be desired, however, to avoid transmitting the user's vehicle identifier information (e.g., a license plate number), away from device 500 (e.g., to a navigation server). In some embodiments, avoiding transmission of the user's vehicle identifier information advantageously protects the user's privacy by not transmitting identifying information outside of device 500 and by not transmitting the user's driving history or destination history outside of device 500. Thus, in some embodiments, device 500 anonymizes the user's vehicle identifier to generate an anonymized vehicle identifier that is transmitted to the navigation server and safeguards the user's actual vehicle identifier information within device 500.

FIG. 10L illustrate an exemplary method 1060 of anonymizing a license plate. At step 1064, an electronic device (e.g., device 500) receives driving restriction ruleset 1062 and determines, based on driving restriction ruleset 1062, the portions of the license plate that are relevant to the respective driving restriction. In some embodiments, driving restriction ruleset 1062 is a simplified ruleset that has been generated from a full ruleset (e.g., as will be described in further detail below with respect to FIGS. 10N-10O). In some embodiments, driving restriction ruleset 1062 is a signed and encrypted package, as will be described in further detail below with respect to FIGS. 10N-10O. In some embodiments, a driving restriction ruleset 1062 includes one or more rules that define which license plates are prohibited from driving in a restricted region and which license plates are not prohibited from driving in the restricted region. For example, a driving restriction ruleset can include a rule that indicates that odd license plates are prohibited from driving in the restricted region and even license plates are not prohibited from driving in the restricted region. In some embodiments, step 1064 determines that a respective portion of the license plate is relevant to the respective driving restriction if the respective portion of the license plate can affect the determination of whether the vehicle is prohibited or not prohibited from driving in the restricted region. In some embodiments, step 1064 determines that a respective portion of the license plate is relevant to the respective driving restriction if a rule in the driving restriction ruleset 1062 defines two different groups of values for the respective portion of the license plate (optionally without indicating whether the groups are prohibited or are not prohibited from driving in the restriction region). For example, if a respective rule indicates that odd license plates are prohibited while even license plates are not prohibited, then at step 1064, the electronic device can determine that the last digit of the license plate is relevant (e.g., and optionally the other digits are not relevant, if there are no other rules in driving restriction ruleset 1062). In another example, if a respective rule asks whether the last digit of the license plate falls within a first set of values that includes only even values or a second set of values that includes only odd values, then at step 1064, the electronic device can determine that the last digit of the license plate is relevant (e.g., and optionally the other digits are not relevant, if there are no other rules in driving restriction ruleset 1062).

In some embodiments, based on the determination from step 1064, method 1060 processes the relevant portions of the license plate separately from the not relevant portions of the license plate. For example, relevant portions 1068 are processed at step 1072 and not relevant portions 1070 are processed at step 1074. At step 1072, the electronic device determines the set of valid values for the respective portion of the license plate that are within the same set as the user's actual license plate. For example, if a respective rule indicates that a first set for the last digit of a license plate includes only even numbers and a second set includes only odd numbers, at step 1072, the device can determine whether the last digit of the user's license plate is even or odd. If the last digit is even, then the device optionally determines that the last digit of the user's license plate is within the "even" group and that the set of values that includes the user's actual license plate consists of even values. On the other hand, if the last digit of the user's actual license plate is odd, then the device optionally determines that the last digit of the user's plate is within the "odd" group and that the set of valid values that includes the user's actual license plate consists of odd values.

Based on this determination, at step 1076, the device is able to determine that, to maintain the same type of restriction, the device should select a value from the respective set of values that includes the value of the respective digit in the user's actual license plate. Thus, at step 1076, the electronic device selects a value from the respective set of values that includes the value of the respective digit in the user's actual license plate. For example, if the last digit of the user's actual license plate is odd, then the device optionally chooses an odd value for the last digit of the anonymized license plate. On the other hand, if the last digit of the user's actual license plate is an even number, then the device optionally chooses an even value for the last digit of the anonymized license plate. In some embodiments, the selection is performed randomly (e.g., randomly selecting a value from the set of values). In some embodiments, the selected values are different from the original value of the respective portion of the actual license plate. In some embodiments, the selected values are the same as the original value of the respective portion of the actual license plate (e.g., if the set of values includes only one value—the actual value of the respective portion of the actual license plate). In some embodiments, step 1076 is performed for each relevant portion of the license plate.

At step 1074, values for the not relevant portions 1070 of the license plate are selected. In some embodiments, because the rules indicate that the not relevant portions 1070 of the license plate are not divided into different groups of values, the electronic device is able to select amongst all valid values for the respective portion of the license plate. Thus, the device need not determine multiple different sets of values to select amongst (e.g., as it does for relevant portions 1068, at step 1072). Therefore, the set of values to select from includes all valid values for the respective portion of the license plate. In some embodiments, the electronic device need only select from the set of valid values, without regard to whether the values are within any particular set of values. Thus, at step 1074, the device optionally randomly selects amongst all possible valid values. In some embodiments, the selected values are different from the original value of the respective portion of the actual license plate. In some embodiments, the selected values are the same as the original value of the respective portion of the actual license plate. In some embodiments, step 1074 is performed for each portion of the license plate that is not relevant to the restriction.

At step 1078, after values for all portions of the license plate have been selected (e.g., via steps 1072 and 1076 or via step 1074), the electronic device optionally generates the anonymized license plate by merging the selected values into a single anonymized license plate. In some embodiments, the anonymized license plate is transmitted to the routing or navigation server when a user requests navigation routes.

In some embodiments, method 1060 described above is performed in response to a request for navigation routes. For example, method 1060 is performed every time the user requests routes and the anonymized license plate is discarded after completion of the request. In some embodiments, method 1060 is performed periodically (e.g., every day, every 30 days, every year, etc.). In some embodiments, method 1060 is performed every time the electronic device receives a set of rules (e.g., from a rules server, from navigation server, etc.). In some embodiments, method 1060 is performed every time the electronic device determines that the set of rules has changed.

FIG. 10M illustrates an example method of generating an anonymized license plate with an example driving restriction ruleset. In FIG. 10M, driving restriction ruleset 1062 includes a first rule that asks whether the last digit of the license plate is either a 3 or an 8, and a second rule that asks whether the second digit of the license plate is a letter within the range of A-F or O-T. As shown in FIG. 10M, neither the first rule nor the second rule defines whether the particular values indicated results in a driving prohibition or doesn't result in a driving prohibition.

At step 1064, the electronic device determines from the first rule and the second rule that the relevant portions 1068 of the license plate consist of the second digit and the last digit. As shown, because the first rule asks whether the last digit is a 3 or 8, the electronic device is able to determine that the value of the last digit of the license plate is a factor in determining whether a vehicle is prohibited or not prohibited from driving in a restricted region. Thus, the electronic device optionally determines that the last digit is relevant to the driving restriction. Similarly, because the second rule asks whether the second digit is in the range of A-F or O-T, the electronic device is able to determine that the value of the second digit of the license plate is a factor in determining whether a vehicle is prohibited or not prohibited from driving in a restricted region. Thus, the electronic device optionally determines that the second digit is relevant to the driving restriction. As shown in FIG. 10M, relevant portions 1068 includes the second digit of the license plate and the last digit of the license plate.

Additionally, at step 1064, because driving restriction ruleset 1062 does not include any more rules than the first rule or the second rule, the driving restriction ruleset 1062 does not care about the value of the first digit and the third through sixth digits of the license plate. Thus, the electronic device optionally determines that not relevant portions 1070 includes the first and third through sixth digits of the license plate.

At step 1072, the electronic device determines the set of values within which to select values for the anonymized license plate. In the embodiment illustrated in FIG. 10M, because the second rule asks whether the second digit is within the range of A-F or O-T, the electronic device optionally determines that the values for the second digit are organized into two sets: a first set that includes the values A-F and O-T (e.g., the set of values that fall "within" the second rule), and a second set that includes the values G-M and U-Z (e.g., the set of values that fall "outside" of the second rule). In the example illustrated in FIG. 10M, only letters are valid values for the second digit. After determining the sets of values for the second rule, the electronic device determines which of the sets of values is the set from which to select values for the anonymized license plate. As described above, to maintain the same restriction as the actual license plate, the electronic device selects from the set of values that includes the actual value of the respective portion of the actual license plate. Thus, because the second digit of the actual license plate is a "B", the value of the second digit of the actual license plate falls "within" the second rule. Thus, the electronic device determines that the set of values to select from 1080 for the second digit is the set of values that falls "within" the second rule (e.g., the set that includes the values A-F and O-T).

Similarly, because the first rule asks whether the last digit is a three or an eight, the electronic device optionally determines that the values for the last digit are organized into two sets: a first set that includes the values 3 and 8 (e.g., the set of values that fall "within" the first rule), and a second set that includes the values 0-2, 4-7, and 9 (e.g., the set of values that fall "outside" of the first rule). After determining the sets of values for the first rule, the electronic device determines which of the sets of values is the set from which to select values for the anonymized license plate. As described above, to maintain the same restriction as the actual license plate, the electronic device selects from the set of values that includes the actual value of the respective portion of the actual license plate. Thus, because the last digit of the actual license plate is a "2", the value of the last digit of the actual license plate falls "outside" the first rule. Thus, the electronic device determines that the set of values to select from 1080 for the last digit is the set of values that falls "outside" of the first rule (e.g., the set that includes the values 0-2, 4-7, and 9).

At step 1076, after determining the set of values to select within, the electronic device selects (optionally randomly) a value from within the respective sets. In FIG. 10M, with respect to the second digit, the electronic device selects "Q" 1084-1 from the set of values that includes A-F and O-T. Thus, the selected value for the second digit is treated the same as the actual value of the second digit of the actual license plate and thus maintains the same restriction state as the actual license plate while simultaneously concealing the actual value of the second digit of the user's actual license plate. In FIG. 10M, with respect to the last digit, the electronic device selects "6" 1084-2 from the set of values that includes 0-2, 4, 7, and 9. Thus, the selected value for the last digit is treated the same as the actual value of the last digit of the actual license plate and thus maintains the same restriction state as the actual license plate while simultaneously concealing the actual value of the last digit of the user's actual license plate.

At step 1074, the electronic device selects from within a set of all valid values for the not relevant portions of the license plate. For example, the electronic device selects from within the set of all valid values for the first digit, for the third digit, the fourth digit, the fifth digit, and the sixth digit of the license plate. In FIG. 10M, the electronic device selects "0" for the first digit, "G" for the third digit, "6" for the fourth digit, and "Y" for the fifth digit. In some embodiments, the selection is a random selection amongst the valid values. Thus, as shown in FIG. 10M, selecting a random value for a respective digit can result in selecting the same value (e.g., the first digit remained the same), or can result in selecting a letter when the original value was a letter (e.g., the selected value for the third digit is "G" when the original value for the third digit is a "3", assuming, for example, that both letters and numbers are valid values for the third digit), or vice versa.

After performing step 1074 and/or step 1076 and selecting anonymized values for all portions of a license plate (e.g., for all digits of a license plate), at step 1078, the electronic device merges all of the anonymized values into a singular anonymized license plate. For example, the first digit of the anonymized license plate is "θ" (e.g., selected in step 1074), the second digit is "Q" (e.g., selected in step 1076), the third digit is "G" (e.g., selected in step 1074), the fourth digit is a "6" (e.g., selected in step 1074), the fifth digit is a "2" (e.g., selected in step 1074), the sixth digit is a "Y" (e.g., selected in step 1074), and the last digit is a "6" (e.g., selected in step 1076), thus resulting in a full anonymized license plate 1086 of "θQG62Y6". As shown, the anonymized license plate is able to protect the original value of the user's license plate ("θB32F92") while maintaining the same restriction state as the original value of the user's license plate (e.g., will be treated the same by the navigation server as the user's actual license plate). Thus, providing the anonymized license plate to the navigation server when requesting navigation routes will result in the same set of routes as if the electronic device provided the user's actual license plate, while simultaneously maintaining the privacy of the user.

FIG. 10N illustrates an exemplary method 1090 of validating a driving restriction ruleset. In some embodiments, method 1090 is performed at a server, such as a rules validation server. As will be described in more detail below with respect to FIG. 10O, a rules validation server is optionally a server that receives a set of rules, determines whether the rules satisfy or violate certain criteria, and signs and/or encrypts the rules if the rules are validated. In some embodiments, validating a driving restriction ruleset includes determining whether the driving restriction ruleset violates certain criteria (e.g., or whether a driving restriction ruleset satisfies certain criteria). In some embodiments, at step 1094, a rules validation server receives a full driving restriction ruleset 1092 and determines whether the ruleset violates privacy criteria. In some embodiments, full driving restriction ruleset 1092 include one or more rules that define the set of vehicles that are prohibited from driving in the restricted region and the set of vehicles that are not prohibited from driving in the restricted region. In some embodiments, the full driving restriction ruleset 1092 includes an indication of whether a respective set of values are prohibited from driving in the restricted region and whether a second respective set of values are not prohibited from driving in the restricted region. In some embodiments, the full driving restriction ruleset 1092 optionally includes more information (e.g., more definitions, more rules, etc.) than the simplified driving restriction ruleset (e.g., such as driving restriction ruleset 1062 described above with respect to FIGS. 10L-10M).

In some embodiments, step 1094 includes step 1096 and step 1098. For example, determining whether full driving restriction ruleset 1092 violates the privacy criteria includes determining the relevant portions of the license plate implicated by the rules (step 1096) and determining whether there are more than a threshold number of relevant portions (step 1098). In some embodiments, at step 1096, the rules validation server determines, from the full driving restriction ruleset 1092, the portions of the license plate that are relevant to the restricted region. In some embodiments, determining the relevant portions is similar to the process described above with respect to step 1072, the details of which will not be repeated here for brevity. At step 1098, after determining the portions of the license plate that are relevant to the restricted region, the validation server determines whether there are more than a threshold number of portions that are relevant to the restricted region. If there are more than the threshold number of portions, then the privacy criteria are optionally violated, and if there are less than the threshold number of portions, then the privacy criteria is optionally not violated. In some embodiments, the threshold number of portions is a third of the digits of the license plate, half of the digits, two thirds of the digits, three quarters of the digits, all of the digits, etc. For example, in the example illustrated in FIG. 10M where the license plate has seven digits, if the validation server determines that full driving restriction ruleset 1092 indicates that all seven digits of the license plate are relevant to the driving restriction, then the privacy criteria is optionally violated. In such an example, if a driving restriction ruleset indicates that all digits are relevant, then there exists a risk that the user's privacy will be violated. For example, the anonymization process described above may not sufficiently anonymize the user's license plate to ensure that the user's identity is not revealed and/or the user's privacy is not violated. In some embodiments, if a driving restriction ruleset indicates that all digits are relevant, then it could indicate that the driving restriction ruleset has been maliciously altered by a unvalidated entity. For example, the driving restriction ruleset may be defective as a result of an error in transmission or the driving restriction ruleset may have been hacked in an effort to cause devices to transmit user's full license plates to an unvalidated entity (e.g., a malicious entity). In such scenarios, it is desired to reject the full driving restriction ruleset and prevent electronic devices (e.g., such as device 500) from transmitting license plates, anonymous or otherwise, outside of the electronic device.

In some embodiments, the validation server can perform privacy validation steps other than those illustrated in method 1090. For example, the validation server can determine whether the rules define a set of values for a respective portion of a license plate with less than a threshold number of valid values. For example, if a respective rule defines a set of values to only include one value, then when performing the anonymization process, an electronic device would be unable to properly anonymize the user's license plate. For example, if a ruleset indicates that two thirds of the digits of a license plate are relevant and for each of those digits, every set of values only includes one value, then the anonymizing process described above would result in the exact same value for two thirds of the digits. Thus, the result would be an anonymized license plate that is still substantially the same as the original license plate such that the user's privacy would be violated. Thus, in some embodiments, the rules validation server can determine that the full driving restriction ruleset 1092 violates the privacy criteria.

Returning to step 1098, if the rules validation server determines that there are more than a threshold number of relevant portions (e.g., "Yes" branch), then the privacy criteria is violated, but if there are not more than the threshold number of relevant portions (e.g., "No" branch), then the privacy criteria is not violated. In some embodiments, if the privacy criteria is violated, then at step 1099, the rules validation server rejects the full driving restriction ruleset 1092. In some embodiments, rejecting the full driving restriction ruleset 1092 includes discarding the full driving restriction ruleset 1092, forgoing generating a simplified driving restriction ruleset from the full driving restriction ruleset 1092, and/or forgoing signing and/or encrypting the full or simplified driving restriction ruleset. In some embodiments, if a driving restriction ruleset is not validated (e.g., is rejected), then devices that depend on receiving a validated ruleset (e.g., such as the electronic devices described in FIGS. 10L-10M) are not able to anonymize a user's license plate. In such embodiments, the electronic device optionally forgoes anonymizing a user's license plate and forgoes providing customized navigation routes to the user. For example, the electronic device optionally only provides suggested routes that are not customized (e.g., without regard to whether a driving restriction applies to the user's vehicle), such as described above with respect to FIG. 6X.

At step 1907, if the privacy criteria is not violated, then the rules validation server accepts the ruleset. In some embodiments, accepting the ruleset includes generating a simplified ruleset based on the full ruleset. In some embodiments, the simplified ruleset defines the sets of values that are treated differently for the relevant portions of a license plate, similar to driving restriction ruleset 1062 described above with respect to FIGS. 10L-10M. In some embodiments, after accepting the ruleset and/or generating the simplified ruleset, the rules validation server signs the simplified ruleset at step 1095. In some embodiments, signing the simplified ruleset includes encrypting the simplified ruleset using a private key of the rules validation server. In some embodiments, when the encrypted simplified ruleset is received by an electronic device (e.g., such as device 500), the electronic device is able to decrypt the simplified ruleset using the public key of the rules validation server. In some embodiments, successfully decrypting the simplified ruleset using he public key of the rules validation server indicates that the rules are genuine and that they have been validated by the rules validation server (e.g., such that it is safe to use for anonymizing license plates to generate customized routes).

Figure 10O:
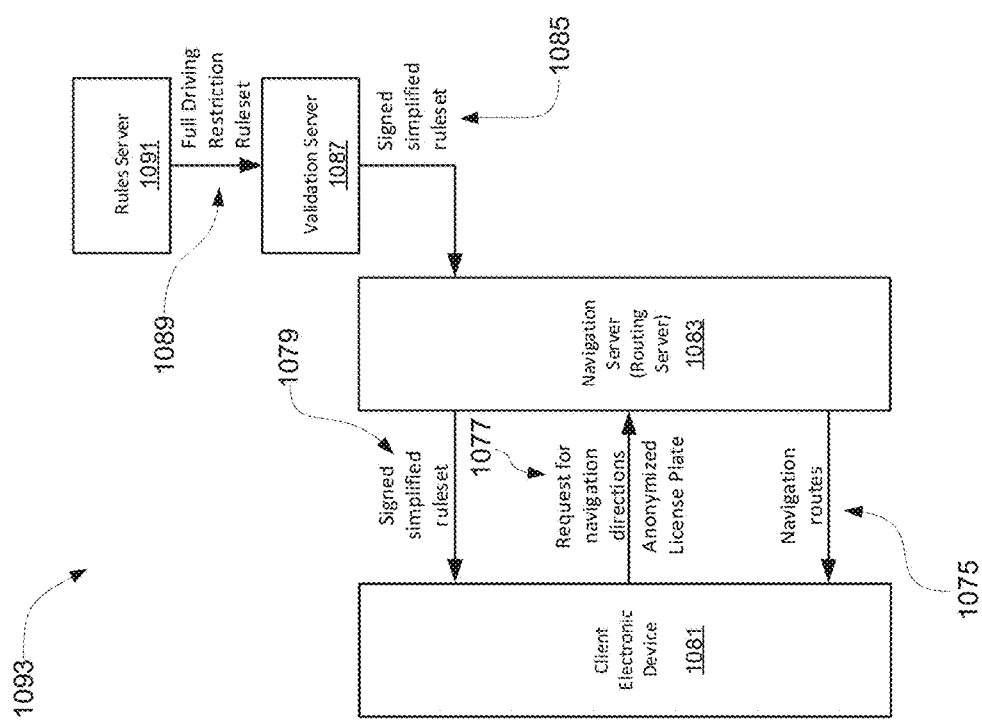

FIG. 10O illustrates an exemplary block diagram of ecosystem 1093, including the servers and/or devices and their interactions during the processes of validating rules, generating anonymous license plates, and providing navigation routes. In some embodiments, ecosystem 1093 includes rules server 1091, validation server 1087 (e.g., rules validation server), navigation server 1083 (e.g., routing server) and client electronic device 1081 (e.g., device 500). It is understood that any of the servers illustrated herein can be combined into a single server.

In some embodiments, rules server 1091 is a rules repository server in which the full driving restriction ruleset 1089 is maintained and/or stored. In some embodiments, in response to a request for the full driving restriction ruleset 1089, rules server 1091 transmits the full driving restriction ruleset 1089 to validation server 1087. In some embodiments, validation server 1087 issues a request for the full driving restriction ruleset 1089 periodically (e.g., every day, every 15 days, every 30 days, every 3 months, every 6 months, etc.). In some embodiments, rules server 1091 automatically pushes the full driving restriction ruleset 1089 to validation server 1087. In some embodiments, in response to receiving full driving restriction ruleset 1089, validation server 1087 validates full driving restriction ruleset 1089 and generates a signed simplified ruleset 1085 (e.g., such as via method 1090 described above with respect to FIG. 10N).

In some embodiments, the signed simplified ruleset 1085 is transmitted to navigation server 1083. In some embodiments, navigation server 1083 stores and/or maintains the signed simplified ruleset 1085 and transmits the signed simplified ruleset 1085 (e.g., unmodified) to client electronic device 1081 (e.g., optionally in response to a request for the signed simplified ruleset 1085 from client electronic device 1081). In some embodiments, client electronic device 1081 issues a request for signed simplified ruleset 1085 periodically (e.g., every day, every 15 days, every 30 days, every 3 months, every 6 months, etc.). In some embodiments, client electronic device 1081 issues a request for signed simplified ruleset 1085 in response to a request, from a user, for suggested navigation routes. In some embodiments, in response to a request for suggested navigation routes, client electronic device 1081 sends a request for navigation directions (e.g., navigation routes) to navigation server 1083. In some embodiments, the request for navigation directions sent to the navigation server 1083 includes the anonymized license plate (e.g., that was generated via method 1060 described above with respect to FIGS. 10L-10M). In some embodiments, navigation server 1083 generates one or more navigation routes using the received license plate (e.g., anonymized license plate). In some embodiments, navigation server 1083 has access to the full driving restriction ruleset 1089 (e.g., navigation server 1083 receives full driving restriction ruleset 1089 from rules server 1091) and is able to determine whether the received license plate is prohibited or not prohibited from driving in a restriction region. In some embodiments, if the received license plate is prohibited from driving in the restricted region, navigation server 1083 optionally only provides navigation routes that avoid the restricted region to client electronic device 1083. In some embodiments, navigation server 1083 provides both routes that avoid the restricted region and routes that do not avoid the restricted region (optionally with an indication that the license plate provided to navigation server 1083 is prohibited from traveling along the routes that do not avoid the restricted region. In some embodiments, navigation server 1083 takes into account the time window for the restrictions in the driving restriction ruleset. For example, if respective driving restrictions only apply during business hours of business days (e.g., M-F from 8:00 AM to 5:00 PM), then navigation server 1083 provides routes that avoid the restricted region only if the request for routes is received within business hours (e.g., assuming the vehicle is prohibited). In some embodiments, the request for routes received from client electronic device 1083 indicates that time at which the vehicle is planning to travel and navigation server 1083 is able to determine whether the provided license plate is restricted during the planned travel time and provide the navigation routes accordingly.

FIG. 10P illustrates device 500 displaying one or more suggested routes that were received from a navigation server (e.g., such as navigation server 1083). As shown in FIG. 10P, the currently selected vehicle has a license plate number of "θB32F92", but has generated an anonymized license plate number "θQG62Y6", which was provided to the navigation server to generate customized routes. As shown in FIG. 10P, device 500 is displaying suggested routes 1071-1 and 1071-2. In some embodiments, suggested route 1071-1 is selected to avoid the driving restriction because the navigation server has determined that the user's license plate is prohibited from driving in the restricted region. In some embodiments, suggested route 1071-2 is selected without regard to the driving restriction. In some embodiments, device 500 receives suggested route 1071-2 from the navigation server as part of the original request for directions (e.g., which included the anonymized license plate) or as part of a separate request for directions (e.g., which did not include any license plate information, or which included a second anonymized license plate that was selected to not be prohibited from driving in the restricted region). Thus, as shown in FIG. 10P, device 500 is able to anonymize the user's license plate, transmit the anonymized license plate to a navigation server, receive one or more navigation routes from the navigation server that avoid a restricted region (e.g., if the user is prohibited) and display the one or more navigation routes for the user to view and select.

FIG. 11 is a flow diagram illustrating a method 1100 of anonymizing a vehicle identifier in accordance with some embodiments of the disclosure. The method 1100 is optionally performed at an electronic device such as device 100, device 300, and device 500 as described above with reference to FIGS. 1A-1B, 2-3, 4A-4B and 5A-5H. Some operations in method 1100 are, optionally combined and/or the order of some operations is, optionally, changed.

As described below, the method 1100 provides ways to anonymize a vehicle identifier. The method ensures that the user's personal information is protected and reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device 500 with one or more processors and memory (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) receives (1102), via a communication device (e.g., a communication subsystem, a wired or wireless communication subsystem, such as WiFi, ethernet, NFC, etc.), a set of rules associated with a driving restriction for a geographic area, such as driving restriction ruleset 1062 in FIG. 10L (e.g., receiving a set of rules that define which cars are prohibited from driving in a geographic area and/or which cars are not prohibited from driving in a geographic area).

In some embodiments, the set of rules is received from an external source (e.g., a navigation server, a rules server, etc.). In some embodiments, the set of rules are a simplified set of rules that indicate which digits of a license plate are relevant and define the sets of values for the relevant digits, optionally without defining whether vehicles with the respective set of values are or are not prohibited from driving in the restricted area (e.g., without defining the outcome or result of the sets of values). For example, the simplified set of rules can indicate that the last digit is relevant to the driving restriction (e.g., because the value of the last digit determines whether the car is prohibited or not prohibited) and that cars with an even last digit are treated differently than those whose last digits are an odd number. In some embodiments, the simplified rules indicate that the cars with the last digit being even or odd are prohibited or not prohibited (e.g., the rules define the outcome or result of the sets of values). In some embodiments, the simplified rules merely indicate that the even cars are in one group and the odd cars are in another group. Both embodiments are contemplated and can be processed by the method described herein. In some embodiments, the simplified set of rules can indicate that certain rules apply during certain time periods and don't apply during other time periods (e.g., the rules apply Monday through Friday during business hours, but not outside of these time periods). In some embodiments, multiple rules can exist and/or the rules can be nested (e.g., the result of one rule can determine whether to apply a second rule, etc.). In some embodiments, the simplified set of rules are simplified from a full set of rules. In some embodiments, the full set of rules are distilled by a server (e.g., navigation server, rules server, etc.) into the simplified set of rules before transmitting the rules to the electronic device. In some embodiments, the rules are received in response to a request by the electronic device. In some embodiments, the rules are received when the user requests navigation routes. In some embodiments, the rules are periodically received from the server (e.g., every 30 minutes, every hour, every 12 hours, every day, every week, every month, etc.).

In some embodiments, the electronic device determines (1104), such as at step 1064 in FIG. 10L, using the set of rules, one or more first portions of an identifier of a vehicle that are relevant to the driving restriction (1106), such as relevant portions 1068 in FIGS. 10L and 10M (e.g., determining the digits that are relevant to the driving restriction), wherein the identifier of the vehicle is stored on the electronic device, and the one or more first portions of the identifier are populated with one or more first values (e.g., the vehicle's license plate information is stored on the electronic device).

In some embodiments, a relevant digit is one whose value can affect the determination of whether the respective vehicle is prohibited or not prohibited. In the example given above in which a vehicle is prohibited if the last digit is even, but not prohibited if the last digit is odd, the device is able to determine from this rule that the last digit of a license plate is relevant to the driving restriction because the value of the last digit dictates whether the respective vehicle is prohibited or not prohibited from driving in a restricted region. In some embodiments, multiple digits can be determined to be relevant. For example, if the set of rules includes a first rule that asks whether the last digit is even or odd and a second rule that asks whether the first digit is between A-M or N-Z, then both the first and last digits of the license plate are relevant. In some embodiments, the vehicle's license plate information is provided by the user. In some embodiments, the vehicle's license plate information is automatically populated from information received from an external source, such as via the method described above with respect to method 900.

In some embodiments, the electronic device determines, using the set of rules, one or more second portions of the identifier of the vehicle that are not relevant to the driving restriction (1108), such as not relevant portions 1070 in FIGS. 10L and 10M (e.g., determining the digits that are not relevant to the driving restriction). In some embodiments, digits that are not relevant to the driving restriction are those that do not affect the determination of whether the respective vehicle is prohibited or not prohibited. For example, if the only rule in the set of rules asks whether the last digit is even or odd, then all other digits in a vehicle's license plate are not relevant to the driving restriction. In another example, if the set of rules includes a first rule that asks whether the last digit is even or odd and a second rule that asks whether the first digit is between A-M or N-Z, then the digits of the vehicle's license plate other than the first and last digit are not relevant to the driving restriction.

In some embodiments, the electronic device generates (1110) an anonymized identifier corresponding to the identifier of the vehicle, such as anonymized license plate "θQG62Y6" in FIG. 10M (e.g., based on the determination of the relevant digits and the digits that are not relevant, generate a license plate for a vehicle that is a proxy for the actual license plate with respect to the driving restriction that protects the user's actual license plate number from being sent out from the device), wherein the anonymized identifier includes one or more third portions corresponding to the one or more first portions, and one or more fourth portions corresponding to the one or more second portions (e.g., the anonymized license plate has digits that correspond to the determined relevant portions of a license plate and digits that correspond to the determined not relevant portions of the license plate).

In some embodiments, the anonymized identifier is generated every time a user requests navigation routes (and optionally is discarded after the request is completed). In some embodiments, the anonymized identifier is generated every time the device receives a set of driving restriction rules. In some embodiments, the anonymized identifier is generated every time the device receives an updated set of driving restriction rules (e.g., in accordance with a determination that the set of driving restriction rules have changed).

In some embodiments, generating the anonymized identifier includes selecting, for the one or more third portions, values selected from a first set of values that correspond to the one or more first values based on the set of rules, wherein the first set of values is a subset of a set of valid values for the one or more third portions (1112), such as selecting "Q" from the set of values including A-F and O-T and "6" from the set of values including 0-2, 4-7, and 9 in step 1076 of FIG. 10M (e.g., for the digits that have been determined to be relevant to the driving restriction, selecting a value from the set of values that are in the same group as the actual value of the respective license plate).

For example, if the rule asks whether the last digit is even or odd, then if the last digit of the user's actual license plate is odd, then the device selects an odd value as a proxy for the actual value for the last digit of the user's license plate. In some embodiments, selecting a value from the same group as the user's actual value allows the device to ensure that the anonymized license plate is still subject to the same restrictions as the user's actual license plate. In some embodiments, the selected value is a different value than the actual value of the respective digit of the user's license plate. In some embodiments, the selected value is the same value as the actual value of the respective digit of the user's license plate.

In some embodiments, generating the anonymized identifier includes selecting, for the one or more fourth portions, random values from a set of valid values for the one or more fourth portions (1114), such as selecting the values "θ" "G", "6", "2", and "Y" from the set of all valid values at step 1074 in FIG. 10M (e.g., for the digits that have been determined to not be relevant to the driving restriction, selecting a value from all valid license plate values (for the respective digits)).

In some embodiments, selecting the value includes randomly selecting a value from all valid license plate values. In some embodiments, the set of valid values for the respective digits are received from an external source (e.g., a navigation server, a rules server, etc.). In some embodiments, the selected value is a different value than the actual value of the respective digit of the user's license plate. In some embodiments, the selected value is the same value as the actual value of the respective digit of the user's license plate. In some embodiments, after selecting the values for the one or more third portions and the one or more fourth portions, the anonymized license plate is generated by combining the selected values into a single licensed plate. In some embodiments, the anonymized license plate has the same restricted state as the original license plate. For example, if the original license plate would otherwise have been prohibited from driving in the restriction zone, then the anonymized license plate is also prohibited from driving in the restriction zone (and vice versa). Thus, the anonymized license plate has the same restriction state as the actual license plate. In some embodiments, ensuring that the anonymized license plate has the same restriction state as the actual license plate ensures that the anonymized license plate is treated similarly as the actual license plate when requesting navigation routes from a navigation server. For example, if the navigation server receives a license plate with the request for navigation routes and determines the available routes for the vehicle based on whether the license plate is prohibited or not prohibited from the restricted region, providing the navigation server with an anonymized license plate that is also prohibited from driving in the restricted region (e.g., if the actual license plate is prohibited from the restricted region) ensures that the navigation server provides the same or similar navigation routes as if the device had provided the vehicle's actual license plate, without requiring the device to transmit the user's actual license plate away from the device.

In some embodiments, the electronic device transmits (1116), via the communication device, the anonymized identifier to a routing server for generating a driving route in the geographic area, wherein the identifier of the vehicle is not transmitted to a destination external to the electronic device, including the routing server, such as the request for navigation directions 1077 in FIG. 10O (e.g., transmitting the anonymized license plate to a routing server that determines, based on the provided license plate, the routes that are available for the respective vehicle).

In some embodiments, the anonymized identifier is transmitted with a request to provide routes from a first geographic location to a second geographic location. Thus, in some embodiments, after transmitting the anonymized identifier, the device receives, from the routing server, one or more potential driving routes from the first geographic location to the second geographic location. In some embodiments, requesting navigation routes from the routing server includes transmitting the anonymized license plate, and origin and destination location information. In some embodiments, in response to requesting the navigation routes, the device receives, from the navigation server, one or more navigation routes (optionally selected based on whether the anonymized license plate is prohibited or not prohibited from driving in the restricted region). In some embodiments, the one or more potential driving routes can be selected by the routing server to avoid the respective driving restriction if the received identifier indicates that the user's vehicle is prohibited from driving in the restricted region. In some embodiments, the one or more driving routes received from the routing server can be displayed in a map user interface, similar to described above with respect to method 700. In some embodiments, the routing server only provides routes that are not prohibited by the driving restriction. Thus, in some embodiments, the device performs the above anonymizing method twice: once to generate routes for a restricted vehicle (e.g., an anonymized identifier that falls within one group of identifiers that results in routes that avoid the restriction), and once to generate routes for an unrestricted vehicle (e.g., an anonymized identifier that falls within the other group of identifiers that results in routes that ignore the restriction) to provide the user with the option of avoiding the restriction or ignoring the restriction, as described above with respect to method 700. In some embodiments, the anonymized identifier is generated every time the user requests routes that are affected by a driving restriction. In some embodiments, the anonymized identifier is generated every time a new set of rules is received (e.g., the device optionally determines whether the new set of rules is different than the previous set of rules and generates a new anonymized identifier accordingly). In some embodiments, the vehicle's original license plate number is not transmitted away from the electronic device as part of the process to determine navigation routes. In some embodiments, the vehicle's original license plate number is never transmitted away from the electronic device as a part of any map or navigation process.

The above-described manner of requesting routes from a routing server for a particular vehicle (e.g., by anonymizing the vehicle's license plate based on a set of driving restriction rules and transmitting the anonymized license plate to the routing server to generate potential routes) provides a quick and efficient way of obtaining applicable driving routes without jeopardizing the privacy of the user of the electronic device or vehicle, which simplifies the interaction between the user and the electronic device and enhances the operability of the electronic device and makes the user-device interface more efficient (e.g., by protecting the user's privacy by automatically anonymizing the user's license plate, without requiring the user to manually anonymize the vehicle's license plate before transmission to the routing server), which additionally reduces power usage and improves battery life of the electronic device by enabling the user to use the electronic device more quickly and efficiency while reducing errors in the usage of the device.

In some embodiments, the identifier of the vehicle is a license plate number of the vehicle, such as license plate number "θB32F92" illustrated in FIG. 10L (e.g., the respective driving restriction is based on the license plate number of the vehicle). For example, if a driving restriction ruleset indicates that if a vehicle's license plate matches certain criteria, the vehicle is prohibited from driving in a restricted region and if the vehicle's license plate does not match the criteria, the vehicle is not prohibited from driving in the restricted region. In some embodiments, the identifier can be other types of identifiers (e.g., unique or not unique). For example, if the respective driving restriction is based on a color of the vehicle, then the identifier is the vehicle's color. In another example, if the respective driving restriction is based on the type of vehicle (e.g., sedan, SUV, truck, minivan, semi-trailer truck, etc.), then the identifier is the type of vehicle. In some embodiments, the identifier includes a vehicle identification number (VIN). In some embodiments, the identifier includes the fuel or power type of the vehicle (e.g., gas vehicle, hybrid vehicle, plug-in hybrid vehicle, electric vehicle, etc.).

The above-described manner of requesting routes from a routing server for a particular vehicle (e.g., by anonymizing the vehicle's license plate based on a set of driving restriction rules and transmitting the anonymized license plate to the routing server to generate potential routes) provides a quick and efficient way of obtaining applicable driving routes without jeopardizing the privacy of the user of the electronic device or vehicle, which simplifies the interaction between the user and the electronic device and enhances the operability of the electronic device and makes the user-device interface more efficient (e.g., by protecting the user's privacy by automatically anonymizing the user's license plate, without requiring the user to manually anonymize the vehicle's license plate before transmission to the routing server), which additionally reduces power usage and improves battery life of the electronic device by enabling the user to use the electronic device more quickly and efficiency while reducing errors in the usage of the device.

In some embodiments, the electronic device determines that a respective portion of the one or more first portions cannot be changed, such as in step 1072 in FIG. 10L (e.g., determining that the driving restriction requires that a respective digit of the license plate not be anonymized). In some embodiments, a respective digit of the license plate cannot be anonymized if the determined set of valid values for the respective digit only includes one value (e.g., the value of the respective digit of the actual license plate). For example, if a respective digit (e.g., the first digit) of a license plate is an indicator of the region in which the vehicle is registered, then a respective rule that asks whether the vehicle is registered in a particular region results in a determination that the first digit of the license plate cannot be anonymized (if, for example, the first digit of the actual license plate indicates that the vehicle is indeed registered in the particular region).

In some embodiments, generating the anonymized identifier further includes selecting, for a respective portion of the one or more third portions corresponding to the one or more first portions, a value of the respective portion of the one or more first portions, such as in step 1076 in FIG. 10L (e.g., if the driving restriction requires that a respective digit of the license plate cannot be anonymized or masked, then the respective digit for the anonymized license plate has the same value as the original license plate).

For example, if a rule asks whether the first digit is an "A" or not an "A", and the first digit of vehicle's original license plate is an "A", then the set of valid values for the first digit only includes the value "A" and thus, the resulting anonymized license plate has "A" for its first digit. Thus, in some embodiments, depending on the rules in the driving restriction ruleset, one or more digits of the license plate can have the same value as the original license plate. In some embodiments, the other digits of the license plate that do not result in a set of valid values of just one value are able to be anonymized as described above (e.g., which optionally results in an anonymized digit that are different value than the original license plate).

The above-described manner of anonymizing the identifier of the vehicle (e.g., by selecting the same value as the original license plate if a driving restriction requires that a respective digit not be changed) provides a quick and efficient way of obtaining applicable driving routes without jeopardizing the privacy of the user of the electronic device or vehicle (e.g., by maintaining the same restriction state as the original license plate, including maintaining the same value for respective digits of the license plate if the driving restriction requires it), which simplifies the interaction between the user and the electronic device and enhances the operability of the electronic device and makes the user-device interface more efficient (e.g., by protecting the user's privacy by automatically anonymizing the user's license plate, without requiring the user to manually anonymize the vehicle's license plate before transmission to the routing server), which additionally reduces power usage and improves battery life of the electronic device by enabling the user to use the electronic device more quickly and efficiency while reducing errors in the usage of the device.

In some embodiments, the set of rules includes a first rule that defines a first set of values for a first respective portion of the identifier (e.g., a first rule defines a first set of values for a respective portion of the identifier (e.g., a respective digit of a license plate) that have a first driving restriction result) and a second set of values, different from the first set of values, for the first respective portion of the identifier, such as the first rule in driving restriction ruleset 1062 in FIG. 10M that defines a first set of values that includes "3" and "8" and a second set of values that includes 0-2, 4-7, and 9 (e.g., the first rule defines a second set of values for the respective portion of the identifier (e.g., the respective digit of a license plate) that have a second driving restriction result, different from the first driving restriction result).

In some embodiments, the first rule defines a first set of values that are prohibited from driving. In some embodiments, the set of rules do not indicate whether the first set of values results in a prohibition or not. In some embodiments, the set of rules indicate that the first set of values exist and are optionally treated differently than the second set of values. In some embodiments, the first rule defines a second set of values that are not prohibited from driving. In some embodiments, the set of rules do not indicate whether the second set of values results in a prohibition or not. In some embodiments, the set of rules indicate that the second set of values exist and are optionally treated differently than the first set of values.

In some embodiments, determining, using the set of rules, the one or more first portions of the identifier of the vehicle that are relevant to the driving restriction includes determining that the first rule defines the first and second sets of values for the first respective portion of the identifier, such as step 1064 in FIG. 10M (e.g., if the set of rules includes a rule that defines two sets of valid values (optionally indicating that the two sets of values are treated differently) for a respective digit of a license plate, then the device determines that the respective digit of the license plate is relevant to the driving restriction). For example, because two sets of potential values exist for a respective digit of a license plate, and the two values are treated different, then the value of the respective digit is informative of whether the respective license plate is prohibited or not prohibited (e.g., the respective digit dictates the result or is a factor in determining the result).

The above-described manner of determining relevant portions of an identifier (e.g., by determining whether a set of rules defines two sets of values for a respective portion of the identifier that are treated differently) provides a quick and efficient way of determining the relevant portions of an identifier from a set of driving restriction rules (e.g., by analyzing whether the rules create different groups of values), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency while reducing errors in the usage of the device.

In some embodiments, receiving the set of rules associated with the driving restriction for a geographic area includes receiving the set of rules from a rules validation server, such as signed simplified ruleset 1085 and 1079 in FIG. 10O (e.g., the set of rules is validated (e.g., by a rules validation server) to determine whether the set of rules are genuine or whether the set of rules potentially violate the privacy of the user).

In some embodiments, if the validation server validates the set of rules, then the validation server generates a set of rules to provide the electronic device (e.g., either by transmitting the set of rules directly to the electronic device or transmitting the set of rules to a navigation server, which then transmits the set of rules to the electronic device). In some embodiments, the set of rules generated by the validation server is a signed (e.g., certified and/or encrypted) version of the original set of rules (e.g., the set of rules from the rules server). In some embodiments, the set of rules generated by the validation server is a simplified set of rules based on the original set of rules.

In some embodiments, the set of rules is generated from a full set of rules associated with the driving restriction for the geographic area, such as full driving restriction ruleset 1089 in FIG. 10O (e.g., the validation server receives the full set of rules from a rules server or any suitable rules repository) and indicates the one or more portions of the identifier of the vehicle that are relevant to the driving restriction and the valid sets of values for the one or more portions of the identifier of the vehicle without indicating whether the identifier of the vehicle is or it not restricted by the driving restriction (e.g., the set of values defines the relevant portions of the license plate and the sets of values for the respective relevant portions).

In some embodiments, the full set of rules defines the criteria in which a vehicle is prohibited from driving in a restricted region. For example, the full set of rules can indicate that if the last digit of a license plate is even, then the vehicle is prohibited from driving in the restricted region, and if the last digit of the license plate is odd, then the vehicle is not prohibited from driving in the restricted region. In some embodiments, the validation server determines, based on the full set of rules, the digits of the license plate that are relevant to the driving restriction and the digits of the license plate that are not relevant to the driving restriction.

In some embodiments, the validation server, based on the full set of rules, determines a first set of values for a respective relevant digit of the license plate that are prohibited from driving in the restricted region and a second set of values for the respective relevant digit of the license plate that are not prohibited from driving in the restricted region. For example, if the full set of rules can indicate that if the last digit of a license plate is even, then the vehicle is prohibited from driving in the restricted region, and if the last digit of the license plate is odd, then the vehicle is not prohibited from driving in the restricted region, then the validation server generates a first set of values that includes even values and a second set of values that includes odd values. Thus, the first set of values (e.g., even values) include the values that are prohibited from driving, whereas the second set of values (e.g., odd values) include the values that are not prohibited from driving. In some embodiments, the set of values include only values that are valid for the respective digit of the license plate. For example, if the last digit of a license plate can only be numbers and not letters, the sets of values only include numbers and does not include letters. In some embodiments, after determining the sets of values, the validation server generates a simplified set of rules based on the full set of rules. In some embodiments, the simplified set of rules indicates which digits of a license plate are relevant (e.g., the last digit in the example provided above), and the sets of values determined above. In some embodiments, the simplified set of rules do not indicate whether a respective set of values are of values that are prohibited or are of values that are not prohibited (e.g., the simplified rules define the groups, but not whether the groups are or are not prohibited). In some embodiments, the simplified set of rules do indicate whether a respective set of values are of values that are prohibited or are of values that are not prohibited. In some embodiments, the simplified set of rules are generated only after the validation server has determined that the full set of rules do not violate a set of privacy criteria, as will be described in further detail below. In some embodiments, the validation server digitally signs the simplified set of rules (e.g., optionally with a private key associated with the validation server) to authenticate that the simplified set of rules originated from the validation server. In some embodiments, the signed and/or encrypted simplified set of rules are then provided to the electronic device (e.g., optionally via the navigation server).

The above-described manner of receiving a simplified set of rules (e.g., from a rules validation server, which validates the rules and generates the simplified set of rules from a full set of rules) provides a quick and efficient way of distilling the rules into a set that is easily consumable by an electronic device (e.g., by compiling together only the information required to anonymize a license plate), which simplifies the interaction between the user and the electronic device and enhances the operability of the electronic device and makes the user-device interface more efficient (e.g., by pre-compiling the simplified set of rules from the full set of rules and providing the simplified set of rules to client devices, without requiring each client device to process the full set of rules), which additionally reduces power usage and improves battery life of the electronic device by enabling the user to use the electronic device more quickly and efficiency while reducing errors in the usage of the device.

In some embodiments, the rules validation server determines whether the full set of rules satisfies one or more criteria, such as step 1094 in FIG. 10N (e.g., the validation server determines whether the full set of rules risks violating the privacy of a user).

For example, the full set of rules indicates that every digit is relevant, then the criteria is optionally not satisfied because selecting from a small set of values for every digit potentially does not anonymize the user's license plate enough. In another example, if the full set of rules results in sets of valid values for a threshold number of digits with less than threshold number of values (e.g., 60%, 75%, 80%, 90% of the digits have sets of value values with less than 2, 3, 4, etc. valid values), than the criteria is optionally not satisfied. In some embodiments, the full set of rules satisfies the one or more criteria if there is no risk that the set of rules would violate the user's privacy. In some embodiments, the rules validation server determines whether the full set of rules is not genuine (e.g., if the full set of rules have an incorrect format, if the full set of rules are not authentically signed by the rules repository or rules server). Thus, in some embodiments, the full set of rules satisfies the one or more criteria if there is no indication that the full set of rules are not genuine.

In some embodiments, in accordance with a determination that the full set of rules satisfies the one or more criteria, the rules validation server signs the generated set of rules to be transmitted to the electronic device, such as step 1095 in FIG. 10N (e.g., the rules validation server digitally signs and/or encrypts the simplified set of rules optionally using the private key of the rules validation server), wherein the electronic device is able to decrypt the generated set of rules (e.g., the client device has access to a public key of the rules validation server and is able to decrypt the simplified set of rules using the public key of the rules validation server).

In some embodiments, successfully decrypting the simplified set of rules indicates that the simplified set of rules are authentic. In some embodiments, the decryption process can include multiple communication transactions (e.g., including generation and/or transmission of a temporary session key, etc.). In some embodiments, the signed simplified set of rules is provided directly to the client electronic device. In some embodiments, the signed simplified set of rules is provided to the navigation server (which optionally then provides the signed simplified rules to the client device).

In some embodiments, in accordance with a determination that the full set of rules does not satisfy the one or more criteria, the rules validation server forgoes signing the generated set of rules, such as step 1099 in FIG. 10N (e.g., if the full set of rules do not satisfy the one or more criteria, the full set of rules are not validated and are rejected by the rules validation server).

In some embodiments, the rules validation server does not generate the simplified set of rules. In some embodiments, the rules validation server discards the simplified set of rules without signing, encrypting, or otherwise transmitting the simplified set of rules to a client device. In some embodiments, performing validation of the rules and signing the validated rules ensures that the rules provided to and received by the client device are authentic and do not violate any validation criteria. This process optionally also ensures that the rules have not been maliciously altered along the way. In some embodiments, the above-described validation method is performed on a client device (e.g., additionally or alternatively to validation by the rules validation server) in response to receiving a set of rules (e.g., full set of rules or simplified set of rules).

The above-described manner of generating a simplified set of rules (e.g., by determining whether the full set of rules violates or satisfies certain criteria, then generating and signing a set of simplified rules based on the full set of rules) provides a quick and efficient way of validating the driving restriction rules, which simplifies the interaction between the user and the electronic device and enhances the operability of the electronic device and makes the user-device interface more efficient (e.g., by automatically determining whether the rules should be provided to client devices and thus protecting client devices from potentially malicious rules, without requiring each client device to separately determine whether the rules violate certain criteria), which additionally reduces power usage and improves battery life of the electronic device by enabling the user to use the electronic device more quickly and efficiency while reducing errors in the usage of the device.

In some embodiments, after transmitting the anonymized identifier to the routing server, the electronic device receives, from the routing server, one or more suggested routes based on the anonymized identifier, such as suggested routes 1075 in FIG. 10O (e.g., the anonymized license plate is provided to a routing server or navigation server that determines one or more navigation routes).

In some embodiments, the routing or navigation server has access to the full driving restriction ruleset and determines, based on the anonymized license plate, whether the user's vehicle is prohibited or not prohibited from driving in a restricted region. Based on this determination, the routing server optionally determines the routes that avoid the restricted region (e.g., if the anonymized license plate indicates that the user's vehicle is prohibited) and provides those routes to the electronic device. In some embodiments, the routing server determines routes that do not avoid the restriction and provides those routes to the electronic device, optionally with an indication that the user's vehicle may be prohibited from driving along the route. In some embodiments, the routing server optionally determines that user's vehicle is not prohibited from driving in the restricted region (e.g., if the anonymized license plate indicates that the user's vehicle is not prohibited) and provides, to the device, one or more routes that are selected without regard to the restricted region (e.g., is not expressly selected to avoid the restricted region). In some embodiments, if the user's license plate is prohibited from driving in the restricted region, the above-described anonymization process is performed multiple times to generate a first license plate that is prohibited from driving in the restricted region to receive navigation routes that avoid the restricted region, and a second license plate that is not prohibited from driving in the restricted region to receive navigation routes that are selected without regard to the restricted region. In some embodiments, the electronic device displays both routes that avoid a restricted region and routes that do not avoid the restricted region, similar to the process described above in method 700.

The above-described manner of generating navigation routes (e.g., by anonymizing the user's license plate and providing the anonymized license plate to a routing server to generate navigation routes) provides a quick and efficient way of generating navigation routes, which simplifies the interaction between the user and the electronic device and enhances the operability of the electronic device and makes the user-device interface more efficient (e.g., by protecting the user's privacy by automatically anonymizing the user's license plate when requesting navigation routes, without requiring the user to manually anonymize the vehicle's license plate before transmission to the routing server), which additionally reduces power usage and improves battery life of the electronic device by enabling the user to use the electronic device more quickly and efficiency while reducing errors in the usage of the device.

It should be understood that the particular order in which the operations in FIG. 11 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700 and 900) are also applicable in an analogous manner to method 1100 described above with respect to FIG. 11. For example, the operation of the electronic device anonymizing a vehicle identifier described above with reference to method 1100 optionally has one or more of the characteristics of displaying customized navigation routes, receiving information about characteristics of respective vehicles, etc., described herein with reference to other methods described herein (e.g., methods 700 and 900). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5B) or application specific chips. Further, the operations described above with reference to FIG. 11 are, optionally, implemented by components depicted in FIGS. 1A-1B. For example, receiving operation 1102, determining operation 1104, generating operation 1110, and transmitting operation 1116 are, optionally, implemented by event sorter 170, event recognizer 180, and event handler 190. Event monitor 171 in event sorter 170 detects a contact on touch-sensitive surface 504, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the display of device location information to users. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, license plate numbers, or any other personal information.

The present disclosure recognizes that the use of such personal information data, in the present technology, can be used to the benefit of users. For example, the personal information data can be used to display the user's current location, display the user's favorite or recently visited locations, and/or provide suggested navigation routes. Accordingly, use of such personal information data enables users to have more information about the user's or the device's location. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to enable customized navigation routes. In yet another example, users can select to limit the sharing of the device's location information or entirely block the display of customized routes or license plate information. In addition to providing "opt in" and "opt out" options, the present disclosure contemplates providing notifications relating to the access or use of personal information. For instance, a user may be notified upon displaying the map application that the characteristics of their vehicle (e.g., license plate number) will be used and then reminded again before customized routes are determined and/or displayed.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, location information can be generated and delivered to users based on non-specific information data or a bare minimum amount of identifying information, such as the determination of suggested routes based on the average driving range of vehicles similar to the user's vehicles.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users, such as by anonymizing a vehicle's license plate as described above with respect to method 1100.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display generation component:
displaying, via the display generation component, a map user interface of a map application;
while displaying the map user interface of the map application, receiving, via one or more input devices, a user input corresponding to a request for directions from a first location to a second location, wherein the directions are associated with a geographic area;
receiving, via a communication device associated with the electronic device with one or more processors and memory, a set of rules associated with a driving restriction for the geographic area;
determining, using the set of rules:
one or more first portions of an identifier of a vehicle that are relevant to the driving restriction, wherein the identifier of the vehicle is stored on the electronic device, and the one or more first portions of the identifier are populated with one or more first values; and
one or more second portions of the identifier of the vehicle that are not relevant to the driving restriction;
generating an anonymized identifier corresponding to the identifier of the vehicle, wherein the anonymized identifier includes one or more third portions corresponding to the one or more first portions, and one or more fourth portions corresponding to the one or more second portions, and wherein generating the anonymized identifier includes:
selecting, for the one or more third portions, values selected from a first set of values that correspond to the one or more first values based on the set of rules, wherein the first set of values is a subset of a set of valid values for the one or more third portions; and
selecting, for the one or more fourth portions, random values from a set of valid values for the one or more fourth portions;
in response to receiving the user input corresponding to the request for directions from the first location to the second location, transmitting, via the communication device, the anonymized identifier to a routing server for generating one or more driving routes in the geographic area from the first location to the second location, wherein the identifier of the vehicle is not transmitted to a destination external to the electronic device, including the routing server; and
after transmitting the anonymized identifier to the routing server, receiving, from the routing server, information corresponding to the one or more driving routes based on the anonymized identifier and displaying, via the display generation component, the map user interface of the map application including one or more visual indicators of the one or more driving routes, wherein the one or more driving routes are based on the anonymized identifier.

2. The method of claim 1, wherein the identifier of the vehicle is a license plate number of the vehicle.

3. The method of claim 1, further comprising:
determining that a respective portion of the one or more first portions cannot be changed, wherein generating the anonymized identifier further includes:
selecting, for a respective portion of the one or more third portions corresponding to the one or more first portions, a value of the respective portion of the one or more first portions.

4. The method of claim 1, wherein:
the set of rules includes a first rule that defines a first set of values for a first respective portion of the identifier and a second set of values, different from the first set of values, for the first respective portion of the identifier; and
determining, using the set of rules, the one or more first portions of the identifier of the vehicle that are relevant to the driving restriction includes determining that the first rule defines the first and second sets of values for the first respective portion of the identifier.

5. The method of claim 1, wherein:
receiving the set of rules associated with the driving restriction for a geographic area includes receiving the set of rules from a rules validation server, and
the set of rules is generated from a full set of rules associated with the driving restriction for the geographic area and indicates the one or more portions of the identifier of the vehicle that are relevant to the driving restriction and the set of valid values for the one or more portions of the identifier of the vehicle without indicating whether the identifier of the vehicle is or it not restricted by the driving restriction.

6. The method of claim 5, wherein:
the rules validation server determines whether the full set of rules satisfies one or more criteria,
in accordance with a determination that the full set of rules satisfies the one or more criteria, the rules validation server signs the generated set of rules to be transmitted to the electronic device, wherein the electronic device is able to decrypt the generated set of rules, and
in accordance with a determination that the full set of rules does not satisfy the one or more criteria, the rules validation server forgoes signing the generated set of rules.

7. An electronic device, comprising:
one or more processors;
memory; and
one or more programs, wherein the one or more programs are stored in the memory and configured to be executed by the one or more processors, the one or more programs including instructions for:
displaying, via a display generation component, a map user interface of a map application;
while displaying the map user interface of the map application, receiving, via one or more input devices, a user input corresponding to a request for directions from a first location to a second location, wherein the directions are associated with a geographic area;
receiving, via a communication device, a set of rules associated with a driving restriction for the geographic area;
determining, using the set of rules:
one or more first portions of an identifier of a vehicle that are relevant to the driving restriction, wherein the identifier of the vehicle is stored on the electronic device, and the one or more first portions of the identifier are populated with one or more first values; and
one or more second portions of the identifier of the vehicle that are not relevant to the driving restriction;
generating an anonymized identifier corresponding to the identifier of the vehicle, wherein the anonymized identifier includes one or more third portions corresponding to the one or more first portions, and one or more fourth portions corresponding to the one or more second portions, and wherein generating the anonymized identifier includes:
selecting, for the one or more third portions, values selected from a first set of values that correspond to the one or more first values based on the set of rules, wherein the first set of values is a subset of a set of valid values for the one or more third portions; and
selecting, for the one or more fourth portions, random values from a set of valid values for the one or more fourth portions;
in response to receiving the user input corresponding to the request for directions from the first location to the second location, transmitting, via the communication device, the anonymized identifier to a routing server for generating one or more driving routes in the geographic area from the first location to the second location, wherein the identifier of the vehicle is not transmitted to a destination external to the electronic device, including the routing server; and
after transmitting the anonymized identifier to the routing server, receiving, from the routing server, information corresponding to the one or more driving routes based on the anonymized identifier and displaying, via the display generation component, the map user interface of the map application including one or more visual indicators of the one or more driving routes, wherein the one or more driving routes are based on the anonymized identifier.

8. The electronic device of claim 7, wherein the identifier of the vehicle is a license plate number of the vehicle.

9. The electronic device of claim 7, the instructions further for:
determining that a respective portion of the one or more first portions cannot be changed, wherein generating the anonymized identifier further includes:
selecting, for a respective portion of the one or more third portions corresponding to the one or more first portions, a value of the respective portion of the one or more first portions.

10. The electronic device of claim 7, wherein:
the set of rules includes a first rule that defines a first set of values for a first respective portion of the identifier and a second set of values, different from the first set of values, for the first respective portion of the identifier; and
determining, using the set of rules, the one or more first portions of the identifier of the vehicle that are relevant to the driving restriction includes determining that the first rule defines the first and second sets of values for the first respective portion of the identifier.

11. The electronic device of claim 7, wherein:
receiving the set of rules associated with the driving restriction for a geographic area includes receiving the set of rules from a rules validation server, and
the set of rules is generated from a full set of rules associated with the driving restriction for the geographic area and indicates the one or more portions of the identifier of the vehicle that are relevant to the driving restriction and the set of valid values for the one or more portions of the identifier of the vehicle without indicating whether the identifier of the vehicle is or it not restricted by the driving restriction.

12. The electronic device of claim 11, wherein:
the rules validation server determines whether the full set of rules satisfies one or more criteria,
in accordance with a determination that the full set of rules satisfies the one or more criteria, the rules validation server signs the generated set of rules to be transmitted to the electronic device, wherein the electronic device is able to decrypt the generated set of rules, and
in accordance with a determination that the full set of rules does not satisfy the one or more criteria, the rules validation server forgoes signing the generated set of rules.

13. A non-transitory computer readable storage medium storing one or more programs, the one or more programs comprising instructions, which when executed by one or more processors of an electronic device, cause the electronic device to perform a method comprising:

displaying, via a display generation component, a map user interface of a map application;

while displaying the map user interface of the map application, receiving, via one or more input devices, a user input corresponding to a request for directions from a first location to a second location, wherein the directions are associated with a geographic area;

receiving, via a communication device, a set of rules associated with a driving restriction for the geographic area;

determining, using the set of rules:

one or more first portions of an identifier of a vehicle that are relevant to the driving restriction, wherein the identifier of the vehicle is stored on the electronic device, and the one or more first portions of the identifier are populated with one or more first values; and one or more second portions of the identifier of the vehicle that are not relevant to the driving restriction;

generating an anonymized identifier corresponding to the identifier of the vehicle, wherein the anonymized identifier includes one or more third portions corresponding to the one or more first portions, and one or more fourth portions corresponding to the one or more second portions, and wherein generating the anonymized identifier includes:

selecting, for the one or more third portions, values selected from a first set of values that correspond to the one or more first values based on the set of rules, wherein the first set of values is a subset of a set of valid values for the one or more third portions; and selecting, for the one or more fourth portions, random values from a set of valid values for the one or more fourth portions;

in response to receiving the user input corresponding to the request for directions from the first location to the second location, transmitting, via the communication device, the anonymized identifier to a routing server for generating one or more driving routes in the geographic area from the first location to the second location, wherein the identifier of the vehicle is not transmitted to a destination external to the electronic device, including the routing server; and after transmitting the anonymized identifier to the routing server, receiving, from the routing server, information corresponding to the one or more driving routes based on the anonymized identifier and displaying, via a display generation component, the map user interface of the map application including one or more visual indicators of the one or more driving routes, wherein the one or more driving routes are based on the anonymized identifier.

14. The non-transitory computer readable storage medium of claim 13, wherein the identifier of the vehicle is a license plate number of the vehicle.

15. The non-transitory computer readable storage medium of claim 13, the method further comprising:

determining that a respective portion of the one or more first portions cannot be changed, wherein generating the anonymized identifier further includes:

selecting, for a respective portion of the one or more third portions corresponding to the one or more first portions, a value of the respective portion of the one or more first portions.

16. The non-transitory computer readable storage medium of claim 13, wherein:

the set of rules includes a first rule that defines a first set of values for a first respective portion of the identifier and a second set of values, different from the first set of values, for the first respective portion of the identifier; and determining, using the set of rules, the one or more first portions of the identifier of the vehicle that are relevant to the driving restriction includes determining that the first rule defines the first and second sets of values for the first respective portion of the identifier.

17. The non-transitory computer readable storage medium of claim 13, wherein:

receiving the set of rules associated with the driving restriction for a geographic area includes receiving the set of rules from a rules validation server, and the set of rules is generated from a full set of rules associated with the driving restriction for the geographic area and indicates the one or more portions of the identifier of the vehicle that are relevant to the driving restriction and the set of valid values for the one or more portions of the identifier of the vehicle without indicating whether the identifier of the vehicle is or it not restricted by the driving restriction.

18. The non-transitory computer readable storage medium of claim 17, wherein:

the rules validation server determines whether the full set of rules satisfies one or more criteria, in accordance with a determination that the full set of rules satisfies the one or more criteria, the rules validation server signs the generated set of rules to be transmitted to the electronic device, wherein the electronic device is able to decrypt the generated set of rules, and in accordance with a determination that the full set of rules does not satisfy the one or more criteria, the rules validation server forgoes signing the generated set of rules.

\* \* \* \* \*